US012422530B2

(12) United States Patent
Nakamae et al.

(10) Patent No.: US 12,422,530 B2
(45) Date of Patent: Sep. 23, 2025

(54) RANGING DEVICE AND RANGING METHOD

(71) Applicant: Miraxia Edge Technology Corporation, Kyoto (JP)

(72) Inventors: Nobutaka Nakamae, Osaka (JP); Yuki Minami, Osaka (JP); Wataru Matsumoto, Osaka (JP); Mitsuhiko Otani, Hyogo (JP); Junichi Matsuo, Osaka (JP); Takuya Asano, Hyogo (JP); Haruka Takano, Osaka (JP); Shigeru Saitou, Kyoto (JP); Shinzo Koyama, Osaka (JP); Toshiya Fujii, Shiga (JP)

(73) Assignee: MIRAXIA EDGE TECHNOLOGY CORPORATION, Kyoto (JP)

( * ) Notice: Subject to any disclaimer, the term of this patent is extended or adjusted under 35 U.S.C. 154(b) by 821 days.

(21) Appl. No.: 17/772,026

(22) PCT Filed: Oct. 30, 2020

(86) PCT No.: PCT/JP2020/040870

§ 371 (c)(1),
(2) Date: Apr. 26, 2022

(87) PCT Pub. No.: WO2021/085612

PCT Pub. Date: May 6, 2021

(65) Prior Publication Data

US 2022/0365182 A1 Nov. 17, 2022

(30) Foreign Application Priority Data

Nov. 1, 2019 (JP) ................................ 2019-200085
Nov. 19, 2019 (JP) ................................ 2019-209169

(51) Int. Cl.
*G01S 7/4865* (2020.01)
*G01S 17/10* (2020.01)
*G01S 17/894* (2020.01)

(52) U.S. Cl.
CPC ............ *G01S 7/4865* (2013.01); *G01S 17/10* (2013.01); *G01S 17/894* (2020.01)

(58) Field of Classification Search
CPC ...... G01S 7/4865; G01S 17/10; G01S 17/894; G01S 7/4868; G01S 17/18; G01S 17/89; G01C 3/06
See application file for complete search history.

(56) References Cited

U.S. PATENT DOCUMENTS 4,854,698 A 8/1989 Schmidt
10,151,835 B2 * 12/2018 Ito .......................... G01S 17/87
(Continued)

FOREIGN PATENT DOCUMENTS

CN 103438863 A 12/2013
JP 2004-294420 A 10/2004
(Continued)

OTHER PUBLICATIONS

International Search Report issued on Dec. 1, 2020 issued in International Patent Application No. PCT/JP2020/040870, with English translation.
(Continued)

*Primary Examiner* — Seung C Sohn
(74) *Attorney, Agent, or Firm* — Rimon P.C.

(57) ABSTRACT

A ranging device includes: a pulse generator; a controller that controls the pulse generator according to n (n is an integer greater than or equal to 4) types of packet generation codes indicating whether or not to expose or emit light in each of unit segments corresponding to distance segments into which a ranging range is divided; a light source; a
(Continued)

solid-state image capturer; and a distance calculator that calculates the distance based on n types of signal values per unit segment obtained from the solid-state image capturer.

30 Claims, 116 Drawing Sheets

(56) References Cited

U.S. PATENT DOCUMENTS

| | | | | |
|---|---|---|---|---|
| 11,906,669 | B2 * | 2/2024 | Nagata | G01S 7/4865 |
| 2006/0192938 | A1 | 8/2006 | Kawahito | |
| 2011/0157354 | A1 | 6/2011 | Kawahito | |
| 2018/0053799 | A1 | 2/2018 | Otani et al. | |
| 2018/0149752 | A1 | 5/2018 | Tadano | |
| 2018/0329063 | A1 | 11/2018 | Takemoto et al. | |
| 2020/0025932 | A1 | 1/2020 | Saitou et al. | |
| 2021/0033730 | A1 | 2/2021 | Saitou et al. | |

FOREIGN PATENT DOCUMENTS

| | | | |
|---|---|---|---|
| JP | 2010-032425 | A | 2/2010 |
| JP | 2017-146155 | A | 8/2017 |
| JP | 2018-169336 | A | 2/2018 |
| JP | 2019-209169 | A | 12/2019 |
| WO | 2016/133053 | A1 | 8/2016 |
| WO | 2016/189808 | A1 | 12/2016 |
| WO | 2017/141957 | A1 | 8/2017 |
| WO | 2019/181518 | A1 | 9/2019 |
| WO | 2019/186838 | A1 | 10/2019 |

OTHER PUBLICATIONS

Japanese Office Action dated Feb. 6, 2024 issued in the corresponding Japanese Patent Application No. 2021-553728.

* cited by examiner

FIG. 5

| | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|
| 10500 | Segment number (decimal) | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 10501 | Packet 1 generation code | 1 | 0 | 0 | 0 | 1 | 0 | 1 | 0 | 1 | 0 | 0 | 0 | 1 | 0 | 0 | 1 | 0 | 0 | 1 | 0 | 0 | 0 | 0 | 1 | 1 | 0 | 0 | 1 | 0 | 0 | 1 | 1 |
| 10502 | Packet 2 generation code | 0 | 1 | 0 | 0 | 0 | 1 | 0 | 0 | 1 | 0 | 1 | 0 | 0 | 1 | 0 | 0 | 1 | 1 | 0 | 0 | 0 | 0 | 0 | 0 | 1 | 1 | 1 | 0 | 1 | 0 | 0 | 1 |
| 10503 | Packet 3 generation code | 0 | 0 | 1 | 0 | 1 | 0 | 0 | 0 | 1 | 0 | 1 | 0 | 0 | 0 | 1 | 0 | 0 | 0 | 1 | 1 | 1 | 0 | 0 | 0 | 0 | 0 | 1 | 1 | 0 | 1 | 1 | 0 |
| 10504 | Packet 4 generation code | 0 | 0 | 0 | 1 | 0 | 1 | 1 | 0 | 0 | 1 | 1 | 0 | 0 | 0 | 0 | 0 | 1 | 0 | 0 | 1 | 0 | 1 | 0 | 1 | 0 | 0 | 0 | 0 | 1 | 0 | 1 | 1 |
| 10505 | Packet 5 generation code | 0 | 0 | 0 | 0 | 0 | 0 | 0 | 1 | 0 | 1 | 0 | 0 | 1 | 1 | 1 | 0 | 1 | 0 | 1 | 1 | 0 | 0 | 1 | 0 | 0 | 1 | 0 | 0 | 0 | 1 | 0 | 1 |
| 10506 | Packet 6 generation code | 0 | 0 | 0 | 0 | 0 | 0 | 0 | 0 | 0 | 0 | 0 | 1 | 0 | 0 | 0 | 1 | 0 | 1 | 0 | 0 | 1 | 1 | 1 | 1 | 1 | 1 | 1 | 1 | 1 | 1 | 1 | 0 |

| | | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|---|
| 10500 | Segment number (decimal) | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 10501 | Packet 1 generation code | 1 | 0 | 0 | 0 | 1 | 0 | 1 | 0 | 1 | 0 | 0 | 0 | 1 | 0 | 0 | 1 | 0 | 0 | 1 | 0 | 0 | 0 | 0 | 1 | 1 | 0 | 0 | 1 | 0 | 0 | 1 | 1 |
| 10502 | Packet 2 generation code | 0 | 1 | 0 | 0 | 0 | 1 | 0 | 0 | 1 | 0 | 1 | 0 | 0 | 1 | 0 | 0 | 1 | 1 | 0 | 0 | 0 | 0 | 0 | 0 | 1 | 1 | 1 | 0 | 1 | 0 | 0 | 1 |
| 10503 | Packet 3 generation code | 0 | 0 | 1 | 0 | 1 | 0 | 0 | 0 | 1 | 0 | 1 | 0 | 0 | 0 | 1 | 0 | 0 | 0 | 1 | 1 | 1 | 0 | 0 | 0 | 0 | 0 | 1 | 1 | 0 | 1 | 1 | 0 |
| 10504 | Packet 4 generation code | 0 | 0 | 0 | 1 | 0 | 1 | 1 | 0 | 0 | 1 | 1 | 0 | 0 | 0 | 0 | 0 | 1 | 0 | 0 | 1 | 0 | 1 | 0 | 1 | 0 | 0 | 0 | 0 | 1 | 0 | 1 | 1 |
| 10505 | Packet 5 generation code | 0 | 0 | 0 | 0 | 0 | 0 | 0 | 1 | 0 | 1 | 0 | 0 | 1 | 1 | 1 | 0 | 1 | 0 | 1 | 1 | 0 | 0 | 1 | 0 | 0 | 1 | 0 | 0 | 0 | 1 | 0 | 1 |
| 10506 | Packet 6 generation code | 0 | 0 | 0 | 0 | 0 | 0 | 0 | 0 | 0 | 0 | 0 | 1 | 0 | 0 | 0 | 1 | 0 | 1 | 0 | 0 | 1 | 1 | 1 | 1 | 1 | 1 | 1 | 1 | 1 | 1 | 1 | 0 |
| 10900 | Independent code (hexadecimal) | 01 | 02 | 04 | 08 | 05 | 0A | 09 | 10 | 07 | 18 | 0E | 20 | 11 | 12 | 14 | 21 | 1A | 22 | 15 | 1C | 24 | 28 | 30 | 29 | 23 | 32 | 26 | 25 | 2A | 34 | 2D | 1B |
| 10901 | Adjacent code (hexadecimal) | 03 | | 0C | | 0F | | 19 | | 1F | | 2E | | 13 | | 35 | | 3A | | 1D | | 2C | | 39 | | 33 | | 27 | | 3E | | 3F | |
| | | - | 06 | | 0D | | 0B | | 17 | | 1E | | 31 | | 16 | | 3B | | 37 | | 3C | | 38 | | 2B | | 36 | | 2F | | 3D | | - |

10920 10922 10925 10923

10910

10911

| Address (hexadecimal) | Write data (segment number) | Address (hexadecimal) | Write data (segment number) | Address (hexadecimal) | Write data (segment number) | Address (hexadecimal) | Write data (segment number) |
|---|---|---|---|---|---|---|---|
| 00 | -1 | 10 | 7 | 20 | 11 | 30 | 22 |
| 01 | 0 | 11 | 12 | 21 | 15 | 31 | 11.5 |
| 02 | 1 | 12 | 13 | 22 | 17 | 32 | 25 |
| 03 | 0.5 | 13 | 12.5 | 23 | 24 | 33 | 24.5 |
| 04 | 2 | 14 | 14 | 24 | 20 | 34 | 29 |
| 05 | 4 | 15 | 18 | 25 | 27 | 35 | 14.5 |
| 06 | 1.5 | 16 | 13.5 | 26 | 26 | 36 | 25.5 |
| 07 | 8 | 17 | 7.5 | 27 | 26.5 | 37 | 17.5 |
| 08 | 3 | 18 | 9 | 28 | 21 | 38 | 21.5 |
| 09 | 6 | 19 | 6.5 | 29 | 23 | 39 | 22.5 |
| 0A | 5 | 1A | 16 | 2A | 28 | 3A | 16.5 |
| 0B | 5.5 | 1B | 31 | 2B | 23.5 | 3B | 15.5 |
| 0C | 2.5 | 1C | 19 | 2C | 20.5 | 3C | 19.5 |
| 0D | 3.5 | 1D | 18.5 | 2D | 30 | 3D | 29.5 |
| 0E | 10 | 1E | 9.5 | 2E | 10.5 | 3E | 28.5 |
| 0F | 4.5 | 1F | 8.5 | 2F | 27.5 | 3F | 30.5 |

FIG. 17

| | | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|---|---|
| 21700 | Segment number (decimal) | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
| 21701 | Packet 1 generation code | 1 | 0 | 0 | 0 | 1 | 0 | 1 | 0 | 1 | 0 | 0 | 0 | 1 | 0 | 0 | 1 | 0 | 0 | 1 | 0 | 0 | 0 | 0 | 1 | 1 | 0 | 0 | 1 | 0 | 0 | 1 |
| 21702 | Packet 2 generation code | 0 | 1 | 0 | 0 | 0 | 1 | 0 | 0 | 1 | 0 | 1 | 0 | 0 | 1 | 0 | 0 | 1 | 1 | 0 | 0 | 0 | 0 | 0 | 0 | 1 | 1 | 1 | 0 | 1 | 0 | 0 |
| 21703 | Packet 3 generation code | 0 | 0 | 1 | 0 | 1 | 0 | 0 | 0 | 1 | 0 | 1 | 0 | 0 | 0 | 1 | 0 | 0 | 0 | 1 | 1 | 1 | 0 | 0 | 0 | 0 | 0 | 1 | 1 | 0 | 1 | 1 |
| 21704 | Packet 4 generation code | 0 | 0 | 0 | 1 | 0 | 1 | 1 | 0 | 0 | 1 | 1 | 0 | 0 | 0 | 0 | 0 | 1 | 0 | 0 | 1 | 0 | 1 | 0 | 1 | 0 | 0 | 0 | 0 | 1 | 0 | 1 |
| 21705 | Packet 5 generation code | 0 | 0 | 0 | 0 | 0 | 0 | 0 | 1 | 0 | 1 | 0 | 0 | 1 | 1 | 1 | 0 | 1 | 0 | 1 | 1 | 0 | 0 | 1 | 0 | 0 | 1 | 0 | 0 | 0 | 1 | 0 |
| 21706 | Packet 6 generation code | 0 | 0 | 0 | 0 | 0 | 0 | 0 | 0 | 0 | 0 | 0 | 1 | 0 | 0 | 0 | 1 | 0 | 1 | 0 | 0 | 1 | 1 | 1 | 1 | 1 | 1 | 1 | 1 | 1 | 1 | 1 |

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | Total | CT |
|---|---|---|---|---|---|---|---|---|---|---|---|---|---|---|---|---|---|---|---|---|---|---|---|---|---|---|---|---|---|---|---|---|---|
| 21700 Segment number (decimal) | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | Total | CT |
| 21701 Packet 1 generation code | 1 | 0 | 0 | 0 | 1 | 0 | 1 | 0 | 1 | 0 | 0 | 0 | 1 | 0 | 0 | 1 | 0 | 0 | 1 | 0 | 0 | 0 | 0 | 1 | 1 | 0 | 0 | 1 | 0 | 0 | 1 | → | 11 |
| 21702 Packet 2 generation code | 0 | 1 | 0 | 0 | 0 | 1 | 0 | 0 | 1 | 0 | 1 | 0 | 0 | 1 | 0 | 0 | 1 | 1 | 0 | 0 | 0 | 0 | 0 | 0 | 1 | 1 | 1 | 0 | 1 | 0 | 0 | → | 11 |
| 21703 Packet 3 generation code | 0 | 0 | 1 | 0 | 1 | 0 | 0 | 0 | 1 | 0 | 1 | 0 | 0 | 0 | 1 | 0 | 0 | 0 | 1 | 1 | 1 | 0 | 0 | 0 | 0 | 0 | 1 | 1 | 0 | 1 | 1 | → | 12 |
| 21704 Packet 4 generation code | 0 | 0 | 0 | 1 | 0 | 1 | 1 | 0 | 0 | 1 | 1 | 0 | 0 | 0 | 0 | 0 | 1 | 0 | 0 | 1 | 0 | 1 | 0 | 1 | 0 | 0 | 0 | 0 | 1 | 0 | 1 | → | 11 |
| 21705 Packet 5 generation code | 0 | 0 | 0 | 0 | 0 | 0 | 0 | 1 | 0 | 1 | 0 | 0 | 1 | 1 | 1 | 0 | 1 | 0 | 1 | 1 | 0 | 0 | 1 | 0 | 0 | 1 | 0 | 0 | 0 | 1 | 0 | → | 11 |
| 21706 Packet 6 generation code | 0 | 0 | 0 | 0 | 0 | 0 | 0 | 0 | 0 | 0 | 0 | 1 | 0 | 0 | 0 | 1 | 0 | 1 | 0 | 0 | 1 | 1 | 1 | 1 | 1 | 1 | 1 | 1 | 1 | 1 | 1 | → | 14 |
| 22000 Independent code (hexadecimal) | 01 | 02 | 04 | 08 | 05 | 0A | 09 | 10 | 07 | 18 | 0E | 20 | 11 | 12 | 14 | 21 | 1A | 22 | 15 | 1C | 24 | 28 | 30 | 29 | 23 | 32 | 26 | 25 | 2A | 34 | 2D | | |

22001 Adjacent code (hexadecimal):

| | | | | | | | | | | | | | | | |
|---|---|---|---|---|---|---|---|---|---|---|---|---|---|---|---|
| 03 | 0C | 0F | 19 | 1F | 2E | 13 | 35 | 3A | 1D | 2C | 39 | 33 | 27 | 3E | - |
| - | 06 | 0D | 0B | 17 | 1E | 31 | 16 | 3B | 37 | 3C | 38 | 2B | 36 | 2F | 3D |

22020 22023 21901 to 21906

22010 22022 22025

| Address (hexadecimal) | Write data (segment number) | Address (hexadecimal) | Write data (segment number) | Address (hexadecimal) | Write data (segment number) | Address (hexadecimal) | Write data (segment number) |
|---|---|---|---|---|---|---|---|
| 00 | -1 | 10 | 7 | 20 | 11 | 30 | 22 |
| 01 | 0 | 11 | 12 | 21 | 15 | 31 | 11.5 |
| 02 | 1 | 12 | 13 | 22 | 17 | 32 | 25 |
| 03 | 0.5 | 13 | 12.5 | 23 | 24 | 33 | 24.5 |
| 04 | 2 | 14 | 14 | 24 | 20 | 34 | 29 |
| 05 | 4 | 15 | 18 | 25 | 27 | 35 | 14.5 |
| 06 | 1.5 | 16 | 13.5 | 26 | 26 | 36 | 25.5 |
| 07 | 8 | 17 | 7.5 | 27 | 26.5 | 37 | 17.5 |
| 08 | 3 | 18 | 9 | 28 | 21 | 38 | 21.5 |
| 09 | 6 | 19 | 6.5 | 29 | 23 | 39 | 22.5 |
| 0A | 5 | 1A | 16 | 2A | 28 | 3A | 16.5 |
| 0B | 5.5 | 1B | -1 | 2B | 23.5 | 3B | 15.5 |
| 0C | 2.5 | 1C | 19 | 2C | 20.5 | 3C | 19.5 |
| 0D | 3.5 | 1D | 18.5 | 2D | 30 | 3D | 29.5 |
| 0E | 10 | 1E | 9.5 | 2E | 10.5 | 3E | 28.5 |
| 0F | 4.5 | 1F | 8.5 | 2F | 27.5 | 3F | -1 |

| | | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|---|
| 10500 | Segment number (decimal) | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 22301 | Packet 1 generation code | 1 | 0 | 0 | 1 | 0 | 1 | 0 | 0 | 0 | 1 | 1 | 0 | 0 | 0 | 0 | 1 | 0 | 1 | 0 | 1 | 0 | 1 | 0 | 0 | 0 | 0 | 0 | 1 | 1 | 1 | 0 | 0 |
| 22302 | Packet 2 generation code | 0 | 1 | 0 | 0 | 0 | 1 | 0 | 1 | 0 | 0 | 1 | 0 | 1 | 0 | 0 | 0 | 1 | 1 | 0 | 0 | 0 | 1 | 1 | 0 | 0 | 1 | 0 | 0 | 0 | 0 | 1 | 0 |
| 22303 | Packet 3 generation code | 0 | 0 | 1 | 0 | 0 | 1 | 0 | 0 | 1 | 0 | 0 | 1 | 0 | 1 | 0 | 1 | 0 | 0 | 1 | 0 | 0 | 0 | 1 | 0 | 0 | 0 | 1 | 1 | 0 | 0 | 0 | 1 |
| 22304 | Packet 4 generation code | 0 | 0 | 0 | 0 | 1 | 0 | 0 | 1 | 1 | 0 | 1 | 0 | 0 | 1 | 0 | 1 | 0 | 0 | 0 | 0 | 1 | 0 | 0 | 1 | 0 | 1 | 1 | 0 | 0 | 1 | 0 | 0 |
| 22305 | Packet 5 generation code | 0 | 0 | 0 | 0 | 0 | 0 | 1 | 0 | 0 | 1 | 0 | 1 | 1 | 1 | 0 | 0 | 0 | 1 | 0 | 0 | 0 | 0 | 0 | 1 | 1 | 0 | 0 | 1 | 1 | 1 | 1 | 1 |
| 22306 | Packet 6 generation code | 0 | 0 | 0 | 0 | 0 | 0 | 0 | 0 | 0 | 0 | 0 | 0 | 0 | 0 | 1 | 0 | 1 | 0 | 1 | 1 | 1 | 1 | 1 | 0 | 1 | 1 | 1 | 0 | 1 | 0 | 1 | 1 |

| | Segment number (decimal) (10500) | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| 22301 | Packet 1 generation code | 1 | 0 | 0 | 1 | 0 | 1 | 0 | 0 | 0 | 1 | 1 | 0 | 0 | 0 | 0 | 1 |
| 22302 | Packet 2 generation code | 0 | 1 | 0 | 0 | 0 | 1 | 0 | 1 | 0 | 0 | 1 | 0 | 1 | 0 | 0 | 0 |
| 22303 | Packet 3 generation code | 0 | 0 | 1 | 0 | 0 | 1 | 0 | 0 | 1 | 0 | 0 | 1 | 0 | 1 | 0 | 1 |
| 22304 | Packet 4 generation code | 0 | 0 | 0 | 0 | 1 | 0 | 0 | 1 | 1 | 0 | 1 | 0 | 0 | 1 | 0 | 1 |
| 22305 | Packet 5 generation code | 0 | 0 | 0 | 0 | 0 | 0 | 1 | 0 | 0 | 1 | 0 | 1 | 1 | 1 | 0 | 0 |
| 22306 | Packet 6 generation code | 0 | 0 | 0 | 0 | 0 | 0 | 0 | 0 | 0 | 0 | 0 | 0 | 0 | 0 | 1 | 0 |
| 22500 | Independent code (hexadecimal) | 01 | 02 | 04 | 01 | 08 | 07 | 10 | 0A | 0C | 11 | 0B | 14 | 12 | 1C | 20 | 0D |

| | Segment number (decimal) (10500) | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|
| 22301 | Packet 1 generation code | 0 | 1 | 0 | 1 | 0 | 1 | 0 | 0 | 0 | 0 | 0 | 1 | 1 | 1 | 0 | 0 |
| 22302 | Packet 2 generation code | 1 | 1 | 0 | 0 | 0 | 1 | 1 | 0 | 0 | 1 | 0 | 0 | 0 | 0 | 1 | 0 |
| 22303 | Packet 3 generation code | 0 | 0 | 1 | 0 | 0 | 0 | 1 | 0 | 0 | 0 | 1 | 1 | 0 | 0 | 0 | 1 |
| 22304 | Packet 4 generation code | 0 | 0 | 0 | 0 | 1 | 0 | 0 | 1 | 0 | 1 | 1 | 0 | 0 | 1 | 0 | 0 |
| 22305 | Packet 5 generation code | 0 | 1 | 0 | 0 | 0 | 0 | 0 | 1 | 1 | 0 | 0 | 1 | 1 | 1 | 1 | 1 |
| 22306 | Packet 6 generation code | 1 | 0 | 1 | 1 | 1 | 1 | 1 | 0 | 1 | 1 | 1 | 0 | 1 | 0 | 1 | 1 |
| 22500 | Independent code (hexadecimal) | 22 | 13 | 24 | 21 | 28 | 23 | 26 | 18 | 30 | 2A | 2C | 15 | 31 | 19 | 32 | 34 |

22501 Adjacent code (hexadecimal)

| | | | | | | | | | | | | | | | | | |
|---|---|---|---|---|---|---|---|---|---|---|---|---|---|---|---|---|---|
| Adjacent code (hexadecimal) | 03 | 05 | 0F | 1A | 1D | 1F | 1E | 2D | 33 | 25 | 2B | 3E | 3A | 3D | 39 | 36 | |
| | - | 06 | 09 | 17 | 0E | 1B | 16 | 3C | 2F | 37 | 29 | 27 | 38 | 2E | 35 | 3B | - |

22502 22503

22510

| Address (hexadecimal) | Write data (segment number) | Address (hexadecimal) | Write data (segment number) | Address (hexadecimal) | Write data (segment number) | Address (hexadecimal) | Write data (segment number) |
|---|---|---|---|---|---|---|---|
| 00 | -1 | 10 | 6 | 20 | 14 | 30 | 24 |
| 01 | 3 | 11 | 9 | 21 | 19 | 31 | 28 |
| 02 | 1 | 12 | 12 | 22 | 16 | 32 | 30 |
| 03 | 0.5 | 13 | 17 | 23 | 21 | 33 | 16.5 |
| 04 | 2 | 14 | 11 | 24 | 18 | 34 | 31 |
| 05 | 2.5 | 15 | 27 | 25 | 18.5 | 35 | 27.5 |
| 06 | 1.5 | 16 | 11.5 | 26 | 22 | 36 | 30.5 |
| 07 | 5 | 17 | 5.5 | 27 | 21.5 | 37 | 17.5 |
| 08 | 4 | 18 | 23 | 28 | 20 | 38 | 23.5 |
| 09 | 3.5 | 19 | 29 | 29 | 19.5 | 39 | 28.5 |
| 0A | 7 | 1A | 6.5 | 2A | 25 | 3A | 24.5 |
| 0B | 10 | 1B | 9.5 | 2B | 20.5 | 3B | 29.5 |
| 0C | 8 | 1C | 13 | 2C | 26 | 3C | 13.5 |
| 0D | 15 | 1D | 8.5 | 2D | 14.5 | 3D | 26.5 |
| 0E | 7.5 | 1E | 12.5 | 2E | 25.5 | 3E | 22.5 |
| 0F | 4.5 | 1F | 10.5 | 2F | 15.5 | 3F | -1 |

FIG. 28

| Segment number (decimal) | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | Total | CT |
|---|---|---|---|---|---|---|---|---|---|---|---|---|---|---|---|---|---|---|---|---|---|---|---|---|---|---|---|---|---|---|---|---|---|
| Packet 1 generation code | 1 | 0 | 0 | 0 | 1 | 0 | 1 | 0 | 1 | 0 | 0 | 0 | 1 | 0 | 0 | 1 | 0 | 0 | 1 | 0 | 0 | 0 | 0 | 1 | 1 | 0 | 0 | 1 | 0 | 0 | 1 | → | 11 |
| Packet 2 generation code | 0 | 1 | 0 | 0 | 0 | 1 | 0 | 0 | 1 | 0 | 1 | 0 | 0 | 1 | 0 | 0 | 1 | 1 | 0 | 0 | 0 | 0 | 0 | 0 | 1 | 1 | 1 | 0 | 1 | 0 | 0 | → | 11 |
| Packet 3 generation code | 0 | 0 | 1 | 0 | 1 | 0 | 0 | 0 | 1 | 0 | 1 | 0 | 0 | 0 | 1 | 0 | 0 | 0 | 1 | 1 | 1 | 0 | 0 | 0 | 0 | 0 | 1 | 1 | 0 | 1 | 1 | → | 12 |
| Packet 4 generation code | 0 | 0 | 0 | 1 | 0 | 1 | 1 | 0 | 0 | 1 | 1 | 0 | 0 | 0 | 0 | 0 | 1 | 0 | 0 | 1 | 0 | 1 | 0 | 1 | 0 | 0 | 0 | 0 | 1 | 0 | 1 | → | 11 |
| Packet 5 generation code | 0 | 0 | 0 | 0 | 0 | 0 | 0 | 1 | 0 | 1 | 0 | 0 | 1 | 1 | 1 | 0 | 1 | 0 | 1 | 1 | 0 | 0 | 1 | 0 | 0 | 1 | 0 | 0 | 0 | 1 | 0 | → | 11 |
| Packet 6 generation code | 0 | 0 | 0 | 0 | 0 | 0 | 0 | 0 | 0 | 0 | 0 | 1 | 0 | 0 | 0 | 1 | 0 | 1 | 0 | 0 | 1 | 1 | 1 | 1 | 1 | 1 | 1 | 1 | 1 | 1 | 1 | → | 14 |
| Independent code (hexadecimal) | 01 | 02 | 04 | 08 | 05 | 0A | 09 | 10 | 07 | 18 | 0E | 20 | 11 | 12 | 14 | 21 | 1A | 22 | 15 | 1C | 24 | 28 | 30 | 29 | 23 | 32 | 26 | 25 | 2A | 34 | 2D | | |
| Adjacent code (hexadecimal) | 03 | | 0C | | 0F | | 19 | | 1F | | 2E | | 13 | | 35 | | 3A | | 1D | | 2C | | 39 | | 33 | | 27 | | 3E | | - | | |
| | - | 06 | | 0D | | 0B | | 17 | | 1E | | 31 | | 16 | | 3B | | 37 | | 3C | | 38 | | 2B | | 36 | | 2F | | 3D | | | |

| Address (hexadecimal) | Write data (segment number) | Address (hexadecimal) | Write data (segment number) | Address (hexadecimal) | Write data (segment number) | Address (hexadecimal) | Write data (segment number) |
|---|---|---|---|---|---|---|---|
| 00 | -1 | 10 | 7 | 20 | 11 | 30 | 22 |
| 01 | 0 | 11 | 12 | 21 | 15 | 31 | 11 |
| 02 | 1 | 12 | 13 | 22 | 17 | 32 | 25 |
| 03 | 0 | 13 | 12 | 23 | 24 | 33 | 24 |
| 04 | 2 | 14 | 14 | 24 | 20 | 34 | 29 |
| 05 | 4 | 15 | 18 | 25 | 27 | 35 | 14 |
| 06 | 1 | 16 | 13 | 26 | 26 | 36 | 25 |
| 07 | 8 | 17 | 7 | 27 | 26 | 37 | 17 |
| 08 | 3 | 18 | 9 | 28 | 21 | 38 | 21 |
| 09 | 6 | 19 | 6 | 29 | 23 | 39 | 22 |
| 0A | 5 | 1A | 16 | 2A | 28 | 3A | 16 |
| 0B | 5 | 1B | -1 | 2B | 23 | 3B | 15 |
| 0C | 2 | 1C | 19 | 2C | 20 | 3C | 19 |
| 0D | 3 | 1D | 18 | 2D | 30 | 3D | 29 |
| 0E | 10 | 1E | 9 | 2E | 10 | 3E | 28 |
| 0F | 4 | 1F | 8 | 2F | 27 | 3F | -1 |

| Exposure code | Data selector output signal | |
|---|---|---|
| | S1 | S0 |
| 0 0 | 0 | 1 |
| 0 1 | 0 | 1 |
| 0 2 | 0 | 1 |
| 0 3 | (packet 2 subtraction signal) | (packet 1 subtraction signal) + (packet 2 subtraction signal) |
| 0 4 | 0 | 1 |
| 0 5 | 0 | 1 |
| 0 6 | (packet 3 subtraction signal) | (packet 2 subtraction signal) + (packet 3 subtraction signal) |
| 0 7 | 0 | 1 |
| 0 8 | 0 | 1 |
| 0 9 | 0 | 1 |
| 0 A | 0 | 1 |
| 0 B | (packet 1 subtraction signal) | (packet 4 subtraction signal) |
| 0 C | (packet 4 subtraction signal) | (packet 3 subtraction signal) + (packet 4 subtraction signal) |
| 0 D | (packet 4 subtraction signal) | (packet 1 subtraction signal) + (packet 4 subtraction signal) |
| 0 E | 0 | 1 |
| 0 F | (packet 2 subtraction signal) | (packet 1 subtraction signal) + (packet 2 subtraction signal) |
| 1 0 | 0 | 1 |
| 1 1 | 0 | 1 |
| 1 2 | 0 | 1 |
| 1 3 | (packet 2 subtraction signal) | (packet 5 subtraction signal) |
| 1 4 | 0 | 1 |
| 1 5 | 0 | 1 |
| 1 6 | (packet 3 subtraction signal) | (packet 5 subtraction signal) |
| 1 7 | (packet 1 subtraction signal) | (packet 5 subtraction signal) + (packet 1 subtraction signal) |
| 1 8 | 0 | 1 |
| 1 9 | (packet 5 subtraction signal) | (packet 1 subtraction signal) + (packet 5 subtraction signal) |
| 1 A | 0 | 1 |
| 1 B | 0 | 1 |
| 1 C | 0 | 1 |
| 1 D | (packet 4 subtraction signal) | (packet 3 subtraction signal) |
| 1 E | (packet 2 subtraction signal) | (packet 4 subtraction signal) |
| 1 F | (packet 4 subtraction signal) | (packet 1 subtraction signal) + (packet 4 subtraction signal) |

FIG. 29B 10820 32711 32712

| Exposure code | Data selector output signal | |
|---|---|---|
| | S1 | S0 |
| 2 0 | 0 | 1 |
| 2 1 | 0 | 1 |
| 2 2 | 0 | 1 |
| 2 3 | 0 | 1 |
| 2 4 | 0 | 1 |
| 2 5 | 0 | 1 |
| 2 6 | 0 | 1 |
| 2 7 | (packet 1 subtraction signal) | (packet 3 subtraction signal) |
| 2 8 | 0 | 1 |
| 2 9 | 0 | 1 |
| 2 A | 0 | 1 |
| 2 B | (packet 2 subtraction signal) | (packet 1 subtraction signal) |
| 2 C | (packet 4 subtraction signal) | (packet 6 subtraction signal) |
| 2 D | 0 | 1 |
| 2 E | (packet 6 subtraction signal) | (packet 2 subtraction signal) + (packet 6 subtraction signal) |
| 2 F | (packet 2 subtraction signal) | (packet 6 subtraction signal) |
| 3 0 | 0 | 1 |
| 3 1 | (packet 1 subtraction signal) | (packet 6 subtraction signal) + (packet 1 subtraction signal) |
| 3 2 | 0 | 1 |
| 3 3 | (packet 5 subtraction signal) | (packet 2 subtraction signal) |
| 3 4 | 0 | 1 |
| 3 5 | (packet 1 subtraction signal) | (packet 3 subtraction signal) + (packet 1 subtraction signal) |
| 3 6 | (packet 3 subtraction signal) | (packet 2 subtraction signal) |
| 3 7 | (packet 1 subtraction signal) | (packet 2 subtraction signal) + (packet 1 subtraction signal) |
| 3 8 | (packet 5 subtraction signal) | (packet 6 subtraction signal) |
| 3 9 | (packet 1 subtraction signal) | (packet 6 subtraction signal) |
| 3 A | (packet 6 subtraction signal) | (packet 2 subtraction signal) |
| 3 B | (packet 2 subtraction signal) | (packet 1 subtraction signal) + (packet 2 subtraction signal) |
| 3 C | (packet 6 subtraction signal) | (packet 3 subtraction signal) |
| 3 D | (packet 1 subtraction signal) | (packet 3 subtraction signal) |
| 3 E | (packet 3 subtraction signal) | (packet 6 subtraction signal) |
| 3 F | 0 | 1 |

FIG. 31A 33100 32711 32712

| Exposure code | Data selector output signal | |
|---|---|---|
| | S1 | S0 |
| 0 0 | 0 | 1 |
| 0 1 | 0 | 1 |
| 0 2 | 0 | 1 |
| 0 3 | (packet 2 subtraction signal) | packet 1 subtraction signal + packet 2 subtraction signal |
| 0 4 | 0 | 1 |
| 0 5 | 0 | 1 |
| 0 6 | (packet 3 subtraction signal) | packet 2 subtraction signal + packet 3 subtraction signal |
| 0 7 | 0 | 1 |
| 0 8 | 0 | 1 |
| 0 9 | 0 | 1 |
| 0 A | 0 | 1 |
| 0 B | (packet 4 subtraction signal) - (packet 2 subtraction signal) + (packet 1 subtraction signal) | (packet 4 subtraction signal) + (packet 2 subtraction signal) + (packet 1 subtraction signal) |
| 0 C | (packet 4 subtraction signal) | (packet 3 subtraction signal) + (packet 4 subtraction signal) |
| 0 D | ((packet 1 subtraction signal + packet 3 subtraction signal) ÷ 2) | (packet 4 subtraction signal) + ((packet 1 subtraction signal + packet 3 subtraction signal) ÷ 2) |
| 0 E | 0 | 1 |
| 0 F | ((packet 2 subtraction signal + packet 4 subtraction signal) ÷ 2) | ((packet 1 subtraction signal + packet 3 subtraction signal) ÷ 2) + ((packet 2 subtraction signal + packet 4 subtraction signal) ÷ 2) |
| 1 0 | 0 | 1 |
| 1 1 | 0 | 1 |
| 1 2 | 0 | 1 |
| 1 3 | (packet 5 subtraction signal) - (packet 1 subtraction signal) + (packet 2 subtraction signal) | (packet 5 subtraction signal) + (packet 1 subtraction signal) + (packet 2 subtraction signal) |
| 1 4 | 0 | 1 |
| 1 5 | 0 | 1 |
| 1 6 | (packet 5 subtraction signal) - (packet 2 subtraction signal) + (packet 1 subtraction signal) | (packet 5 subtraction signal) + (packet 2 subtraction signal) + (packet 1 subtraction signal) |
| 1 7 | ((packet 1 subtraction signal + packet 2 subtraction signal + packet 3 subtraction signal) ÷ 3) | (packet 5 subtraction signal) + ((packet 1 subtraction signal + packet 2 subtraction signal + packet 3 subtraction signal) ÷ 3) |
| 1 8 | 0 | 0 |
| 1 9 | packet 5 subtraction signal | ((packet 1 subtraction signal + packet 4 subtraction signal) ÷ 2) + packet 5 subtraction signal |

FIG. 31B 33100 32711 32712

| Exposure code | Data selector output signal | |
|---|---|---|
| | S1 | S0 |
| 1 A | 0 | 1 |
| 1 B | 0 | 1 |
| 1 C | 0 | 1 |
| 1 D | ((packet 3 subtraction signal + packet 5 subtraction signal) ÷ 2) - (packet 1 subtraction signal) + (packet 4 subtraction signal) | ((packet 3 subtraction signal + packet 5 subtraction signal) ÷ 2) + (packet 1 subtraction signal) + (packet 4 subtraction signal) |
| 1 E | (packet 4 subtraction signal) - (packet 5 subtraction signal) + ((packet 2 subtraction signal + packet 3 subtraction signal) ÷ 2) | (packet 4 subtraction signal) + (packet 5 subtraction signal) + ((packet 2 subtraction signal + packet 3 subtraction signal) ÷ 2) |
| 1 F | ((packet 4 subtraction signal + packet 5 subtraction signal) ÷ 2) | ((packet 1 subtraction signal + packet 2 subtraction signal + packet 3 subtraction signal) ÷ 3) + ((packet 4 subtraction signal + packet 5 subtraction signal) ÷ 2) |
| 2 0 | 0 | 1 |
| 2 1 | 0 | 1 |
| 2 2 | 0 | 1 |
| 2 3 | 0 | 1 |
| 2 4 | 0 | 1 |
| 2 5 | 0 | 1 |
| 2 6 | 0 | 1 |
| 2 7 | ((packet 3 subtraction signal + packet 6 subtraction signal) ÷ 2) - (packet 2 subtraction signal) + (packet 1 subtraction signal) | ((packet 3 subtraction signal + packet 6 subtraction signal) ÷ 2) + (packet 2 subtraction signal) + (packet 1 subtraction signal) |
| 2 8 | 0 | 1 |
| 2 9 | 0 | 1 |
| 2 A | 0 | 1 |
| 2 B | ((packet 1 subtraction signal + packet 6 subtraction signal) ÷ 2) - (packet 4 subtraction signal) + (packet 2 subtraction signal) | ((packet 1 subtraction signal + packet 6 subtraction signal) ÷ 2) + (packet 4 subtraction signal) + (packet 2 subtraction signal) |
| 2 C | (packet 6 subtraction signal) - (packet 3 subtraction signal) + (packet 4 subtraction signal) | (packet 6 subtraction signal) + (packet 3 subtraction signal) + (packet 4 subtraction signal) |
| 2 D | 0 | 1 |
| 2 E | (packet 6 subtraction signal) | ((packet 2 subtraction signal + packet 3 subtraction signal + packet 4 subtraction signal) ÷ 3) + (packet 6 subtraction signal) |
| 2 F | (packet 6 subtraction signal) - ((packet 1 subtraction signal + packet 3 subtraction signal) ÷ 2) + ((packet 2 subtraction signal + packet 4 subtraction signal) ÷ 2) | (packet 6 subtraction signal) + ((packet 1 subtraction signal + packet 3 subtraction signal) ÷ 2) + ((packet 2 subtraction signal + packet 4 subtraction signal) ÷ 2) |
| 3 0 | 0 | 1 |

FIG. 31C 33100 32711 32712

| Exposure code | Data selector output signal | |
|---|---|---|
| | S1 | S0 |
| 3 1 | ((packet 1 subtraction signal + packet 5 subtraction signal) ÷ 2) | (packet 6 subtraction signal) + ((packet 1 subtraction signal + packet 5 subtraction signal) ÷ 2) |
| 3 2 | 0 | 1 |
| 3 3 | ((packet 2 subtraction signal + packet 6 subtraction signal) ÷ 2) - (packet 1 subtraction signal) + (packet 5 subtraction signal) | ((packet 2 subtraction signal + packet 6 subtraction signal) ÷ 2) + (packet 1 subtraction signal) + (packet 5 subtraction signal) |
| 3 4 | 0 | 1 |
| 3 5 | ((packet 1 subtraction signal + packet 6 subtraction signal) ÷ 2) | ((packet 3 subtraction signal + packet 5 subtraction signal) ÷ 2) + ((packet 1 subtraction signal + packet 6 subtraction signal) ÷ 2) |
| 3 6 | ((packet 2 subtraction signal + packet 6 subtraction signal) ÷ 2) - (packet 5 subtraction signal) + (packet 3 subtraction signal) | ((packet 2 subtraction signal + packet 6 subtraction signal) ÷ 2) + (packet 5 subtraction signal) + (packet 3 subtraction signal) |
| 3 7 | ((packet 1 subtraction signal + packet 3 subtraction signal + packet 5 subtraction signal) ÷ 3) | ((packet 2 subtraction signal + packet 6 subtraction signal ÷ 2) + ((packet 1 subtraction signal + packet 3 subtraction signal + packet 5 subtraction signal) ÷ 3) |
| 3 8 | (packet 6 subtraction signal) - (packet 4 subtraction signal) + (packet 5 subtraction signal) | (packet 6 subtraction signal) + (packet 4 subtraction signal) + (packet 5 subtraction signal) |
| 3 9 | (packet 6 subtraction signal) - (packet 5 subtraction signal) + ((packet 1 subtraction signal + packet 4 subtraction signal) ÷ 2) | (packet 6 subtraction signal) + (packet 5 subtraction signal) + ((packet 1 subtraction signal + packet 4 subtraction signal) ÷ 2) |
| 3 A | (packet 2 subtraction signal) - ((packet 4 subtraction signal + packet 5 subtraction signal) ÷ 2) + (packet 6 subtraction signal) | (packet 2 subtraction signal) + ((packet 4 subtraction signal + packet 5 subtraction signal) ÷ 2) + (packet 6 subtraction signal) |
| 3 B | ((packet 2 subtraction signal + packet 4 subtraction signal + packet 5 subtraction signal) ÷ 3) | ((packet 1 subtraction signal + packet 6 subtraction signal ÷ 2) + ((packet 2 subtraction signal + packet 4 subtraction signal + packet 5 subtraction signal) ÷ 3) |
| 3 C | (packet 3 subtraction signal) - ((packet 4 subtraction signal + packet 5 subtraction signal) ÷ 2) + (packet 6 subtraction signal) | (packet 3 subtraction signal) + ((packet 4 subtraction signal + packet 5 subtraction signal) ÷ 2) + (packet 6 subtraction signal) |
| 3 D | ((packet 3 subtraction signal + packet 6 subtraction signal ÷ 2) - (packet 5 subtraction signal) + ((packet 1 subtraction signal + packet 4 subtraction signal) ÷ 2) | ((packet 3 subtraction signal + packet 6 subtraction signal ÷ 2) + (packet 5 subtraction signal) + ((packet 1 subtraction signal + packet 4 subtraction signal) ÷ 2) |
| 3 E | (packet 6 subtraction signal) - ((packet 2 subtraction signal + packet 4 subtraction signal) ÷ 2) + ((packet 3 subtraction signal + packet 5 subtraction signal) ÷ 2) | (packet 6 subtraction signal) + ((packet 2 subtraction signal + packet 4 subtraction signal) ÷ 2) + ((packet 3 subtraction signal + packet 5 subtraction signal) ÷ 2) |
| 3 F | 0 | 1 |

FIG. 34

| | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| 21700 | Segment number (decimal) | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
| 21701 | Packet 1 generation code | 1 | 0 | 0 | 0 | 1 | 0 | 1 | 0 | 1 | 0 | 0 | 0 | 1 | 0 | 0 | 1 | 0 | 0 | 1 | 0 | 0 | 0 | 0 | 1 | 1 | 0 | 0 | 1 | 0 | 0 | 1 |
| 21702 | Packet 2 generation code | 0 | 1 | 0 | 0 | 0 | 1 | 0 | 0 | 1 | 0 | 1 | 0 | 0 | 1 | 0 | 0 | 1 | 1 | 0 | 0 | 0 | 0 | 0 | 0 | 1 | 1 | 1 | 0 | 1 | 0 | 0 |
| 21703 | Packet 3 generation code | 0 | 0 | 1 | 0 | 1 | 0 | 0 | 0 | 1 | 0 | 1 | 0 | 0 | 0 | 1 | 0 | 0 | 0 | 1 | 1 | 1 | 0 | 0 | 0 | 0 | 0 | 1 | 1 | 0 | 1 | 1 |
| 21704 | Packet 4 generation code | 0 | 0 | 0 | 1 | 0 | 1 | 1 | 0 | 0 | 1 | 1 | 0 | 0 | 0 | 0 | 0 | 1 | 0 | 0 | 1 | 0 | 1 | 0 | 1 | 0 | 0 | 0 | 0 | 1 | 0 | 1 |
| 21705 | Packet 5 generation code | 0 | 0 | 0 | 0 | 0 | 0 | 0 | 1 | 0 | 1 | 0 | 0 | 1 | 1 | 1 | 0 | 1 | 0 | 1 | 1 | 0 | 0 | 1 | 0 | 0 | 1 | 0 | 0 | 0 | 1 | 0 |
| 21706 | Packet 6 generation code | 0 | 0 | 0 | 0 | 0 | 0 | 0 | 0 | 0 | 0 | 0 | 1 | 0 | 0 | 0 | 1 | 0 | 1 | 0 | 0 | 1 | 1 | 1 | 1 | 1 | 1 | 1 | 1 | 1 | 1 | 1 |
| 22000 | Segment exposure count | 9 | | | | | | 12 | 17 | 22 | 27 | 34 | 41 | 48 | 57 | 66 | 75 | 86 | 97 | 108 | 121 | 134 | 147 | 162 | 177 | 192 | 209 | 226 | 243 | 262 | 281 | 300 |
| | Unit drive pattern number | A | | | | | | B | C | D | E | F | G | H | I | J | K | L | M | N | O | P | Q | R | S | T | U | V | W | X | Y | Z |
| 22001 | Unit drive pattern iteration count | 9 | | | | | | 3 | 5 | 5 | 5 | 7 | 7 | 7 | 9 | 9 | 9 | 11 | 11 | 11 | 13 | 13 | 13 | 15 | 15 | 15 | 17 | 17 | 17 | 19 | 19 | 19 |

FIG. 40A 44000 32711 32712

| Exposure code | Data selector output signal | |
|---|---|---|
| | S1 | S0 |
| 00 | 0 | 1 |
| 01 | 0 | 1 |
| 02 | 0 | 1 |
| 03 | (packet 2 subtraction signal × packet 1 segment exposure count of segment number 0) | (packet 1 subtraction signal × packet 2 segment exposure count of segment number 1) + (packet 2 subtraction signal × packet 1 segment exposure count of segment number 0) |
| 04 | 0 | 1 |
| 05 | 0 | 1 |
| 06 | (packet 3 subtraction signal × packet 2 segment exposure count of segment number 1) | (packet 2 subtraction signal × packet 3 segment exposure count of segment number 2) + (packet 3 subtraction signal × packet 2 segment exposure count of segment number 1) |
| 07 | 0 | 1 |
| 08 | 0 | 1 |
| 09 | 0 | 1 |
| 0A | 0 | 1 |
| 0B | (packet 1 subtraction signal × packet 2 segment exposure count of segment number 5) | (packet 2 subtraction signal × packet 1 segment exposure count of segment number 6) + (packet 1 subtraction signal × packet 2 segment exposure count of segment number 5) |
| 0C | (packet 4 subtraction signal × packet 3 segment exposure count of segment number 2) | (packet 3 subtraction signal × packet 4 segment exposure count of segment number 3) + (packet 4 subtraction signal × packet 3 segment exposure count of segment number 2) |
| 0D | (packet 4 subtraction signal × packet 1 segment exposure count of segment number 3) | (packet 1 subtraction signal × packet 4 segment exposure count of segment number 4) + (packet 4 subtraction signal × packet 1 segment exposure count of segment number 3) |
| 0E | 0 | 1 |
| 0F | (packet 2 subtraction signal × packet 1 segment exposure count of segment number 4) | (packet 1 subtraction signal × packet 2 segment exposure count of segment number 5) + (packet 2 subtraction signal × packet 1 segment exposure count of segment number 4) |
| 10 | 0 | 1 |
| 11 | 0 | 1 |
| 12 | 0 | 1 |
| 13 | (packet 2 subtraction signal × packet 1 segment exposure count of segment number 12) | (packet 1 subtraction signal × packet 2 segment exposure count of segment number 13) + (packet 2 subtraction signal × packet 1 segment exposure count of segment number 12) |
| 14 | 0 | 1 |
| 15 | 0 | 1 |

FIG. 40B 44000 32711 32712

| Exposure code | Data selector output signal | |
|---|---|---|
| | S1 | S0 |
| 16 | (packet 3 subtraction signal × packet 2 segment exposure count of segment number 13) | (packet 2 subtraction signal × packet 3 segment exposure count of segment number 14) + (packet 3 subtraction signal × packet 2 segment exposure count of segment number 13) |
| 17 | (packet 1 subtraction signal × packet 5 segment exposure count of segment number 7) | (packet 5 subtraction signal × packet 1 segment exposure count of segment number 8) + (packet 1 subtraction signal × packet 5 segment exposure count of segment number 7) |
| 18 | 0 | 1 |
| 19 | (packet 5 subtraction signal × packet 1 segment exposure count of segment number 6) | (packet 1 subtraction signal × packet 5 segment exposure count of segment number 7) + (packet 5 subtraction signal × packet 1 segment exposure count of segment number 6) |
| 1A | 0 | 1 |
| 1B | 0 | 1 |
| 1C | 0 | 1 |
| 1D | (packet 4 subtraction signal × packet 1 segment exposure count of segment number 18) | (packet 1 subtraction signal × packet 4 segment exposure count of segment number 19) + (packet 4 subtraction signal × packet 1 segment exposure count of segment number 18) |
| 1E | (packet 2 subtraction signal × packet 5 segment exposure count of segment number 9) | (packet 5 subtraction signal × packet 2 segment exposure count of segment number 10) + (packet 2 subtraction signal × packet 5 segment exposure count of segment number 9) |
| 1F | (packet 4 subtraction signal × packet 1 segment exposure count of segment number 8) | (packet 1 subtraction signal × packet 4 segment exposure count of segment number 9) + (packet 4 subtraction signal × packet 1 segment exposure count of segment number 8) |
| 20 | 0 | 1 |
| 21 | 0 | 1 |
| 22 | 0 | 1 |
| 23 | 0 | 1 |
| 24 | 0 | 1 |
| 25 | 0 | 1 |
| 26 | 0 | 1 |
| 27 | (packet 1 subtraction signal × packet 2 segment exposure count of segment number 26) | (packet 2 subtraction signal × packet 1 segment exposure count of segment number 27) + (packet 1 subtraction signal × packet 2 segment exposure count of segment number 26) |
| 28 | 0 | 1 |
| 29 | 0 | 1 |
| 2A | 0 | 1 |

FIG. 40C 44000 32711 32712

| Exposure code | Data selector output signal | |
|---|---|---|
| | S1 | S0 |
| 2B | (packet 2 subtraction signal × packet 4 segment exposure count of segment number 23) | (packet 4 subtraction signal × packet 2 segment exposure count of segment number 24) + (packet 2 subtraction signal × packet 4 segment exposure count of segment number 23) |
| 2C | (packet 4 subtraction signal × packet 3 segment exposure count of segment number 20) | (packet 3 subtraction signal × packet 4 segment exposure count of segment number 21) + (packet 4 subtraction signal × packet 3 segment exposure count of segment number 20) |
| 2D | 0 | 1 |
| 2E | (packet 6 subtraction signal × packet 2 segment exposure count of segment number 10) | (packet 2 subtraction signal × packet 6 segment exposure count of segment number 11) + (packet 6 subtraction signal × packet 2 segment exposure count of segment number 10) |
| 2F | (packet 2 subtraction signal × packet 1 segment exposure count of segment number 27) | (packet 1 subtraction signal × packet 2 segment exposure count of segment number 28) + (packet 2 subtraction signal × packet 1 segment exposure count of segment number 27) |
| 30 | 0 | 1 |
| 31 | (packet 1 subtraction signal × packet 6 segment exposure count of segment number 11) | (packet 6 subtraction signal × packet 1 segment exposure count of segment number 12) + (packet 1 subtraction signal × packet 6 segment exposure count of segment number 11) |
| 32 | 0 | 1 |
| 33 | (packet 5 subtraction signal × packet 1 segment exposure count of segment number 24) | (packet 1 subtraction signal × packet 5 segment exposure count of segment number 25) + (packet 5 subtraction signal × packet 1 segment exposure count of segment number 24) |
| 34 | 0 | 1 |

FIG. 40D 44000 32711 32712

| Exposure code | Data selector output signal | |
|---|---|---|
| | S1 | S0 |
| 35 | (packet 1 subtraction signal × packet 3 segment exposure count of segment number 14) | (packet 3 subtraction signal × packet 1 segment exposure count of segment number 15) + (packet 1 subtraction signal × packet 3 segment exposure count of segment number 14) |
| 36 | (packet 3 subtraction signal × packet 5 segment exposure count of segment number 25) | (packet 5 subtraction signal × packet 3 segment exposure count of segment number 26) + (packet 3 subtraction signal × packet 5 segment exposure count of segment number 25) |
| 37 | (packet 1 subtraction signal × packet 2 segment exposure count of segment number 17) | (packet 2 subtraction signal × packet 1 segment exposure count of segment number 18) + (packet 1 subtraction signal × packet 2 segment exposure count of segment number 17) |
| 38 | (packet 5 subtraction signal × packet 4 segment exposure count of segment number 21) | (packet 4 subtraction signal × packet 5 segment exposure count of segment number 22) + (packet 5 subtraction signal × packet 4 segment exposure count of segment number 21) |
| 39 | (packet 1 subtraction signal × packet 5 segment exposure count of segment number 22) | (packet 5 subtraction signal × packet 1 segment exposure count of segment number 23) + (packet 1 subtraction signal × packet 5 segment exposure count of segment number 22) |
| 3A | (packet 6 subtraction signal × packet 4 segment exposure count of segment number 16) | (packet 4 subtraction signal × packet 6 segment exposure count of segment number 17) + (packet 6 subtraction signal × packet 4 segment exposure count of segment number 16) |
| 3B | (packet 2 subtraction signal × packet 1 segment exposure count of segment number 15) | (packet 1 subtraction signal × packet 2 segment exposure count of segment number 16) + (packet 2 subtraction signal × packet 1 segment exposure count of segment number 15) |
| 3C | (packet 6 subtraction signal × packet 4 segment exposure count of segment number 19) | (packet 4 subtraction signal × packet 6 segment exposure count of segment number 20) + (packet 6 subtraction signal × packet 4 segment exposure count of segment number 19) |
| 3D | (packet 1 subtraction signal × packet 5 segment exposure count of segment number 29) | (packet 5 subtraction signal × packet 1 segment exposure count of segment number 30) + (packet 1 subtraction signal × packet 5 segment exposure count of segment number 29) |
| 3E | (packet 3 subtraction signal × packet 2 segment exposure count of segment number 28) | (packet 2 subtraction signal × packet 3 segment exposure count of segment number 29) + (packet 3 subtraction signal × packet 2 segment exposure count of segment number 28) |
| 3F | 0 | 1 |

FIG. 45A

| Segment number (decimal) | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|---|
| Packet 1 generation code | 0 | 1 | 1 | 1 | 0 | 1 | 0 | 1 | 0 | 1 | 1 | 1 | 0 | 1 | 1 | 0 | 1 | 1 | 0 | 1 | 0 | 1 | 1 | 1 | 1 | 1 | 0 | 0 | 0 | 1 | 0 |
| Packet 2 generation code | 1 | 0 | 1 | 1 | 1 | 0 | 1 | 1 | 0 | 1 | 0 | 1 | 1 | 0 | 1 | 1 | 0 | 0 | 0 | 0 | 1 | 1 | 1 | 1 | 1 | 0 | 1 | 1 | 0 | 1 | 1 |
| Packet 3 generation code | 1 | 1 | 0 | 1 | 0 | 1 | 1 | 1 | 0 | 1 | 0 | 1 | 1 | 1 | 0 | 1 | 1 | 0 | 1 | 1 | 0 | 0 | 0 | 1 | 1 | 1 | 0 | 1 | 1 | 0 | 1 |
| Packet 4 generation code | 1 | 1 | 1 | 0 | 1 | 0 | 0 | 1 | 1 | 0 | 0 | 1 | 1 | 1 | 1 | 1 | 0 | 1 | 1 | 1 | 1 | 0 | 1 | 0 | 1 | 0 | 1 | 0 | 1 | 1 | 0 |
| Packet 5 generation code | 1 | 1 | 1 | 1 | 1 | 1 | 1 | 0 | 1 | 0 | 1 | 1 | 0 | 0 | 0 | 1 | 0 | 1 | 1 | 0 | 0 | 0 | 1 | 1 | 0 | 1 | 1 | 1 | 1 | 0 | 0 |
| Packet 6 generation code | 1 | 1 | 1 | 1 | 1 | 1 | 1 | 1 | 1 | 1 | 1 | 0 | 1 | 1 | 1 | 0 | 1 | 0 | 0 | 0 | 1 | 1 | 0 | 0 | 0 | 0 | 0 | 0 | 0 | 0 | 0 |
| Independent code (hexadecimal) | 3E | 3D | 3B | 37 | 3A | 35 | 36 | 2F | 38 | 27 | 31 | 1F | 2E | 2D | 2B | 1E | 25 | 19 | 1C | 0D | 2A | 23 | 1B | 17 | 0F | 15 | 1A | 16 | 1D | 0B | 06 |
| Second adjacent code (AND adjacent code) (Binary) | 0 | 1 | 1 | 0 | 0 | 0 | 0 | 0 | 0 | 1 | 1 | 0 | 0 | 1 | 0 | 0 | 1 | 0 | 0 | 0 | 0 | 1 | 1 | 1 | 1 | 0 | 0 | 0 | 1 | 0 | |
| | 0 | 0 | 1 | 1 | 0 | 0 | 1 | 0 | 0 | 0 | 0 | 1 | 0 | 0 | 1 | 0 | 0 | 0 | 0 | 0 | 1 | 1 | 1 | 1 | 0 | 0 | 1 | 0 | 0 | 1 | |
| | 1 | 0 | 0 | 0 | 0 | 1 | 1 | 0 | 0 | 0 | 0 | 1 | 1 | 0 | 0 | 1 | 0 | 0 | 1 | 0 | 0 | 0 | 0 | 1 | 1 | 0 | 0 | 1 | 0 | 0 | |
| | 1 | 1 | 0 | 0 | 0 | 0 | 0 | 1 | 0 | 0 | 0 | 1 | 1 | 1 | 1 | 0 | 0 | 1 | 1 | 1 | 0 | 0 | 0 | 0 | 0 | 0 | 0 | 0 | 1 | 0 | |
| | 1 | 1 | 1 | 1 | 1 | 1 | 0 | 0 | 0 | 0 | 1 | 0 | 0 | 0 | 0 | 0 | 0 | 1 | 0 | 0 | 0 | 0 | 1 | 0 | 0 | 1 | 1 | 1 | 0 | 0 | |
| | 1 | 1 | 1 | 1 | 1 | 1 | 1 | 1 | 1 | 1 | 0 | 0 | 1 | 1 | 0 | 0 | 0 | 0 | 0 | 0 | 1 | 0 | 0 | 0 | 0 | 0 | 0 | 0 | 0 | 0 | |
| (Hexadecimal) | 3C | 39 | 33 | 32 | 30 | 34 | 26 | 28 | 20 | 21 | 11 | 0E | 2C | 29 | 0A | 04 | 01 | 18 | 0C | 08 | 22 | 03 | 13 | 07 | 05 | 10 | 12 | 14 | 09 | 02 | |

FIG. 45B

| Segment number (decimal) | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|---|
| Packet 1 generation code | 1 | 0 | 0 | 0 | 1 | 0 | 1 | 0 | 1 | 0 | 0 | 0 | 1 | 0 | 0 | 1 | 0 | 0 | 1 | 0 | 1 | 0 | 0 | 0 | 0 | 0 | 1 | 1 | 0 | 0 | 1 |
| Packet 2 generation code | 0 | 1 | 0 | 0 | 0 | 1 | 0 | 0 | 1 | 0 | 1 | 0 | 0 | 1 | 0 | 0 | 1 | 1 | 1 | 1 | 0 | 0 | 0 | 0 | 0 | 1 | 0 | 0 | 1 | 0 | 0 |
| Packet 3 generation code | 0 | 0 | 1 | 0 | 1 | 0 | 0 | 0 | 1 | 0 | 1 | 0 | 0 | 0 | 1 | 0 | 0 | 1 | 0 | 0 | 1 | 1 | 1 | 0 | 0 | 0 | 1 | 0 | 0 | 1 | 1 |
| Packet 4 generation code | 0 | 0 | 0 | 1 | 0 | 1 | 1 | 0 | 0 | 1 | 1 | 0 | 0 | 0 | 0 | 0 | 1 | 0 | 0 | 0 | 0 | 1 | 0 | 1 | 0 | 1 | 0 | 1 | 0 | 0 | 1 |
| Packet 5 generation code | 0 | 0 | 0 | 0 | 0 | 0 | 0 | 1 | 0 | 1 | 0 | 0 | 1 | 1 | 1 | 0 | 1 | 0 | 0 | 1 | 1 | 1 | 0 | 0 | 1 | 0 | 0 | 0 | 0 | 1 | 0 |
| Packet 6 generation code | 0 | 0 | 0 | 0 | 0 | 0 | 0 | 0 | 0 | 0 | 0 | 1 | 0 | 0 | 0 | 1 | 0 | 1 | 1 | 1 | 0 | 0 | 1 | 1 | 1 | 1 | 1 | 1 | 1 | 1 | 1 |
| Independent code (hexadecimal) | 01 | 02 | 04 | 08 | 05 | 0A | 09 | 10 | 07 | 18 | 0E | 20 | 11 | 12 | 14 | 21 | 1A | 26 | 23 | 32 | 15 | 1C | 24 | 28 | 30 | 2A | 25 | 29 | 22 | 34 | 2D |
| First adjacent code (OR adjacent code) (Binary) | 1 | 0 | 0 | 1 | 1 | 1 | 1 | 1 | 1 | 0 | 0 | 1 | 1 | 0 | 1 | 1 | 0 | 1 | 1 | 1 | 1 | 0 | 0 | 0 | 0 | 1 | 1 | 1 | 0 | 1 | |
| | 1 | 1 | 0 | 0 | 1 | 1 | 0 | 1 | 1 | 1 | 1 | 0 | 1 | 1 | 0 | 1 | 1 | 1 | 1 | 1 | 0 | 0 | 0 | 0 | 1 | 1 | 0 | 1 | 1 | 0 | |
| | 0 | 1 | 1 | 1 | 1 | 0 | 0 | 1 | 1 | 1 | 1 | 0 | 0 | 1 | 1 | 0 | 1 | 1 | 0 | 1 | 1 | 1 | 1 | 0 | 0 | 1 | 1 | 0 | 1 | 1 | |
| | 0 | 0 | 1 | 1 | 1 | 1 | 1 | 0 | 1 | 1 | 1 | 0 | 0 | 0 | 0 | 1 | 1 | 0 | 0 | 0 | 1 | 1 | 1 | 1 | 1 | 1 | 1 | 1 | 0 | 1 | |
| | 0 | 0 | 0 | 0 | 0 | 0 | 1 | 1 | 1 | 1 | 0 | 1 | 1 | 1 | 1 | 1 | 1 | 0 | 1 | 1 | 1 | 1 | 0 | 1 | 1 | 0 | 0 | 0 | 1 | 1 | |
| | 0 | 0 | 0 | 0 | 0 | 0 | 0 | 0 | 0 | 0 | 1 | 1 | 0 | 0 | 1 | 1 | 1 | 1 | 1 | 1 | 0 | 1 | 1 | 1 | 1 | 1 | 1 | 1 | 1 | 1 | |
| (Hexadecimal) | 03 | 06 | 0C | 0D | 0F | 0B | 19 | 17 | 1F | 1E | 2E | 31 | 13 | 16 | 35 | 3B | 3E | 27 | 33 | 37 | 1D | 3C | 2C | 38 | 3A | 2F | 2D | 2B | 36 | 3D | |

FIG. 48

| Segment number (decimal) | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Packet 1 generation code | 1 | 1 | 1 | 1 | 1 | 1 | 1 | 0 | 0 | 0 | 0 | 0 | 0 | 0 | 1 | 0 | 0 | 1 | 1 | 0 |
| Packet 2 generation code | 1 | 0 | 1 | 1 | 0 | 0 | 1 | 1 | 1 | 0 | 0 | 1 | 1 | 0 | 0 | 0 | 1 | 0 | 0 | 1 |
| Packet 3 generation code | 0 | 1 | 1 | 1 | 1 | 0 | 0 | 0 | 1 | 1 | 1 | 1 | 0 | 0 | 1 | 1 | 0 | 0 | 0 | 0 |
| Packet 4 generation code | 0 | 1 | 0 | 0 | 1 | 0 | 0 | 1 | 1 | 1 | 0 | 0 | 0 | 0 | 0 | 1 | 1 | 1 | 1 | 1 |
| Packet 5 generation code | 0 | 0 | 1 | 0 | 0 | 1 | 1 | 1 | 0 | 0 | 1 | 0 | 0 | 1 | 1 | 1 | 0 | 0 | 1 | 1 |
| Packet 6 generation code | 0 | 0 | 0 | 1 | 1 | 1 | 0 | 0 | 0 | 1 | 1 | 0 | 1 | 1 | 0 | 0 | 1 | 1 | 0 | 1 |
| Independent code (hexadecimal) | 03 | 0D | 17 | 27 | 2D | 31 | 13 | 1A | 0E | 2C | 34 | 06 | 22 | 30 | 15 | 1C | 2A | 29 | 19 | 3A |

| | | | | | | | | | | | | | | | | | | | |
|---|---|---|---|---|---|---|---|---|---|---|---|---|---|---|---|---|---|---|---|
| First adjacent code (OR adjacent code) (Binary) | 1 | 1 | 1 | 1 | 1 | 1 | 1 | 0 | 0 | 0 | 0 | 0 | 0 | 1 | 1 | 0 | 1 | 1 | 1 |
| | 1 | 1 | 1 | 1 | 0 | 1 | 1 | 1 | 1 | 0 | 1 | 1 | 1 | 0 | 0 | 1 | 1 | 0 | 1 |
| | 1 | 1 | 1 | 1 | 1 | 0 | 0 | 1 | 1 | 1 | 1 | 1 | 0 | 1 | 1 | 1 | 0 | 0 | 0 |
| | 1 | 1 | 0 | 1 | 1 | 0 | 1 | 1 | 1 | 1 | 0 | 0 | 0 | 0 | 1 | 1 | 1 | 1 | 1 |
| | 0 | 1 | 1 | 0 | 1 | 1 | 1 | 1 | 0 | 1 | 1 | 0 | 1 | 1 | 1 | 1 | 0 | 1 | 1 |
| | 0 | 0 | 1 | 1 | 1 | 1 | 0 | 0 | 1 | 1 | 1 | 1 | 1 | 1 | 0 | 1 | 1 | 1 | 1 |
| (Hexadecimal) | 0F | 1F | 37 | 2F | 3D | 33 | 1B | 1E | 2E | 3C | 36 | 26 | 32 | 35 | 1D | 3E | 2B | 39 | 3B |
| Second adjacent code (AND adjacent code) (Binary) | 1 | 1 | 1 | 1 | 1 | 1 | 0 | 0 | 0 | 0 | 0 | 0 | 0 | 0 | 0 | 0 | 0 | 1 | 0 |
| | 0 | 0 | 1 | 0 | 0 | 0 | 1 | 1 | 0 | 0 | 0 | 1 | 0 | 0 | 0 | 0 | 0 | 0 | 0 |
| | 0 | 1 | 1 | 1 | 0 | 0 | 0 | 0 | 1 | 1 | 1 | 0 | 0 | 0 | 1 | 0 | 0 | 0 | 0 |
| | 0 | 0 | 0 | 0 | 0 | 0 | 0 | 1 | 1 | 0 | 0 | 0 | 0 | 0 | 0 | 1 | 1 | 1 | 1 |
| | 0 | 0 | 0 | 0 | 0 | 1 | 1 | 0 | 0 | 0 | 0 | 0 | 0 | 1 | 1 | 0 | 0 | 0 | 1 |
| | 0 | 0 | 0 | 1 | 1 | 0 | 0 | 0 | 0 | 1 | 0 | 0 | 1 | 0 | 0 | 0 | 1 | 0 | 0 |
| (Hexadecimal) | 01 | 05 | 07 | 25 | 21 | 11 | 12 | 0A | 0C | 24 | 04 | 02 | 20 | 10 | 14 | 08 | 28 | 09 | 18 |

| Segment number (decimal) | 1 | 2 | 3 | 4 | 5 | 6 | 7 | 8 | 9 | 10 |
|---|---|---|---|---|---|---|---|---|---|---|
| Packet 1 generation code | 1 | 0 | 0 | 0 | 1 | 0 | 0 | 1 | 0 | 0 |
| Packet 2 generation code | 0 | 1 | 0 | 1 | 1 | 1 | 1 | 0 | 0 | 0 |
| Packet 3 generation code | 0 | 0 | 1 | 0 | 1 | 1 | 0 | 0 | 0 | 0 |
| Packet 4 generation code | 0 | 0 | 0 | 1 | 0 | 0 | 1 | 1 | 0 | 1 |
| Packet 5 generation code | 0 | 0 | 0 | 0 | 0 | 1 | 1 | 0 | 1 | 0 |
| Packet 6 generation code | 0 | 0 | 0 | 0 | 0 | 0 | 0 | 0 | 0 | 0 |
| Independent code (hexadecimal) | 01 | 02 | 04 | 0A | 07 | 16 | 1A | 09 | 10 | 08 |
| First adjacent code (hexadecimal) | 03 | 06 | 0E | 0F | 17 | 1E | 1B | 19 | 18 | |

| Segment number (decimal) | 1 | 2 | 3 | 4 | 5 | 6 | 7 | 8 | 9 | 10 |
|---|---|---|---|---|---|---|---|---|---|---|
| Packet 1 generation code | 0 | 0 | 0 | 0 | 0 | 1 | 1 | 0 | 1 | 0 |
| Packet 2 generation code | 0 | 0 | 0 | 1 | 1 | 0 | 0 | 0 | 1 | 1 |
| Packet 3 generation code | 0 | 1 | 1 | 0 | 0 | 0 | 0 | 1 | 0 | 1 |
| Packet 4 generation code | 1 | 0 | 1 | 0 | 1 | 1 | 0 | 1 | 1 | 1 |
| Packet 5 generation code | 1 | 1 | 0 | 1 | 0 | 0 | 1 | 1 | 0 | 0 |
| Packet 6 generation code | 1 | 1 | 1 | 1 | 1 | 1 | 1 | 0 | 0 | 0 |
| Independent code (hexadecimal) | 38 | 34 | 2C | 32 | 2A | 29 | 31 | 1C | 0B | 0E |
| Second adjacent code (hexadecimal) | 30 | 2[illegible] | 20 | 2[illegible] | 28 | 21 | 10 | 08 | 0A | |

| Packet number | 1 | 2 | 3 | 4 | 5 | 6 |
|---|---|---|---|---|---|---|
| Second exposure code | 0 | 0 | 0 | 0 | 0 | 1 |
| Binarization | 0 | 0 | 0 | 0 | 0 | 1 |

FIG. 59

(a) Table memory 601

| Measurement segment | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|---|---|---|---|---|---|---|---|---|---|---|---|---|---|---|
| First emission table | 100 | 0 | 0 | 0 | 100 | 0 | 100 | 0 | 92 | 0 | 0 | 0 | 76 | 0 | 0 | 64 | 0 | 0 | 52 | 0 | 0 | 0 | 0 | 32 | 28 | 0 | 0 | 16 | 0 | 0 | 4 |
| Second emission table | 0 | 100 | 0 | 0 | 0 | 100 | 0 | 0 | 92 | 0 | 84 | 0 | 0 | 72 | 0 | 0 | 60 | 56 | 0 | 0 | 0 | 0 | 0 | 0 | 28 | 24 | 20 | 0 | 12 | 0 | 0 |
| Third emission table | 0 | 0 | 100 | 0 | 100 | 0 | 0 | 0 | 92 | 0 | 84 | 0 | 0 | 0 | 68 | 0 | 0 | 0 | 52 | 48 | 44 | 0 | 0 | 0 | 0 | 0 | 20 | 16 | 0 | 8 | 4 |
| Fourth emission table | 0 | 0 | 0 | 100 | 0 | 100 | 100 | 0 | 0 | 88 | 84 | 0 | 0 | 0 | 0 | 0 | 60 | 0 | 0 | 48 | 0 | 40 | 0 | 32 | 0 | 0 | 0 | 0 | 12 | 0 | 4 |
| Fifth emission table | 0 | 0 | 0 | 0 | 0 | 0 | 0 | 96 | 0 | 88 | 0 | 0 | 76 | 72 | 68 | 0 | 60 | 0 | 52 | 48 | 0 | 0 | 36 | 0 | 0 | 24 | 0 | 0 | 0 | 8 | 0 |
| Sixth emission table | 0 | 0 | 0 | 0 | 0 | 0 | 0 | 0 | 0 | 0 | 0 | 80 | 0 | 0 | 0 | 64 | 0 | 56 | 0 | 0 | 44 | 40 | 36 | 32 | 28 | 24 | 20 | 16 | 12 | 8 | 4 |

(b) Emission codes

| Measurement segment | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|---|---|---|---|---|---|---|---|---|---|---|---|---|---|---|
| First emission code | 1 | 0 | 0 | 0 | 1 | 0 | 1 | 0 | 1 | 0 | 0 | 0 | 1 | 0 | 0 | 1 | 0 | 0 | 1 | 0 | 0 | 0 | 0 | 1 | 1 | 0 | 0 | 1 | 0 | 0 | 1 |
| Second emission code | 0 | 1 | 0 | 0 | 0 | 1 | 0 | 0 | 1 | 0 | 1 | 0 | 0 | 1 | 0 | 0 | 1 | 1 | 0 | 0 | 0 | 0 | 0 | 0 | 1 | 1 | 1 | 0 | 1 | 0 | 0 |
| Third emission code | 0 | 0 | 1 | 0 | 1 | 0 | 0 | 0 | 1 | 0 | 1 | 0 | 0 | 0 | 1 | 0 | 0 | 0 | 1 | 1 | 1 | 0 | 0 | 0 | 0 | 0 | 1 | 1 | 0 | 1 | 1 |
| Fourth emission code | 0 | 0 | 0 | 1 | 0 | 1 | 1 | 0 | 0 | 1 | 1 | 0 | 0 | 0 | 0 | 0 | 1 | 0 | 0 | 1 | 0 | 1 | 0 | 1 | 0 | 0 | 0 | 0 | 1 | 0 | 1 |
| Fifth emission code | 0 | 0 | 0 | 0 | 0 | 0 | 0 | 1 | 0 | 1 | 0 | 0 | 1 | 1 | 1 | 0 | 1 | 0 | 1 | 1 | 0 | 0 | 1 | 0 | 0 | 1 | 0 | 0 | 0 | 1 | 0 |
| Sixth emission code | 0 | 0 | 0 | 0 | 0 | 0 | 0 | 0 | 0 | 0 | 0 | 1 | 0 | 0 | 0 | 1 | 0 | 1 | 0 | 0 | 1 | 1 | 1 | 1 | 1 | 1 | 1 | 1 | 1 | 1 | 1 |

(c) Code register 602

| Measurement segment | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|---|---|---|---|---|---|---|---|---|---|---|---|---|---|---|
| Independent code | 1 | 2 | 4 | 8 | 5 | 10 | 9 | 16 | 7 | 24 | 14 | 32 | 17 | 18 | 20 | 33 | 26 | 34 | 21 | 28 | 36 | 40 | 48 | 41 | 35 | 50 | 38 | 37 | 42 | 52 | 45 |
| Adjacent code | 3 | | 12 | | 15 | | 25 | | 31 | | 46 | | 19 | | 53 | | 58 | | 29 | | 44 | | 57 | | 51 | | 39 | | 62 | | |
| | | 6 | | 13 | | 11 | | 23 | | 30 | | 49 | | 22 | | 59 | | 55 | | 60 | | 56 | | 43 | | 54 | | 47 | | 61 | |

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| Measurement segment | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 |
| Independent code | 45 | 52 | 42 | 37 | 38 | 50 | 35 | 41 | 48 | 40 | 36 | 28 | 21 | 34 | 26 | 33 | 20 | 18 | 17 | 32 | 14 | 24 | 7 | 16 | 9 | 10 | 5 | 8 | 4 | 2 | 1 |
| Adjacent code | 61 | | 47 | | 54 | | 43 | | 56 | | 60 | | 55 | | 59 | | 22 | | 49 | | 30 | | 23 | | 11 | | 13 | | 6 | | |
| | | 62 | | 39 | | 51 | | 57 | | 44 | | 29 | | 58 | | 53 | | 19 | | 46 | | 31 | | 25 | | 15 | | 12 | | 3 | |

(b)

| | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| Measurement segment | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 |
| Independent code | 52 | 50 | 25 | 49 | 21 | 44 | 42 | 48 | 24 | 38 | 35 | 40 | 33 | 36 | 19 | 34 | 13 | 32 | 28 | 18 | 20 | 11 | 17 | 12 | 10 | 16 | 7 | 8 | 1 | 4 | 2 | 1 |
| Adjacent code | 54 | | 57 | | 61 | | 58 | | 62 | | 43 | | 37 | | 51 | | 45 | | 30 | | 31 | | 29 | | 26 | | 15 | | 5 | | 3 | |
| | | 59 | | 53 | | 46 | | 56 | | 39 | | 41 | | 55 | | 47 | | 60 | | 22 | | 27 | | 14 | | 23 | | 9 | | 6 | |

FIG. 67

| Measurement segment | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|---|---|---|---|---|---|---|---|---|---|---|---|---|---|---|
| First emission table | 400 | 0 | 0 | 0 | 400 | 0 | 362 | 0 | 322 | 0 | 0 | 0 | 246 | 0 | 0 | 194 | 0 | 0 | 145 | 0 | 0 | 0 | 0 | 73 | 60 | 0 | 0 | 27 | 0 | 0 | 4 |
| Second emission table | 0 | 400 | 0 | 0 | 0 | 382 | 0 | 0 | 322 | 0 | 283 | 0 | 0 | 228 | 0 | 0 | 177 | 160 | 0 | 0 | 0 | 0 | 0 | 0 | 60 | 49 | 38 | 0 | 18 | 0 | 0 |
| Third emission table | 0 | 0 | 400 | 0 | 400 | 0 | 0 | 0 | 322 | 0 | 283 | 0 | 0 | 0 | 211 | 0 | 0 | 0 | 145 | 129 | 114 | 0 | 0 | 0 | 0 | 0 | 38 | 27 | 0 | 10 | 4 |
| Fourth emission table | 0 | 0 | 0 | 400 | 0 | 382 | 362 | 0 | 0 | 303 | 283 | 0 | 0 | 0 | 0 | 0 | 177 | 0 | 0 | 129 | 0 | 100 | 0 | 73 | 0 | 0 | 0 | 0 | 18 | 0 | 4 |
| Fifth emission table | 0 | 0 | 0 | 0 | 0 | 0 | 0 | 342 | 0 | 303 | 0 | 0 | 246 | 228 | 211 | 0 | 177 | 0 | 145 | 129 | 0 | 0 | 86 | 0 | 0 | 49 | 0 | 0 | 0 | 10 | 0 |
| Sixth emission table | 0 | 0 | 0 | 0 | 0 | 0 | 0 | 0 | 0 | 0 | 0 | 265 | 0 | 0 | 0 | 194 | 0 | 160 | 0 | 0 | 114 | 100 | 86 | 73 | 60 | 49 | 38 | 27 | 18 | 10 | 4 |

FIG. 70

| Measurement segment | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | Total |
|---|---|---|---|---|---|---|---|---|---|---|---|---|---|---|---|---|---|---|---|---|---|---|---|---|---|---|---|---|---|---|---|---|
| First emission table | 16 | 0 | 0 | 0 | 15 | 0 | 14 | 0 | 13 | 0 | 0 | 0 | 10 | 0 | 0 | 9 | 0 | 0 | 8 | 0 | 0 | 0 | 0 | 5 | 4 | 0 | 0 | 3 | 0 | 0 | 3 | 100 |
| Second emission table | 0 | 21 | 0 | 0 | 0 | 15 | 0 | 0 | 13 | 0 | 12 | 0 | 0 | 9 | 0 | 0 | 8 | 8 | 0 | 0 | 0 | 0 | 0 | 0 | 4 | 4 | 3 | 0 | 3 | 0 | 0 | 100 |
| Third emission table | 0 | 0 | 17 | 0 | 15 | 0 | 0 | 0 | 13 | 0 | 12 | 0 | 0 | 0 | 9 | 0 | 0 | 0 | 8 | 7 | 7 | 0 | 0 | 0 | 0 | 0 | 3 | 3 | 0 | 3 | 3 | 100 |
| Fourth emission table | 0 | 0 | 0 | 15 | 0 | 15 | 14 | 0 | 0 | 12 | 12 | 0 | 0 | 0 | 0 | 0 | 8 | 0 | 0 | 7 | 0 | 6 | 0 | 5 | 0 | 0 | 0 | 0 | 3 | 0 | 3 | 100 |
| Fifth emission table | 0 | 0 | 0 | 0 | 0 | 0 | 0 | 24 | 0 | 12 | 0 | 0 | 10 | 9 | 9 | 0 | 8 | 0 | 8 | 7 | 0 | 0 | 6 | 0 | 0 | 4 | 0 | 0 | 0 | 3 | 0 | 100 |
| Sixth emission table | 0 | 0 | 0 | 0 | 0 | 0 | 0 | 0 | 0 | 0 | 0 | 36 | 0 | 0 | 0 | 9 | 0 | 8 | 0 | 0 | 7 | 6 | 6 | 5 | 4 | 4 | 3 | 3 | 3 | 3 | 3 | 100 |

FIG. 76

| Segment number (decimal) | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|---|
| First emission code | 0 | 1 | 1 | 1 | 0 | 1 | 0 | 1 | 0 | 1 | 1 | 1 | 0 | 1 | 1 | 0 | 1 | 1 | 0 | 1 | 0 | 1 | 1 | 1 | 1 | 1 | 0 | 0 | 0 | 1 | 0 |
| Second emission code | 1 | 0 | 1 | 1 | 1 | 0 | 1 | 1 | 0 | 1 | 0 | 1 | 1 | 0 | 1 | 1 | 0 | 0 | 0 | 0 | 1 | 1 | 1 | 1 | 1 | 0 | 1 | 1 | 0 | 1 | 1 |
| Third emission code | 1 | 1 | 0 | 1 | 0 | 1 | 1 | 1 | 0 | 1 | 0 | 1 | 1 | 1 | 0 | 1 | 1 | 0 | 1 | 1 | 0 | 0 | 0 | 1 | 1 | 1 | 0 | 1 | 1 | 0 | 1 |
| Fourth emission code | 1 | 1 | 1 | 0 | 1 | 0 | 0 | 1 | 1 | 0 | 0 | 1 | 1 | 1 | 1 | 1 | 0 | 1 | 1 | 1 | 1 | 0 | 1 | 0 | 1 | 0 | 1 | 0 | 1 | 1 | 0 |
| Fifth emission code | 1 | 1 | 1 | 1 | 1 | 1 | 1 | 0 | 1 | 0 | 1 | 1 | 0 | 0 | 0 | 1 | 0 | 1 | 1 | 0 | 0 | 0 | 1 | 1 | 0 | 1 | 1 | 1 | 1 | 0 | 0 |
| Sixth emission code | 1 | 1 | 1 | 1 | 1 | 1 | 1 | 1 | 1 | 1 | 1 | 0 | 1 | 1 | 1 | 0 | 1 | 0 | 0 | 0 | 1 | 1 | 0 | 0 | 0 | 0 | 0 | 0 | 0 | 0 | 0 |
| Independent code (hexadecimal) | 3E | 3D | 3B | 37 | 3A | 35 | 36 | 2F | 38 | 27 | 31 | 1F | 2E | 2D | 2B | 1E | 25 | 19 | 1C | 0D | 2A | 23 | 1B | 17 | 0F | 15 | 1A | 16 | 1D | 0B | 06 |

| | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| Second adjacent code (AND adjacent code) (Binary) | 0 | 1 | 1 | 0 | 0 | 0 | 0 | 0 | 0 | 1 | 1 | 0 | 0 | 1 | 0 | 0 | 1 | 0 | 0 | 0 | 0 | 1 | 1 | 1 | 1 | 0 | 0 | 0 | 1 | 0 |
| | 0 | 0 | 1 | 1 | 0 | 0 | 1 | 0 | 0 | 0 | 0 | 1 | 0 | 0 | 1 | 0 | 0 | 0 | 0 | 0 | 1 | 1 | 1 | 1 | 0 | 0 | 1 | 0 | 0 | 1 |
| | 1 | 0 | 0 | 0 | 0 | 1 | 1 | 0 | 0 | 0 | 0 | 1 | 1 | 0 | 0 | 1 | 0 | 0 | 1 | 0 | 0 | 0 | 0 | 1 | 1 | 0 | 0 | 1 | 0 | 0 |
| | 1 | 1 | 0 | 0 | 0 | 0 | 0 | 1 | 0 | 0 | 0 | 1 | 1 | 1 | 1 | 0 | 0 | 1 | 1 | 1 | 0 | 0 | 0 | 0 | 0 | 0 | 0 | 0 | 1 | 0 |
| | 1 | 1 | 1 | 1 | 1 | 1 | 0 | 0 | 0 | 0 | 1 | 0 | 0 | 0 | 0 | 0 | 0 | 1 | 0 | 0 | 0 | 0 | 1 | 0 | 0 | 1 | 1 | 1 | 0 | 0 |
| | 1 | 1 | 1 | 1 | 1 | 1 | 1 | 1 | 1 | 1 | 0 | 0 | 1 | 1 | 0 | 0 | 0 | 0 | 0 | 0 | 1 | 0 | 0 | 0 | 0 | 0 | 0 | 0 | 0 | 0 |
| (Hexadecimal) | 3C | 39 | 33 | 32 | 30 | 34 | 26 | 28 | 20 | 21 | 11 | 0E | 2C | 29 | 0A | 04 | 01 | 18 | 0C | 08 | 22 | 03 | 13 | 07 | 05 | 10 | 12 | 14 | 09 | 02 |

FIG. 77

| Segment number (decimal) | | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|
| First emission code | | 1 | 1 | 1 | 1 | 1 | 1 | 1 | 0 | 0 | 0 | 0 | 0 | 0 | 0 | 1 | 0 | 0 | 1 | 1 | 0 |
| Second emission code | | 1 | 0 | 1 | 1 | 0 | 0 | 1 | 1 | 1 | 0 | 0 | 1 | 1 | 0 | 0 | 0 | 1 | 0 | 0 | 1 |
| Third emission code | | 0 | 1 | 1 | 1 | 1 | 0 | 0 | 0 | 1 | 1 | 1 | 1 | 0 | 0 | 1 | 1 | 0 | 0 | 0 | 0 |
| Fourth emission code | | 0 | 1 | 0 | 0 | 1 | 0 | 0 | 1 | 1 | 1 | 0 | 0 | 0 | 0 | 0 | 1 | 1 | 1 | 1 | 1 |
| Fifth emission code | | 0 | 0 | 1 | 0 | 0 | 1 | 1 | 1 | 0 | 0 | 1 | 0 | 0 | 1 | 1 | 1 | 0 | 0 | 1 | 1 |
| Sixth emission code | | 0 | 0 | 0 | 1 | 1 | 1 | 0 | 0 | 0 | 1 | 1 | 0 | 1 | 1 | 0 | 0 | 1 | 1 | 0 | 1 |
| Independent code (hexadecimal) | | 03 | 0D | 17 | 27 | 2D | 31 | 13 | 1A | 0E | 2C | 34 | 06 | 22 | 30 | 15 | 1C | 2A | 29 | 19 | 3A |
| First adjacent code (OR adjacent code) | (Binary) | 1 | 1 | 1 | 1 | 1 | 1 | 1 | 0 | 0 | 0 | 0 | 0 | 0 | 1 | 1 | 0 | 1 | 1 | 1 | |
| | | 1 | 1 | 1 | 1 | 0 | 1 | 1 | 1 | 1 | 0 | 1 | 1 | 1 | 0 | 0 | 1 | 1 | 0 | 1 | |
| | | 1 | 1 | 1 | 1 | 1 | 0 | 0 | 1 | 1 | 1 | 1 | 1 | 0 | 1 | 1 | 1 | 0 | 0 | 0 | |
| | | 1 | 1 | 0 | 1 | 1 | 0 | 1 | 1 | 1 | 1 | 0 | 0 | 0 | 0 | 1 | 1 | 1 | 1 | 1 | |
| | | 0 | 1 | 1 | 0 | 1 | 1 | 1 | 1 | 0 | 1 | 1 | 0 | 1 | 1 | 1 | 1 | 0 | 1 | 1 | |
| | | 0 | 0 | 1 | 1 | 1 | 1 | 0 | 0 | 1 | 1 | 1 | 1 | 1 | 1 | 0 | 1 | 1 | 1 | 1 | |
| | (Hexadecimal) | 0F | 1F | 37 | 2F | 3D | 33 | 1B | 1E | 2E | 3C | 36 | 26 | 32 | 35 | 1D | 3E | 2B | 39 | 3B | |
| Second adjacent code (AND adjacent code) | (Binary) | 1 | 1 | 1 | 1 | 1 | 1 | 0 | 0 | 0 | 0 | 0 | 0 | 0 | 0 | 0 | 0 | 0 | 1 | 0 | |
| | | 0 | 0 | 1 | 0 | 0 | 0 | 1 | 1 | 0 | 0 | 0 | 1 | 0 | 0 | 0 | 0 | 0 | 0 | 0 | |
| | | 0 | 1 | 1 | 1 | 0 | 0 | 0 | 0 | 1 | 1 | 1 | 0 | 0 | 0 | 1 | 0 | 0 | 0 | 0 | |
| | | 0 | 0 | 0 | 0 | 0 | 0 | 0 | 1 | 1 | 0 | 0 | 0 | 0 | 0 | 0 | 1 | 1 | 1 | 1 | |
| | | 0 | 0 | 0 | 0 | 0 | 1 | 1 | 0 | 0 | 0 | 0 | 0 | 0 | 1 | 1 | 0 | 0 | 0 | 1 | |
| | | 0 | 0 | 0 | 1 | 1 | 0 | 0 | 0 | 0 | 1 | 0 | 0 | 1 | 0 | 0 | 0 | 1 | 0 | 0 | |
| | (Hexadecimal) | 01 | 05 | 07 | 25 | 21 | 11 | 12 | 0A | 0C | 24 | 04 | 02 | 20 | 10 | 14 | 08 | 28 | 09 | 18 | |

RANGING DEVICE AND RANGING METHOD

CROSS-REFERENCE OF RELATED APPLICATIONS

This application is the U.S. National Phase under 35 U.S.C. § 371 of International Patent Application No. PCT/JP2020/040870, filed on Oct. 30, 2020, which in turn claims the benefit of Japanese Patent Application No. 2019-200085, filed on Nov. 1, 2019, and Japanese Patent Application No. 2019-209169, filed on Nov. 19, 2019, the entire disclosures of which Applications are incorporated by reference herein.

TECHNICAL FIELD

The present invention relates to a ranging device and a ranging method.

BACKGROUND ART

One of the several known methods for detecting objects is the time of flight (TOF) method, which uses the time it takes light to travel to and from a target object to be measured.

Patent Literature (PTL) 1 discloses a conventional technique in which signal accumulation is performed by transferring electric charges to two different signal storage means at different phases in synchronization with the intermittent operation of light from the light source, the distance to the target object is calculated from the distribution ratio of the accumulated signals, and background light removal is further performed to eliminate the influence of the background light by accumulating only background light in a third signal storage means.

PTL 2 discloses a conventional technique in which signals are accumulated by transferring charges to three different signal storage means at different phases in synchronization with the intermittent operation of light from the light source, the signal storage means in which only background light is accumulated is identified according to the determination result of the magnitude of the accumulated signal amount, and background light removal is performed to eliminate the influence of background light.

CITATION LIST

Patent Literature

[PTL 1] Japanese Unexamined Patent Application Publication No. 2004-294420

[PTL 2] WO 2016/189808

SUMMARY OF INVENTION

Technical Problem

However, with the conventional technique disclosed in PTL 1, the third signal storage means is dedicated to background light, so the ranging range (limit) D depends on the pulse width (To) of the light source, and if light speed (299,792,458 m/s) is c, D is expressed as follows.

$$D=c\times To/2$$

As the pulse width (To) of the light source increases, the ranging range D increases and the distance resolution decreases, so the ranging accuracy is inversely proportional to the pulse width (To) of the light source. Stated differently, if the pulse width (To) of the light source is increased to extend the ranging range (limit) D, the ranging accuracy conversely decreases.

It is therefore difficult to achieve both an increase in ranging range and an improvement in ranging accuracy. With the conventional technique disclosed in PTL 2, it is necessary to increase the number of signal storage means in order to extend the ranging range while maintaining the ranging accuracy. It is therefore difficult to achieve both an increase in ranging range and an improvement in ranging accuracy.

In view of the above problems, the present disclosure has an object to provide a ranging device and a ranging method that achieve a high ranging accuracy and a wide ranging range.

Solution to Problem

In order to overcome the problems described above, a ranging device according to one aspect of the present disclosure includes: a pulse generator that generates an emission pulse instructing emission timing and an exposure pulse instructing exposure timing for receiving reflected light; a controller that controls the pulse generator according to n (n is an integer greater than or equal to 4) types of packet generation codes indicating whether or not to expose or emit light in each of unit segments corresponding to distance segments into which a ranging range is divided; a light source that emits light according to the emission pulse; a solid-state image capturer that captures an image according to the exposure pulse; and a distance calculator that calculates a distance based on n types of signal values obtained from the solid-state image capturer, the n types of signal values being per unit segment.

A ranging method according to the present disclosure is used in a ranging device including: a pulse generator that generates an emission pulse instructing emission timing and an exposure pulse instructing exposure timing for receiving reflected light; a controller that controls the pulse generator; a light source that emits light according to the emission pulse; a solid-state image capturer that captures an image according to the exposure pulse; and a distance calculator that calculates a distance based on signal values obtained from the solid-state image capturer. The ranging method includes: generating, by the pulse generator, an exposure pulse and an emission pulse according to n (n is an integer greater than or equal to 4) types of packet generation codes indicating whether or not to expose or emit light in each of unit segments corresponding to distance segments into which a ranging range is divided; obtaining n types of signal values obtained from the solid-state image capturer, the n types of signal values being per unit segment; binarizing the n types of signal values into an n-bit binary number; determining the binarized n-bit binary number as an exposure code; generating n-bit binary numbers as independent codes, each n-bit binary number being n bits included in the n types of packet generation codes per unit segment; and comparing the exposure code with the independent codes and calculating a distance corresponding to the unit segment that matches. Each of the n types of packet generation codes instructs a plurality of exposure pulses for one emission pulse or a plurality of emission pulses for one exposure pulse.

Advantageous Effects of Invention

With the ranging device according to the present disclosure, it is possible to achieve a high ranging accuracy and a wide ranging range.

BRIEF DESCRIPTION OF DRAWINGS

FIG. 5 illustrates generation codes of packets 1 to 6 that are used by a pulse generator to generate unit drive patterns for packets 1 to 6 and a discharge drive pulse for controlling the solid-state image capturer according to Embodiment 1.

FIG. 9 illustrates data for storing generation codes of packets 1 to 6 of FIG. 5 in memory (LUT) in a distance calculator according to Embodiment 1.

FIG. 17 illustrates generation codes of packets 1 to 6 that take background light into account and are used by a pulse generator to generate unit drive patterns for packets 1 to 6 and a discharge drive pulse for controlling the solid-state image capturer according to Embodiment 2.

FIG. 20 illustrates data for storing generation codes of packets 1 to 6 of FIG. 17 in memory (LUT) in a distance calculator according to Embodiment 2.

FIG. 23 illustrates generation codes of packets 1 to 6 that have overlapping independent codes and are used by a pulse generator to generate unit drive patterns for packets 1 to 6 and a discharge drive pulse for controlling the solid-state image capturer according to Embodiment 2.

FIG. 25 illustrates data for storing generation codes of packets 1 to 6 of FIG. 23 in memory (LUT) in a distance calculator according to Embodiment 2.

FIG. 28 illustrates data for storing generation codes of packets 1 to 6 of FIG. 17 in memory (LUT) in a distance calculator according to Embodiment 3.

FIG. 29A illustrates processes performed by a data selection block of a distance calculator according to Embodiment 3.

FIG. 29B illustrates a continuation of the processes performed by the data selection block of the distance calculator according to Embodiment 3.

FIG. 31A illustrates processes performed by a data selection block of a distance calculator with an improved S/N ratio according to an embodiment.

FIG. 31B illustrates a continuation of the processes performed by the data selection block of the distance calculator with an improved S/N ratio according to Embodiment 3.

FIG. 31C illustrates a continuation of the processes performed by the data selection block of the distance calculator with an improved S/N ratio according to Embodiment 3.

FIG. 34 illustrates generation codes of packets 1 to 6 that take background light into account and are used by a pulse generator to generate unit drive patterns for packets 1 to 6 and a discharge drive pulse for controlling the solid-state image capturer according to Embodiment 4.

FIG. 40A illustrates data selection processes performed by a distance calculator according to Embodiment 4.

FIG. 40B illustrates a continuation of the data selection processes performed by the distance calculator according to Embodiment 4.

FIG. 40C illustrates a continuation of the data selection processes performed by the distance calculator according to Embodiment 4.

FIG. 40D illustrates a continuation of the data selection processes performed by the distance calculator according to Embodiment 4.

FIG. 45A illustrates an example of the assignment of packet generation codes, independent codes, and second adjacent codes according to Embodiment 5.

FIG. 45B illustrates an example of the assignment of packet generation codes, independent codes, and first adjacent codes for comparison with FIG. 45A.

FIG. 48 illustrates an example of the assignment of packet generation codes, independent codes, first adjacent codes, and second adjacent codes according to Embodiment 6.

FIG. 59 illustrates specific examples of (a) emission tables according to Embodiments 7 through 10, (b) emission codes according to Embodiments 7 through 10, and (c) independent codes and first adjacent codes according to Embodiments 7 through 10.

In FIG. 64, (a) illustrates another example of independent codes and first adjacent codes according to Embodiment 7, and (b) illustrates yet another example.

FIG. 67 illustrates an example of emission tables according to Embodiment 8.

FIG. 70 illustrates an example of emission tables according to Embodiment 9.

FIG. 76 illustrates an example of the assignment of packet generation codes and second adjacent codes according to Embodiment 11.

FIG. 77 illustrates an example of the assignment of packet generation codes, first adjacent codes, and second adjacent codes according to Embodiment 12.

DESCRIPTION OF EMBODIMENTS

Figure 1:
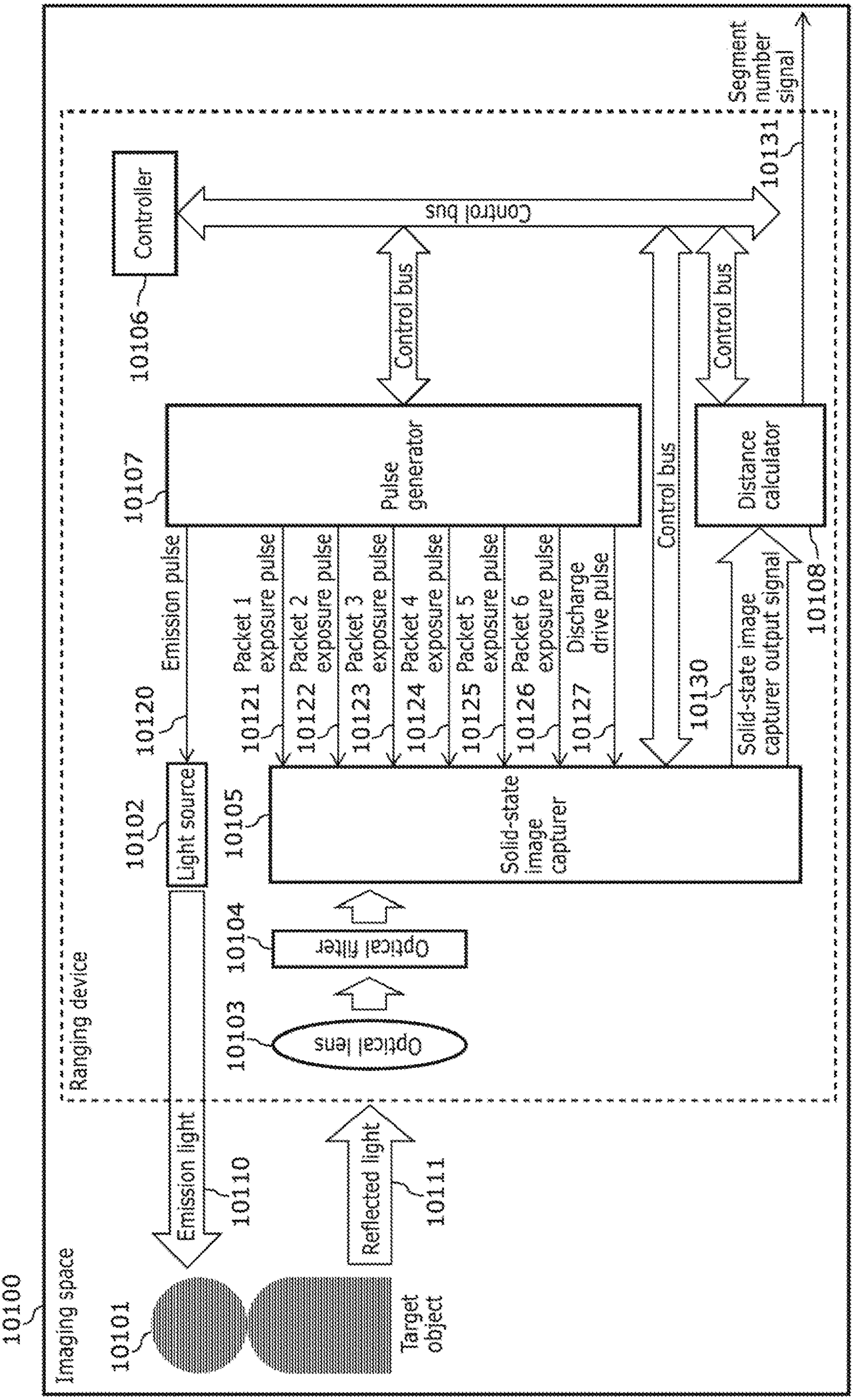
FIG. 1 schematically illustrates a configuration of a time of flight (TOF) ranging device according to Embodiment 1.

Hereinafter, a ranging device according to embodiments of the present disclosure will be described with reference to the drawings. Each of the following embodiments shows a specific example of the present disclosure. The numerical values, shapes, materials, elements, the arrangement and connection of the elements, etc., indicated in the following embodiments are mere examples, and therefore do not intend to limit the present disclosure.

Outline of Embodiments

It is difficult to achieve both an increase in ranging range and an improvement in ranging accuracy with the ranging device described in the Background Art section. In view of this, the present disclosure provides a ranging device and a ranging method that achieve a high ranging accuracy and a wide ranging range.

A ranging device according to one aspect of the present disclosure thus includes: a pulse generator that generates an emission pulse instructing emission timing and an exposure pulse instructing exposure timing for receiving reflected light; a controller that controls the pulse generator according to n (n is an integer greater than or equal to 4) types of packet generation codes indicating whether or not to expose or emit light in each of unit segments corresponding to distance segments into which a ranging range is divided; a light source that emits light according to the emission pulse; a solid-state image capturer that captures an image according to the exposure pulse; and a distance calculator that calculates a distance based on n types of signal values obtained from the solid-state image capturer, the n types of signal values being per unit segment.

This makes it possible to achieve a high ranging accuracy and a wide ranging range.

A ranging method according to the present disclosure is used in a ranging device including: a pulse generator that generates an emission pulse instructing emission timing and an exposure pulse instructing exposure timing for receiving reflected light; a controller that controls the pulse generator; a light source that emits light according to the emission pulse; a solid-state image capturer that captures an image according to the exposure pulse; and a distance calculator that calculates a distance based on signal values obtained from the solid-state image capturer. The ranging method includes: generating, by the pulse generator, an exposure pulse and an emission pulse according to n (n is an integer greater than or equal to 4) types of packet generation codes indicating whether or not to expose or emit light in each of unit segments corresponding to distance segments into which a ranging range is divided; obtaining n types of signal values obtained from the solid-state image capturer, the n types of signal values being per unit segment; binarizing the n types of signal values into an n-bit binary number; determining the binarized n-bit binary number as an exposure code; generating n-bit binary numbers as independent codes, each n-bit binary number being n bits included in the n types of packet generation codes per unit segment; and comparing the exposure code with the independent codes and calculating a distance corresponding to the unit segment that matches. Each of the n types of packet generation codes instructs a plurality of exposure pulses for one emission pulse or a plurality of emission pulses for one exposure pulse.

This makes it possible to achieve a high ranging accuracy and a wide ranging range.

Hereinafter, in Embodiments 1 to 6, a ranging device premised on the above-described n types of packet generation codes that indicate whether or not to expose in each of unit segments will be described. In Embodiments 7 to 11, a ranging device premised on the above-described n types of packet generation codes that indicate whether or not to emit light in each of unit segments will be described.

Embodiment 1

FIG. 1 schematically illustrates a configuration of a time of flight (TOF) ranging device and a surrounding object according to Embodiment 1.

In FIG. 1, imaging space 10100 is a space including the ranging device and target object 10101 whose distance is to be measured. Target object 10101 is not limited to a person, and may be any object. The ranging device illustrated in FIG. 1 includes light source 10102, optical lens 10103, optical filter 10104, solid-state image capturer 10105, controller 10106, pulse generator 10107, and distance calculator 10108.

Light source 10102 emits pulsed light according to emission pulse 10120 from pulse generator 10107. Emission pulse 10120 is a signal that instructs light source 10102 to emit pulsed light. Light source 10102 emits infrared light, for example. Light source 10102 may be an LED or a laser element.

Optical lens 10103 and optical filter 10104 are optical systems that guide the reflected light from target object 10101 to solid-state image capturer 10105. Optical filter 10104 is, for example, an infrared transmission filter.

Controller 10106 controls pulse generator 10107 according to n (n is an integer greater than or equal to 4) types of packet generation codes that indicate whether or not to expose in each of unit segments corresponding to distance segments into which the ranging range is divided. Here, a packet is a signal charge generated and accumulated by solid-state image capturer 10105 through plural exposures made according to the packet generation codes. n types of packets (signal charges) are generated from the n types of packet generation codes. In the following, n=6 is used as specific example.

Pulse generator 10107 generates emission pulse 10120 that instructs the emission timing of light source 10102 and exposure pulses that instruct the exposure timing of solid-state image capturer 10105. Pulse generator 10107 generates six signals as the n types of exposure pulses, namely packet 1 exposure pulse 10121 to packet 6 exposure pulse 10126.

Solid-state image capturer 10105 captures images according to emission pulse 10120 and the n types of exposure pulses. As used herein, capturing an image refers to obtaining a distance image whose pixels each indicate a distance by receiving reflected light, mainly for ranging.

Distance calculator 10108 calculates distance based on n types of signal values per unit segment, which are obtained from solid-state image capturer 10105.

As illustrated in FIG. 1, pulsed emission light 10110 having a wavelength of 940 nm (pulse width: 10 ns) is emitted from light source 10102 to target object 10101 in imaging space 10100, and reflected light 10111 reflected by target object 10101 is received by solid-state image capturer 10105 through optical lens 10103 and optical filter 10104 that transmits light in the near-infrared wavelength region around 940 nm, whereby an image is captured. The emission timing of light source 10102 and the exposure timing of solid-state image capturer 10105 are controlled by emission pulse 10120, exposure pulses 10121 to 10126 of packets 1 to 6, and discharge drive pulse 10127 from pulse generator 10107, which are controlled from controller 10106 via a control bus. Light source 10102 emits emission light 10110 when emission pulse 10120 is high level, and does not emit emission light 10110 when emission pulse 10120 is low level. For each pixel, solid-state image capturer 10105 outputs solid-state image capturer output signal 10130, which is six types of signal values corresponding to exposure pulses 10121 to 10126 of packets 1 to 6, to distance calculator 10108. Distance calculator 10108 uses solid-state image capturer output signal 10130 and control information from controller 10106 to output, for each pixel, segment number signal 10131 corresponding to the distance to target object 10101.

Light source 10102, optical lens 10103, optical filter 10104, solid-state image capturer 10105, controller 10106, pulse generator 10107, and distance calculator 10108 constitute the ranging device. Regarding the configuration, light source 10102 includes a drive circuit and light emitting elements, and emits light in response to application of voltage from the drive circuit. Laser diodes or other light emitting elements may be used as the light emitting elements. For example, controller 10106, pulse generator 10107, and distance calculator 10108 are realized by a combination of a central processing unit (CPU), a field programmable gate array (FPGA), a digital signal processor (DSP), and an analog front end (AFE) and the like.

Figure 2:
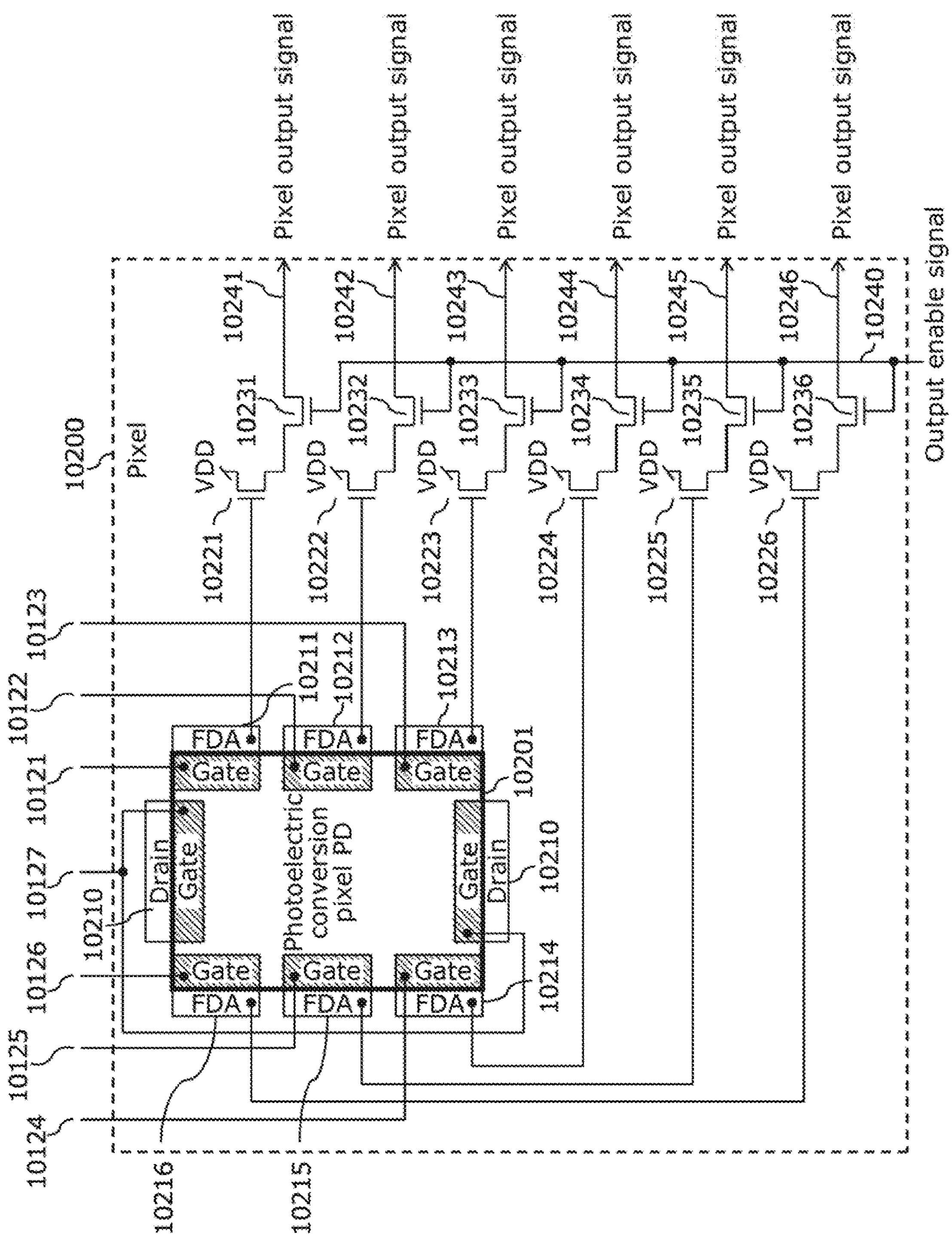
FIG. 2 illustrates a configuration of one pixel in a solid-state image capturer according to Embodiments 1 through 4.

FIG. 2 illustrates a configuration of pixel 10200 in solid-state image capturer 10105 according to Embodiments 1 through 4.

As illustrated in FIG. 2, pixel 10200 includes photoelectric conversion pixel 10201, two drains 10210, six floating diffusion amplifiers (FDAs) 10211 to 10216, six source follower circuits 10221 to 10226, and six output selection transistors 10231 to 10236. Pixel 10200 includes a gate electrode between photoelectric conversion pixel 10201 on one side and each of drains 10210 and FDAs 10211 to 10216 on the other.

Photoelectric conversion pixel 10201 is configured of a photodiode (PD) that receives reflected light 10111 and performs photoelectric conversion.

Drains 10210 discharge the signal charge that is photoelectrically converted in photoelectric conversion pixel 10201.

Each of FDAs 10211 to 10216 stores the signal charge photoelectrically converted by photoelectric conversion pixel 10201.

Source follower circuit 10221 outputs a voltage corresponding to the amount of signal charge in FDA (signal charge accumulator) 10211. The same applies to the source follower circuits 10222 to 10226.

Output selection transistor 10231 outputs the output voltage of source follower circuit 10221 as pixel output signal 10241 when the output enable signal is high level. The same applies to output selection transistors 10232 through 10236.

Next, operations of pixel 10200 will be described. When packet 1 exposure pulse 10121 is set to high level, the signal charge photoelectrically converted in photoelectric conversion pixel 10201 is accumulated in FDA 10211. When packet 2 exposure pulse 10122 is set to high level, the signal charge photoelectrically converted in photoelectric conversion pixel 10201 is accumulated in FDA 10212. When packet 3 exposure pulse 10123 is set to high level, the signal charge photoelectrically converted in photoelectric conversion pixel 10201 is accumulated in FDA 10213. When packet 4 exposure pulse 10124 is set to high level, the signal charge photoelectrically converted in photoelectric conversion pixel 10201 is accumulated in FDA 10214. When packet 5 exposure pulse 10125 is set to high level, the signal charge photoelectrically converted in photoelectric conversion pixel 10201 is accumulated in FDA 10215. When packet 6 exposure pulse 10126 is set to high level, the signal charge photoelectrically converted in photoelectric conversion pixel 10201 is accumulated in FDA 10216.

When discharge drive pulse 10127 is set to high level, the signal charge photoelectrically converted in photoelectric conversion pixel 10201 is discharged to drains 10210. Accordingly, six types of imaging corresponding to exposure pulses 10121 to 10126 of packets 1 to 6 are performed per pixel by: discharging the signal charge photoelectrically converted in photoelectric conversion pixel 10201 to drains 10210 when all exposure pulses 10121 to 10126 of packets 1 to 6 are low level by setting discharge drive pulse 10127 to high level when all exposure pulses 10121 to 10126 of packets 1 to 6 are low level; and accumulating the signal charge from photoelectric conversion pixel 10201 in FDAs 10211 to 10216 corresponding to exposure pulses 10121 to 10126 of packets 1 to 6 only when one of the six exposure pulses 10121 to 10126 of packets 1 to 6 is high level by, when one of the six exposure pulses 10121 to 10126 of packets 1 to 6 is high level, setting the remaining five to low level and setting discharge drive pulse 10127 to low level. FDAs 10211 through 10216 accumulate signal charge, resulting in a voltage corresponding to the amount of signal charge, and generate a packet 1 voltage value corresponding to the amount of signal charge in FDA 10211, a packet 2 voltage value corresponding to the amount of signal charge in FDA 10212, a packet 3 voltage value corresponding to the amount of signal charge in FDA 10213, a packet 4 voltage value corresponding to the amount of signal charge in FDA 10214, a packet 5 voltage value corresponding to the amount of signal charge in FDA 10215, and a packet 6 voltage value corresponding to the amount of signal charge in FDA 10216. By setting output enable signal 10240 to high level, simultaneously, the packet 1 voltage value is output to pixel output signal 10241 through source follower circuit 10221 and output selection transistor 10231, the packet 2 voltage value is output to pixel output signal 10242 through source follower circuit 10222 and output selection transistor 10232, the packet 3 voltage value is output to pixel output signal 10243 through source follower circuit 10223 and output selection transistor 10233, the packet 4 voltage value is output to pixel output signal 10244 through source follower circuit 10224 and output selection transistor 10234, the packet 5 voltage value is output to pixel output signal 10245 through source follower circuit 10225 and output selection transistor 10235, and the packet 6 voltage value is output to pixel output signal 10246 through source follower circuit 10226 and output selection transistor 10236.

Figure 3:
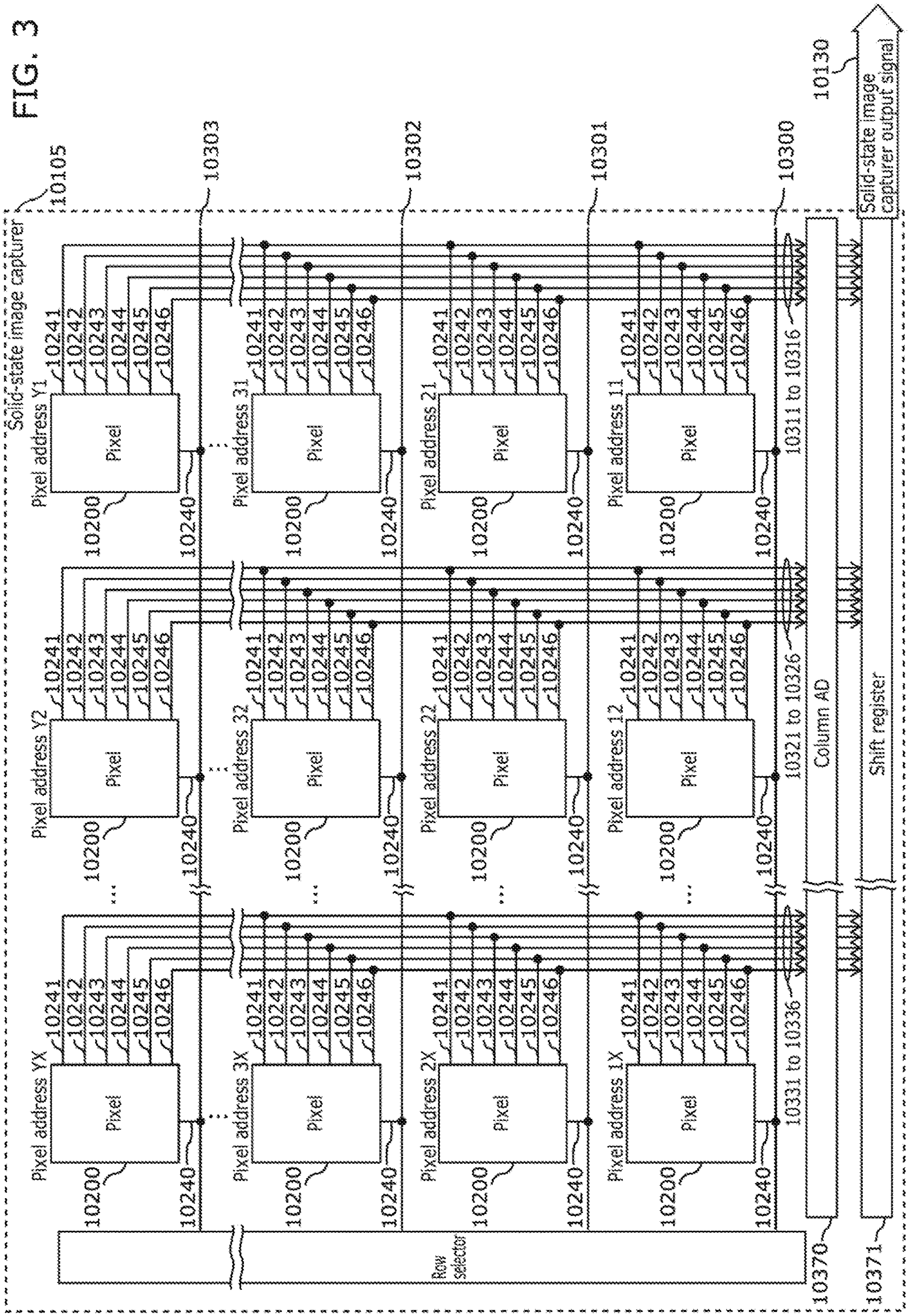
FIG. 3 illustrates a configuration of a solid-state image capturer according to Embodiments 1 through 4.

FIG. 3 illustrates a configuration of solid-state image capturer 10105 according to Embodiments 1 through 4. Solid-state image capturer 10105 in FIG. 3 includes a plurality of pixels 10200 arranged two-dimensionally, a row selector, column AD 10370, and shift register 10371. As illustrated in FIG. 3, solid-state image capturer 10105 includes X number of pixels 10200 in the horizontal direction and Y number of pixels in the vertical direction, arranged in two dimensions, where X=320 and Y=240 in Embodiments 1 through 4. The stated number of pixels is merely one non-limiting example. Output enable signals 10240 of pixels 10200 at pixel address 11, pixel address 12, and pixel address 1X arranged in the horizontal direction in the first row are connected to row select signal 10300, output enable signals 10240 of pixels 10200 at pixel address 21, pixel address 22, and pixel address 2X arranged in the horizontal direction in the second row are connected to row select signal 10301, output enable signals 10240 of pixels 10200 at pixel address 31, pixel address 32, and pixel address 3X arranged in the horizontal direction in the third row are connected to row select signal 10302, and output enable signals 10240 of pixels 10200 at pixel address Y1, pixel address Y2, and pixel address YX arranged in the horizontal direction in the Yth row are connected to row select signal 10303. Pixel output signals 10241 to 10246 of pixels 10200 at pixel address 11, pixel address 21, pixel address 31, and pixel address Y1 arranged in the vertical direction in the first column are connected to vertical pixel signals 10311 to 10316, pixel output signals 10241 to 10246 of pixels 10200 at pixel address 12, pixel address 22, pixel address 32, and pixel address Y2 arranged in the vertical direction in the second column are connected to vertical pixel signals 10321 to 10326, and pixel output signals 10241 to 10246 of pixels 10200 at pixel address 1X, pixel address 2X, pixel address 3X, and pixel address YX arranged in the vertical direction in the $X^{th}$ column are connected to vertical pixel signals 10331 to 10336. Vertical pixel signals 10311 to 10316, 10321 to 10326, and 10331 to 10336 are connected to column AD 10370, the output signals of column AD 10370 are connected to shift register 10371, and shift register 10371 outputs solid-state image capturer output signal 10130.

Next, readout operations of solid-state image capturer 10105 will be described. The readout operation is the same as that of a typical CMOS image sensor with six times the number of horizontal pixels. By setting row select signal 10300 to high level, row select signal 10301 to low level, row select signal 10302 to low level, and row select signal 10303 to low level, pixel output signals 10241 to 10246 of packets 1 to 6 of pixel 10200 at pixel address 11 are output to vertical pixel signals 10311 to 10316, pixel output signals 10241 to 10246 of packets 1 to 6 of pixel 10200 at pixel address 12 are output to vertical pixel signals 10321 to 10326, and pixel output signals 10241 to 10246 of packets 1 to 6 of pixel 10200 at pixel address 1X are output to vertical pixel signals 10331 to 10336, and input to column AD 10370. By setting row select signal 10300 to low level, row select signal 10301 to high level, row select signal 10302 to low level, and row select signal 10303 to low level, pixel output signals 10241 to 10246 of packets 1 to 6 of pixel 10200 at pixel address 21 are output to vertical pixel signals 10311 to 10316, pixel output signals 10241 to 10246 of packets 1 to 6 of pixel 10200 at pixel address 22 are output to vertical pixel signals 10321 to 10326, and pixel output signals 10241 to 10246 of packets 1 to 6 of pixel 10200 at pixel address 2X are output to vertical pixel signals 10331 to 10336, and input to column AD 10370. By setting row select signal 10300 to low level, row select signal 10301 to low level, row select signal 10302 to high level, and row select signal 10303 to low level, pixel output signals 10241 to 10246 of packets 1 to 6 of pixel 10200 at pixel address 31 are output to vertical pixel signals 10311 to 10316, pixel output signals 10241 to 10246 of packets 1 to 6 of pixel 10200 at pixel address 32 are output to vertical pixel signals 10321 to 10326, and pixel output signals 10241 to 10246 of packets 1 to 6 of pixel 10200 at pixel address 3X are output to vertical pixel signals 10331 to 10336, and input to column AD 10370. By setting row select signal 10300 to low level, row select signal 10301 to low level, row select signal 10302 to low level, and row select signal 10303 to high level, pixel output signals 10241 to 10246 of packets 1 to 6 of pixel 10200 at pixel address Y1 are output to vertical pixel signals 10311 to 10316, pixel output signals 10241 to 10246 of packets 1 to 6 of pixel 10200 at pixel address Y2 are output to vertical pixel signals 10321 to 10326, and pixel output signals 10241 to 10246 of packets 1 to 6 of pixel 10200 at pixel address YX are output to vertical pixel signals 10331 to 10336, and input to column AD 10370. Column AD 10370 AD-converts the input pixel output signals 10241 to 10246 of packets 1 to 6 for the X number of pixels into 12-bit signal values, generates a packet 1 signal value resulting from AD-converting packet 1 voltage value, a packet 2 signal value resulting from AD-converting packet 2 voltage value, a packet 3 signal value resulting from AD-converting packet 3 voltage value, a packet 4 signal value resulting from AD-converting packet 4 voltage value, a packet 5 signal value resulting from AD-converting packet 5 voltage value, and a packet 6 signal value resulting from AD-converting packet 6 voltage value for the X number of pixels, and outputs the generated signal values to shift register 10371. Shift register 10371 shifts the input signal values of packets 1 to 6 for the X number of pixels one by one, and outputs the shifted signal values to solid-state image capturer output signal 10130.

Figure 4:
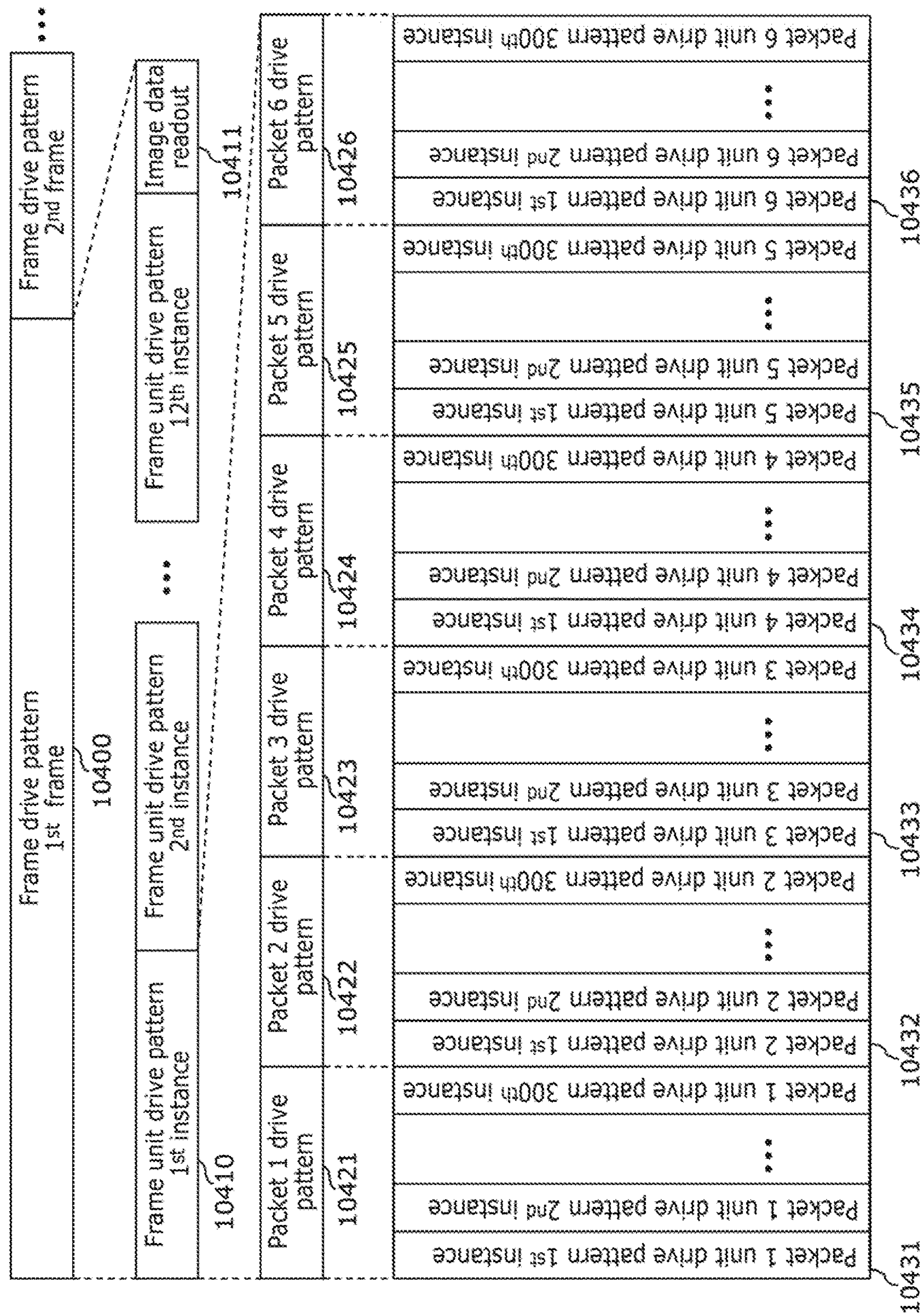
FIG. 4 illustrates a control sequence of a light emitter and a solid-state image capturer according to Embodiment 1.

FIG. 4 illustrates the control sequence of light source 10102 and solid-state image capturer 10105 according to Embodiment 1. In the control sequence illustrated in FIG. 4, as illustrated in FIG. 1, the number of frame unit drive pattern repetitions (12 times) and the number of unit drive pattern repetitions for packets 1 to 6 (300 times) are instructed to pulse generator 10107 from controller 10106 through the control bus, and emission pulse 10120, exposure pulses 10121 to 10126 of packets 1 to 6, and discharge drive pulse 10127 are generated in pulse generator 10107 in accordance with the number of frame unit drive pattern repetitions and the number of unit drive pattern repetitions for packets 1 to 6. FIG. 4 describes the generation of unit drive patterns 10431 to 10436 for packets 1 to 6, and FIG. 5 and FIG. 6A to FIG. 6F describe the method of generating emission pulse 10120, exposure pulses 10121 to 10126 of packets 1 to 6, and discharge drive pulse 10127 for each of unit drive patterns 10431 to 10436 for packets 1 to 6.

As illustrated in FIG. 4, one frame consists of frame drive pattern 10400. Frame drive pattern 10400 consists of 12 repetitions of frame unit drive pattern 10410 and image data readout 10411, which outputs the signal charges accumulated in the signal charge accumulators of all pixels 10200 from solid-state image capturer 10105. Frame unit drive pattern 10410 consists of packet 1 drive pattern 10421, packet 2 drive pattern 10422, packet 3 drive pattern 10423, packet 4 drive pattern 10424, packet 5 drive pattern 10425, and packet 6 drive pattern 10426. Packet 1 drive pattern 10421 consists of 300 repetitions of packet 1 unit drive pattern 10431. Packet 2 drive pattern 10422 consists of 300 repetitions of packet 2 unit drive pattern 10432. Packet 3 drive pattern 10423 consists of 300 repetitions of packet 3 unit drive pattern 10433. Packet 4 drive pattern 10424 consists of 300 repetitions of packet 4 unit drive pattern 10434. Packet 5 drive pattern 10425 consists of 300 repetitions of packet 5 unit drive pattern 10435. Packet 6 drive pattern 10426 consists of 300 repetitions of packet 6 unit drive pattern 10436. Unit drive patterns 10431 to 10436 for packets 1 to 6 drive emission pulse 10120, exposure pulses 10121 to 10126 of packets 1 to 6, and discharge drive pulse 10127. Unit drive patterns 10431 to 10436 for packets 1 to 6 will be described in greater detail later with reference to FIG. 5 and FIG. 6A to FIG. 6F. The control sequence of light source 10102 and solid-state image capturer 10105 illustrated in FIG. 4 is merely one non-limiting example.

Unit drive patterns 10431 to 10436 for packets 1 to 6 are repeated 300 times in drive patterns 10421 to 10426 for packets 1 to 6, respectively, and drive patterns 10421 to 10426 for packets 1 to 6 are repeated 12 times via the frame unit drive patterns. Stated differently, each of unit drive patterns 10431 to 10436 for packets 1 to 6 are repeated 3600 (=300×12) times. By repeating each pattern 3600 times, even though the amount of emission light 10110 emitted each time is small, it is possible to ensure a sufficient amount of light. On the other hand, by dividing frame drive pattern 10400 into 12 frame unit drive patterns 10410, the amount of time required for each frame unit drive pattern 10410 can be shortened and the apparent imaging timing of packets 1 to 6 can be synchronized. By repeating the frame unit drive pattern 10410 12 times, blur caused by target object 10101 moving occurs evenly in packets 1 to 6, making it possible to inhibit side effects such as data corruption during distance calculation caused by target object 10101 moving.

FIG. 5 illustrates generation codes 10501 to 10506 of packets 1 to 6 that are applied to controller 10106 to generate unit drive patterns 10431 to 10436 for packets 1 to 6 and discharge drive pulse 10127 for controlling solid-state image capturer 10105 according to Embodiment 1. As illustrated in FIG. 5, generation codes 10501 to 10506 of packets 1 to 6 are divided into 32 segments identified by segment numbers 10500 of 0 to 31, and each segment identified by one of segment numbers 10500 has a value of "0" or "1". Generation codes 10501 to 10506 of packets 1 to 6 are information for controlling the driving of exposure pulses 10121 to 10126 of packets 1 to 6. Here, the segment numbers are sequential numbers assigned to a plurality of distance segments (also called unit segments) into which the ranging range is divided. Packet 1 generation code 10501 to packet 6 generation code 10506 may be stored in advance in internal memory by controller 10106, and, alternatively, may be obtained dynamically from outside and stored in the internal memory.

Segment numbers 10500 and generation codes 10501 to 10506 of packets 1 to 6 are transmitted to pulse generator 10107 through the control bus, and pulse generator 10107 generates unit drive patterns 10431 to 10436 for packets 1 to 6 from segment numbers 10500 and generation codes 10501 to 10506 of packets 1 to 6. The generation codes of packets 1 to 6 illustrated in FIG. 5 are non-limiting examples.

FIG. 6A to FIG. 6F are timing charts showing packet 1 unit drive pattern 10431 to packet 6 unit drive pattern 10436 according to Embodiment 1. As illustrated in FIG. 6A to FIG. 6F, pulse generator 10107 generates unit drive patterns 10431 to 10436 for packets 1 to 6 by switching segment number 10600 every unit segment (10 ns) for 80 segments from 0 to 79, and using (i) generation codes 10501 to 10506 of packets 1 to 6 with the same segment numbers 10600 and 10500 and (ii) segment number 10600 to control emission pulse 10120, exposure pulses 10121 to 10126 of packets 1 to 6, and discharge drive pulse 10127. The reason why segment numbers 10600 of pulse generator 10107 are set to a value (79) that is twice or more than the maximum value (31) of segment numbers 10500 is to prevent the reception of reflected light 10111 of emission light 10110 that has been reflected by target object 10101 located outside the ranging range (a segment number that is larger than the maximum value of segment numbers 10500). Therefore, in a segment number that does not exist in segment numbers 10500, pulses are generated with emission pulse 10120 at low level, exposure pulses 10121 to 10126 of packets 1 to 6 at low level, and discharge drive pulse 10127 at high level. By controlling solid-state image capturer 10105 in this way, the time required for 12 repetitions of frame unit drive pattern 10410, which corresponds to the imaging exposure time, is 17.28 ms, which is calculated by multiplying the length of the unit segment, 10 ns, the number of segment numbers, 80, the number of unit drive pattern repetitions, 300, the number of packets, 6, and the number of frame unit drive pattern repetitions, 12. This unit segment specifies that the pulse width of emission light 10110 and exposure pulses 10121 to 10126 of packets 1 to 6 are the same, and does not limit the pulse width to 10 ns.

The following describes a method of controlling emission pulse 10120, exposure pulses 10121 to 10126 of packets 1 to 6, and discharge drive pulse 10127 for segment numbers 0 to 31 included in segment numbers 10500.

Figure 6A:
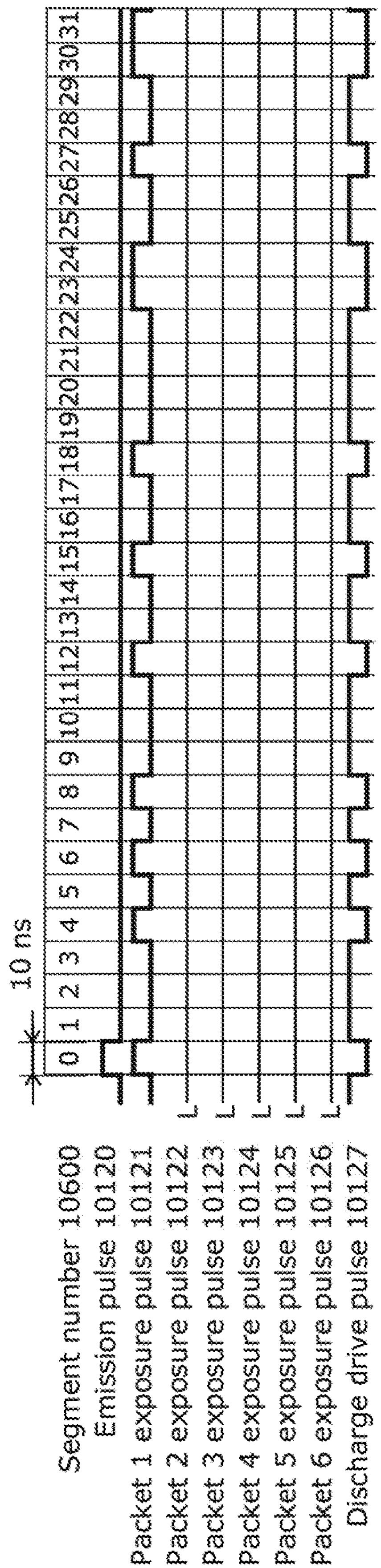
FIG. 6A illustrates the operation timing of packet 1 unit drive pattern according to Embodiment 1.

FIG. 6A is a timing chart showing packet 1 unit drive pattern 10431. Emission pulse 10120 is generated as high level when segment number 10500 is 0, and low level when segment number 10500 is the remaining 1 to 31. Packet 1 exposure pulse 10121 is generated as high level when packet 1 generation code 10501 corresponding to segment number 10500 is "1" and low level when packet 1 generation code 10501 corresponding to segment number 10500 is "0", and packet 2 exposure pulse 10122, packet 3 exposure pulse 10123, packet 4 exposure pulse 10124, packet 5 exposure pulse 10125, and packet 6 exposure pulse 10126 are generated as low level in all segments, i.e., when segment number 10500 is 0 to 31. Discharge drive pulse 10127 is generated as low level when packet 1 generation code 10501 corresponding to segment number 10500 is "1" and high level when packet 1 generation code 10501 corresponding to segment number 10500 is "0", which results in a pulse whose logic is inverted from that of packet 1 exposure pulse 10121.

Figure 6B:
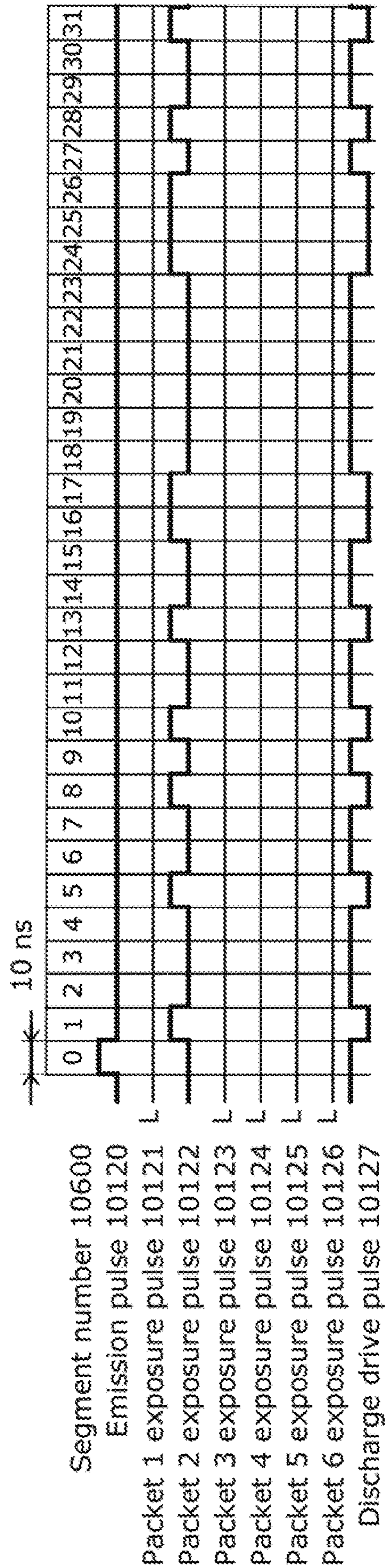
FIG. 6B illustrates the operation timing of packet 2 unit drive pattern according to Embodiment 1.

FIG. 6B is a timing chart showing packet 2 unit drive pattern 10432. Emission pulse 10120 is generated as high level when segment number 10500 is 0, and low level when segment number 10500 is the remaining 1 to 31. Packet 2 exposure pulse 10122 is generated as high level when packet 2 generation code 10502 corresponding to segment number 10500 is "1" and low level when packet 2 generation code 10502 corresponding to segment number 10500 is "0", and packet 1 exposure pulse 10121, packet 3 exposure pulse 10123, packet 4 exposure pulse 10124, packet 5 exposure pulse 10125, and packet 6 exposure pulse 10126 are generated as low level in all segments, i.e., when segment number 10500 is 0 to 31. Discharge drive pulse 10127 is generated as low level when packet 2 generation code 10502 corresponding to segment number 10500 is "1" and high level when packet 2 generation code 10502 corresponding to segment number 10500 is "0", which results in a pulse whose logic is inverted from that of packet 2 exposure pulse 10122.

Figure 6C:
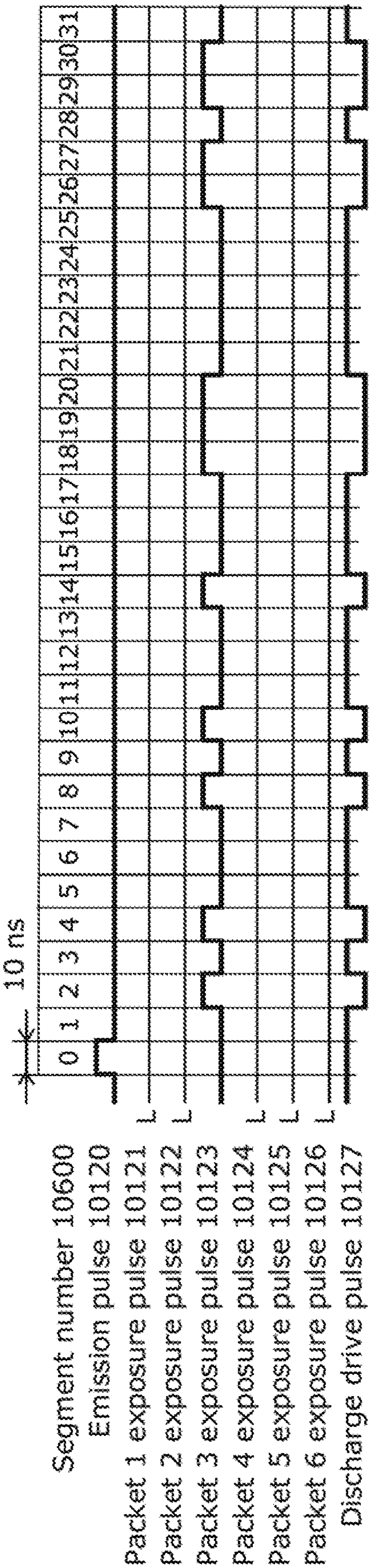
FIG. 6C illustrates the operation timing of packet 3 unit drive pattern according to Embodiment 1.

FIG. 6C is a timing chart showing packet 3 unit drive pattern 10433. Emission pulse 10120 is generated as high level when segment number 10500 is 0, and low level when segment number 10500 is the remaining 1 to 31. Packet 3 exposure pulse 10123 is generated as high level when packet 3 generation code 10503 corresponding to segment number 10500 is "1" and low level when packet 3 generation code 10503 corresponding to segment number 10500 is "0", and packet 1 exposure pulse 10121, packet 2 exposure pulse 10122, packet 4 exposure pulse 10124, packet 5 exposure pulse 10125, and packet 6 exposure pulse 10126 are generated as low level in all segments, i.e., when segment number 10500 is 0 to 31. Discharge drive pulse 10127 is generated as low level when packet 3 generation code 10503 corresponding to segment number 10500 is "1" and high level when packet 3 generation code 10503 corresponding to segment number 10500 is "0", which results in a pulse whose logic is inverted from that of packet 3 exposure pulse 10123.

Figure 6D:
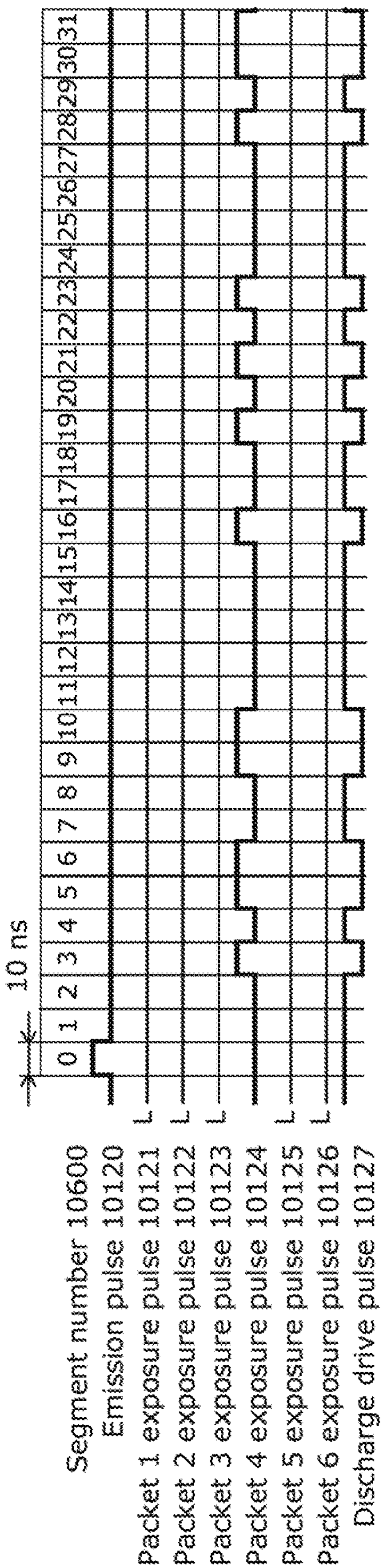
FIG. 6D illustrates the operation timing of packet 4 unit drive pattern according to Embodiment 1.

FIG. 6D is a timing chart showing packet 4 unit drive pattern 10434. Emission pulse 10120 is generated as high level when segment number 10500 is 0, and low level when segment number 10500 is the remaining 1 to 31. Packet 4 exposure pulse 10124 is generated as high level when packet 4 generation code 10504 corresponding to segment number 10500 is "1" and low level when packet 4 generation code 10504 corresponding to segment number 10500 is "0", and packet 1 exposure pulse 10121, packet 2 exposure pulse 10122, packet 3 exposure pulse 10123, packet 5 exposure pulse 10125, and packet 6 exposure pulse 10126 are generated as low level in all segments, i.e., when segment number 10500 is 0 to 31. Discharge drive pulse 10127 is generated as low level when packet 4 generation code 10504 corresponding to segment number 10500 is "1" and high level when packet 4 generation code 10504 corresponding to segment number 10500 is "0", which results in a pulse whose logic is inverted from that of packet 4 exposure pulse 10124.

Figure 6E:
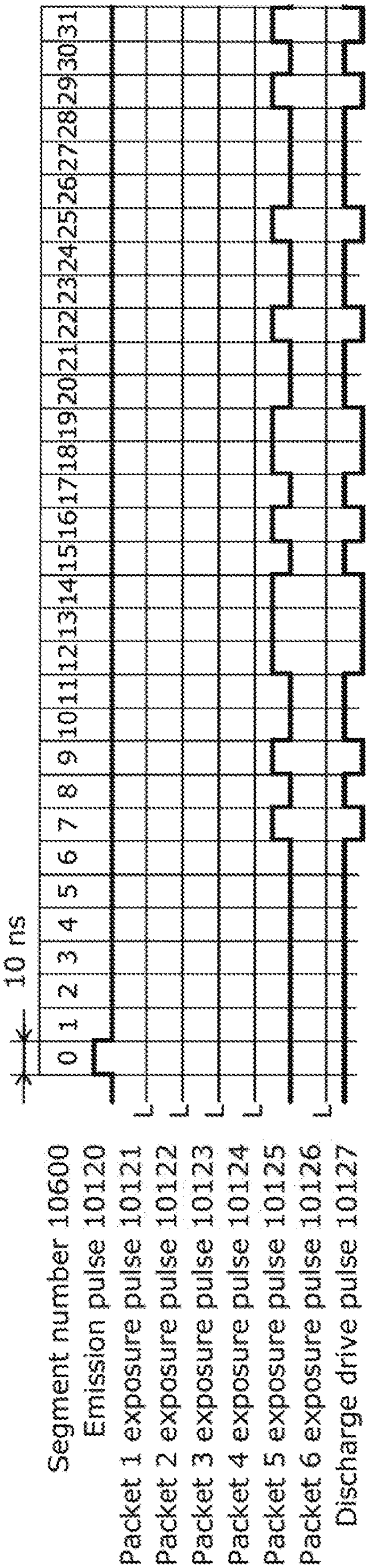
FIG. 6E illustrates the operation timing of packet 5 unit drive pattern according to Embodiment 1.

FIG. 6E is a timing chart showing packet 5 unit drive pattern 10435. Emission pulse 10120 is generated as high level when segment number 10500 is 0, and low level when segment number 10500 is the remaining 1 to 31. Packet 5 exposure pulse 10125 is generated as high level when packet 5 generation code 10505 corresponding to segment number 10500 is "1" and low level when packet 5 generation code 10505 corresponding to segment number 10500 is "0", and packet 1 exposure pulse 10121, packet 2 exposure pulse 10122, packet 3 exposure pulse 10123, packet 4 exposure pulse 10124, and packet 6 exposure pulse 10126 are generated as low level in all segments, i.e., when segment number 10500 is 0 to 31. Discharge drive pulse 10127 is generated as low level when packet 5 generation code 10505 corresponding to segment number 10500 is "1" and high level when packet 5 generation code 10505 corresponding to segment number 10500 is "0", which results in a pulse whose logic is inverted from that of packet 5 exposure pulse 10125.

Figure 6F:
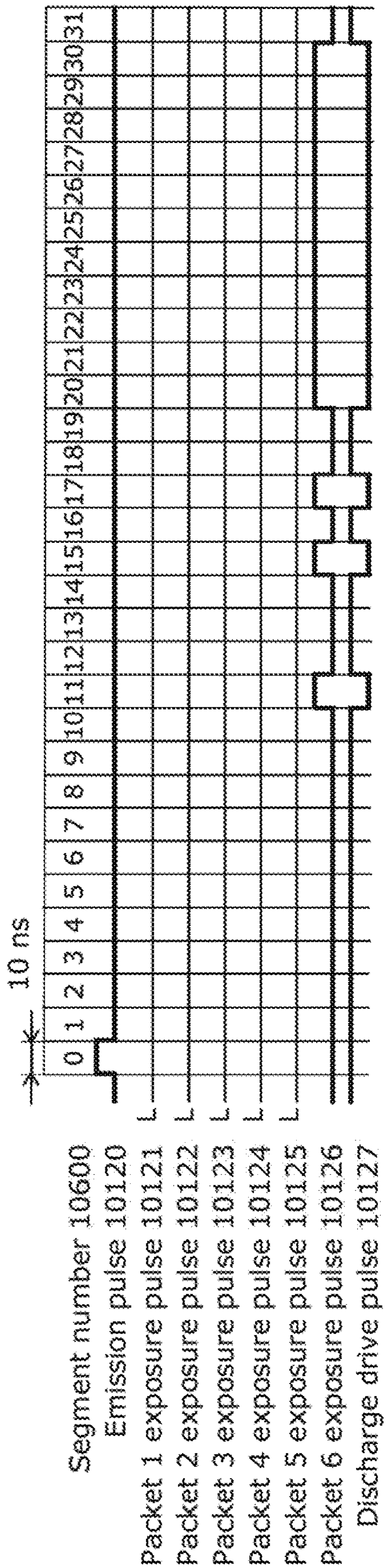
FIG. 6F illustrates the operation timing of packet 6 unit drive pattern according to Embodiment 1.

FIG. 6F is a timing chart showing packet 6 unit drive pattern 10436. Emission pulse 10120 is generated as high level when segment number 10500 is 0, and low level when segment number 10500 is the remaining 1 to 31. Packet 6 exposure pulse 10126 is generated as high level when packet 6 generation code 10506 corresponding to segment number 10500 is "1" and low level when packet 6 generation code 10506 corresponding to segment number 10500 is "0", and packet 1 exposure pulse 10121, packet 2 exposure pulse 10122, packet 3 exposure pulse 10123, packet 4 exposure pulse 10124, and packet 5 exposure pulse 10125 are generated as low level in all segments, i.e., when segment number 10500 is 0 to 31. Discharge drive pulse 10127 is generated as low level when packet 6 generation code 10506 corresponding to segment number 10500 is "1" and high level when packet 6 generation code 10506 corresponding to segment number 10500 is "0", which results in a pulse whose logic is inverted from that of packet 6 exposure pulse 10126.

Figure 7:
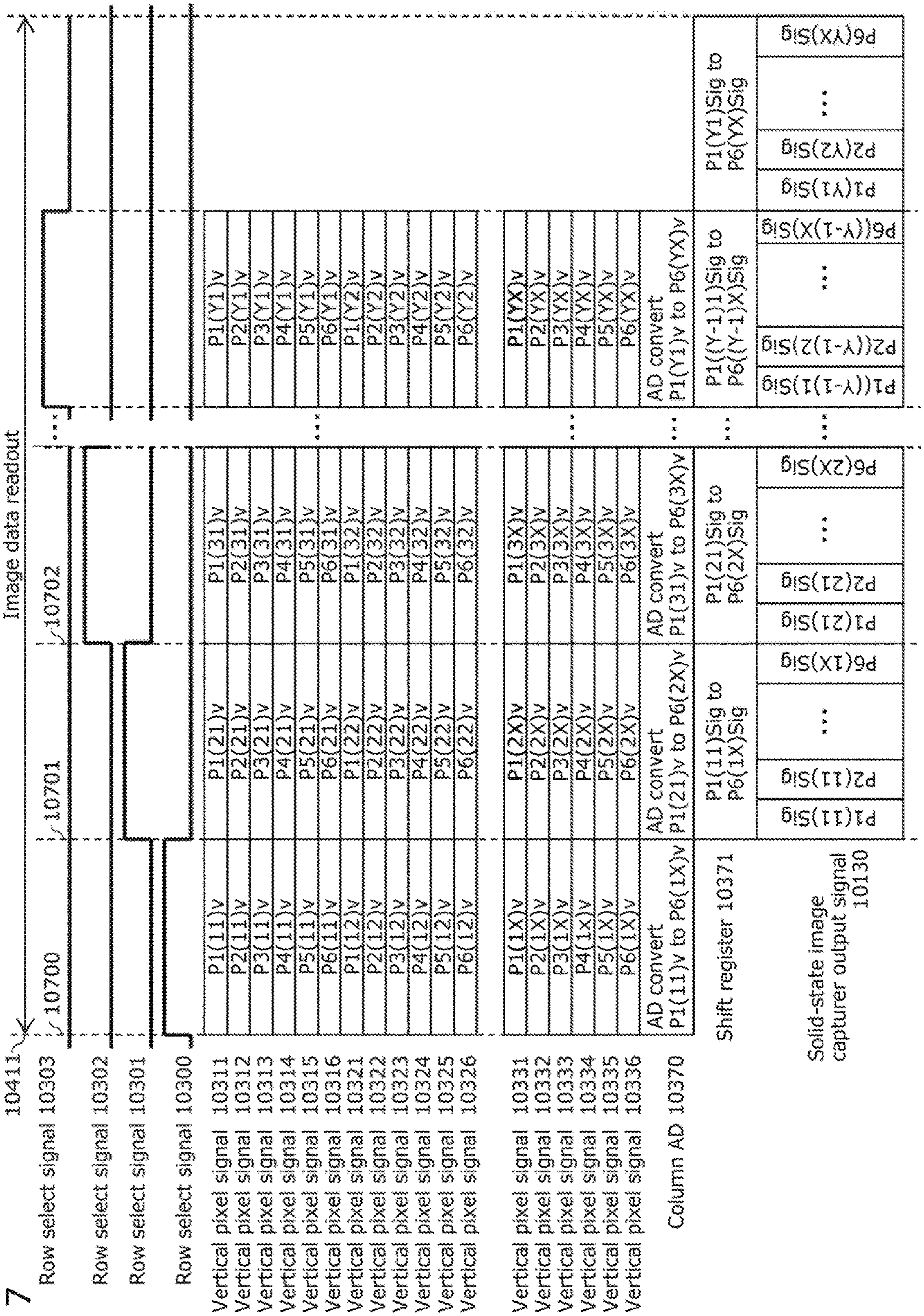
FIG. 7 illustrates an operation timing for reading pixel values from a solid-state image capturer according to Embodiments 1 through 4.

FIG. 7 illustrates the timing of image data readout 10411 of solid-state image capturer 10105 according to Embodiments 1 through 4.

Regarding the notations in FIG. 7, for example, notations "P1(11)v" to "P6(11)v" indicate the voltage values of packets 1 to 6 of pixel 10200 at pixel address 11, which correspond to pixel output signals 10241 through 10246 and vertical pixel signals 10311 through 10316, in the following description. Similarly, notation P6(YX)v indicates the packet 6 voltage value of the pixel at pixel address YX, which corresponds to pixel output signal 10246 and vertical pixel signal 10336.

For example, notations "P1(11)Sig" to "P6(11)Sig" indicate the signal values of packets 1 to 6 of pixel 10200 at pixel address 11 in the following description. More specifically, P1(11)Sig in FIG. 7 refers to the packet 1 signal value of pixel 10200 at pixel address 11, i.e., the digital value resulting from column AD 10370 AD-converting the packet 1 voltage value, and is output to distance calculator 10108 via shift register 10371 as solid-state image capturer output signal 10130. Similarly, P6(YX)Sig refers to the packet 6 signal value of pixel 10200 at pixel address YX, i.e., the digital value resulting from column AD 10370 AD-converting the packet 6 voltage value, and is output to distance calculator 10108 via shift register 10371 as solid-state image capturer output signal 10130.

Row select signals 10300 to 10303, column AD 10370, and shift register 10371 are controlled to output the signal values of packets 1 to 6 of all pixels 10200 illustrated in FIG. 3 to solid-state image capturer output signal 10130. The operation of this image data readout 10411 is the same as that of a normal CMOS image sensor with six times more horizontal pixels.

As illustrated in FIG. 7, at timing 10700, by setting row select signal 10300 to high level, row select signal 10301 to low level, row select signal 10302 to low level, and row select signal 10303 to low level, voltage values of packets 1 to 6 of pixel 10200 at pixel address 11 are output to vertical pixel signals 10311 to 10316, the voltage values of packets

1 to 6 of pixel 10200 at pixel address 12 are output to vertical pixel signals 10321 to 10326, and the voltage values of packets 1 to 6 of pixel 10200 at pixel address 1X are output to vertical pixel signals 10331 to 10336. Vertical pixel signals 10311 to 10316, vertical pixel signals 10321 to 10326, and vertical pixel signals 10331 to 10336 are connected to column AD 10370, these signals are AD-converted into 12-bit signal values, and packet 1 signal value resulting from AD-converting packet 1 voltage value, packet 2 signal value resulting from AD-converting packet 2 voltage value, packet 3 signal value resulting from AD-converting packet 3 voltage value, packet 4 signal value resulting from AD-converting packet 4 voltage value, packet 5 signal value resulting from AD-converting packet 5 voltage value, and packet 6 signal value resulting from AD-converting packet 6 voltage value of pixel address 11, pixel address 12, and pixel address 1X are generated. At timing 10701, which is the timing of completion of the AD conversions, the AD-converted signal values of packets 1 to 6 of pixel address 11, pixel address 12, and pixel address 1X are output to shift register 10371. While shifting the input signal value, shift register 10371 outputs, from solid-state image capturer output signal 10130, in stated order: packet 1 signal value of pixel address 11, packet 2 signal value of pixel address 11, packet 3 signal value of pixel address 11, packet 4 signal value of pixel address 11, packet 5 signal value of pixel address 11, packet 6 signal value of pixel address 11, packet 1 signal value of pixel address 12, packet 2 signal value of pixel address 12, packet 3 signal value of pixel address 12, packet 4 signal value of pixel address 12, packet 5 signal value of pixel address 12, packet 6 signal value of pixel address 12, packet 1 signal value of pixel address 1X 1 signal value, packet 2 signal value at pixel address 1X, packet 3 signal value at pixel address 1X, packet 4 signal value at pixel address 1X, packet 5 signal value at pixel address 1X, and packet 6 signal value at pixel address 1X. Also, at timing 10701, row select signal 10300 is set to low level, row select signal 10301 is set to high level, row select signal 10302 is set to low level, and row select signal 10303 is set to low level, the voltage values of packets 1 to 6 of pixel 10200 at pixel address 21, the voltage values of packets 1 to 6 of pixel 10200 at pixel address 22, and the voltage values of packets 1 to 6 of pixel 10200 at pixel address 2X are input to column AD 10370, and AD conversion to 12-bit signal values is performed. At timing 10702, which is the timing of the completion of the AD conversions by column AD 10370 and the shift operation of shift register 10371 started at timing 10701, the results of the AD conversions by column AD 10370 started at timing 10701 are output to shift register 10371, and the input signal values are shifted and output from solid-state image capturer output signal 10130 in the same manner as described above. At timing 10702, row select signal 10300 is set to low level, row select signal 10301 is set to low level, row select signal 10302 is set to high level, and row select signal 10303 is set to low level, the voltage values of packets 1 to 6 of pixel 10200 at pixel address 31, the voltage values of packets 1 to 6 of pixel 10200 at pixel address 32, and the voltage values of packets 1 to 6 of pixel 10200 at pixel address 3X are input to column AD 10370, and AD conversion to 12-bit signal values is performed in the same manner as described above. By performing this operation for all rows, the signal values of all pixels 10200 are output from solid-state image capturer output signal 10130. Although six FDAs 10211 to 10216 are exemplified in FIG. 2 and six generation codes 10501 to 10506 of packets 1 to 6 are exemplified in FIG. 5, the number is not limited to six. If the number of signal charge accumulators is greater than the number of packet generation codes, it is possible to obtain the signal values of packets 1 to 6 in one frame, and thus calculate the segment number corresponding to the distance using the data of a single frame. If the number of signal charge accumulators is greater than the number of packet generation codes, it is possible to calculate the segment number corresponding to the distance by obtaining the signal values of packets 1 to 6 using the data of a plurality of frames. The time required for image data readout 10411, which corresponds to the imaging readout time, is calculated by dividing the number of pixels taking into account the blanking interval, which is calculated as (number of horizontal pixels X320+horizontal blanking interval 80)×(number of vertical pixels Y240+vertical blanking interval 23), by the output clock frequency of solid-state image capturer output signal 10130. If the output clock frequency is 39.319 MHz, the time required for image data readout 10411, which corresponds to the imaging readout time, is 16.053 ms.

Figure 8:
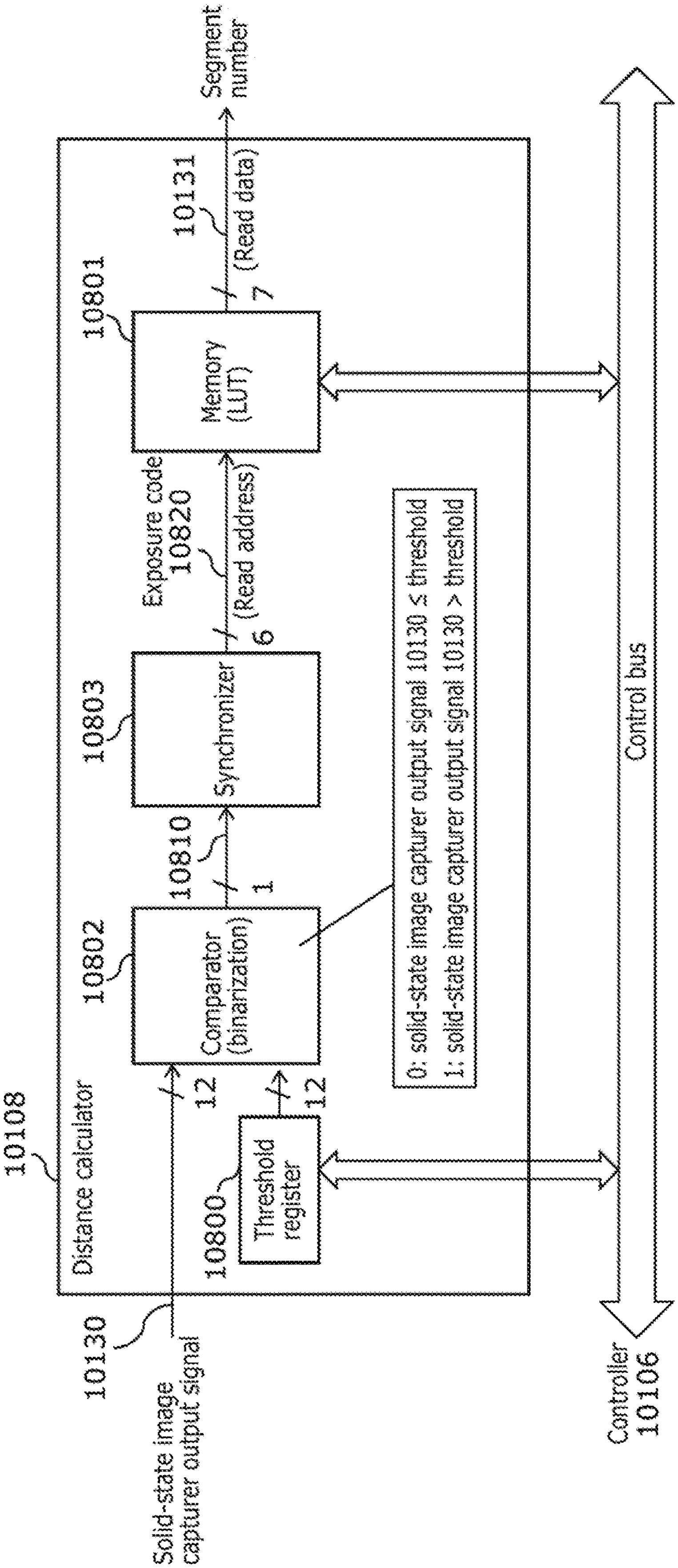
FIG. 8 illustrates a configuration of a distance calculator according to Embodiment 1.

FIG. 8 illustrates a configuration of distance calculator 10108 according to Embodiment 1.

Distance calculator 10108 illustrated in FIG. 8 includes threshold register 10800, comparator 10802, synchronizer 10803, and memory (LUT) 10801.

Threshold register 10800 stores, as the threshold value, the boundary value between the black level, which is the signal level when there is no reflected light, and the signal level when there is reflected light.

Comparator 10802 compares solid-state image capturer output signal 10130 with the threshold value and binarizes solid-state image capturer output signal 10130, i.e., outputs a binary signal indicating the presence or absence of reflected light.

Synchronizer 10803 synchronizes packets 1 to 6 of the same pixel address. Stated differently, binarized packets 1 to 6 of the same pixel address are output in parallel. The 6-bit data corresponding to the binary packets 1 to 6 of the same pixel address is called the exposure code.

Memory (LUT) 10801 is a look-up table (LUT) for converting the exposure code to a segment number. The LUT, for example, receives an input of the exposure code as an address and outputs the segment number as read data.

Next, the operation of distance calculator 10108 will be described. Distance calculator 10108 compares solid-state image capturer output signal 10130 and the value of threshold register 10800 in comparator 10802, and outputs packet code 10810 of "0" when solid-state image capturer output signal 10130 threshold register 10800, and outputs packet code 10810 of "1" when solid-state image capturer output signal 10130>threshold register 10800. Packet codes 10810 corresponding to the signal values of packets 1 to 6 for each pixel address are synchronized in synchronizer 10803, and the six synchronized packet codes 10810 are regarded as a 6-bit binary number to generate exposure code 10820. By setting threshold register 10800 to the sum of the black level and a value that takes into account offset for inhibiting variations caused by dark current in, for example, photoelectric conversion pixels 10201 and FDA 10211 to 10216 and the like, it is possible to achieve a configuration where the result of comparator 10802 for the signal values of packets 1 to 6 that include reflected light 10111 is "1", and the result of comparator 10802 for the signal values of packets 1 to 6 that do not include reflected light 10111 is "0", whereby exposure code 10820 thus indicates packets that include reflected light 10111. Exposure code 10820 is then used as a read address to access memory (LUT) 10801, and the read data of memory (LUT) 10801 is output as segment number signal 10131. The initial values of memory (LUT) 10801 are set from controller 10106 via the control bus. The method of generating the initial values to be set in memory (LUT) 10801 will be explained with reference to FIG. 9.

FIG. 9 illustrates the method of generating the initial values of memory (LUT) 10801 according to Embodiment 1. The upper part of FIG. 9 illustrates packet 1 generation code 10501 to packet 6 generation code 10506 illustrated in FIG. 5, independent codes 10900, and adjacent codes 10901. The lower part of FIG. 9 illustrates memory 10801, i.e., the LUT.

Each independent code 10900 in the upper part of FIG. 9 is the n-bit data included in the n types of packet generation codes (six types in this example) per unit segment. 31 independent codes are illustrated in FIG. 9. Each of the independent codes is, in principle, different from any other independent code. Each independent code 10900 is generated by controller 10106, for example, as an n-bit binary number of the n bits included in the n types of packet generation codes per unit segment. If the exposure code described above matches any of the independent codes, the distance value of the pixel in question will be the distance indicated by the corresponding unit segment (distance segment).

Each adjacent code 10901 is a code obtained by applying a bitwise logical OR operation between two independent codes corresponding to two adjacent unit segments. Each adjacent code 10901 is generated, for example, by applying a bitwise logical OR operation between two independent codes corresponding to two adjacent unit segments by controller 10106. If the above exposure code matches any of the adjacent codes, the intermediate distance between the two unit segments corresponding to the matching adjacent code is the distance value of the pixel.

As illustrated in FIG. 9, the initial values of memory (LUT) 10801 are generated from segment numbers 10500 and generation codes 10501 to 10506 of packets 1 to 6 to generate unit drive patterns 10431 to 10436 for packets 1 to 6, which control light source 10102 and solid-state image capturer 10105.

Controller 10106 generates each independent code 10900 as a 6-bit binary number, where packet 1 generation code 10501 is bit 0, packet 2 generation code 10502 is bit 1, packet 3 generation code 10503 is bit 2, packet 4 generation code 10504 is bit 3, packet 5 generation code 10505 is bit 4, and packet 6 generation code 10506 is bit 5. For example, independent code 10920 of segment number 10500 of 7, which is labeled 10921, is a 6-bit binary number where packet 1 generation code 10501 of "0" at segment number 10500 of 7 is bit 0, packet 2 generation code 10502 of "0" at segment number 10500 of 7 is bit 1, packet 3 generation code 10503 of "0" at segment number 10500 of 7 is bit 2, packet 4 generation code 10504 of "0" at segment number 10500 of 7 is bit 3, packet 5 generation code 10505 of "1" at segment number 10500 of 7 is bit 4, and packet 6 generation code 10506 of "0" at segment number 10500 of 7 is bit 5, which converts to 10 in hexadecimal notation. Controller 10106 generates each adjacent code 10901 by applying a bitwise logical OR operation between independent codes 10900 of two adjacent segments. For example, adjacent code 10923 corresponding to the adjacent segment numbers 10500 of 24 and 25, which are labeled 10924, is a 6-bit binary number where the result of the logical OR operation of the value "1" of bit 0 of the independent code at segment number 10500 of 24 and the value "0" of bit 0 of the independent code at segment number 10500 of 25 is "1" as bit 0, the result of the logical OR operation of the value "1" of bit 1 of the independent code at segment number 10500 of 24 and the value "1" of bit 1 of the independent code at segment number 10500 of 25 is "1" as bit 1, the result of the logical OR operation of the value "0" of bit 2 of the independent code at segment number 10500 of 24 and the value "0" of bit 2 of the independent code at segment number 10500 of 25 is "0" as bit 2, the result of the logical OR operation of the value "0" of bit 3 of the independent code at segment number 10500 of 24 and the value "0" of bit 3 of the independent code at segment number 10500 of 25 is "0" as bit 3, the result of the logical OR operation of the value "0" of bit 4 of the independent code at segment number 10500 of 24 and the value "1" of bit 4 of the independent code at segment number 10500 of 25 is "1" as bit 4, and the result of the logical OR operation of the value "1" of bit 5 of the independent code at segment number 10500 of 24 and the value "1" of bit 5 of the independent code at segment number 10500 of 25 is "1" as bit 5, which converts to 33 in hexadecimal notation. In this example, in independent codes 10900, the signal values of packets 1 to 6 that include reflected light 10111 are "1" and the signal values of packets 1 to 6 that do not include reflected light 10111 are "0" when reflected light 10111 returns to only one segment number 10500, and in adjacent codes 10901, the signal values of packets 1 to 6 that include reflected light 10111 are "1" and the signal values of packets 1 to 6 that do not include reflected light 10111 are "0" when reflected light 10111 returns across two adjacent segment numbers 10500, and exposure code 10820 is estimated for each segment number 10500 based on generation codes 10501 to 10506 of packets 1 to 6. For this reason, memory (LUT) 10801 is initialized with independent codes 10900 and adjacent codes 10901 as addresses and segment numbers 10500 corresponding to independent codes 10900 and adjacent codes 10901 as data, and memory (LUT) 10801 is accessed and read with exposure code 10820 as an address, making it is possible to convert exposure code 10820 to the segment number corresponding to the distance. Table 10910 is a data set for initializing memory (LUT) 10801. Since the hexadecimal notation of independent code 10920 is "10", the data corresponding to the hexadecimal address of "10" in table 10910 is 7, which is segment number 10921 of independent code 10920. Since the hexadecimal notation of adjacent code 10923 is "33", the data corresponding to the hexadecimal address of "33" in table 10910 is 24.5, the average of 24 and 25, which are segment numbers 10924 of adjacent code 10923. This is because segment numbers 10924 of adjacent code 10923 indicate that reflected light 10111 returned across segment numbers 24 and 25, but the specific timing of the return of reflected light 10111 is not known, so it is assumed that the reflected light 10111 returned in the middle of two adjacent segments, and so the average of the two adjacent segment numbers is used to reduce the maximum error to half of the segment.

Next, the method of generating generation codes 10501 to 10506 of packets 1 to 6 to be applied to controller 10106 will be described. In order to calculate the segment numbers using exposure codes 10820 generated from the signal values of packets 1 to 6 described above, there must be a one-to-one correspondence between exposure codes 10820 and the segment numbers. Therefore, generation codes 10501 to 10506 of packets 1 to 6 are determined so that the values of independent codes 10900 and adjacent codes 10901 do not overlap, and exposure codes 10820 and the segment numbers are associated one-to-one. Moreover, generation codes 10501 to 10506 of packets 1 to 6 are determined such that independent codes 10900 and adjacent codes 10901 do not take a value of "00" in hexadecimal notation. When reflected light 10111 is returned at a timing when the value of independent code 10900 or adjacent code 10901 is "00", exposure pulses 10121 to 10126 of packets 1 to 6 are low level, and as such, the signal values of packets 1 to 6 do not include the reflected light 10111 component. Even if target object 10101 does not exist within the ranging range of segment numbers 0 to 31, the signal values of packets 1 to 6 do not include the reflected light 10111 component. Accordingly, since it is not possible to determine whether these two conditions are satisfied from the signal values of packets 1 to 6, generation codes 10501 to 10506 of packets 1 to 6 are generated such that independent codes 10900 and adjacent codes 10901 do not take a value of "00" in hexadecimal notation. In case exposure code 10820 matches "00", which does not exist in independent codes 10900 or adjacent codes 10901, it is possible to determine that the segment number is not calculated correctly by setting the segment number to a negative value of −1.

Figure 10:
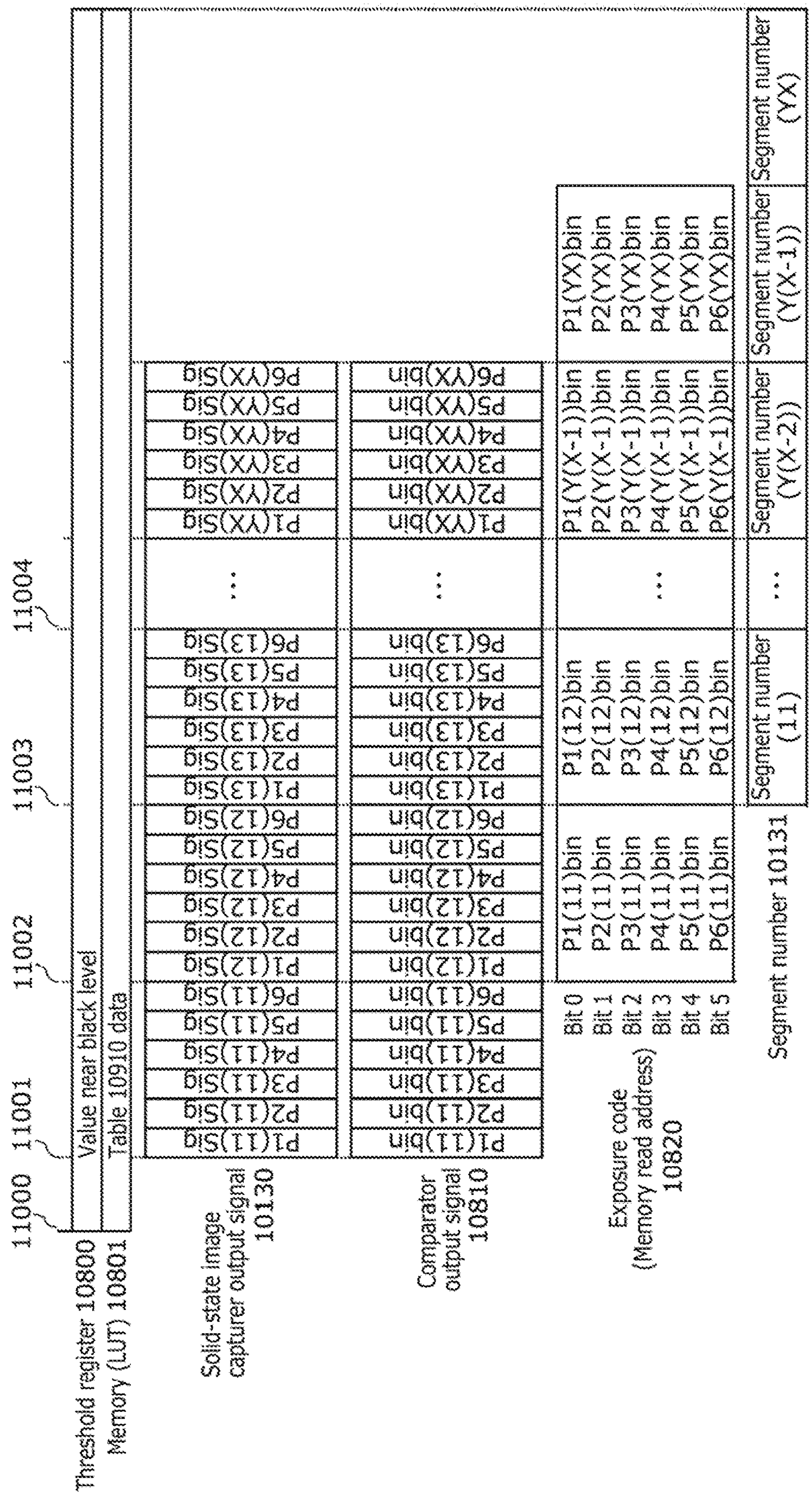
FIG. 10 illustrates timings of operations performed by a distance calculator according to Embodiment 1.

FIG. 10 illustrates a timing chart for distance calculator 10108 according to Embodiment 1.

Notations in FIG. 10 that are the same as in FIG. 7 refer to the same elements as in FIG. 7. The notations "P1(11)bin" through "P6(11)bin" indicate the codes of packets 1 to 6 of pixel 10200 at pixel address 11 in the following description, and correspond to exposure code 10820 of pixel 10200 at pixel address 11.

As illustrated in FIG. 10, at timing 11000 before a valid signal value is output from solid-state image capturer output signal 10130, controller 10106 sets values in threshold register 10800 and memory (LUT) 10801 via the control bus. Threshold register 10800 writes a value near black level, and memory (LUT) 10801 writes the data of table 10910. At timing 11001, the signal values of packets 1 to 6 of pixel address 11, i.e., P1(11)sig to P6(11)sig in FIG. 10, are sequentially sent from solid-state image capturer output signal 10130. The sent signal values are sequentially processed with the values in threshold register 10800 in the comparator 10802, and the codes of packets 1 to 6 of pixel address 11 corresponding to the signal values of packets 1 to 6 of pixel address 11, i.e., P1(11)bin to P6(11)bin in FIG. 10, are generated and sent to synchronizer 10803. At timing 11002, the codes of packets 1 to 6 at pixel address 11 are synchronized, and exposure code 10820 is determined. Memory (LUT) 10801 is accessed and read using exposure code 10820 as the address, and segment number signal 10131 corresponding to the distance of pixel address 11 is output at timing 11003. All of the two-dimensional segment numbers are output by performing this operation on all two-dimensionally arranged pixels 10200.

The method used to calculate distance by distance calculator 10108 of a single pixel is explained in detail below.

Figure 11:
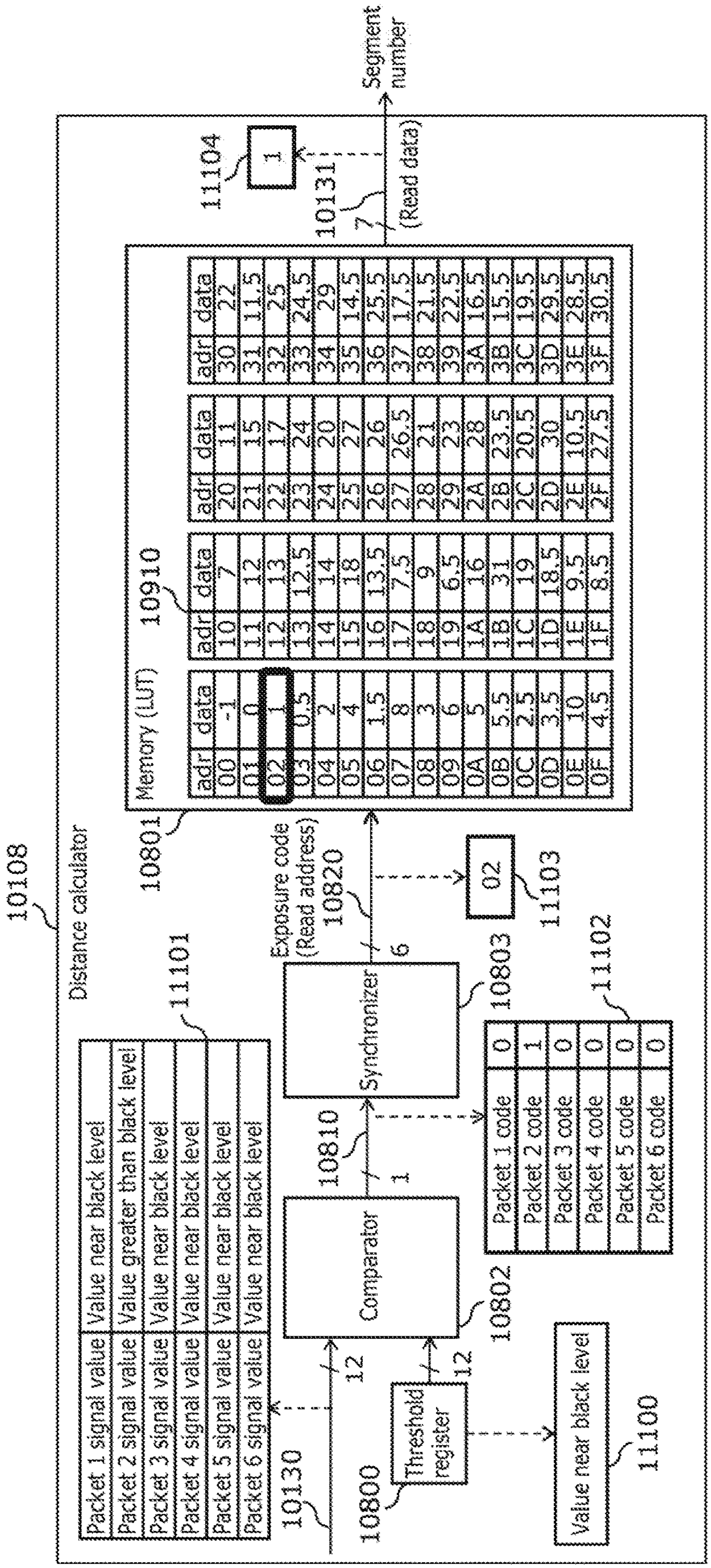
FIG. 11 illustrates the calculation of a segment number of one pixel on the near end when an independent code and the exposure code are the same according to Embodiment 1.

FIG. 11 illustrates a method used to calculate distance by distance calculator 10108 according to Embodiment 1. As illustrated in FIG. 11, the signal values of packets 1 to 6 corresponding to one pixel of solid-state image capturer output signal 10130, which are input to distance calculator 10108, are as follows: packet 1 signal value=value near black level; packet 2 signal value=value greater than black level; packet 3 signal value=value near black level; packet 4 signal value=value near black level; packet 5 signal value =value near black level; and packet 6 signal value=value near black level.

The signal values of packets 1 to 6 are determined according to the signal charge from the photoelectric conversion of the reflected light 10111 by photoelectric conversion pixel 10201, the dark current noise of photoelectric conversion pixel 10201 and FDAs 10211 to 10216, and so on. In a typical image sensor, components such as dark current noise are somewhat small, so the signal values of packets 1 to 6 which do not include reflected light 10111 are near black level. In the control sequence of light source 10102 and solid-state image capturer 10105 illustrated in FIG. 4 and FIG. 6A to FIG. 6F, since unit drive patterns 10431 to 10436 for packets 1 to 6 are executed 1,920 times, respectively, reflected light 10111 has a sufficient amount of light and the signal values of packets 1 to 6 are greater than black level. Threshold register 10800 sets value near black level, and memory (LUT) 10801 sets the values of table 10910.

Comparator 10802 sequentially compares the signal values of packets 1 to 6 sequentially input from solid-state image capturer 10105 with the value in threshold register 10800, and generates the codes of packets 1 to 6.

The packet 1 code is set to "0" because the packet 1 signal value "value near black level" the threshold register value "value near black level". The packet 2 code is set to "1" because the packet 2 signal value "greater than black level">the threshold register value "value near black level". The packet 3 code is set to "0" because the packet 3 signal value "value near black level" the threshold register value "value near black level". The packet 4 code is set to "0" because the packet 4 signal value "value near black level" the threshold register value "value near black level". The packet 5 code is set to "0" because the packet 5 signal value "value near black level" the threshold register value "value near black level". The packet 6 code is set to "0" because the packet 6 signal value "value near black level" the threshold register value "value near black level".

The codes of packets 1 to 6 are synchronized in synchronizer 10803, and exposure code 10820 is generated as a 6-bit binary number, where packet 1 code is bit 0, packet 2 code is bit 1, packet 3 code is bit 2, packet 4 code is bit 3, packet 5 code is bit 4, and packet 6 code is bit 5, which converts to "02" in hexadecimal notation. When this exposure code 10820 is accessed and read as the address of memory (LUT) 10801, the data at address 02 of table 10910 is 1, which means reflected light 10111 has returned with a segment number of 1, and this segment number of 1 is output as the distance.

The actual distance to target object 10101 can be calculated from the time difference between the generation of emission light 10110 and the return of reflected light 10111. The time difference between the generation of emission light 10110 and the return of reflected light 10111 can be calculated by multiplying the time of one segment by the segment number, and since emission light 10110 was reflected by target object 10101 and returned to solid-state image capturer 10105 as reflected light 10111, emission light 10110 and reflected light 10111 traveled twice the distance to target object 10101.

$$\begin{aligned}&\text{Accordingly, the actual distance to target object 10101}\\&=\text{speed of light}\times\text{length of one segment}\times\\&\text{segment number where reflected light 10111 returned}\div 2\\&=299792458[\text{m/s}]\times 10[\text{ns}]\times 1\div 2\\&=1.49896229[\text{m}]\end{aligned}$$

In other words, the reflected wave from the unit segment (distance segment) with a segment number of 0 indicates that a target object is present at a distance of 0 to 1.5 meters, the reflected wave from the unit segment (distance segment) with a segment number of 1 indicates that a target object is present at a distance of 1.5 to 3 meters, the reflected wave from the unit segment (distance segment) with a segment number of 2 indicates that a target object is present at a distance of 3 to 4.5 meters, and so on for the remaining segment numbers.

The unit segment may be based on the pulse width of the exposure pulse. The unit segment may be the same as the pulse width of the exposure pulse or it may be different. The pulse width of the exposure pulse may be the same as the pulse width of the emission pulse, or it may be different. For ease of understanding, the present embodiment assumes that the pulse width of the exposure pulse, the pulse width of the emission pulse, and the unit segment are the same.

Figure 12:
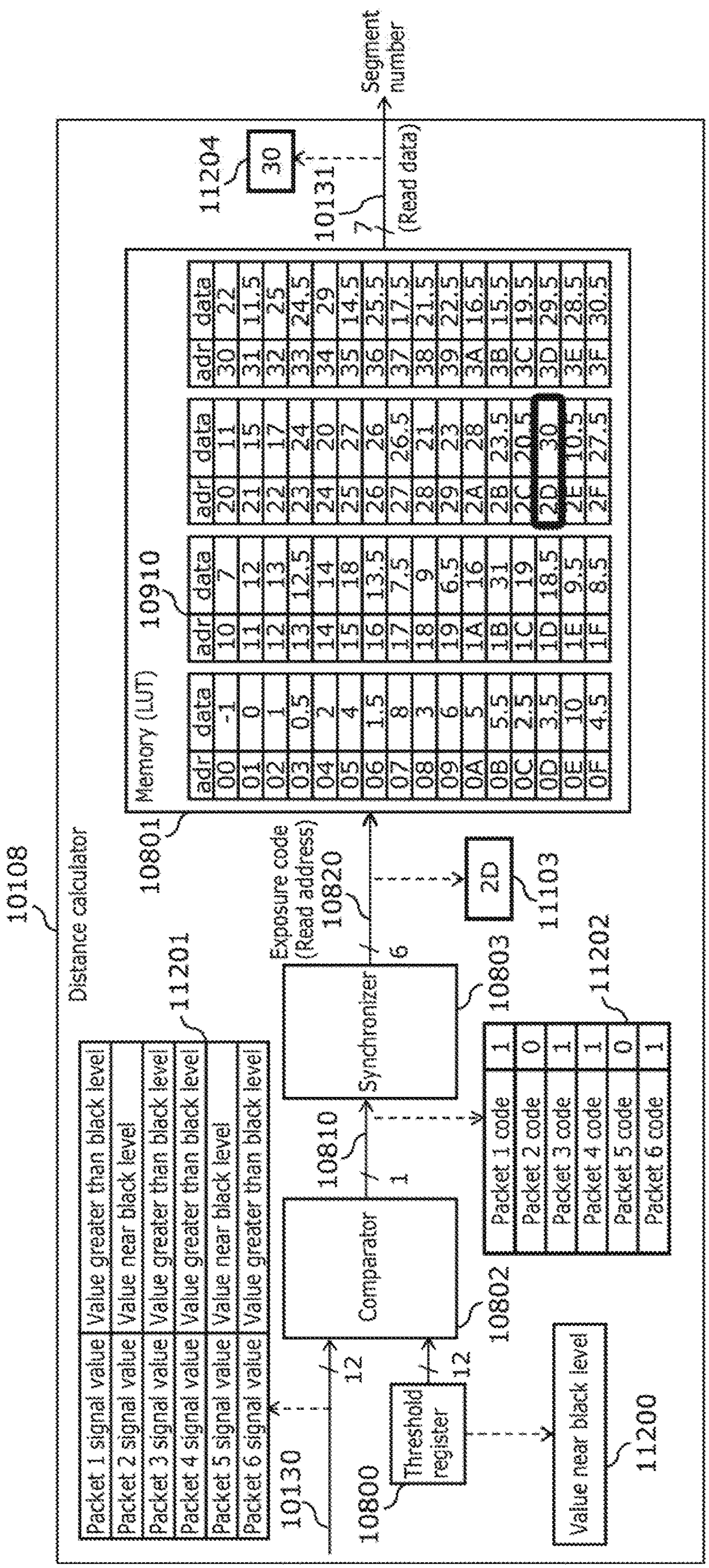
FIG. 12 illustrates the calculation of a segment number of one pixel on the far end when an independent code and the exposure code are the same according to Embodiment 1.

FIG. 12 illustrates a method used to calculate distance by distance calculator 10108 according to Embodiment 1. As illustrated in FIG. 12, the signal values of packets 1 to 6 corresponding to one pixel of solid-state image capturer output signal 10130, which are input to distance calculator 10108, are as follows: packet 1 signal value=value greater than black level; packet 2 signal value=value near black level; packet 3 signal value=value greater than black level; packet 4 signal value=value greater than black level; packet 5 signal value=value near black level; and packet 6 signal value=value greater than black level.

Comparator 10802 sequentially compares the signal values of packets 1 to 6 sequentially input from the solid-state image capturer with the value in threshold register 10800, and generates the codes of packets 1 to 6.

The packet 1 code is set to "1" because the packet 1 signal value "greater than black level">the threshold register value "value near black level". The packet 2 code is set to "0" because the packet 2 signal value "value near black level" the threshold register value "value near black level". The packet 3 code is set to "1" because the packet 3 signal value "greater than black level">the threshold register value "value near black level". The packet 4 code is set to "1" because the packet 4 signal value "greater than black level">the threshold register value "value near black level". The packet 5 code is set to "0" because the packet 5 signal value "value near black level" the threshold register value "value near black level". The packet 6 code is set to "1" because the packet 6 signal value "greater than black level">the threshold register value "value near black level".

The codes of packets 1 to 6 are synchronized in synchronizer 10803, and exposure code 10820 is generated as a 6-bit binary number, where packet 1 code is bit 0, packet 2 code is bit 1, packet 3 code is bit 2, packet 4 code is bit 3, packet 5 code is bit 4, and packet 6 code is bit 5, which converts to "2D" in hexadecimal notation. When this exposure code 10820 is accessed and read as the address of memory (LUT) 10801, the data at address 2D of table 10910 is 30, which means reflected light 10111 has returned with a segment number of 30, and this segment number of 30 is output as the distance.

Figure 13:
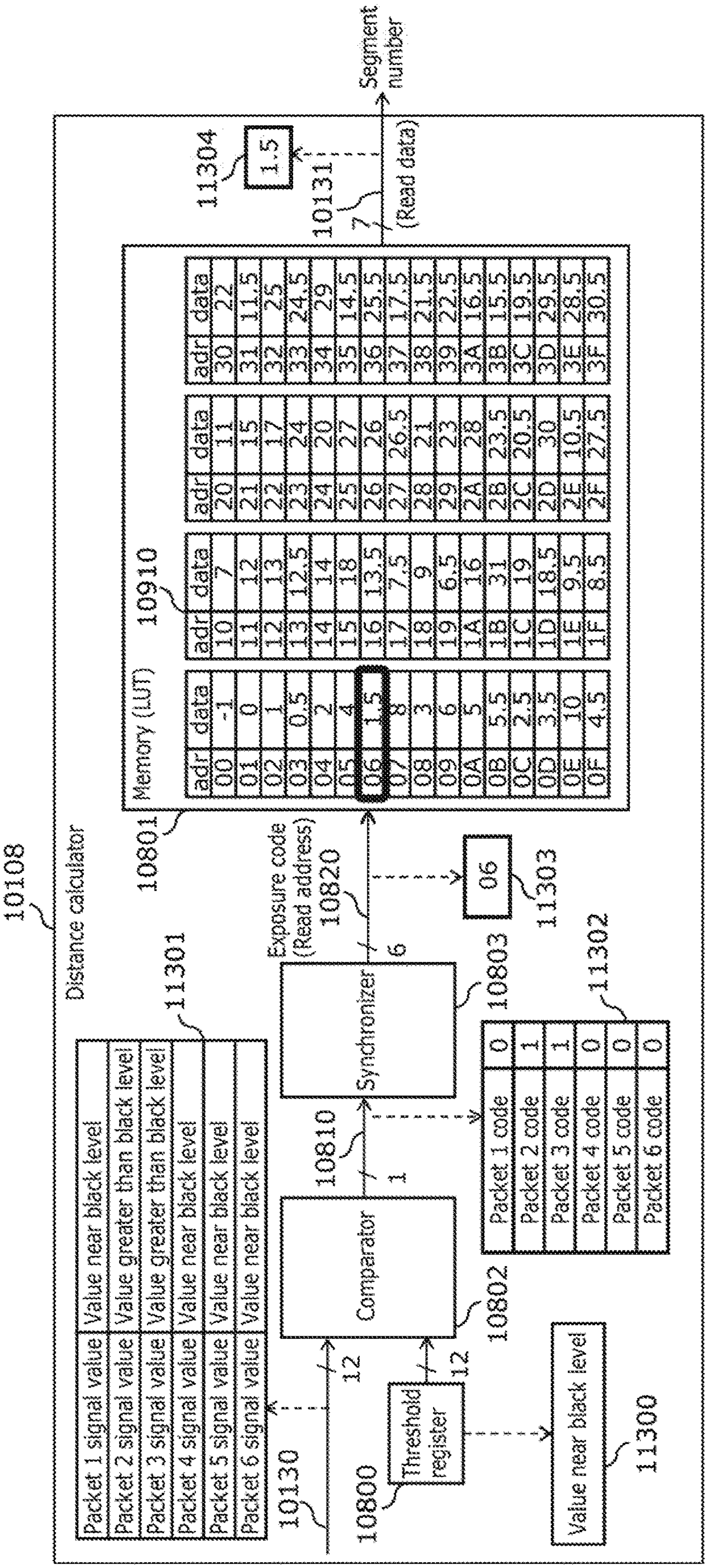
FIG. 13 illustrates the calculation of a segment number of one pixel on the near end when an adjacent code and the exposure code are the same according to Embodiment 1.

FIG. 13 illustrates a method used to calculate distance by distance calculator 10108 according to Embodiment 1. As illustrated in FIG. 13, the signal values of packets 1 to 6 corresponding to one pixel of solid-state image capturer output signal 10130, which are input to distance calculator 10108, are as follows: packet 1 signal value=value near black level; packet 2 signal value=value greater than black level; packet 3 signal value=value greater than black level; packet 4 signal value=value near black level; packet 5 signal value=value near black level; and packet 6 signal value=value near black level.

Comparator 10802 sequentially compares the signal values of packets 1 to 6 sequentially input from the solid-state image capturer with the value in threshold register 10800, and generates the codes of packets 1 to 6.

The packet 1 code is set to "0" because the packet 1 signal value "value near black level" the threshold register value "value near black level". The packet 2 code is set to "1" because the packet 2 signal value "greater than black level">the threshold register value "value near black level". The packet 3 code is set to "1" because the packet 3 signal value "greater than black level">the threshold register value "value near black level". The packet 4 code is set to "0" because the packet 4 signal value "value near black level" the threshold register value "value near black level". The packet 5 code is set to "0" because the packet 5 signal value "value near black level" the threshold register value "value near black level". The packet 6 code is set to "0" because the packet 6 signal value "value near black level" the threshold register value "value near black level".

The codes of packets 1 to 6 are synchronized in synchronizer 10803, and exposure code 10820 is generated as a 6-bit binary number, where packet 1 code is bit 0, packet 2 code is bit 1, packet 3 code is bit 2, packet 4 code is bit 3, packet 5 code is bit 4, and packet 6 code is bit 5, which converts to "06" in hexadecimal notation. When this exposure code 10820 is accessed and read as the address of memory (LUT) 10801, the data at address 06 of table 10910 is 1.5, which means reflected light 10111 has returned with a segment number between 1 and 2, and this segment number of 1.5 is output as the distance.

Figure 14:
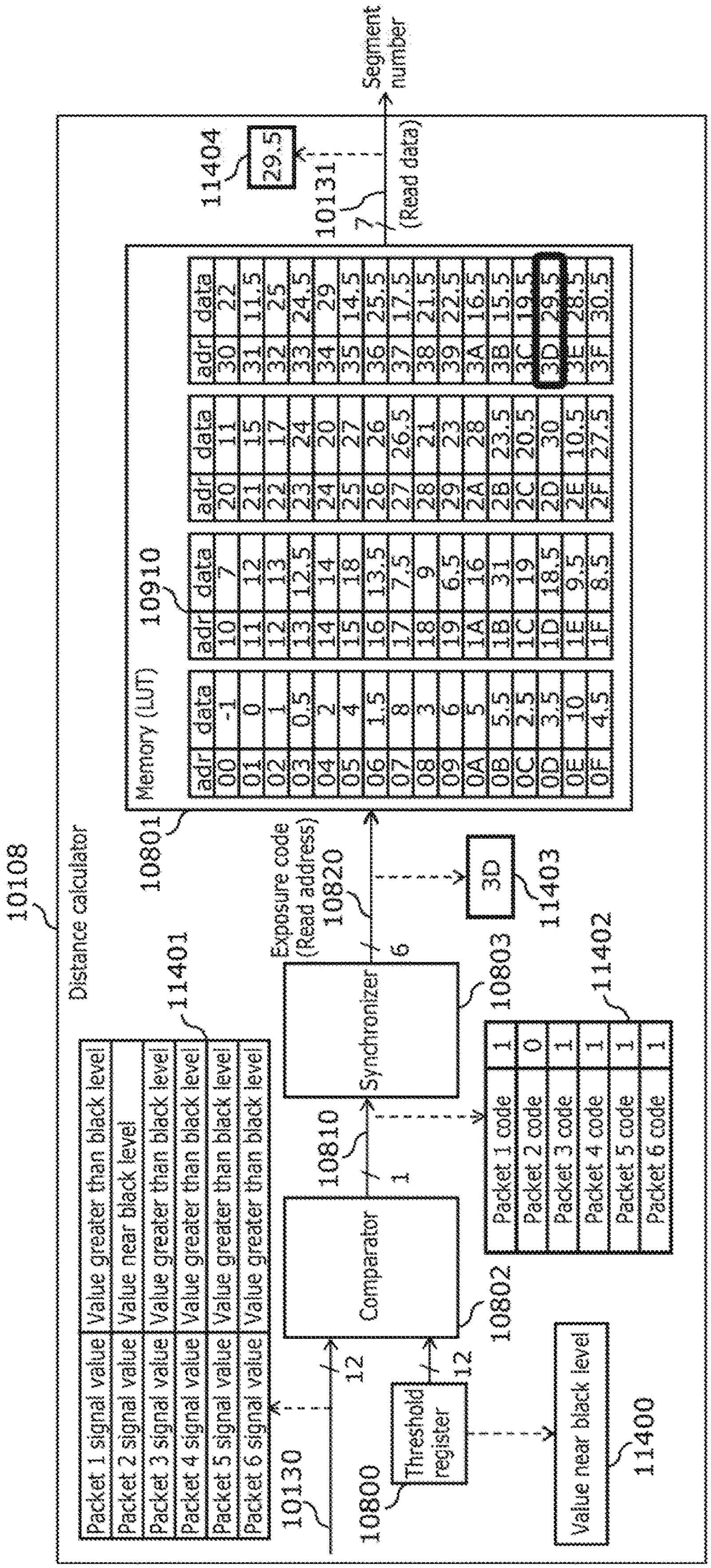
FIG. 14 illustrates the calculation of a segment number of one pixel on the far end when an adjacent code and the exposure code are the same according to Embodiment 1.

FIG. 14 illustrates a method used to calculate distance by distance calculator 10108 according to Embodiment 1. As illustrated in FIG. 14, the signal values of packets 1 to 6 corresponding to one pixel of solid-state image capturer output signal 10130, which are input to distance calculator 10108, are as follows: packet 1 signal value=value greater than black level; packet 2 signal value=value near black level; packet 3 signal value=value greater than black level; packet 4 signal value=value greater than black level; packet 5 signal value=value greater than black level; and packet 6 signal value=value greater than black level.

Comparator 10802 sequentially compares the signal values of packets 1 to 6 sequentially input from the solid-state image capturer with the value in threshold register 10800, and generates the codes of packets 1 to 6. The packet 1 code is set to "1" because the packet 1 signal value "greater than black level">the threshold register value "value near black level". The packet 2 code is set to "0" because the packet 2 signal value "value near black level" the threshold register value "value near black level". The packet 3 code is set to "1" because the packet 3 signal value "greater than black level">the threshold register value "value near black level". The packet 4 code is set to "1" because the packet 4 signal value "greater than black level">the threshold register value "value near black level". The packet 5 code is set to "1" because the packet 5 signal value "greater than black level">the threshold register value "value near black level". The packet 6 code is set to "1" because the packet 6 signal value "greater than black level">the threshold register value "value near black level".

The codes of packets 1 to 6 are synchronized in synchronizer 10803, and exposure code 10820 is generated as a 6-bit binary number, where packet 1 code is bit 0, packet 2 code is bit 1, packet 3 code is bit 2, packet 4 code is bit 3, packet 5 code is bit 4, and packet 6 code is bit 5, which converts to "3D" in hexadecimal notation. When this exposure code 10820 is accessed and read as the address of memory (LUT) 10801, the data at address 3D of table 10910 is 29.5, which means reflected light 10111 has returned with a segment number between 29 and 30, and this segment number of 29.5 is output as the distance.

From the above operation, the time required for 12 repetitions of frame unit drive pattern 10410, which corresponds to the imaging exposure time, is 17.28 ms, and the time required for image data readout 10411, which corresponds to the imaging readout time, is 16.053 ms. Therefore, the time required for one frame is 33.3 ms, and the frame rate of this ranging device is 30 fps. Compared to the conventional technique, this technique can significantly expand the range over which distance can be measured with a smaller number of packets, so by using this technique, the ranging range can be significantly expanded while maintaining the frame rate.

As described above, the ranging device according to Embodiment 1 includes: a pulse generator that generates an emission pulse instructing emission timing and an exposure pulse instructing exposure timing for receiving reflected light; a controller that controls the pulse generator according to n (n is an integer greater than or equal to 4) types of packet generation codes indicating whether or not to expose in each of unit segments corresponding to distance segments into which a ranging range is divided; a light source that emits light according to the emission pulse; a solid-state image capturer that captures an image according to the exposure pulse; and a distance calculator that calculates a distance based on n types of signal values obtained from the solid-state image capturer, the n types of signal values being per unit segment.

This makes it possible to achieve a high ranging accuracy and a wide ranging range. This is because the distance to the target object is determined by identifying the unit segment (i.e., the distance segment) where the n-bit data of the n types of signal values matches the n-bit data per unit segment (per distance segment) among the n types of packet generation codes. Since the n-bit data per unit segment (per distance segment) can be used for 2 to the $n^{th}$ power unit segments, the number of unit segments can be easily increased, thus achieving a high ranging accuracy and a wide ranging range.

Here, the controller may generate n-bit binary numbers as independent codes, each n-bit binary number being n bits included in the n types of packet generation codes per unit segment, and the distance calculator may: binarize the n types of signal values into an n-bit binary number and determine the binarized n-bit binary number as an exposure code; and compare the exposure code with the independent codes and calculate a distance corresponding to the matching unit segment.

With this, the distance to the target object can be calculated by identifying the distance segment where the exposure code and the independent code match. Since the maximum number of unit segments, i.e., independent codes is 2 to the $n^{th}$ power, the number of unit segments can be easily increased, thus achieving a high ranging accuracy and a wide ranging range.

Here, the controller may generate n-bit adjacent codes by applying a bitwise logical OR operation between two independent codes corresponding to two adjacent unit segments, and the distance calculator may further compare the exposure code with the adjacent codes, and when there is a match, calculates an intermediate distance between the two unit segments corresponding to the matching adjacent code.

With this, when the exposure code matches an adjacent code, it is possible to identify the two corresponding distance segments, and calculate the distance to the target object as an intermediate distance between the two identified distance segments. The total of the number of independent codes and the number of adjacent codes can be set up to a maximum of 2 to the $n^{th}$ power. For example, since a maximum of 2 to the $(n-1)^{th}$ power of independent codes and a maximum of 2 to the $(n-1)^{th}$ power of adjacent codes can be set, a higher ranging accuracy and a wider ranging range can be achieved.

Here, each of the adjacent codes may be different from any other adjacent code.

With this, when the exposure code matches an adjacent code, the distance to the target object can be easily identified as a range spanning across the boundary of the two corresponding distance segments and a range less than or equal to the distance segment.

Here, each of the independent codes may be different from any other independent code.

With this, when the exposure code matches an independent code, the distance to the target object can be easily identified via the corresponding distance segment.

Here, the solid-state image capturer may include: a photoelectric conversion pixel; n signal charge accumulators that each accumulate a signal charge generated by the photoelectric conversion pixel, the n signal charge accumulators corresponding to the n types of packet generation codes; and a signal outputter that outputs the n types of signal values corresponding to the signal charges accumulated in the n signal charge accumulators.

This makes it possible to accumulate n types of signal values in the solid-state image capturer. Since the readout operation of the signal values from the solid-state image capturer can be performed after accumulating n types of signal values, i.e., after successive exposures made according to the n types of packet generation codes, the imaging operation can be sped up. Stated differently, it is easy to increase the frame rate.

A ranging method according to Embodiment 1 is used in a ranging device including: a pulse generator that generates an emission pulse instructing emission timing and an exposure pulse instructing exposure timing for receiving reflected light; a controller that controls the pulse generator according to n (n is an integer greater than or equal to 4) types of packet generation codes indicating whether or not to expose in each of unit segments corresponding to distance segments into which a ranging range is divided; a light source that emits light according to the emission pulse; a solid-state image capturer that captures an image according to the exposure pulse; and a distance calculator that calculates a distance based on n types of signal values per unit segment obtained from the solid-state image capturer. The ranging method includes: generating, by the pulse generator, an exposure pulse and an emission pulse according to n types of packet generation codes indicating whether or not to expose in each of unit segments corresponding to distance segments into which a ranging range is divided, n being an integer greater than or equal to 4; obtaining n types of signal values obtained from the solid-state image capturer, the n types of signal values being per unit segment; binarizing the n types of signal values into an n-bit binary number; determining the binarized n-bit binary number as an exposure code; generating n-bit binary numbers as independent codes, each n-bit binary number being n bits included in the n types of packet generation codes per unit segment; and comparing the exposure code with the independent codes and calculating a distance corresponding to the unit segment that matches. Each of the n types of packet generation codes instructs a plurality of exposure pulses for one emission pulse.

With this, the distance to the target object can be calculated by identifying the distance segment where the exposure code and the independent code match. Since the maximum number of unit segments, i.e., independent codes is 2 to the $n^{th}$ power, the number of unit segments can be easily increased, thus achieving a high ranging accuracy and a wide ranging range.

Here, n-bit adjacent codes may be generated by applying a bitwise logical OR operation between two independent codes corresponding to two adjacent unit segments, and the adjacent codes may be compared with the independent codes, and when there is a match, an intermediate distance between the two corresponding unit segments may be calculated.

With this, when the exposure code matches an adjacent code, it is possible to identify the two corresponding distance segments, and calculate the distance to the target object as an intermediate distance between the two identified distance segments. The total of the number of independent codes and the number of adjacent codes can be set up to a maximum of 2 to the $n^{th}$ power. For example, since a maximum of 2 to the $(n-1)^{th}$ power of independent codes and a maximum of 2 to the $(n-1)^{th}$ power of adjacent codes can be set, a higher ranging accuracy and a wider ranging range can be achieved.

Embodiment 2

Embodiment 1 described use in an environment where there is no background light including a 940 nm wavelength component. However, when considering outdoor use, etc., there will be a high-energy background light including a 940 nm wavelength component from, for example, sunlight, which has a significant negative impact on the accuracy of the ranging device. Embodiment 2 describes a method to mitigate adverse effects even in the presence of high-energy background light including a 940 nm wavelength component.

Figure 15:
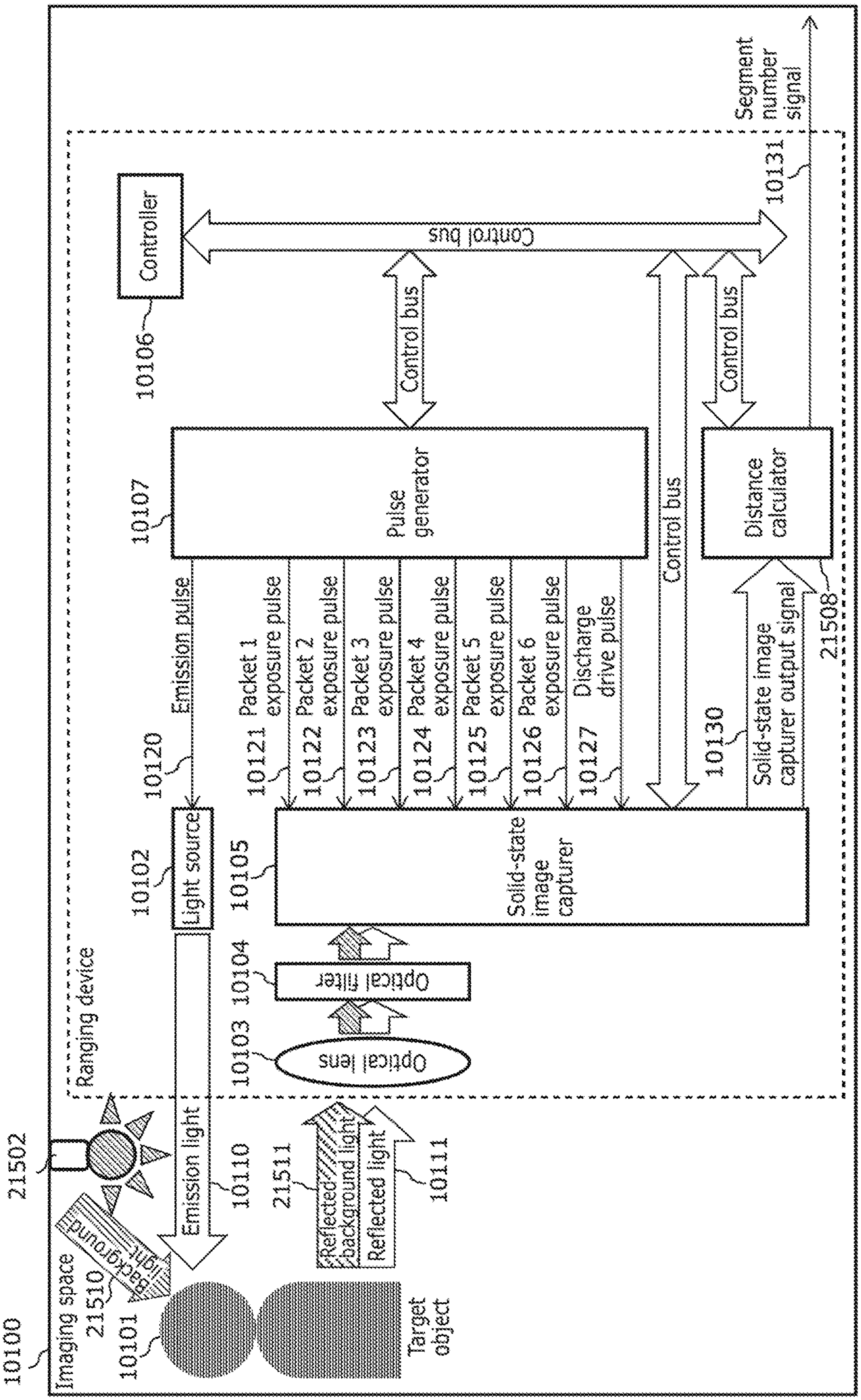
FIG. 15 schematically illustrates a configuration of a time of flight (TOF) ranging device according to Embodiment 2.

FIG. 15 schematically illustrates a configuration of a time of flight (TOF) ranging device and a surrounding object according to Embodiment 2 in an environment including background light. As illustrated in FIG. 15, background light 21510, which is emitted from background light light source 21502 and includes the same 940 nm wavelength component as light source 10102, and pulsed emission light 10110, which is 940 nm wavelength pulsed light (pulse width: 10 ns) emitted from light source 10102, are emitted to target object 10101 in imaging space 10100 and reflected by target object 10101. Reflected light 10111 of emission light 10110 and reflected background light 21511 of background light 21510 pass through optical lens 10103 and optical filter 10104, which transmits light in the near-infrared wavelength region around 940 nm, whereby reflected light 10111 of emission light 10110 and reflected background light 21511 including only components of background light 21510 around 940 nm are received by solid-state image capturer 10105, and an image is captured. The emission timing of light source 10102 and the exposure timing of solid-state image capturer 10105 are controlled by emission pulse 10120, exposure pulses 10121 to 10126 of packets 1 to 6, and discharge drive pulse 10127 from pulse generator 10107, which are controlled from controller 10106 via a control bus. Light source 10102 emits emission light 10110 when emission pulse 10120 is high level, and does not emit emission light 10110 when emission pulse 10120 is low level. For each pixel, solid-state image capturer 10105 outputs solid-state image capturer output signal 10130, which is six types of signal values corresponding to exposure pulses 10121 to 10126 of packets 1 to 6, to distance calculator 21508. Distance calculator 21508 uses solid-state image capturer output signal 10130 and control information from controller 10106 to output, for each pixel, segment number signal 10131 corresponding to the distance to target object 10101.

Light source 10102, optical lens 10103, optical filter 10104, solid-state image capturer 10105, controller 10106, pulse generator 10107, and distance calculator 21508 constitute the ranging device. Regarding the configuration, light source 10102 includes a drive circuit and light emitting elements, and emits light in response to application of voltage from the drive circuit. Laser diodes and other light emitting elements may be used as the light emitting elements. For example, controller 10106, pulse generator 10107, and distance calculator 21508 are realized by a combination of a central processing unit (CPU), a field programmable gate array (FPGA), a digital signal processor (DSP), and an analog front end (AFE) and the like.

FIG. 2 illustrates a configuration of pixel 10200 in solid-state image capturer 10105 according to Embodiments 1 through 4. As illustrated in FIG. 2, pixel 10200 includes photoelectric conversion pixel 10201 configured of a photodiode (PD) that receives reflected light 10111 and performs photoelectric conversion, drains 10210 for discharging signal charge photoelectrically converted by photoelectric conversion pixel 10201, a signal charge accumulator configured of floating diffusion amplifiers (FDAs) 10211 to 10216 that accumulate signal charges photoelectrically converted by photoelectric conversion pixel 10201, and an outputter which outputs voltage values dependent on the signal charges accumulated in FDAs 10211 to 10216 and is configured of source follower circuit 10221, output selection transistor 10231, source follower circuit 10222, output selection transistor 10232, source follower circuit 10223, output selection transistor 10233, source follower circuit 10224, output selection transistor 10234, source follower circuit 10225, output selection transistor 10235, source follower circuit 10226, and output selection transistor 10236.

Next, operations of pixel 10200 will be described. When packet 1 exposure pulse 10121 is set to high level, the signal charge photoelectrically converted in photoelectric conversion pixel 10201 is accumulated in FDA 10211, when packet 2 exposure pulse 10122 is set to high level, the signal charge photoelectrically converted in photoelectric conversion pixel 10201 is accumulated in FDA 10212, when packet 3 exposure pulse 10123 is set to high level, the signal charge photoelectrically converted in photoelectric conversion pixel 10201 is accumulated in FDA 10213, when packet 4 exposure pulse 10124 is set to high level, the signal charge photoelectrically converted in photoelectric conversion pixel 10201 is accumulated in FDA 10214, when packet 5 exposure pulse 10125 is set to high level, the signal charge photoelectrically converted in photoelectric conversion pixel 10201 is accumulated in FDA 10215, when packet 6 exposure pulse 10126 is set to high level, the signal charge photoelectrically converted in photoelectric conversion pixel 10201 is accumulated in FDA 10216, and when discharge drive pulse 10127 is set to high level, the signal charge photoelectrically converted in photoelectric conversion pixel 10201 is discharged to drains 10210. Accordingly, six types of imaging corresponding to exposure pulses 10121 to 10126 of packets 1 to 6 are performed per pixel by: discharging the signal charge photoelectrically converted in photoelectric conversion pixel 10201 to drains 10210 when all exposure pulses 10121 to 10126 of packets 1 to 6 are low level by setting discharge drive pulse 10127 to high level when all exposure pulses 10121 to 10126 of packets 1 to 6 are low level; and accumulating the signal charge from photoelectric conversion pixel 10201 in FDAs 10211 to 10216 corresponding to exposure pulses 10121 to 10126 of packets 1 to 6 only when one of the six exposure pulses 10121 to 10126 of packets 1 to 6 is high level by, when one of the six exposure pulses 10121 to 10126 of packets 1 to 6 is high level, setting the remaining five to low level and setting discharge drive pulse 10127 to low level. FDAs 10211 through 10216 accumulate signal charge, resulting in a voltage corresponding to the amount of signal charge, and generate a packet 1 voltage value corresponding to the amount of signal charge in FDA 10211, a packet 2 voltage value corresponding to the amount of signal charge in FDA 10212, a packet 3 voltage value corresponding to the amount of signal charge in FDA 10213, a packet 4 voltage value corresponding to the amount of signal charge in FDA 10214, a packet 5 voltage value corresponding to the amount of signal charge in FDA 10215, and a packet 6 voltage value corresponding to the amount of signal charge in FDA 10216. By setting output enable signal 10240 to high level, simultaneously, the packet 1 voltage value is output to pixel output signal 10241 through source follower circuit 10221 and output selection transistor 10231, the packet 2 voltage value is output to pixel output signal 10242 through source follower circuit 10222 and output selection transistor 10232, the packet 3 voltage value is output to pixel output signal 10243 through source follower circuit 10223 and output selection transistor 10233, the packet 4 voltage value is output to pixel output signal 10244 through source follower circuit 10224 and output selection transistor 10234, the packet 5 voltage value is output to pixel output signal 10245 through source follower circuit 10225 and output selection transistor 10235, and the packet 6 voltage value is output to pixel output signal 10246 through source follower circuit 10226 and output selection transistor 10236.

FIG. 3 illustrates a configuration of solid-state image capturer 10105 according to Embodiments 1 through 4. As illustrated in FIG. 3, solid-state image capturer 10105 includes X number of pixels 10200 in the horizontal direction and Y number of pixels in the vertical direction, arranged in two dimensions, where X=320 and Y=240 in Embodiments 1 through 4. The stated number of pixels is merely one non-limiting example. Output enable signals 10240 of pixels 10200 at pixel address 11, pixel address 12, and pixel address 1X arranged in the horizontal direction in the first row are connected to row select signal 10300, output enable signals 10240 of pixels 10200 at pixel address 21, pixel address 22, and pixel address 2X arranged in the horizontal direction in the second row are connected to row select signal 10301, output enable signals 10240 of pixels 10200 at pixel address 31, pixel address 32, and pixel address 3X arranged in the horizontal direction in the third row are connected to row select signal 10302, and output enable signals 10240 of pixels 10200 at pixel address Y1, pixel address Y2, and pixel address YX arranged in the horizontal direction in the Yth row are connected to row select signal 10303. Pixel output signals 10241 to 10246 of pixels 10200 at pixel address 11, pixel address 21, pixel address 31, and pixel address Y1 arranged in the vertical direction in the first column are connected to vertical pixel signals 10311 to 10316, pixel output signals 10241 to 10246 of pixels 10200 at pixel address 12, pixel address 22, pixel address 32, and pixel address Y2 arranged in the vertical direction in the second column are connected to vertical pixel signals 10321 to 10326, and pixel output signals 10241 to 10246 of pixels 10200 at pixel address 1X, pixel address 2X, pixel address 3X, and pixel address YX arranged in the vertical direction in the $X^{th}$ column are connected to vertical pixel signals 10331 to 10336. Vertical pixel signals 10311 to 10316, 10321 to 10326, and 10331 to 10336 are connected to column AD 10370, the output signals of column AD 10370 are connected to shift register 10371, and shift register 10371 outputs solid-state image capturer output signal 10130.

Next, readout operations of solid-state image capturer 10105 will be described. The readout operation is the same as that of a typical CMOS image sensor with six times the number of horizontal pixels. By setting row select signal 10300 to high level, row select signal 10301 to low level, row select signal 10302 to low level, and row select signal 10303 to low level, voltage values of packets 1 to 6 of pixel 10200 at pixel address 11 are output to vertical pixel signals 10311 to 10316, voltage values of packets 1 to 6 of pixel 10200 at pixel address 12 are output to vertical pixel signals 10321 to 10326, and voltage values of packets 1 to 6 of pixel 10200 at pixel address 1X are output to vertical pixel signals 10331 to 10336, and input to column AD 10370. By setting row select signal 10300 to low level, row select signal 10301 to high level, row select signal 10302 to low level, and row select signal 10303 to low level, voltage values of packets 1 to 6 of pixel 10200 at pixel address 21 are output to vertical pixel signals 10311 to 10316, voltage values of packets 1 to 6 of pixel 10200 at pixel address 22 are output to vertical pixel signals 10321 to 10326, and voltage values of packets 1 to 6 of pixel 10200 at pixel address 2X are output to vertical pixel signals 10331 to 10336, and input to column AD 10370. By setting row select signal 10300 to low level, row select signal 10301 to low level, row select signal 10302 to high level, and row select signal 10303 to low level, voltage values of packets 1 to 6 of pixel 10200 at pixel address 31 are output to vertical pixel signals 10311 to 10316, voltage values of packets 1 to 6 of pixel 10200 at pixel address 32 are output to vertical pixel signals 10321 to 10326, and voltage values of packets 1 to 6 of pixel 10200 at pixel address 3X are output to vertical pixel signals 10331 to 10336, and input to column AD 10370. By setting row select signal 10300 to low level, row select signal 10301 to low level, row select signal 10302 to low level, and row select signal 10303 to high level, voltage values of packets 1 to 6 of pixel 10200 at pixel address Y1 are output to vertical pixel signals 10311 to 10316, voltage values of packets 1 to 6 of pixel 10200 at pixel address Y2 are output to vertical pixel signals 10321 to 10326, and voltage values of packets 1 to 6 of pixel 10200 at pixel address YX are output to vertical pixel signals 10331 to 10336, and input to column AD 10370. Column AD 10370 AD-converts the input voltage values of packets 1 to 6 for the X number of pixels into 12-bit signal values, generates a packet 1 signal value resulting from AD-converting packet 1 voltage value, a packet 2 signal value resulting from AD-converting packet 2 voltage value, a packet 3 signal value resulting from AD-converting packet 3 voltage value, a packet 4 signal value resulting from AD-converting packet 4 voltage value, a packet 5 signal value resulting from AD-converting packet 5 voltage value, and a packet 6 signal value resulting from AD-converting packet 6 voltage value for the X number of pixels, and outputs the generated signal values to shift register 10371. Shift register 10371 shifts the input signal values of packets 1 to 6 for the X number of pixels one by one, and outputs the shifted signal values to solid-state image capturer output signal 10130.

Figure 16:
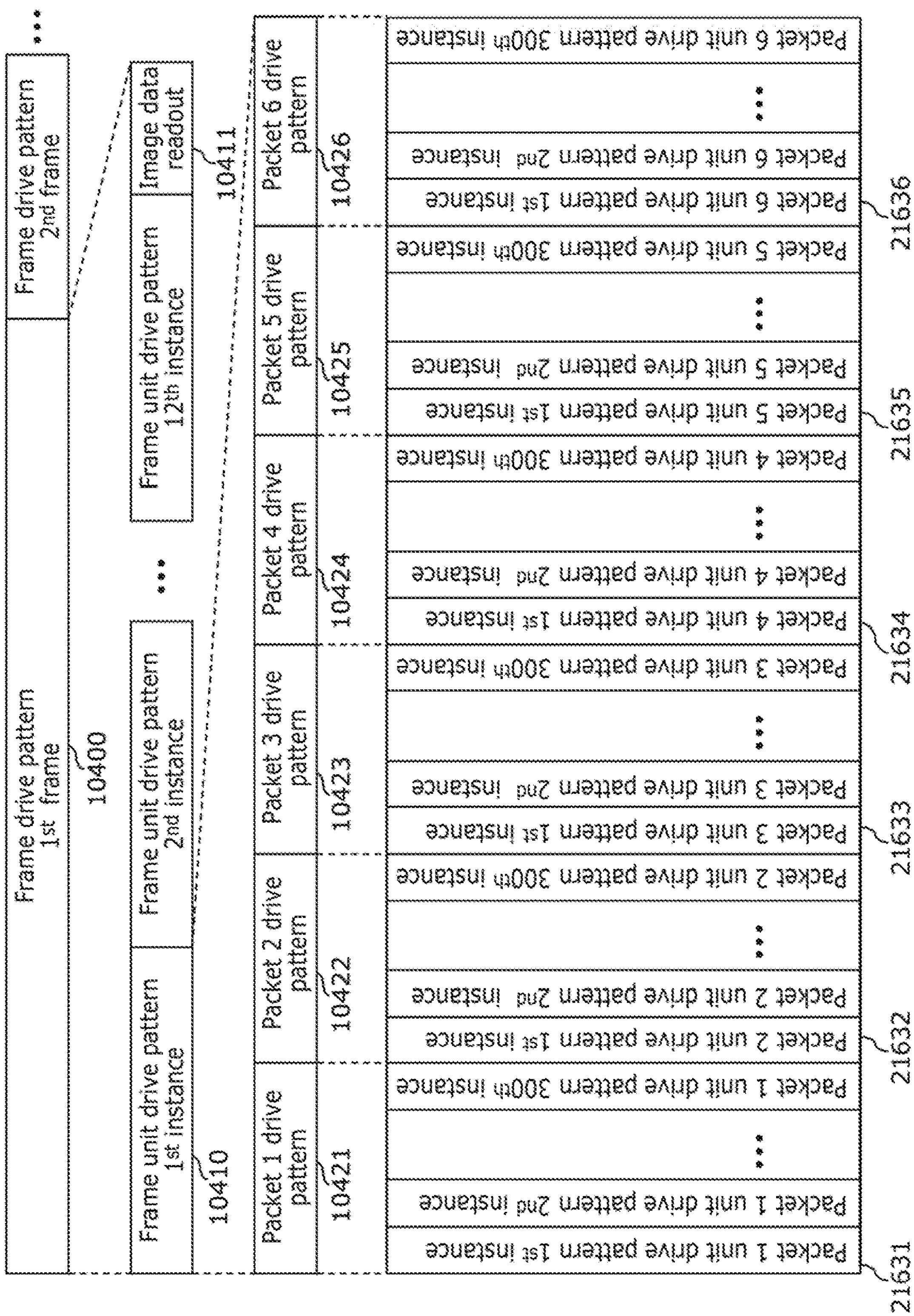
FIG. 16 illustrates a control sequence of a light emitter and a solid-state image capturer according to Embodiment 2.

FIG. 16 illustrates the control sequence of light source 10102 and solid-state image capturer 10105 according to Embodiment 2. In the control sequence illustrated in FIG. 16, as illustrated in FIG. 1, the number of frame unit drive pattern repetitions (12 times) and the number of unit drive pattern repetitions for packets 1 to 6 (300 times) are instructed to pulse generator 10107 from controller 10106 through the control bus, and emission pulse 10120, exposure pulses 10121 to 10126 of packets 1 to 6, and discharge drive pulse 10127 are generated in pulse generator 10107 in accordance with the number of frame unit drive pattern repetitions and the number of unit drive pattern repetitions for packets 1 to 6. FIG. 16 describes the generation of unit drive patterns 21631 to 21636 for packets 1 to 6, and FIG. 17 and FIG. 18A to FIG. 18F describe the method of generating emission pulse 10120, exposure pulses 10121 to 10126 of packets 1 to 6, and discharge drive pulse 10127 for each of unit drive patterns 21631 to 21636 for packets 1 to 6.

As illustrated in FIG. 16, one frame consists of frame drive pattern 10400. Frame drive pattern 10400 consists of 12 repetitions of frame unit drive pattern 10410 and image data readout 10411, which outputs the signal charges accumulated in the signal charge accumulators of all pixels 10200 from solid-state image capturer 10105. Frame unit drive pattern 10410 consists of packet 1 drive pattern 10421, packet 2 drive pattern 10422, packet 3 drive pattern 10423, packet 4 drive pattern 10424, packet 5 drive pattern 10425, and packet 6 drive pattern 10426. Packet 1 drive pattern 10421 consists of 300 repetitions of packet 1 unit drive pattern 21631. Packet 2 drive pattern 10422 consists of 300 repetitions of packet 2 unit drive pattern 21632. Packet 3 drive pattern 10423 consists of 300 repetitions of packet 3 unit drive pattern 21633. Packet 4 drive pattern 10424 consists of 300 repetitions of packet 4 unit drive pattern 21634. Packet 5 drive pattern 10425 consists of 300 repetitions of packet 5 unit drive pattern 21635. Packet 6 drive pattern 10426 consists of 300 repetitions of packet 6 unit drive pattern 21636. Unit drive patterns 21631 to 21636 for packets 1 to 6 drive emission pulse 10120, exposure pulses 10121 to 10126 of packets 1 to 6, and discharge drive pulse 10127. Unit drive patterns 21631 to 21636 for packets 1 to 6 will be described in greater detail later with reference to FIG. 17 and FIG. 18A to FIG. 18F. The control sequence of light source 10102 and solid-state image capturer 10105 illustrated in FIG. 16 is merely one non-limiting example.

Unit drive patterns 21631 to 21636 for packets 1 to 6 are repeated 300 times in drive patterns 10421 to 10426 for packets 1 to 6, respectively, and drive patterns 10421 to 10426 for packets 1 to 6 are repeated 12 times via the frame unit drive patterns. Stated differently, each of unit drive patterns 21631 to 21636 for packets 1 to 6 are repeated 3600 (=300×12) times. By repeating each pattern 3600 times, even though the amount of emission light 10110 emitted each time is small, it is possible to ensure a sufficient amount of light. On the other hand, by dividing frame drive pattern 10400 into 12 frame unit drive patterns 10410, the amount of time required for each frame unit drive pattern 10410 can be shortened and the apparent imaging timing of packets 1 to 6 can be synchronized. By repeating the frame unit drive pattern 10410 12 times, blur caused by target object 10101 moving occurs evenly in packets 1 to 6, making it possible to inhibit side effects such as data corruption during distance calculation caused by target object 10101 moving.

FIG. 17 illustrates generation codes 21701 to 21706 of packets 1 to 6 that are applied to controller 10106 to generate unit drive patterns 21631 to 21636 for packets 1 to 6 and discharge drive pulse 10127 for controlling solid-state image capturer 10105 according to Embodiment 2. As illustrated in FIG. 17, generation codes 21701 to 21706 of packets 1 to 6 are divided into 31 segments identified by segment numbers 21700 of 0 to 30, and each segment identified by one of segment numbers 21700 has a value of "0" or "1". Generation codes 21701 to 21706 of packets 1 to 6 are information for controlling the driving of exposure pulses 10121 to 10126 of packets 1 to 6. Segment numbers 21700 and generation codes 21701 to 21706 of packets 1 to 6 are transmitted to pulse generator 10107 through the control bus, and pulse generator 10107 generates unit drive patterns 21631 to 21636 for packets 1 to 6 from segment numbers 21700 and generation codes 21701 to 21706 of packets 1 to 6. The generation codes of packets 1 to 6 illustrated in FIG. 17 are non-limiting examples.

FIG. 18A to FIG. 18F are timing charts showing packet 1 unit drive pattern 21631 to packet 6 unit drive pattern 21636 according to Embodiment 2. As illustrated in FIG. 18A to FIG. 18F, pulse generator 10107 generates unit drive patterns 21631 to 21636 for packets 1 to 6 by switching segment number 10600 every unit segment (10 ns) for 80 segments from 0 to 79, and using (i) generation codes 21701 to 21706 of packets 1 to 6 with the same segment numbers 10600 and 21700 and (ii) segment number 10600 to control emission pulse 10120, exposure pulses 10121 to 10126 of packets 1 to 6, and discharge drive pulse 10127. The reason why segment numbers 10600 of pulse generator 10107 are set to a value (79) that is twice or more than the maximum value (30) of segment numbers 21700 is to prevent the reception of reflected light 10111 of emission light 10110 that has been reflected by target object 10101 located outside the ranging range (a segment number that is larger than the maximum value of segment numbers 21700). Therefore, in a segment number that does not exist in segment numbers 21700, pulses are generated with emission pulse 10120 at low level, exposure pulses 10121 to 10126 of packets 1 to 6 at low level, and discharge drive pulse 10127 at high level. By controlling solid-state image capturer 10105 in this way, the time required for 12 repetitions of frame unit drive pattern 10410, which corresponds to the imaging exposure time, is 17.28 ms, which is calculated by multiplying the length of the unit segment, 10 ns, the number of segment numbers, 80, the number of unit drive pattern repetitions, 300, the number of packets, 6, and the number of frame unit drive pattern repetitions, 12. This unit segment specifies that the pulse width of emission light 10110 and exposure pulses 10121 to 10126 of packets 1 to 6 are the same, and does not limit the pulse width to 10 ns.

The following describes a method of controlling emission pulse 10120, exposure pulses 10121 to 10126 of packets 1 to 6, and discharge drive pulse 10127 for segment numbers 0 to 30 included in segment numbers 21700.

Figure 18A:
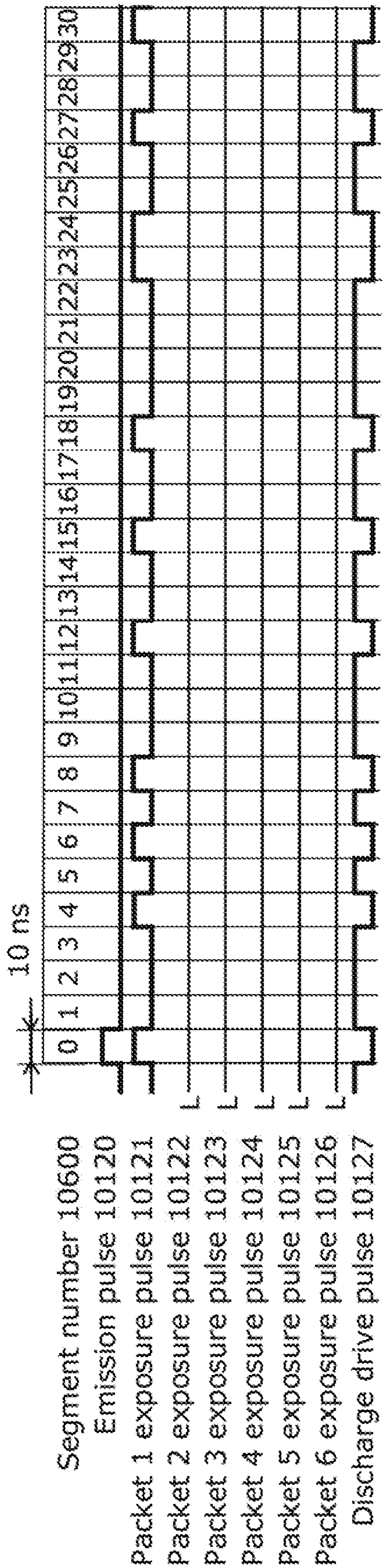
FIG. 18A illustrates the operation timing of packet 1 unit drive pattern according to Embodiment 2.

FIG. 18A is a timing chart showing packet 1 unit drive pattern 21631. Emission pulse 10120 is generated as high level when segment number 21700 is 0, and low level when segment number 21700 is the remaining 1 to 30. Packet 1 exposure pulse 10121 is generated as high level when packet 1 generation code 21701 corresponding to segment number 21700 is "1" and low level when packet 1 generation code 21701 corresponding to segment number 21700 is "0", and packet 2 exposure pulse 10122, packet 3 exposure pulse 10123, packet 4 exposure pulse 10124, packet 5 exposure pulse 10125, and packet 6 exposure pulse 10126 are generated as low level in all segments, i.e., when segment number 21700 is 0 to 30. Discharge drive pulse 10127 is generated as low level when packet 1 generation code 21701 corresponding to segment number 21700 is "1" and high level when packet 1 generation code 21701 corresponding to segment number 21700 is "0", which results in a pulse whose logic is inverted from that of packet 1 exposure pulse 10121.

Figure 18B:
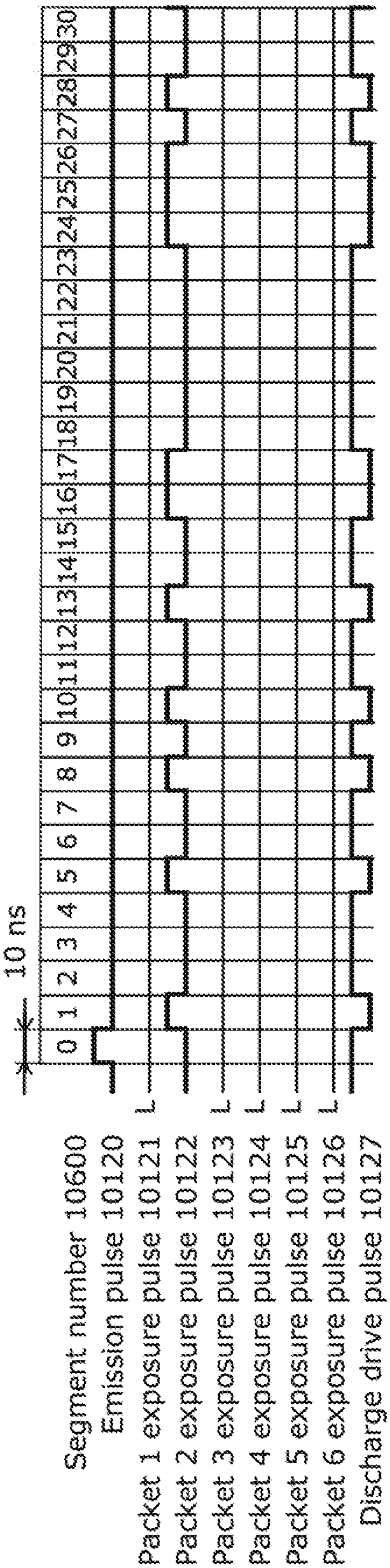
FIG. 18B illustrates the operation timing of packet 2 unit drive pattern according to Embodiment 2.

FIG. 18B is a timing chart showing packet 2 unit drive pattern 21632. Emission pulse 10120 is generated as high level when segment number 21700 is 0, and low level when segment number 21700 is the remaining 1 to 30. Packet 2 exposure pulse 10122 is generated as high level when packet 2 generation code 21702 corresponding to segment number 21700 is "1" and low level when packet 2 generation code 21702 corresponding to segment number 21700 is "0", and packet 1 exposure pulse 10121, packet 3 exposure pulse 10123, packet 4 exposure pulse 10124, packet 5 exposure pulse 10125, and packet 6 exposure pulse 10126 are generated as low level in all segments, i.e., when segment number 21700 is 0 to 30. Discharge drive pulse 10127 is generated as low level when packet 2 generation code 21702 corresponding to segment number 21700 is "1" and high level when packet 2 generation code 21702 corresponding to segment number 21700 is "0", which results in a pulse whose logic is inverted from that of packet 2 exposure pulse 10122.

Figure 18C:
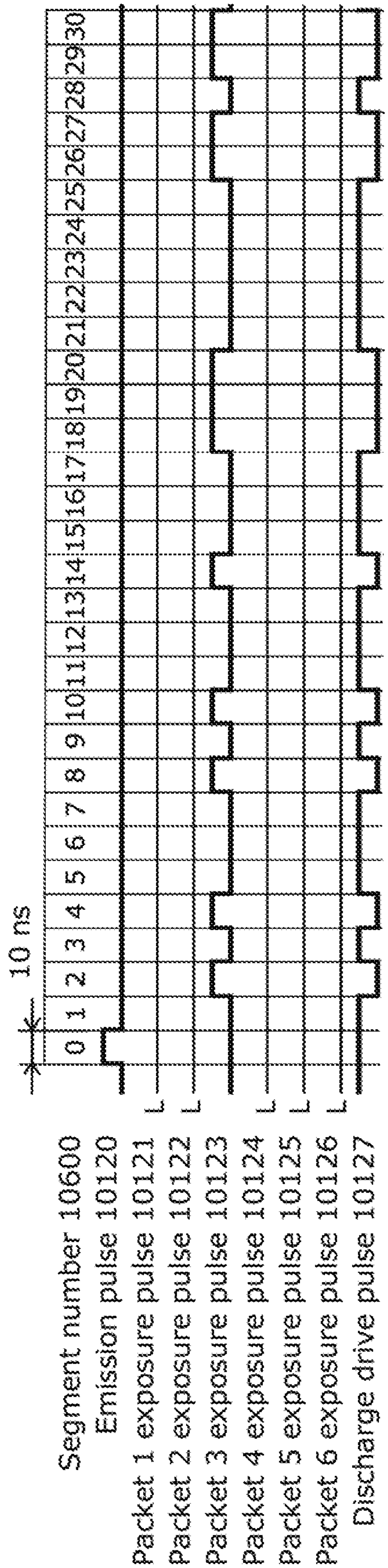
FIG. 18C illustrates the operation timing of packet 3 unit drive pattern according to Embodiment 2.

FIG. 18C is a timing chart showing packet 3 unit drive pattern 21633. Emission pulse 10120 is generated as high level when segment number 21700 is 0, and low level when segment number 21700 is the remaining 1 to 30. Packet 3 exposure pulse 10123 is generated as high level when packet 3 generation code 21703 corresponding to segment number 21700 is "1" and low level when packet 3 generation code 21703 corresponding to segment number 21700 is "0", and packet 1 exposure pulse 10121, packet 2 exposure pulse 10122, packet 4 exposure pulse 10124, packet 5 exposure pulse 10125, and packet 6 exposure pulse 10126 are generated as low level in all segments, i.e., when segment number 21700 is 0 to 30. Discharge drive pulse 10127 is generated as low level when packet 3 generation code 21703 corresponding to segment number 21700 is "1" and high level when packet 3 generation code 21703 corresponding to segment number 21700 is "0", which results in a pulse whose logic is inverted from that of packet 3 exposure pulse 10123.

Figure 18D:
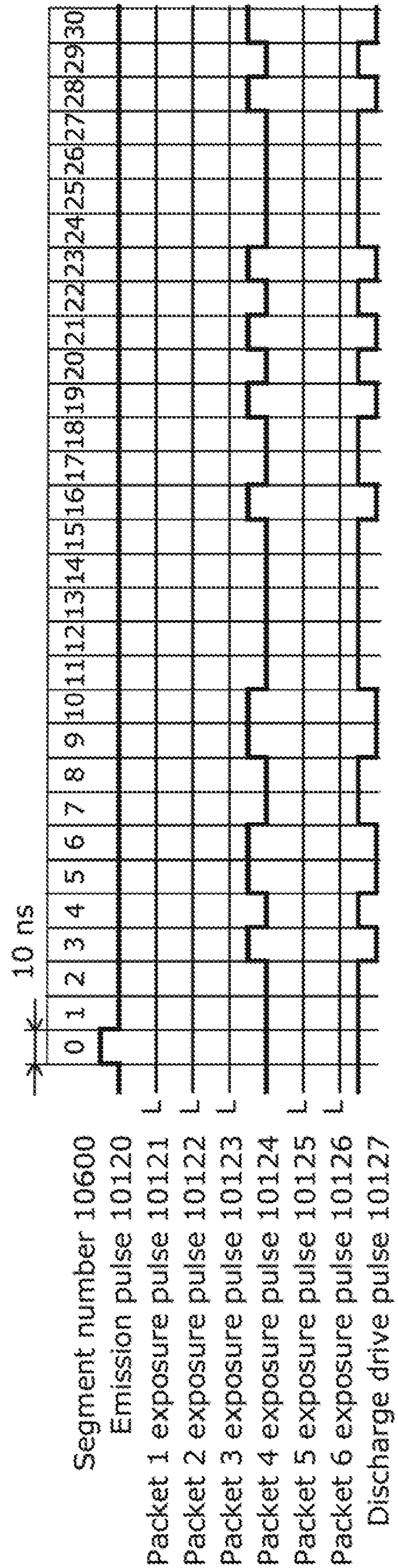
FIG. 18D illustrates the operation timing of packet 4 unit drive pattern according to Embodiment 2.

FIG. 18D is a timing chart showing packet 4 unit drive pattern 21634. Emission pulse 10120 is generated as high level when segment number 21700 is 0, and low level when segment number 21700 is the remaining 1 to 30. Packet 4 exposure pulse 10124 is generated as high level when packet 4 generation code 21704 corresponding to segment number 21700 is "1" and low level when packet 4 generation code 21704 corresponding to segment number 21700 is "0", and packet 1 exposure pulse 10121, packet 2 exposure pulse 10122, packet 3 exposure pulse 10123, packet 5 exposure pulse 10125, and packet 6 exposure pulse 10126 are generated as low level in all segments, i.e., when segment number 21700 is 0 to 30. Discharge drive pulse 10127 is generated as low level when packet 4 generation code 21704 corresponding to segment number 21700 is "1" and high level when packet 4 generation code 21704 corresponding to segment number 21700 is "0", which results in a pulse whose logic is inverted from that of packet 4 exposure pulse 10124.

Figure 18E:
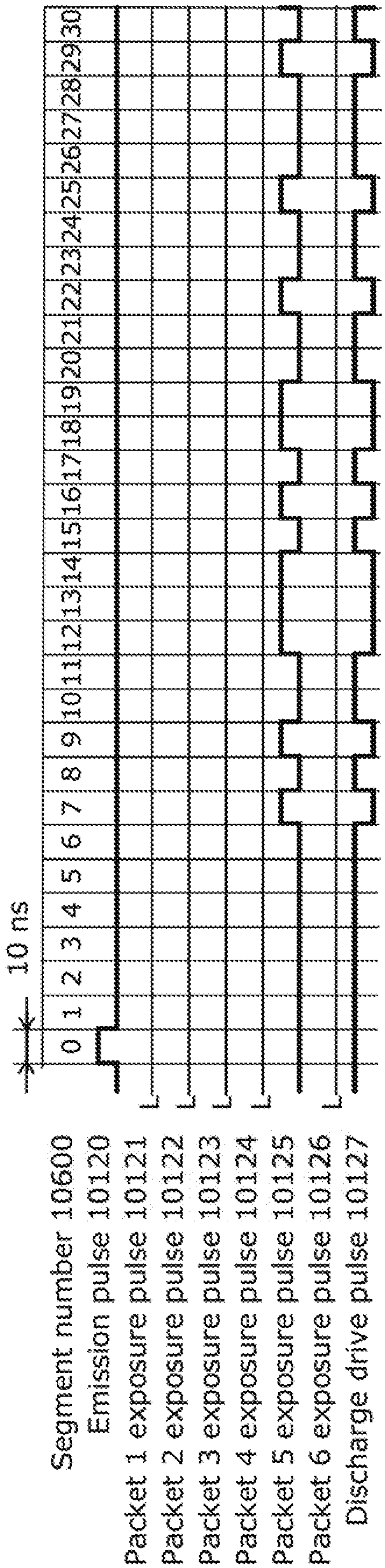
FIG. 18E illustrates the operation timing of packet 5 unit drive pattern according to Embodiment 2.

FIG. 18E is a timing chart showing packet 5 unit drive pattern 21635. Emission pulse 10120 is generated as high level when segment number 21700 is 0, and low level when segment number 21700 is the remaining 1 to 30. Packet 5 exposure pulse 10125 is generated as high level when packet 5 generation code 21705 corresponding to segment number 21700 is "1" and low level when packet 5 generation code 21705 corresponding to segment number 21700 is "0", and packet 1 exposure pulse 10121, packet 2 exposure pulse 10122, packet 3 exposure pulse 10123, packet 4 exposure pulse 10124, and packet 6 exposure pulse 10126 are generated as low level in all segments, i.e., when segment number 21700 is 0 to 30. Discharge drive pulse 10127 is generated as low level when packet 5 generation code 21705 corresponding to segment number 21700 is "1" and high level when packet 5 generation code 21705 corresponding to segment number 21700 is "0", which results in a pulse whose logic is inverted from that of packet 5 exposure pulse 10125.

Figure 18F:
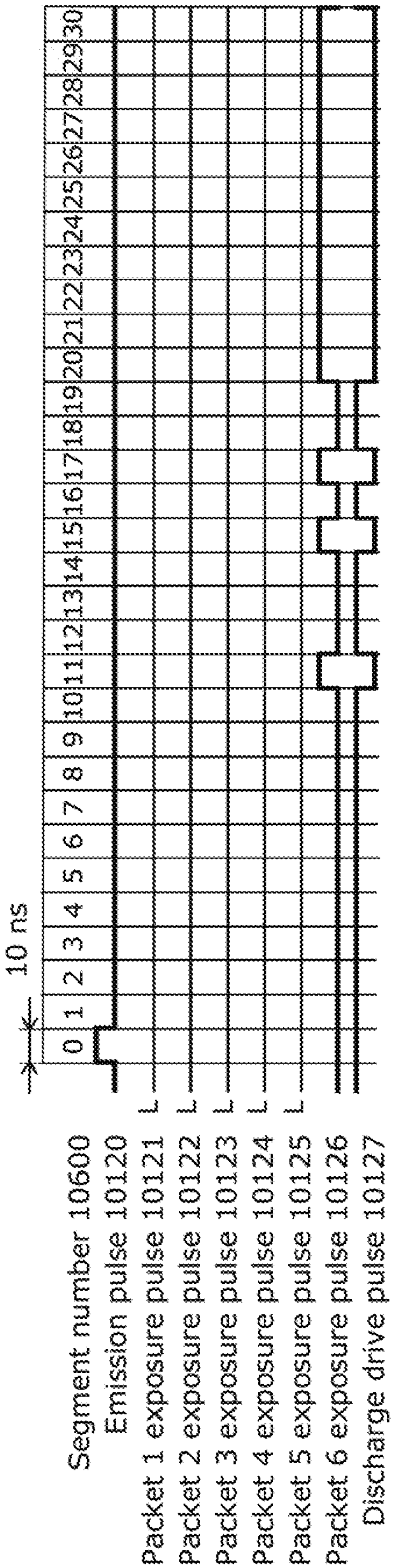
FIG. 18F illustrates the operation timing of packet 6 unit drive pattern according to Embodiment 2.

FIG. 18F is a timing chart showing packet 6 unit drive pattern 21636. Emission pulse 10120 is generated as high level when segment number 21700 is 0, and low level when segment number 21700 is the remaining 1 to 30. Packet 6 exposure pulse 10126 is generated as high level when packet 6 generation code 21706 corresponding to segment number 21700 is "1" and low level when packet 6 generation code 21706 corresponding to segment number 21700 is "0", and packet 1 exposure pulse 10121, packet 2 exposure pulse 10122, packet 3 exposure pulse 10123, packet 4 exposure pulse 10124, and packet 5 exposure pulse 10125 are generated as low level in all segments, i.e., when segment number 21700 is 0 to 30. Discharge drive pulse 10127 is generated as low level when packet 6 generation code 21706 corresponding to segment number 21700 is "1" and high level when packet 6 generation code 21706 corresponding to segment number 21700 is "0", which results in a pulse whose logic is inverted from that of packet 6 exposure pulse 10126.

FIG. 7 illustrates the timing of image data readout 10411 of solid-state image capturer 10105 according to Embodiments 1 through 4. Row select signals 10300 to 10303, column AD 10370, and shift register 10371 are controlled to output the signal values of packets 1 to 6 of all pixels 10200 illustrated in FIG. 3 to solid-state image capturer output signal 10130. The operation of this image data readout 10411 is the same as that of a normal CMOS image sensor with six times more horizontal pixels.

As illustrated in FIG. 7, at timing 10700, by setting row select signal 10300 to high level, row select signal 10301 to low level, row select signal 10302 to low level, and row select signal 10303 to low level, voltage values of packets 1 to 6 of pixel 10200 at pixel address 11 are output to vertical pixel signals 10311 to 10316, the voltage values of packets 1 to 6 of pixel 10200 at pixel address 12 are output to vertical pixel signals 10321 to 10326, and the voltage values of packets 1 to 6 of pixel 10200 at pixel address 1X are output to vertical pixel signals 10331 to 10336. Vertical pixel signals 10311 to 10316, vertical pixel signals 10321 to 10326, and vertical pixel signals 10331 to 10336 are connected to column AD 10370, these signals are AD-converted into 12-bit signal values, and packet 1 signal value resulting from AD-converting packet 1 voltage value, packet 2 signal value resulting from AD-converting packet 2 voltage value, packet 3 signal value resulting from AD-converting packet 3 voltage value, packet 4 signal value resulting from AD-converting packet 4 voltage value, packet 5 signal value resulting from AD-converting packet 5 voltage value, and packet 6 signal value resulting from AD-converting packet 6 voltage value of pixel address 11, pixel address 12, and pixel address 1X are generated. At timing 10701, which is the timing of completion of the AD conversions, the AD-converted signal values of packets 1 to 6 of pixel address 11, pixel address 12, and pixel address 1X are output to shift register 10371. While shifting the input signal value, shift register 10371 outputs, from solid-state image capturer output signal 10130, in stated order: packet 1 signal value of pixel address 11, packet 2 signal value of pixel address 11, packet 3 signal value of pixel address 11, packet 4 signal value of pixel address 11, packet 5 signal value of pixel address 11, packet 6 signal value of pixel address 11, packet 1 signal value of pixel address 12, packet 2 signal value of pixel address 12, packet 3 signal value of pixel address 12, packet 4 signal value of pixel address 12, packet 5 signal value of pixel address 12, packet 6 signal value of pixel address 12, packet 1 signal value of pixel address 1X 1 signal value, packet 2 signal value at pixel address 1X, packet 3 signal value at pixel address 1X, packet 4 signal value at pixel address 1X, packet 5 signal value at pixel address 1X, and packet 6 signal value at pixel address 1X. Also, at timing 10701, row select signal 10300 is set to low level, row select signal 10301 is set to high level, row select signal 10302 is set to low level, and row select signal 10303 is set to low level, the voltage values of packets 1 to 6 of pixel 10200 at pixel address 21, the voltage values of packets 1 to 6 of pixel 10200 at pixel address 22, and the voltage values of packets 1 to 6 of pixel 10200 at pixel address 2X are input to column AD 10370, and AD conversion to 12-bit signal values is performed. At timing 10702, which is the timing of the completion of the AD conversions by column AD 10370 and the shift operation of shift register 10371 started at timing 10701, the results of the AD conversions by column AD 10370 started at timing 10701 are output to shift register 10371, and the input signal values are shifted and output from solid-state image capturer output signal 10130 in the same manner as described above. At timing 10702, row select signal 10300 is set to low level, row select signal 10301 is set to low level, row select signal 10302 is set to high level, and row select signal 10303 is set to low level, the voltage values of packets 1 to 6 of pixel 10200 at pixel address 31, the voltage values of packets 1 to 6 of pixel 10200 at pixel address 32, and the voltage values of packets 1 to 6 of pixel 10200 at pixel address 3X are input to column AD 10370, and AD conversion to 12-bit signal values is performed in the same manner as described above. By performing this operation for all rows, the signal values of all pixels 10200 are output from solid-state image capturer output signal 10130. Although six FDAs 10211 to 10216 are exemplified in FIG. 2 and six generation codes 21701 to 21706 of packets 1 to 6 are exemplified in FIG. 17, the number is not limited to six. If the number of signal charge accumulators is greater than the number of packet generation codes, it is possible to obtain the signal values of packets 1 to 6 in one frame, and thus calculate the segment number corresponding to the distance using the data of a single frame. If the number of signal charge accumulators is greater than the number of packet generation codes, it is possible to calculate the segment number corresponding to the distance by obtaining the signal values of packets 1 to 6 using the data of a plurality of frames. The time required for image data readout 10411, which corresponds to the imaging readout time, is calculated by dividing the number of pixels taking into account the blanking interval, which is calculated as (number of horizontal pixels X320+horizontal blanking interval 80)×(number of vertical pixels Y240+vertical blanking interval 23), by the output clock frequency of solid-state image capturer output signal 10130. If the output clock frequency is 39.319 MHz, the time required for image data readout 10411, which corresponds to the imaging readout time, is 16.053 ms.

Figure 19:
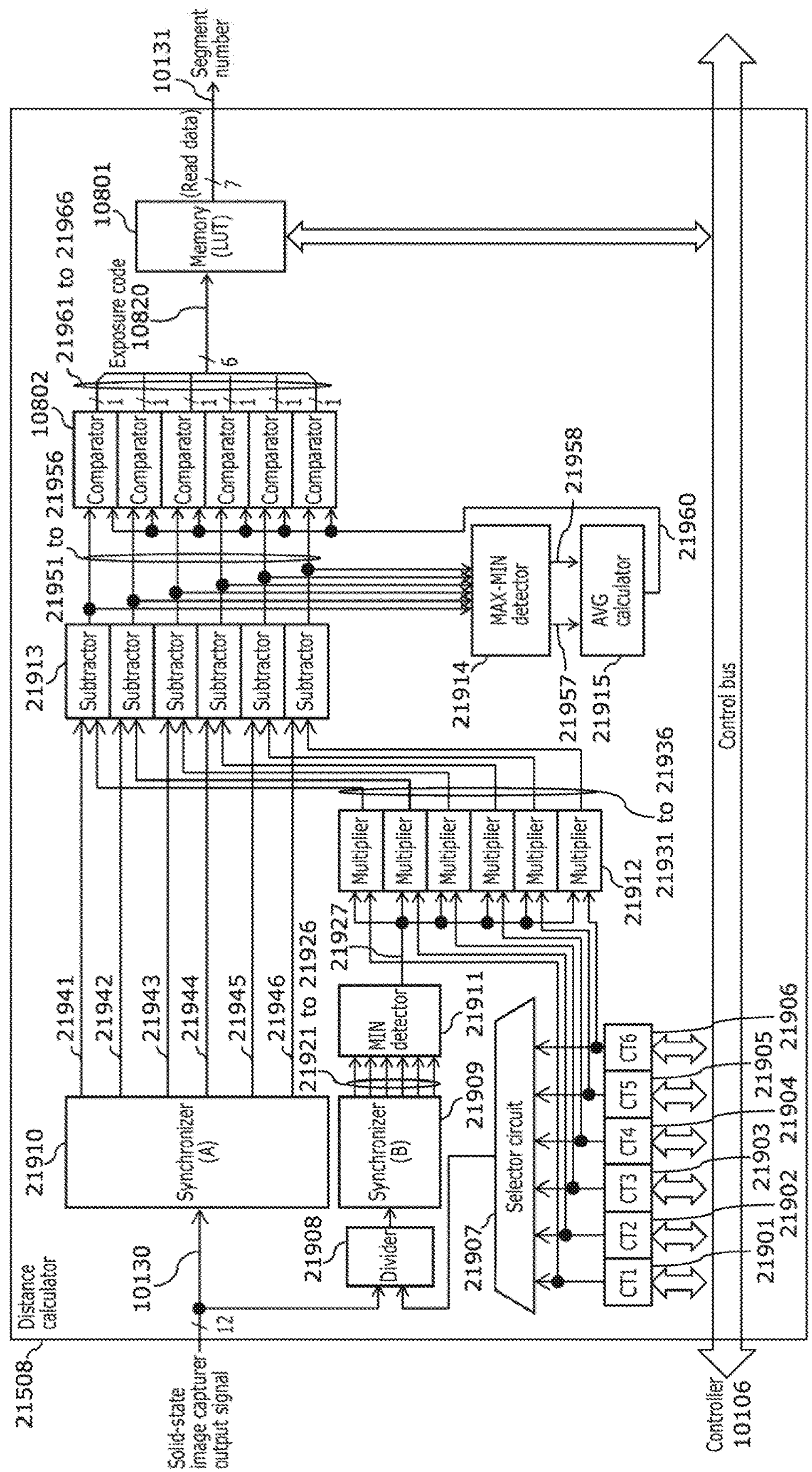
FIG. 19 illustrates a configuration of a distance calculator according to Embodiment 2.

FIG. 19 illustrates a configuration of distance calculator 21508 according to Embodiment 2. As illustrated in FIG. 19, distance calculator 21508 includes: exposure counts 21901 to 21906 of packets 1 to 6 controlled by controller 10106 via a control bus; memory (LUT) 10801 controlled by controller 10106 via the control bus; selector circuit 21907 that selects exposure counts 21901 to 21906 of packets 1 to 6; divider 21908 that performs division of solid-state image capturer output signal 10130 and the output signal from selector circuit 21907; synchronizer (B) 21909 that synchronizes the output signal of divider 21908 for each pixel address; MIN detector 21911 that detects a minimum value from among synchronizer (B) output signals 21921 to 21926; multiplier 21912 that multiplies MIN detector output signal 21927 and exposure counts 21901 to 21906 of packets 1 to 6; synchronizer (A) 21910 that synchronizes solid-state image capturer output signal 10130 for each pixel address; subtractor 21913 that performs subtraction of synchronizer (A) output signals 21941 to 21946 and multiplier output signals 21931 to 21936; MAX-MIN detector 21914 that detects a maximum value and a minimum value from among subtraction signals 21951 to 21956; AVG calculator 21915 that calculates an average value of maximum value signal 21957 and minimum value signal 21958 output from the MAX-MIN detector to generate threshold signal 21960; and comparator 10802 that compares subtraction signals 21951 to 21956 with threshold signal 21960. Next, the operation of distance calculator 21508 will be described. Note that the explanation will be based on the assumption that the signal values of packets 1 to 6 of solid-state image capturer output signal 10130 include at least one packet that does not include reflected light 10111 and at least one packet that does include reflected light 10111. How to realize this constraint will be explained with reference to FIG. 20.

Solid-state image capturer output signal 10130 is synchronized in synchronizer (A) 21910 with the signal values of packets 1 to 6 for each pixel address, which generates synchronizer (A) output signals 21941 to 21946. Since the number of times that exposure pulses 10121 to 10126 of packets 1 to 6 become high level is different for each signal value of packets 1 to 6 in solid-state image capturer output signal 10130, in order to equalize the amount of reflected background light 21511 included in the signal values of packets 1 to 6, for each signal value of packets 1 to 6, exposure counts 21901 to 21906 of packets 1 to 6 are selected by selector circuit 21907, divided by divider 21908, and input to synchronizer (B) 21909. The method of generating exposure counts 21901 to 21906 of packets 1 to 6 will be explained later with reference to FIG. 20. The synchronizer (B) synchronizes the output signal of divider 21908 for each pixel address and outputs the result to MIN detector 21911. MIN detector 21911 estimates a signal value corresponding to the amount of reflected background light 21511 by detecting the minimum value of synchronizer (B) output signals 21921 to 21926, and generates MIN detector output signal 21927. MIN detector output signal 21927 is multiplied by exposure counts 21901 to 21906 of packets 1 to 6 in multiplier 21912, thereby generating multiplier output signals 21931 to 21936, which are the signal values corresponding to the amount of reflected background light 21511 included in each signal value of packets 1 to 6. Subtractor 21913 performs subtraction of synchronizer (A)

output signals 21941 to 21946 and multiplier output signals 21931 to 21936 to generate subtraction signals 21951 to 21956 removed of the reflected background light 21511 component that is included in the signal values of packets 1 to 6. MAX-MIN detector 21914 generates maximum value signal 21957 and minimum value signal 21958 of subtraction signals 21951 to 21956. Here, since the signal values of packets 1 to 6 of solid-state image capturer output signal 10130 include at least one packet that does not include reflected light 10111 and at least one packet that does include reflected light 10111, maximum value signal 21957 is a signal value corresponding to the amount of reflected light 10111 and minimum value signal 21958 is black level value. AVG calculator 21915 generates an average value of maximum value signal 21957 and minimum value signal 21958 to generate threshold signal 21960, which is a threshold for detecting packets that include reflected light 10111 and packets that do not include reflected light 10111. Comparator 10802 compares threshold signal 21960, which is the average value of maximum value signal 21957 and minimum value signal 21958, with subtraction signals 21951 to 21956 to reduce variations caused by the dark current of photoelectric conversion pixel 10201 and FDAs 10211 to 10216 and reduce shot noise, which makes it possible to yield a comparison result of "1" by comparator 10802 for subtraction signals 21951 to 21956 that include reflected light 10111 and a comparison result of "0" by comparator 10802 for subtraction signals 21951 to 21956 that do not include reflected light 10111. Therefore, exposure code 10820, which is the bitwise concatenation of comparator output signals 21961 to 21966, indicates packets that include reflected light 10111. Exposure code 10820 is then used as a read address to access memory (LUT) 10801, and the read data of memory (LUT) 10801 is output as segment number signal 10131. The initial values of memory (LUT) 10801 are set from controller 10106 via the control bus. The method of generating the initial values to be set in memory (LUT) 10801 will be explained with reference to FIG. 20.

FIG. 20 illustrates the method of generating the initial values of exposure counts 21901 to 21906 of packets 1 to 6 and memory (LUT) 10801 according to Embodiment 2. As illustrated in FIG. 20, the initial values of exposure counts 21901 to 21906 of packets 1 to 6 and memory (LUT) 10801 are generated from segment numbers 21700 and generation codes 21701 to 21706 of packets 1 to 6 to generate unit drive patterns 21631 to 21636 for packets 1 to 6, which control light source 10102 and solid-state image capturer 10105.

First, the method of calculating exposure counts 21901 to 21906 of packets 1 to 6 will be explained. The amount of reflected background light 21511 included in the signal values of packets 1 to 6 is proportional to the number of times exposure pulses 10121 to 10126 of packets 1 to 6 are set to high level (the exposure count). Accordingly, controller 10106 generates exposure counts 21901 to 21906 for packets 1 to 6 by calculating, for each generation code of packets 1 to 6, the number of segments among all segment numbers 21700 in which the generation code of the packet is "1".

Next, the method of generating the initial values for memory (LUT) 10801 will be explained. Controller 10106 generates each independent code 22000 as a 6-bit binary number, where packet 1 generation code 21701 is bit 0, packet 2 generation code 21702 is bit 1, packet 3 generation code 21703 is bit 2, packet 4 generation code 21704 is bit 3, packet 5 generation code 21705 is bit 4, and packet 6 generation code 21706 is bit 5. For example, independent code 22020 of segment number 21700 of 7, which is labeled 22021, is a 6-bit binary number where packet 1 generation code 21701 of "0" at segment number 21700 of 7 is bit 0, packet 2 generation code 21702 of "0" at segment number 21700 of 7 is bit 1, packet 3 generation code 21703 of "0" at segment number 21700 of 7 is bit 2, packet 4 generation code 21704 of "0" at segment number 21700 of 7 is bit 3, packet 5 generation code 21705 of "1" at segment number 21700 of 7 is bit 4, and packet 6 generation code 21706 of "0" at segment number 21700 of 7 is bit 5, which converts to 10 in hexadecimal notation. Controller 10106 generates each adjacent code 22001 by applying a bitwise logical OR operation between independent codes 22000 of two adjacent segments. For example, adjacent code 22023 corresponding to the adjacent segment numbers 21700 of 24 and 25, which are labeled 22024, is a 6-bit binary number where the result of the logical OR operation of the value "1" of bit 0 of the independent code at segment number 21700 of 24 and the value "0" of bit 0 of the independent code at segment number 21700 of 25 is "1" as bit 0, the result of the logical OR operation of the value "1" of bit 1 of the independent code at segment number 21700 of 24 and the value "1" of bit 1 of the independent code at segment number 21700 of 25 is "1" as bit 1, the result of the logical OR operation of the value "0" of bit 2 of the independent code at segment number 21700 of 24 and the value "0" of bit 2 of the independent code at segment number 21700 of 25 is "0" as bit 2, the result of the logical OR operation of the value "0" of bit 3 of the independent code at segment number 21700 of 24 and the value "0" of bit 3 of the independent code at segment number 21700 of 25 is "0" as bit 3, the result of the logical OR operation of the value "0" of bit 4 of the independent code at segment number 21700 of 24 and the value "1" of bit 4 of the independent code at segment number 21700 of 25 is "1" as bit 4, and the result of the logical OR operation of the value "1" of bit 5 of the independent code at segment number 21700 of 24 and the value "1" of bit 5 of the independent code at segment number 21700 of 25 is "1" as bit 5, which converts to 33 in hexadecimal notation. In this example, in independent codes 22000, the signal values of packets 1 to 6 that include reflected light 10111 are "1" and the signal values of packets 1 to 6 that do not include reflected light 10111 are "0" when reflected light 10111 returns to only one segment number 21700, and in adjacent codes 22001, the signal values of packets 1 to 6 that include reflected light 10111 are "1" and the signal values of packets 1 to 6 that do not include reflected light 10111 are "0" when reflected light 10111 returns across two adjacent segment numbers 21700, and exposure code 10820 is estimated for each segment number 21700 based on generation codes 21701 to 21706 of packets 1 to 6. For this reason, memory (LUT) 10801 is initialized with independent codes 22000 and adjacent codes 22001 as addresses and segment numbers 21700 corresponding to independent codes 22000 and adjacent codes 22001 as data, and memory (LUT) 10801 is accessed and read with exposure code 10820 as an address, making it is possible to convert exposure code 10820 to the segment number corresponding to the distance. Table 22010 is a data set for initializing memory (LUT) 10801. Since the hexadecimal notation of independent code 22020 is "10", the data corresponding to the hexadecimal address of "10" in table 22010 is 7, which is segment number 22021 of independent code 22020. Since the hexadecimal notation of adjacent code 22023 is "33", the data corresponding to the hexadecimal address of "33" in table 22010 is 24.5, the average of 24 and 25, which are segment numbers 22024 of adjacent code 22023. This is because segment numbers 22024 of adjacent code 22023 indicate that reflected light 10111 returned across segment numbers 24 and 25, but the specific timing of the return of reflected light 10111 is not known, so it is assumed that the reflected light 10111 returned in the middle of two adjacent segments, and so the average of the two adjacent segment numbers is used to reduce the maximum error to half of the segment.

Next, the method of generating generation codes 21701 to 21706 of packets 1 to 6 to be applied to controller 10106 will be described. In order to calculate the segment numbers using exposure codes 10820 generated from the signal values of packets 1 to 6 described above, there must be a one-to-one correspondence between exposure codes 10820 and the segment numbers. Therefore, generation codes 21701 to 21706 of packets 1 to 6 are determined so that the values of independent codes 22000 and adjacent codes 22001 do not overlap, and exposure codes 10820 and the segment numbers are associated one-to-one. Moreover, generation codes 21701 to 21706 of packets 1 to 6 are determined such that independent codes 22000 and adjacent codes 22001 do not take a value of "00" or "3F" in hexadecimal notation. When reflected light 10111 is returned at a timing when the value of independent code 22000 or adjacent code 22001 is "00", exposure pulses 10121 to 10126 of packets 1 to 6 are low level, and as such, the signal values of packets 1 to 6 do not include the reflected light 10111 component. Even if target object 10101 does not exist within the ranging range of segment numbers 0 to 31, the signal values of packets 1 to 6 do not include the reflected light 10111 component. Accordingly, since it is not possible to determine whether these two conditions are satisfied from the signal values of packets 1 to 6, generation codes 21701 to 21706 of packets 1 to 6 are generated such that independent codes 22000 and adjacent codes 22001 do not take a value of "00" in hexadecimal notation. By making sure that independent codes 22000 and adjacent codes 22001 do not take a value of "00" in hexadecimal notation, it is possible to make sure that there is at least one packet that includes reflected light 10111 among the signal values of packets 1 to 6 of solid-state image capturer output signal 10130. However, by generating generation codes 21701 to 21706 of packets 1 to 6 in such a manner that independent codes 22000 and adjacent codes 22001 do not take a value of "3F" in hexadecimal notation, it is possible to make sure that there is at least one packet that does not include reflected light 10111 among the signal values of packets 1 to 6 of solid-state image capturer output signal 10130. In case exposure code 10820 matches "00", "1B", or "3F", which do not exist in independent codes 22000 or adjacent codes 22001, it is possible to determine that the segment number is not calculated correctly by setting the segment number to a negative value of —1.

Figure 21:
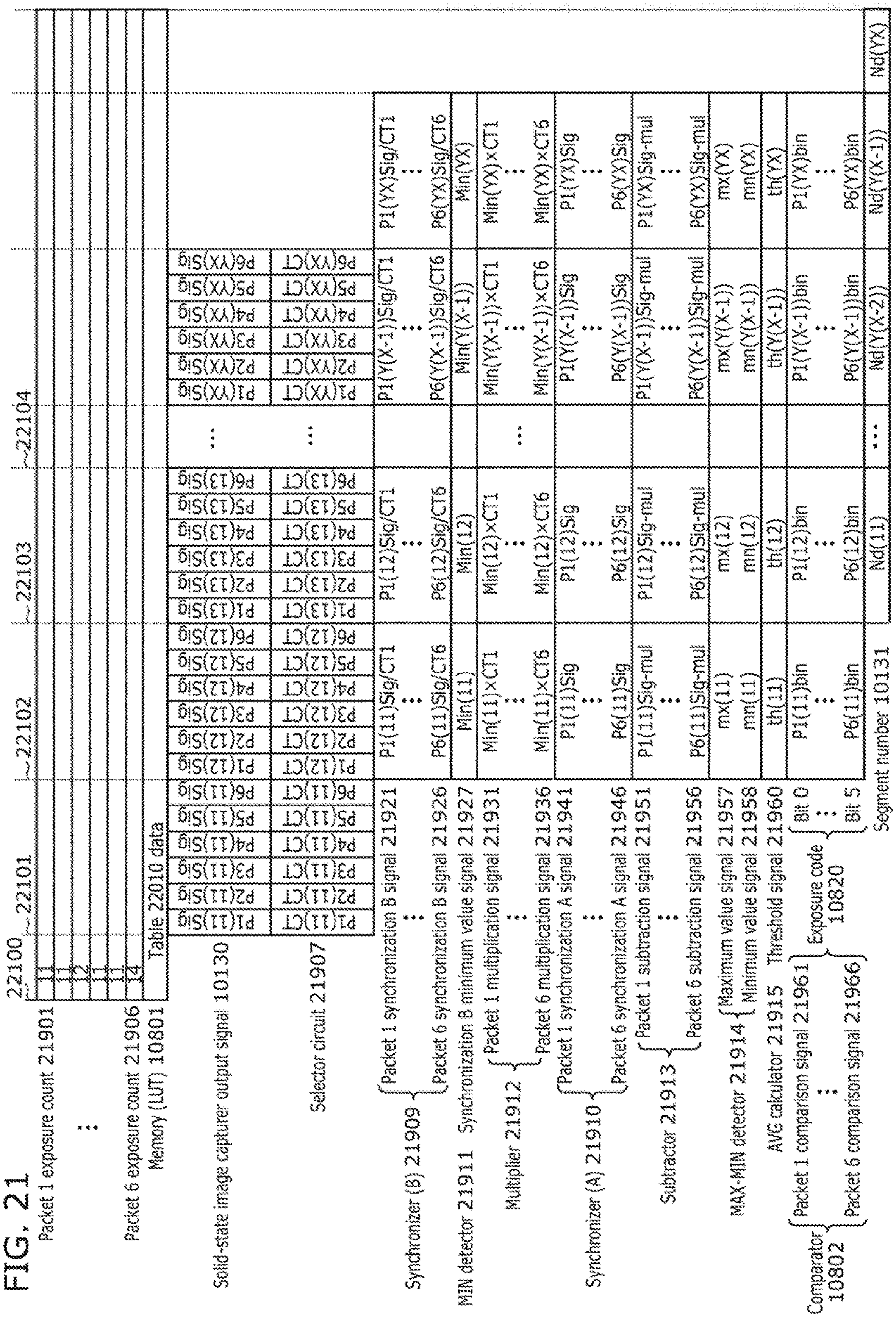
FIG. 21 illustrates timings of operations performed by a distance calculator according to Embodiment 2.

FIG. 21 illustrates a timing chart for distance calculator 21508 according to Embodiment 2.

Notations in FIG. 21 that are the same as in FIG. 10 refer to the same elements as in FIG. 10. The notations "P1(11)CT" through "P6(11)CT" indicate the exposure counts of packets 1 to 6 of pixel 10200 at pixel address 11 in the following description, and correspond to the output of selector circuit 21907.

The notation "P1(11)Sig/CT1" indicates (packet 1 signal value of solid-state image capturer output signal 10130)/(packet 1 exposure count) of pixel 10200 at pixel address 11, which corresponds to packet 1 synchronization B signal 21921.

The notation "Min(11)" indicates the minimum value among packet 1 synchronization B signal 21921 to packet 1 synchronization B signal 21926 of pixel 10200 at pixel address 11, which corresponds to synchronization B minimum signal 21927.

The notation "Min(11)×CT1" indicates (synchronization B minimum signal 21927)×(packet 1 exposure count) of pixel 10200 at pixel address 11, which corresponds to packet 1 multiplication signal 21931.

The notation "P1(11)Sig-mul" indicates (packet 1 synchronization A signal 21941)—(packet 1 multiplication signal 21931) of pixel 10200 at pixel address 11, which corresponds to packet 1 subtraction signal 21951.

The notation "mx(11)" indicates the maximum value among packet 1 subtraction signal 21951 to packet 6 subtraction signal 21956 of pixel 10200 at pixel address 11, which corresponds to maximum value signal 21957.

The notation "mn(11)" indicates the minimum value among packet 1 subtraction signal 21951 to packet 6 subtraction signal 21956 of pixel 10200 at pixel address 11, which corresponds to minimum value signal 21958.

The notation "th(11)" indicates (mx(11)+mn(11))/2, i.e., the average of maximum value signal 21957 and minimum value signal 21958 of pixel 10200 at pixel address 11, which corresponds to threshold signal 21960.

The notation "Nd(11)" corresponds to segment number 10131 of pixel 10200 at pixel address 11. Here, "Nd(11)" etc., are represented by integers.

As illustrated in FIG. 21, at timing 22100 before a valid signal value is output from solid-state image capturer output signal 10130, controller 10106 sets values in exposure counts 21901 to 21906 of packets 1 to 6 and memory (LUT) 10801 via the control bus. Packet 1 exposure count 21901 is 11, packet 2 exposure count 21902 is 11, packet 3 exposure count 21903 is 12, packet 4 exposure count 21904 is 11, packet 5 exposure count 21905 is 11, packet 6 exposure count 21906 is 14, and memory (LUT) 10801 writes the data in table 22010. At timing 22101, the signal values of packets 1 to 6 of pixel address 11 are sequentially sent from solid-state image capturer output signal 10130. The sent signal values are sequentially sent to the synchronizer (A) 21910 and at the same time divided by exposure counts 21901 to 21906 of packets 1 to 6 and sent to synchronizer (B) 21909. At timing 22102, exposure code 10820 is determined using synchronizer (A) output signals 21941 to 21946, synchronizer (B) output signals 21921 to 21926, and exposure counts 21901 to 21906 of packets 1 to 6. Memory (LUT) 10801 is accessed and read using exposure code 10820 as the address, and segment number signal 10131 corresponding to the distance of pixel address 11 is output at timing 22103. All of the two-dimensional segment numbers are output by performing this operation on all two-dimensionally arranged pixels 10200.

From the above operation, the time required for 12 repetitions of frame unit drive pattern 10410, which corresponds to the imaging exposure time, is 17.28 ms, and the time required for image data readout 10411, which corresponds to the imaging readout time, is 16.053 ms. Therefore, the time required for one frame is 33.3 ms, and the frame rate of this ranging device is 30 fps. Compared to the conventional technique, this technique can significantly expand the range over which distance can be measured with a smaller number of packets, so by using this technique, the ranging range can be significantly expanded while maintaining the frame rate, even under conditions with background light.

Here, generation codes 10501 to 10506 of packets 1 to 6 are determined such that independent codes 10900 and adjacent codes 10901 in FIG. 9 of Embodiment 1 do not take a value of "00" in hexadecimal notation. However, generation codes 21701 to 21706 of packets 1 to 6 are determined such that independent codes 22000 and adjacent codes 22001 in FIG. 20 do not take a value of "00" or "3F" in hexadecimal notation. By making it so that a value of "3F" in hexadecimal notation is not taken, the maximum segment number in FIG. 20 is 30 and the maximum segment number in FIG. 9 is 31, so the ranging range is narrower. The following describes a method of further extending the ranging range from Embodiment 2 by changing the control sequence of light source 10102 and solid-state image capturer 10105 in FIG. 16 to FIG. 22, changing generation codes 21701 to 21706 of packets 1 to 6 in FIG. 17 to FIG. 23, changing unit drive patterns 21631 to 21636 for packets 1 to 6 in FIG. 18A through FIG. 18F to FIG. 24A through FIG. 24F, and changing the generation of the initial values of memory (LUT) 10801 in FIG. 20 to FIG. 25.

Figure 22:
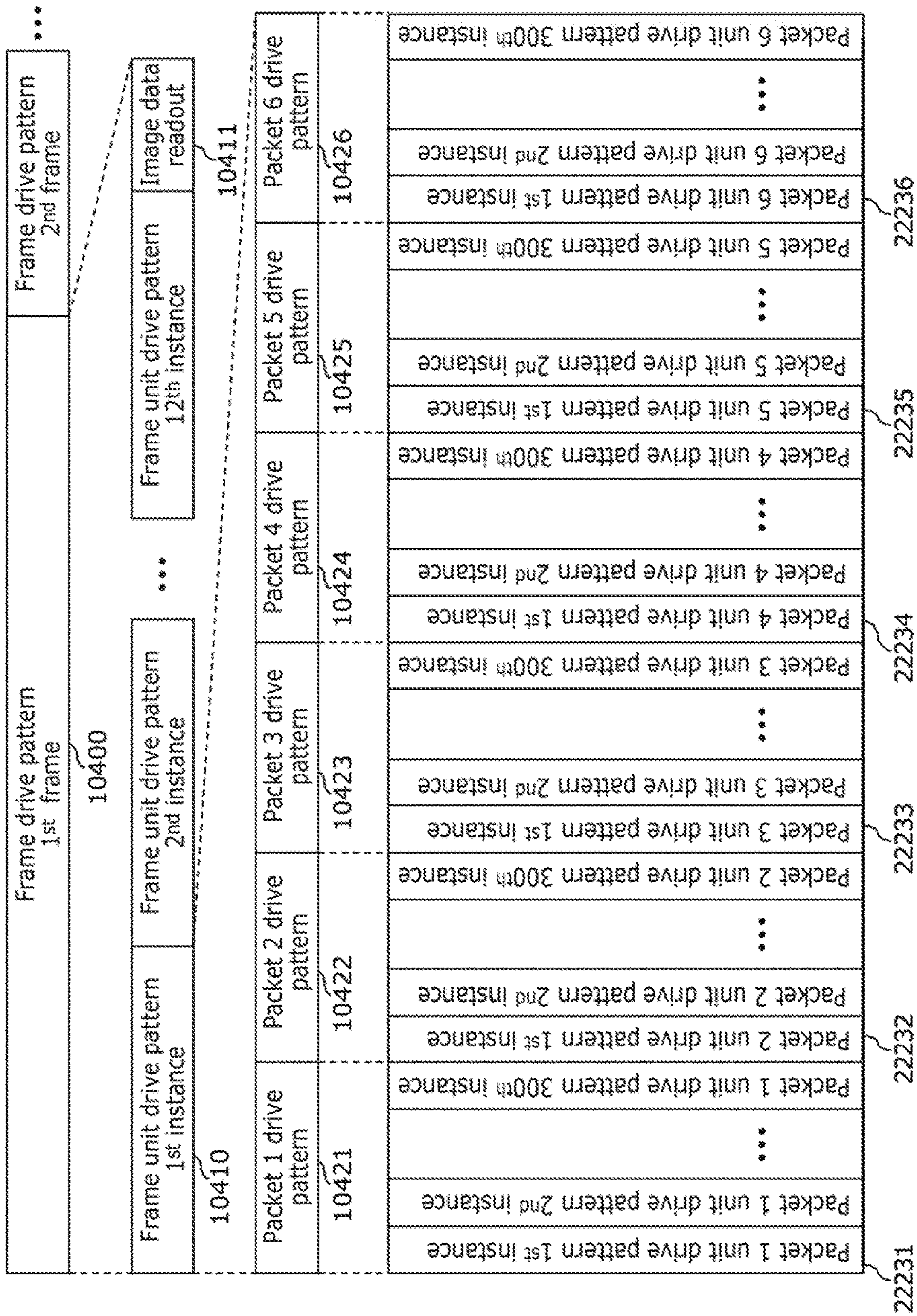
FIG. 22 illustrates a control sequence of a light emitter and a solid-state image capturer when there are overlapping independent codes according to Embodiment 2.
Figure 24A:
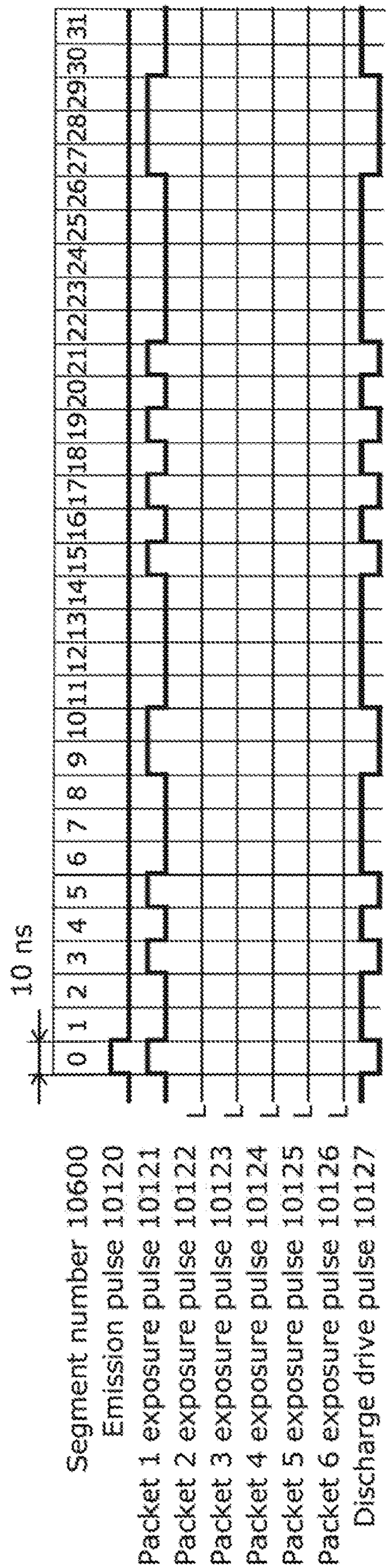
FIG. 24A illustrates the operation timing of packet 1 unit drive pattern according to Embodiment 2.
Figure 24B:
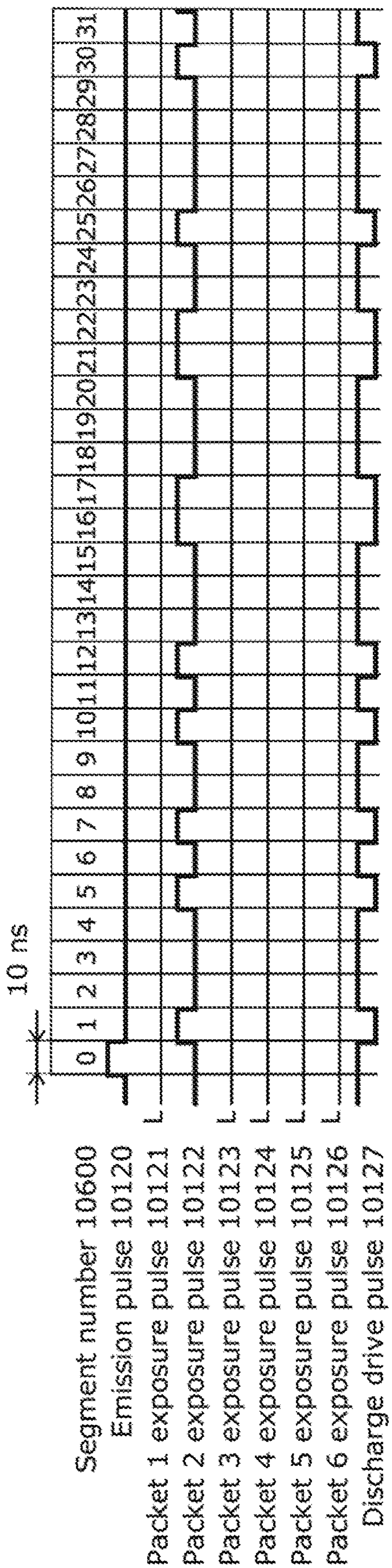
FIG. 24B illustrates the operation timing of packet 2 unit drive pattern according to Embodiment 2.
Figure 24C:
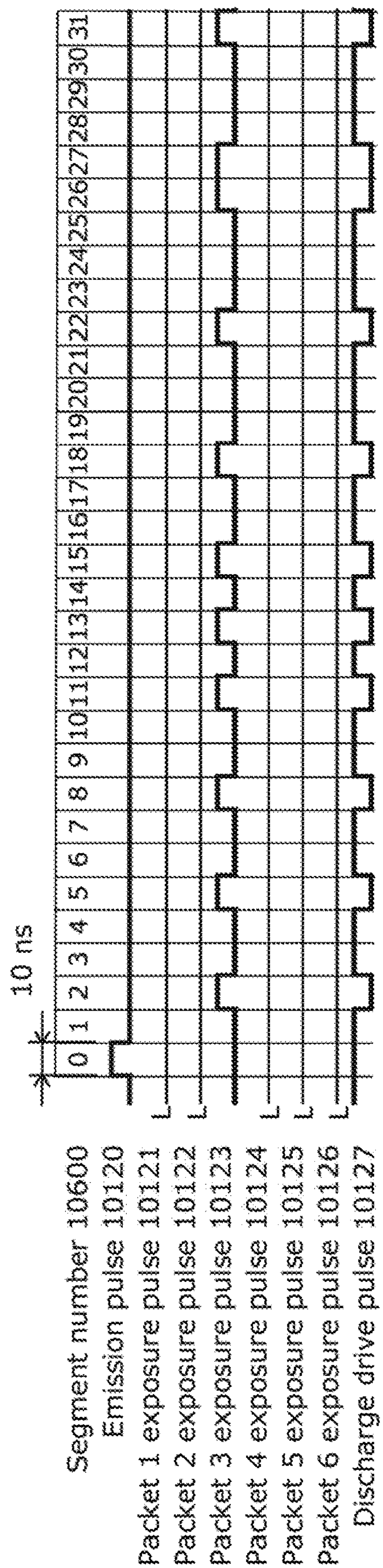
FIG. 24C illustrates the operation timing of packet 3 unit drive pattern according to Embodiment 2.
Figure 24D:
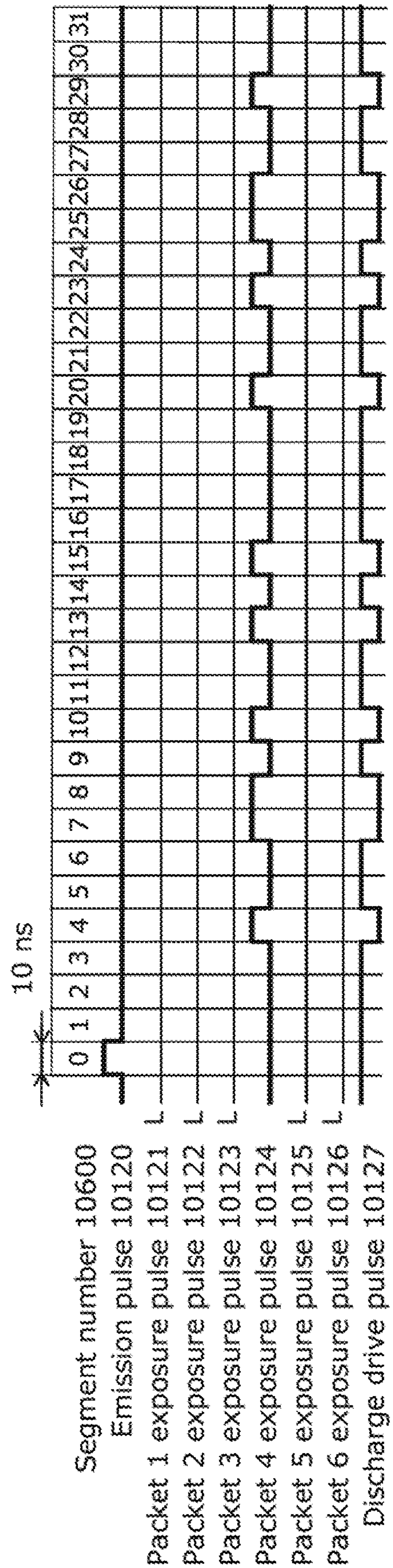
FIG. 24D illustrates the operation timing of packet 4 unit drive pattern according to Embodiment 2.
Figure 24E:
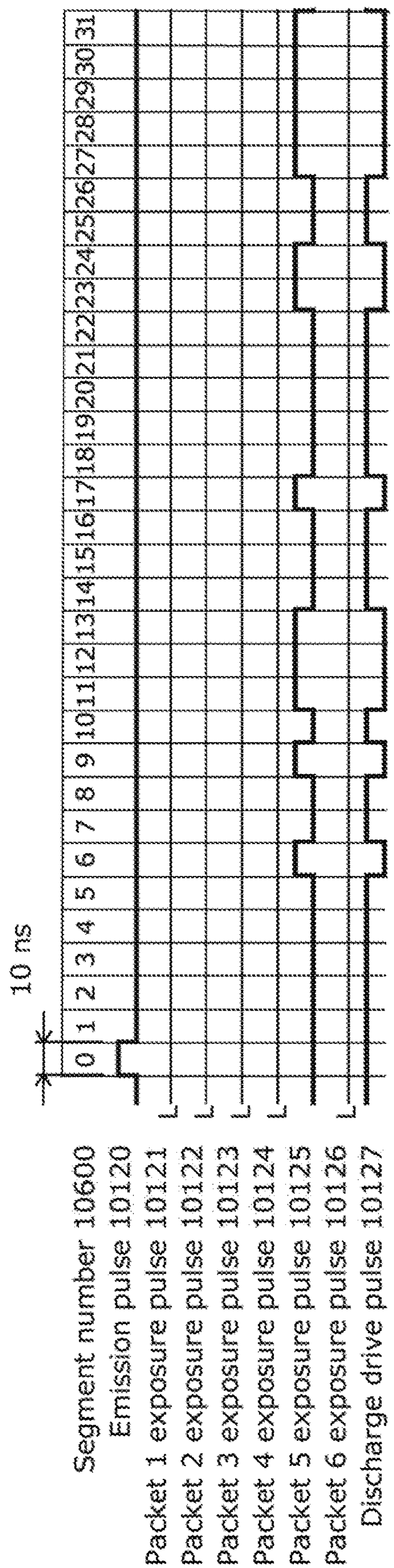
FIG. 24E illustrates the operation timing of packet 5 unit drive pattern according to Embodiment 2.
Figure 24F:
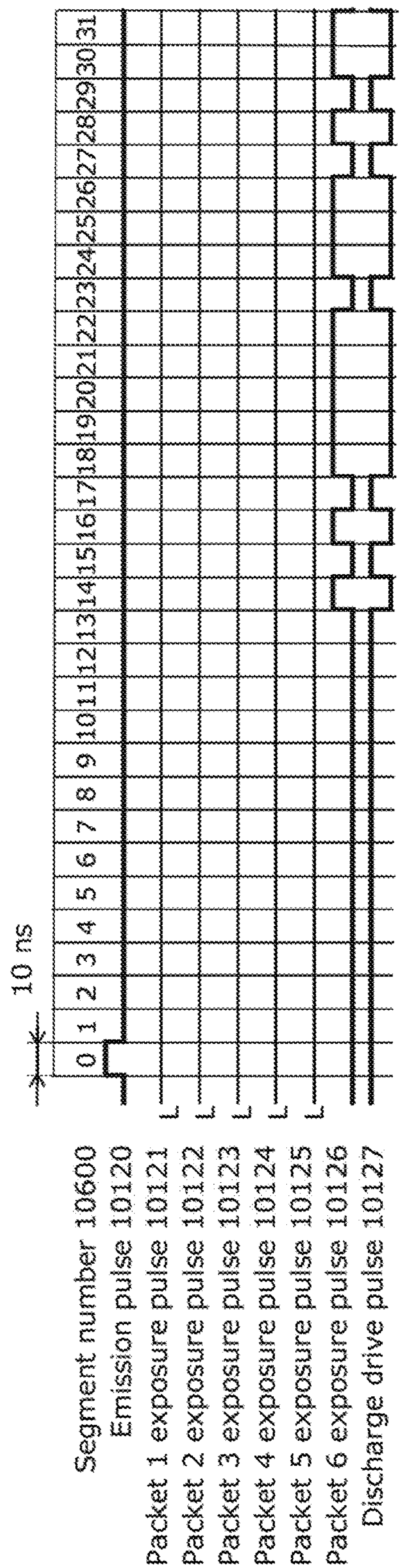
FIG. 24F illustrates the operation timing of packet 6 unit drive pattern according to Embodiment 2.

FIG. 22 illustrates the control sequence of light source 10102 and solid-state image capturer 10105 for further extending the ranging range according to Embodiment 2. FIG. 22 differs from FIG. 16 in regard to unit drive patterns 22231 to 22236 of packets 1 to 6.

FIG. 23 illustrates generation codes 22301 to 22306 of packets 1 to 6 that are applied to controller 10106 to generate unit drive patterns 22231 to 22236 for packets 1 to 6 and discharge drive pulse 10127 for controlling solid-state image capturer 10105 to further extend the ranging range according to Embodiment 2. The method of generating generation codes 22301 to 22306 of packets 1 to 6 will be explained later with reference to FIG. 25.

FIG. 24A to FIG. 24F are timing charts showing unit drive patterns 22231 to 22236 for packets 1 to 6 for further extending the ranging range according to Embodiment 2. These are generated using generation codes 22301 to 22306 of packets 1 to 6 and segment numbers 10500, and the method of generation is the same as in FIG. 18A to FIG. 18F.

FIG. 25 illustrates the method of generating the initial values of memory (LUT) 10801 for further extending the ranging range according to Embodiment 2. The initial values of memory (LUT) 10801 are created in the same way as in FIG. 20, but independent codes 22500 include overlapping values of "01" in hexadecimal notation at the segment number of 0, which is labeled 22502, and the segment number of 3, which is labeled 22503. However, reflected light 10111 returning only when segment number 10500 is 0 indicates a distance to target object 10101 of 0, and when the distance to target object 10101 is not 0, since it takes time for emission light 10110 from light source 10102 to be reflected by target object 10101 and reflected light 10111 to reach solid-state image capturer 10105, reflected light 10111 returning only when segment number 10500 is 0 does not occur in practice. Therefore, when exposure code 10820 is "01" in hexadecimal notation, it is reasonable to assume that reflected light 10111 returned at the segment number of 3, so the segment number that corresponds to the distance can be calculated even when the value of independent code 22500 at segment number 10500 of 0 overlaps once with the value of independent code 22500 at any segment other than segment number 10500 of 0. The same applies when the value of independent code 22500 at segment number 10500 of 0 overlaps once with the value of adjacent code 22501 at a segment whose segment number 10500 is not 0 or 1.

With the above operation, it is possible to achieve the same ranging range regardless of the presence or absence of background light by using this technique. Compared to the conventional technique, this technique can significantly expand the range over which distance can be measured with a smaller number of packets, so by using this technique, the ranging range can be significantly expanded while maintaining the frame rate.

As described above, in the ranging device according to Embodiment 2, the independent code corresponding to the unit segment where the timing of the emission pulse may be the same as the timing of the exposure pulse is the same as any one of all of the independent codes and the adjacent codes corresponding to the remaining unit segments. In the example in FIG. 25, the independent code corresponding to the unit segment whose timing is the same as the timing of the emission pulse is the same as any one of all of the independent codes and the adjacent codes corresponding to the unit segments whose timing is not the same as the timing of the light emission pulse. A unit segment where the timing of the emission pulse is the same as the timing of the exposure pulse corresponds to a distance segment of a distance of 0. The independent code corresponding to a distance segment of a distance of 0 may be the same as any one of the other independent codes and adjacent codes.

With this, even if the independent code corresponding to the timing of the emission pulse overlaps with another independent code, the distance segment can be identified.

Here, each of the independent codes may include at least one bit of 0, and each of the adjacent codes may include at least one bit of 0.

With this, the background light component can be obtained even when the exposure code corresponds to any of the independent codes and the adjacent codes, and thus ranging accuracy can be improved.

Embodiment 3

Embodiments 1 and 2 describe a ranging method based on unit segments. However, in order to achieve a high ranging accuracy, the unit segments need to be shortened, but a lot of cost is required to achieve a light source characterized by short pulse emission and a solid-state image capturer characterized by a short exposure. Embodiment 3 therefore describes a method to achieve a high ranging accuracy without using means for short pulse emission or short exposure.

Figure 26:
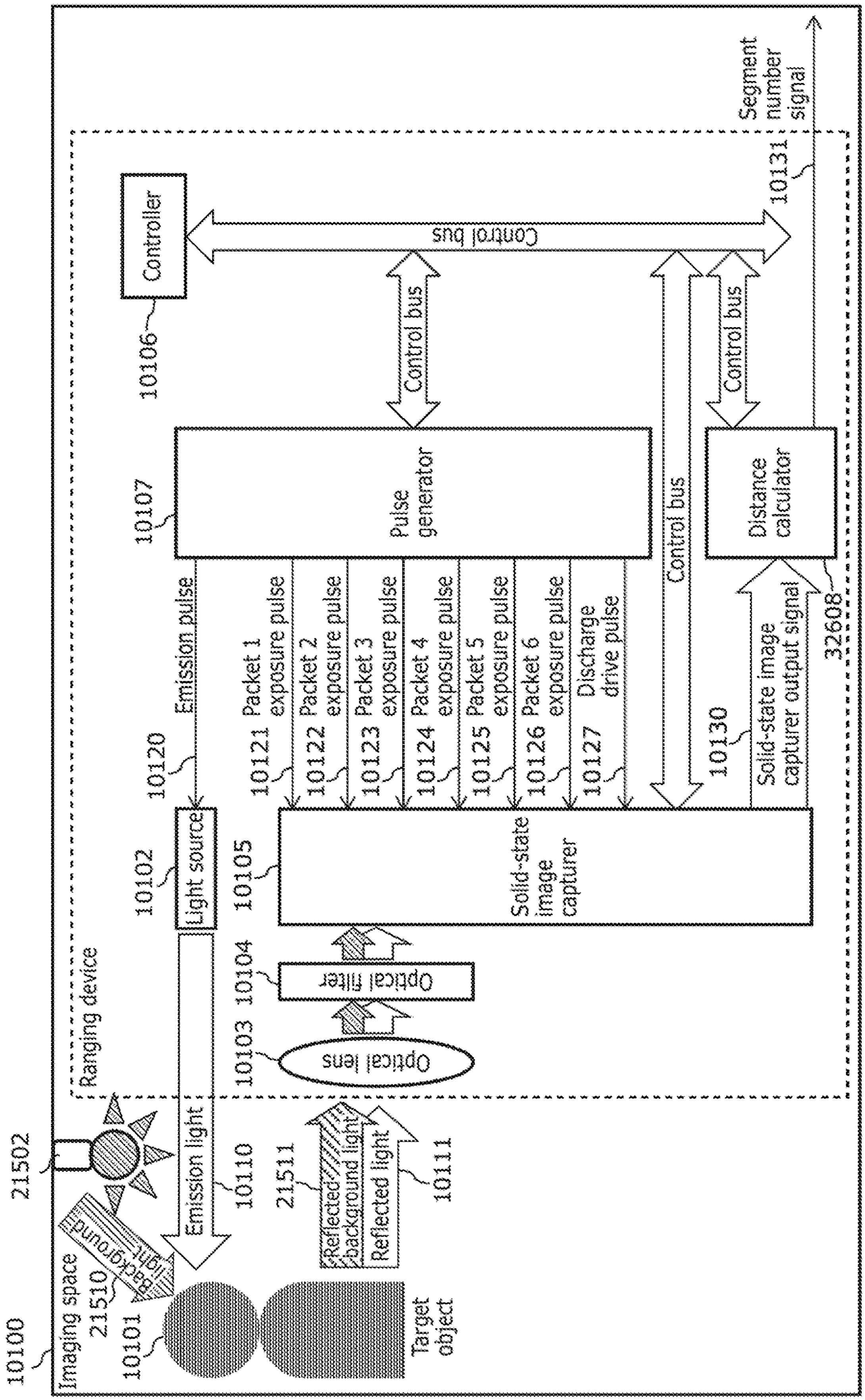
FIG. 26 schematically illustrates a configuration of a time of flight (TOF) ranging device according to Embodiment 3.

FIG. 26 schematically illustrates a configuration of a time of flight (TOF) ranging device and a surrounding object according to Embodiment 3 in an environment including background light. As illustrated in FIG. 26, background light 21510, which is emitted from background light light source 21502 and includes the same 940 nm wavelength component as light source 10102, and pulsed emission light 10110, which is 940 nm wavelength pulsed light (pulse width: 10 ns) emitted from light source 10102, are emitted to target object 10101 in imaging space 10100 and reflected by target object 10101. Reflected light 10111 of emission light 10110 and reflected background light 21511 of background light 21510 pass through optical lens 10103 and optical filter 10104, which transmits light in the near-infrared wavelength region around 940 nm, whereby reflected light 10111 of emission light 10110 and reflected background light 21511 including only components of background light 21510 around 940 nm are received by solid-state image capturer 10105, and an image is captured. The emission timing of light source 10102 and the exposure timing of solid-state image capturer 10105 are controlled by emission pulse 10120, exposure pulses 10121 to 10126 of packets 1 to 6, and discharge drive pulse 10127 from pulse generator 10107, which are controlled from controller 10106 via a control bus. Light source 10102 emits emission light 10110 when emission pulse 10120 is high level, and does not emit emission light 10110 when emission pulse 10120 is low level. For each pixel, solid-state image capturer 10105 outputs solid-state image capturer output signal 10130, which is six types of signal values corresponding to exposure pulses 10121 to 10126 of packets 1 to 6, to distance calculator 32608. Distance calculator 32608 uses solid-state image capturer output signal 10130 and control information from controller 10106 to output, for each pixel, segment number signal 10131 corresponding to the distance to target object 10101.

Light source 10102, optical lens 10103, optical filter 10104, solid-state image capturer 10105, controller 10106, pulse generator 10107, and distance calculator 32608 constitute the ranging device. Regarding the configuration, light source 10102 includes a drive circuit and light emitting elements, and emits light in response to application of voltage from the drive circuit. Laser diodes and other light emitting elements may be used as the light emitting elements. For example, controller 10106, pulse generator 10107, and distance calculator 32608 are realized by a combination of a central processing unit (CPU), a field programmable gate array (FPGA), a digital signal processor (DSP), and an analog front end (AFE) and the like.

FIG. 2 illustrates a configuration of pixel 10200 in solid-state image capturer 10105 according to Embodiments 1 through 4. As illustrated in FIG. 2, pixel 10200 includes photoelectric conversion pixel 10201 configured of a photodiode (PD) that receives reflected light 10111 and performs photoelectric conversion, drains 10210 for discharging signal charge photoelectrically converted by photoelectric conversion pixel 10201, a signal charge accumulator configured of floating diffusion amplifiers (FDAs) 10211 to 10216 that accumulate signal charges photoelectrically converted by photoelectric conversion pixel 10201, and an outputter which outputs voltage values dependent on the signal charges accumulated in FDAs 10211 to 10216 and is configured of source follower circuit 10221, output selection transistor 10231, source follower circuit 10222, output selection transistor 10232, source follower circuit 10223, output selection transistor 10233, source follower circuit 10224, output selection transistor 10234, source follower circuit 10225, output selection transistor 10235, source follower circuit 10226, and output selection transistor 10236.

Next, operations of pixel 10200 will be described. When packet 1 exposure pulse 10121 is set to high level, the signal charge photoelectrically converted in photoelectric conversion pixel 10201 is accumulated in FDA 10211, when packet 2 exposure pulse 10122 is set to high level, the signal charge photoelectrically converted in photoelectric conversion pixel 10201 is accumulated in FDA 10212, when packet 3 exposure pulse 10123 is set to high level, the signal charge photoelectrically converted in photoelectric conversion pixel 10201 is accumulated in FDA 10213, when packet 4 exposure pulse 10124 is set to high level, the signal charge photoelectrically converted in photoelectric conversion pixel 10201 is accumulated in FDA 10214, when packet 5 exposure pulse 10125 is set to high level, the signal charge photoelectrically converted in photoelectric conversion pixel 10201 is accumulated in FDA 10215, when packet 6 exposure pulse 10126 is set to high level, the signal charge photoelectrically converted in photoelectric conversion pixel 10201 is accumulated in FDA 10216, and when discharge drive pulse 10127 is set to high level, the signal charge photoelectrically converted in photoelectric conversion pixel 10201 is discharged to drains 10210. Accordingly, six types of imaging corresponding to exposure pulses 10121 to 10126 of packets 1 to 6 are performed per pixel by: discharging the signal charge photoelectrically converted in photoelectric conversion pixel 10201 to drains 10210 when all exposure pulses 10121 to 10126 of packets 1 to 6 are low level by setting discharge drive pulse 10127 to high level when all exposure pulses 10121 to 10126 of packets 1 to 6 are low level; and accumulating the signal charge from photoelectric conversion pixel 10201 in FDAs 10211 to 10216 corresponding to exposure pulses 10121 to 10126 of packets 1 to 6 only when one of the six exposure pulses 10121 to 10126 of packets 1 to 6 is high level by, when one of the six exposure pulses 10121 to 10126 of packets 1 to 6 is high level, setting the remaining five to low level and setting discharge drive pulse 10127 to low level. FDAs 10211 through 10216 accumulate signal charge, resulting in a voltage corresponding to the amount of signal charge, and generate a packet 1 voltage value corresponding to the amount of signal charge in FDA 10211, a packet 2 voltage value corresponding to the amount of signal charge in FDA 10212, a packet 3 voltage value corresponding to the amount of signal charge in FDA 10213, a packet 4 voltage value corresponding to the amount of signal charge in FDA 10214, a packet 5 voltage value corresponding to the amount of signal charge in FDA 10215, and a packet 6 voltage value corresponding to the amount of signal charge in FDA 10216. By setting output enable signal 10240 to high level, simultaneously, the packet 1 voltage value is output to pixel output signal 10241 through source follower circuit 10221 and output selection transistor 10231, the packet 2 voltage value is output to pixel output signal 10242 through source follower circuit 10222 and output selection transistor 10232, the packet 3 voltage value is output to pixel output signal 10243 through source follower circuit 10223 and output selection transistor 10233, the packet 4 voltage value is output to pixel output signal 10244 through source follower circuit 10224 and output selection transistor 10234, the packet 5 voltage value is output to pixel output signal 10245 through source follower circuit 10225 and output selection transistor 10235, and the packet 6 voltage value is output to pixel output signal 10246 through source follower circuit 10226 and output selection transistor 10236.

FIG. 3 illustrates a configuration of solid-state image capturer 10105 according to Embodiments 1 through 4. As illustrated in FIG. 3, solid-state image capturer 10105 includes X number of pixels 10200 in the horizontal direction and Y number of pixels in the vertical direction, arranged in two dimensions, where X=320 and Y=240 in Embodiments 1 through 4. The stated number of pixels is merely one non-limiting example. Output enable signals 10240 of pixels 10200 at pixel address 11, pixel address 12, and pixel address 1X arranged in the horizontal direction in the first row are connected to row select signal 10300, output enable signals 10240 of pixels 10200 at pixel address 21, pixel address 22, and pixel address 2X arranged in the horizontal direction in the second row are connected to row select signal 10301, output enable signals 10240 of pixels 10200 at pixel address 31, pixel address 32, and pixel address 3X arranged in the horizontal direction in the third row are connected to row select signal 10302, and output enable signals 10240 of pixels 10200 at pixel address Y1, pixel address Y2, and pixel address YX arranged in the horizontal direction in the Yth row are connected to row select signal 10303. Pixel output signals 10241 to 10246 of pixels 10200 at pixel address 11, pixel address 21, pixel address 31, and pixel address Y1 arranged in the vertical direction in the first column are connected to vertical pixel signals 10311 to 10316, pixel output signals 10241 to 10246 of pixels 10200 at pixel address 12, pixel address 22, pixel address 32, and pixel address Y2 arranged in the vertical direction in the second column are connected to vertical pixel signals 10321 to 10326, and pixel output signals 10241 to 10246 of pixels 10200 at pixel address 1X, pixel address 2X, pixel address 3X, and pixel address YX arranged in the vertical direction in the $X^{th}$ column are connected to vertical pixel signals 10331 to 10336. Vertical pixel signals 10311 to 10316, 10321 to 10326, and 10331 to 10336 are connected to column AD 10370, the output signals of column AD 10370 are connected to shift register 10371, and shift register 10371 outputs solid-state image capturer output signal 10130.

Next, readout operations of solid-state image capturer 10105 will be described. The readout operation is the same as that of a typical CMOS image sensor with six times the number of horizontal pixels. By setting row select signal 10300 to high level, row select signal 10301 to low level, row select signal 10302 to low level, and row select signal 10303 to low level, voltage values of packets 1 to 6 of pixel 10200 at pixel address 11 are output to vertical pixel signals 10311 to 10316, voltage values of packets 1 to 6 of pixel 10200 at pixel address 12 are output to vertical pixel signals 10321 to 10326, and voltage values of packets 1 to 6 of pixel 10200 at pixel address 1X are output to vertical pixel signals 10331 to 10336, and input to column AD 10370. By setting row select signal 10300 to low level, row select signal 10301 to high level, row select signal 10302 to low level, and row select signal 10303 to low level, voltage values of packets 1 to 6 of pixel 10200 at pixel address 21 are output to vertical pixel signals 10311 to 10316, voltage values of packets 1 to 6 of pixel 10200 at pixel address 22 are output to vertical pixel signals 10321 to 10326, and voltage values of packets 1 to 6 of pixel 10200 at pixel address 2X are output to vertical pixel signals 10331 to 10336, and input to column AD 10370. By setting row select signal 10300 to low level, row select signal 10301 to low level, row select signal 10302 to high level, and row select signal 10303 to low level, voltage values of packets 1 to 6 of pixel 10200 at pixel address 31 are output to vertical pixel signals 10311 to 10316, voltage values of packets 1 to 6 of pixel 10200 at pixel address 32 are output to vertical pixel signals 10321 to 10326, and voltage values of packets 1 to 6 of pixel 10200 at pixel address 3X are output to vertical pixel signals 10331 to 10336, and input to column AD 10370. By setting row select signal 10300 to low level, row select signal 10301 to low level, row select signal 10302 to low level, and row select signal 10303 to high level, voltage values of packets 1 to 6 of pixel 10200 at pixel address Y1 are output to vertical pixel signals 10311 to 10316, voltage values of packets 1 to 6 of pixel 10200 at pixel address Y2 are output to vertical pixel signals 10321 to 10326, and voltage values of packets 1 to 6 of pixel 10200 at pixel address YX are output to vertical pixel signals 10331 to 10336, and input to column AD 10370. Column AD 10370 AD-converts the input voltage values of packets 1 to 6 for the X number of pixels into 12-bit signal values, generates a packet 1 signal value resulting from AD-converting packet 1 voltage value, a packet 2 signal value resulting from AD-converting packet 2 voltage value, a packet 3 signal value resulting from AD-converting packet 3 voltage value, a packet 4 signal value resulting from AD-converting packet 4 voltage value, a packet 5 signal value resulting from AD-converting packet 5 voltage value, and a packet 6 signal value resulting from AD-converting packet 6 voltage value for the X number of pixels, and outputs the generated signal values to shift register 10371. Shift register 10371 shifts the input signal values of packets 1 to 6 for the X number of pixels one by one, and outputs the shifted signal values to solid-state image capturer output signal 10130.

FIG. 16 illustrates the control sequence of light source 10102 and solid-state image capturer 10105 according to Embodiment 3. In the control sequence illustrated in FIG. 16, as illustrated in FIG. 1, the number of frame unit drive pattern repetitions (12 times) and the number of unit drive pattern repetitions for packets 1 to 6 (300 times) are instructed to pulse generator 10107 from controller 10106 through the control bus, and emission pulse 10120, exposure pulses 10121 to 10126 of packets 1 to 6, and discharge drive pulse 10127 are generated in pulse generator 10107 in accordance with the number of frame unit drive pattern repetitions and the number of unit drive pattern repetitions for packets 1 to 6. FIG. 16 describes the generation of unit drive patterns 21631 to 21636 for packets 1 to 6, and FIG. 17 and FIG. 18A to FIG. 18F describe the method of generating emission pulse 10120, exposure pulses 10121 to 10126 of packets 1 to 6, and discharge drive pulse 10127 for each of packet 1 unit drive pattern 21631 to packet 6 unit drive pattern 21636.

As illustrated in FIG. 16, one frame consists of frame drive pattern 10400. Frame drive pattern 10400 consists of 12 repetitions of frame unit drive pattern 10410 and image data readout 10411, which outputs the signal charges accumulated in the signal charge accumulators of all pixels 10200 from solid-state image capturer 10105. Frame unit drive pattern 10410 consists of packet 1 drive pattern 10421, packet 2 drive pattern 10422, packet 3 drive pattern 10423, packet 4 drive pattern 10424, packet 5 drive pattern 10425, and packet 6 drive pattern 10426. Packet 1 drive pattern 10421 consists of 300 repetitions of packet 1 unit drive pattern 21631. Packet 2 drive pattern 10422 consists of 300 repetitions of packet 2 unit drive pattern 21632. Packet 3 drive pattern 10423 consists of 300 repetitions of packet 3 unit drive pattern 21633. Packet 4 drive pattern 10424 consists of 300 repetitions of packet 4 unit drive pattern 21634. Packet 5 drive pattern 10425 consists of 300 repetitions of packet 5 unit drive pattern 21635. Packet 6 drive pattern 10426 consists of 300 repetitions of packet 6 unit drive pattern 21636. Unit drive patterns 21631 to 21636 for packets 1 to 6 drive emission pulse 10120, exposure pulses 10121 to 10126 of packets 1 to 6, and discharge drive pulse 10127. Unit drive patterns 21631 to 21636 for packets 1 to 6 will be described in greater detail later with reference to FIG. 17 and FIG. 18A to FIG. 18F. The control sequence of light source 10102 and solid-state image capturer 10105 illustrated in FIG. 16 is merely one non-limiting example.

Unit drive patterns 21631 to 21636 for packets 1 to 6 are repeated 300 times in drive patterns 10421 to 10426 for packets 1 to 6, respectively, and drive patterns 10421 to 10426 for packets 1 to 6 are repeated 12 times via the frame unit drive patterns. Stated differently, each of unit drive patterns 21631 to 21636 for packets 1 to 6 are repeated 3600 (=300×12) times. By repeating each pattern 3600 times, even though the amount of emission light 10110 emitted each time is small, it is possible to ensure a sufficient amount of light. On the other hand, by dividing frame drive pattern 10400 into 12 frame unit drive patterns 10410, the amount of time required for each frame unit drive pattern 10410 can be shortened and the apparent imaging timing of packets 1 to 6 can be synchronized. By repeating the frame unit drive pattern 10410 12 times, blur caused by target object 10101 moving occurs evenly in packets 1 to 6, making it possible to inhibit side effects such as data corruption during distance calculation caused by target object 10101 moving.

FIG. 17 illustrates generation codes 21701 to 21706 of packets 1 to 6 that are applied to controller 10106 to generate unit drive patterns 21631 to 21636 for packets 1 to 6 and discharge drive pulse 10127 for controlling solid-state image capturer 10105 according to Embodiment 3. As illustrated in FIG. 17, generation codes 21701 to 21706 of packets 1 to 6 are divided into 31 segments identified by segment numbers 21700 of 0 to 30, and each segment identified by one of segment numbers 21700 has a value of "0" or "1". Generation codes 21701 to 21706 of packets 1 to 6 are information for controlling the driving of exposure pulses 10121 to 10126 of packets 1 to 6. Segment numbers 21700 and generation codes 21701 to 21706 of packets 1 to 6 are transmitted to pulse generator 10107 through the control bus, and pulse generator 10107 generates unit drive patterns 21631 to 21636 for packets 1 to 6 from segment numbers 21700 and generation codes 21701 to 21706 of packets 1 to 6. The generation codes of packets 1 to 6 illustrated in FIG. 17 are non-limiting examples.

FIG. 18A to FIG. 18F are timing charts showing packet 1 unit drive pattern 21631 to packet 6 unit drive pattern 21636 according to Embodiment 3. As illustrated in FIG. 18A to FIG. 18F, pulse generator 10107 generates unit drive patterns 21631 to 21636 for packets 1 to 6 by switching segment number 10600 every unit segment (10 ns) for 80 segments from 0 to 79, and using (i) generation codes 21701 to 21706 of packets 1 to 6 with the same segment numbers 10600 and 21700 and (ii) segment number 10600 to control emission pulse 10120, exposure pulses 10121 to 10126 of packets 1 to 6, and discharge drive pulse 10127. The reason why segment numbers 10600 of pulse generator 10107 are set to a value (79) that is twice or more than the maximum value (30) of segment numbers 21700 is to prevent the reception of reflected light 10111 of emission light 10110 that has been reflected by target object 10101 located outside the ranging range (a segment number that is larger than the maximum value of segment numbers 21700). Therefore, in a segment number that does not exist in segment numbers 21700, pulses are generated with emission pulse 10120 at low level, exposure pulses 10121 to 10126 of packets 1 to 6 at low level, and discharge drive pulse 10127 at high level. By controlling solid-state image capturer 10105 in this way, the time required for 12 repetitions of frame unit drive pattern 10410, which corresponds to the imaging exposure time, is 17.28 ms, which is calculated by multiplying the length of the unit segment, 10 ns, the number of segment numbers, 80, the number of unit drive pattern repetitions, 300, the number of packets, 6, and the number of frame unit drive pattern repetitions, 12. This unit segment specifies that the pulse width of emission light 10110 and exposure pulses 10121 to 10126 of packets 1 to 6 are the same, and does not limit the pulse width to 10 ns.

The following describes a method of controlling emission pulse 10120, exposure pulses 10121 to 10126 of packets 1 to 6, and discharge drive pulse 10127 for segment numbers 0 to 30 included in segment numbers 21700.

FIG. 18A is a timing chart showing packet 1 unit drive pattern 21631. Emission pulse 10120 is generated as high level when segment number 21700 is 0, and low level when segment number 21700 is the remaining 1 to 30. Packet 1 exposure pulse 10121 is generated as high level when packet 1 generation code 21701 corresponding to segment number 21700 is "1" and low level when packet 1 generation code 21701 corresponding to segment number 21700 is "0", and packet 2 exposure pulse 10122, packet 3 exposure pulse 10123, packet 4 exposure pulse 10124, packet 5 exposure pulse 10125, and packet 6 exposure pulse 10126 are generated as low level in all segments, i.e., when segment number 21700 is 0 to 30. Discharge drive pulse 10127 is generated as low level when packet 1 generation code 21701 corresponding to segment number 21700 is "1" and high level when packet 1 generation code 21701 corresponding to segment number 21700 is "0", which results in a pulse whose logic is inverted from that of packet 1 exposure pulse 10121.

FIG. 18B is a timing chart showing packet 2 unit drive pattern 21632. Emission pulse 10120 is generated as high level when segment number 21700 is 0, and low level when segment number 21700 is the remaining 1 to 30. Packet 2 exposure pulse 10122 is generated as high level when packet 2 generation code 21702 corresponding to segment number 21700 is "1" and low level when packet 2 generation code 21702 corresponding to segment number 21700 is "0", and packet 1 exposure pulse 10121, packet 3 exposure pulse 10123, packet 4 exposure pulse 10124, packet 5 exposure pulse 10125, and packet 6 exposure pulse 10126 are generated as low level in all segments, i.e., when segment number 21700 is 0 to 30. Discharge drive pulse 10127 is generated as low level when packet 2 generation code 21702 corresponding to segment number 21700 is "1" and high level when packet 2 generation code 21702 corresponding to segment number 21700 is "0", which results in a pulse whose logic is inverted from that of packet 2 exposure pulse 10122.

FIG. 18C is a timing chart showing packet 3 unit drive pattern 21633. Emission pulse 10120 is generated as high level when segment number 21700 is 0, and low level when segment number 21700 is the remaining 1 to 30. Packet 3 exposure pulse 10123 is generated as high level when packet 3 generation code 21703 corresponding to segment number 21700 is "1" and low level when packet 3 generation code 21703 corresponding to segment number 21700 is "0", and packet 1 exposure pulse 10121, packet 2 exposure pulse 10122, packet 4 exposure pulse 10124, packet 5 exposure pulse 10125, and packet 6 exposure pulse 10126 are generated as low level in all segments, i.e., when segment number 21700 is 0 to 30. Discharge drive pulse 10127 is generated as low level when packet 3 generation code 21703 corresponding to segment number 21700 is "1" and high level when packet 3 generation code 21703 corresponding to segment number 21700 is "0", which results in a pulse whose logic is inverted from that of packet 3 exposure pulse 10123.

FIG. 18D is a timing chart showing packet 4 unit drive pattern 21634. Emission pulse 10120 is generated as high level when segment number 21700 is 0, and low level when segment number 21700 is the remaining 1 to 30. Packet 4 exposure pulse 10124 is generated as high level when packet 4 generation code 21704 corresponding to segment number 21700 is "1" and low level when packet 4 generation code 21704 corresponding to segment number 21700 is "0", and packet 1 exposure pulse 10121, packet 2 exposure pulse 10122, packet 3 exposure pulse 10123, packet 5 exposure pulse 10125, and packet 6 exposure pulse 10126 are generated as low level in all segments, i.e., when segment number 21700 is 0 to 30. Discharge drive pulse 10127 is generated as low level when packet 4 generation code 21704 corresponding to segment number 21700 is "1" and high level when packet 4 generation code 21704 corresponding to segment number 21700 is "0", which results in a pulse whose logic is inverted from that of packet 4 exposure pulse 10124.

FIG. 18E is a timing chart showing packet 5 unit drive pattern 21635. Emission pulse 10120 is generated as high level when segment number 21700 is 0, and low level when segment number 21700 is the remaining 1 to 30. Packet 5 exposure pulse 10125 is generated as high level when packet 5 generation code 21705 corresponding to segment number 21700 is "1" and low level when packet 5 generation code 21705 corresponding to segment number 21700 is "0", and packet 1 exposure pulse 10121, packet 2 exposure pulse 10122, packet 3 exposure pulse 10123, packet 4 exposure pulse 10124, and packet 6 exposure pulse 10126 are generated as low level in all segments, i.e., when segment number 21700 is 0 to 30. Discharge drive pulse 10127 is generated as low level when packet 5 generation code 21705 corresponding to segment number 21700 is "1" and high level when packet 5 generation code 21705 corresponding to segment number 21700 is "0", which results in a pulse whose logic is inverted from that of packet 5 exposure pulse 10125.

FIG. 18F is a timing chart showing packet 6 unit drive pattern 21636. Emission pulse 10120 is generated as high level when segment number 21700 is 0, and low level when segment number 21700 is the remaining 1 to 30. Packet 6 exposure pulse 10126 is generated as high level when packet 6 generation code 21706 corresponding to segment number 21700 is "1" and low level when packet 6 generation code 21706 corresponding to segment number 21700 is "0", and packet 1 exposure pulse 10121, packet 2 exposure pulse 10122, packet 3 exposure pulse 10123, packet 4 exposure pulse 10124, and packet 5 exposure pulse 10125 are generated as low level in all segments, i.e., when segment number 21700 is 0 to 30. Discharge drive pulse 10127 is generated as low level when packet 6 generation code 21706 corresponding to segment number 21700 is "1" and high level when packet 6 generation code 21706 corresponding to segment number 21700 is "0", which results in a pulse whose logic is inverted from that of packet 6 exposure pulse 10126.

FIG. 7 illustrates the timing of image data readout 10411 of solid-state image capturer 10105 according to Embodiments 1 through 4. Row select signals 10300 to 10303, column AD 10370, and shift register 10371 are controlled to output the signal values of packets 1 to 6 of all pixels 10200 illustrated in FIG. 3 to solid-state image capturer output signal 10130. The operation of this image data readout 10411 is the same as that of a normal CMOS image sensor with six times more horizontal pixels.

As illustrated in FIG. 7, at timing 10700, by setting row select signal 10300 to high level, row select signal 10301 to low level, row select signal 10302 to low level, and row select signal 10303 to low level, voltage values of packets 1 to 6 of pixel 10200 at pixel address 11 are output to vertical pixel signals 10311 to 10316, the voltage values of packets 1 to 6 of pixel 10200 at pixel address 12 are output to vertical pixel signals 10321 to 10326, and the voltage values of packets 1 to 6 of pixel 10200 at pixel address 1X are output to vertical pixel signals 10331 to 10336. Vertical pixel signals 10311 to 10316, vertical pixel signals 10321 to 10326, and vertical pixel signals 10331 to 10336 are connected to column AD 10370, these signals are AD-converted into 12-bit signal values, and packet 1 signal value resulting from AD-converting packet 1 voltage value, packet 2 signal value resulting from AD-converting packet 2 voltage value, packet 3 signal value resulting from AD-converting packet 3 voltage value, packet 4 signal value resulting from AD-converting packet 4 voltage value, packet 5 signal value resulting from AD-converting packet 5 voltage value, and packet 6 signal value resulting from AD-converting packet 6 voltage value of pixel address 11, pixel address 12, and pixel address 1X are generated. At timing 10701, which is the timing of completion of the AD conversions, the AD-converted signal values of packets 1 to 6 of pixel address 11, pixel address 12, and pixel address 1X are output to shift register 10371. While shifting the input signal value, shift register 10371 outputs, from solid-state image capturer output signal 10130, in stated order: packet 1 signal value of pixel address 11, packet 2 signal value of pixel address 11, packet 3 signal value of pixel address 11, packet 4 signal value of pixel address 11, packet 5 signal value of pixel address 11, packet 6 signal value of pixel address 11, packet 1 signal value of pixel address 12, packet 2 signal value of pixel address 12, packet 3 signal value of pixel address 12, packet 4 signal value of pixel address 12, packet 5 signal value of pixel address 12, packet 6 signal value of pixel address 12, packet 1 signal value of pixel address 1X 1 signal value, packet 2 signal value at pixel address 1X, packet 3 signal value at pixel address 1X, packet 4 signal value at pixel address 1X, packet 5 signal value at pixel address 1X, and packet 6 signal value at pixel address 1X. Also, at timing 10701, row select signal 10300 is set to low level, row select signal 10301 is set to high level, row select signal 10302 is set to low level, and row select signal 10303 is set to low level, the voltage values of packets 1 to 6 of pixel 10200 at pixel address 21, the voltage values of packets 1 to 6 of pixel 10200 at pixel address 22, and the voltage values of packets 1 to 6 of pixel 10200 at pixel address 2X are input to column AD 10370, and AD conversion to 12-bit signal values is performed. At timing 10702, which is the timing of the completion of the AD conversions by column AD 10370 and the shift operation of shift register 10371 started at timing 10701, the results of the AD conversions by column AD 10370 started at timing 10701 are output to shift register 10371, and the input signal values are shifted and output from solid-state image capturer output signal 10130 in the same manner as described above. At timing 10702, row select signal 10300 is set to low level, row select signal 10301 is set to low level, row select signal 10302 is set to high level, and row select signal 10303 is set to low level, the voltage values of packets 1 to 6 of pixel 10200 at pixel address 31, the voltage values of packets 1 to 6 of pixel 10200 at pixel address 32, and the voltage values of packets 1 to 6 of pixel 10200 at pixel address 3X are input to column AD 10370, and AD conversion to 12-bit signal values is performed in the same manner as described above. By performing this operation for all rows, the signal values of all pixels 10200 are output from solid-state image capturer output signal 10130. Although six FDAs 10211 to 10216 are exemplified in FIG. 2 and six generation codes 21701 to 21706 of packets 1 to 6 are exemplified in FIG. 17, the number is not limited to six. If the number of signal charge accumulators is greater than the number of packet generation codes, it is possible to obtain the signal values of packets 1 to 6 in one frame, and thus calculate the segment number corresponding to the distance using the data of a single frame. If the number of signal charge accumulators is greater than the number of packet generation codes, it is possible to calculate the segment number corresponding to the distance by obtaining the signal values of packets 1 to 6 using the data of a plurality of frames. The time required for image data readout 10411, which corresponds to the imaging readout time, is calculated by dividing the number of pixels taking into account the blanking interval, which is calculated as (number of horizontal pixels X320+horizontal blanking interval 80)×(number of vertical pixels Y240+vertical blanking interval 23), by the output clock frequency of solid-state image capturer output signal 10130. If the output clock frequency is 39.319 MHz, the time required for image data readout 10411, which corresponds to the imaging readout time, is 16.053 ms.

Figure 27:
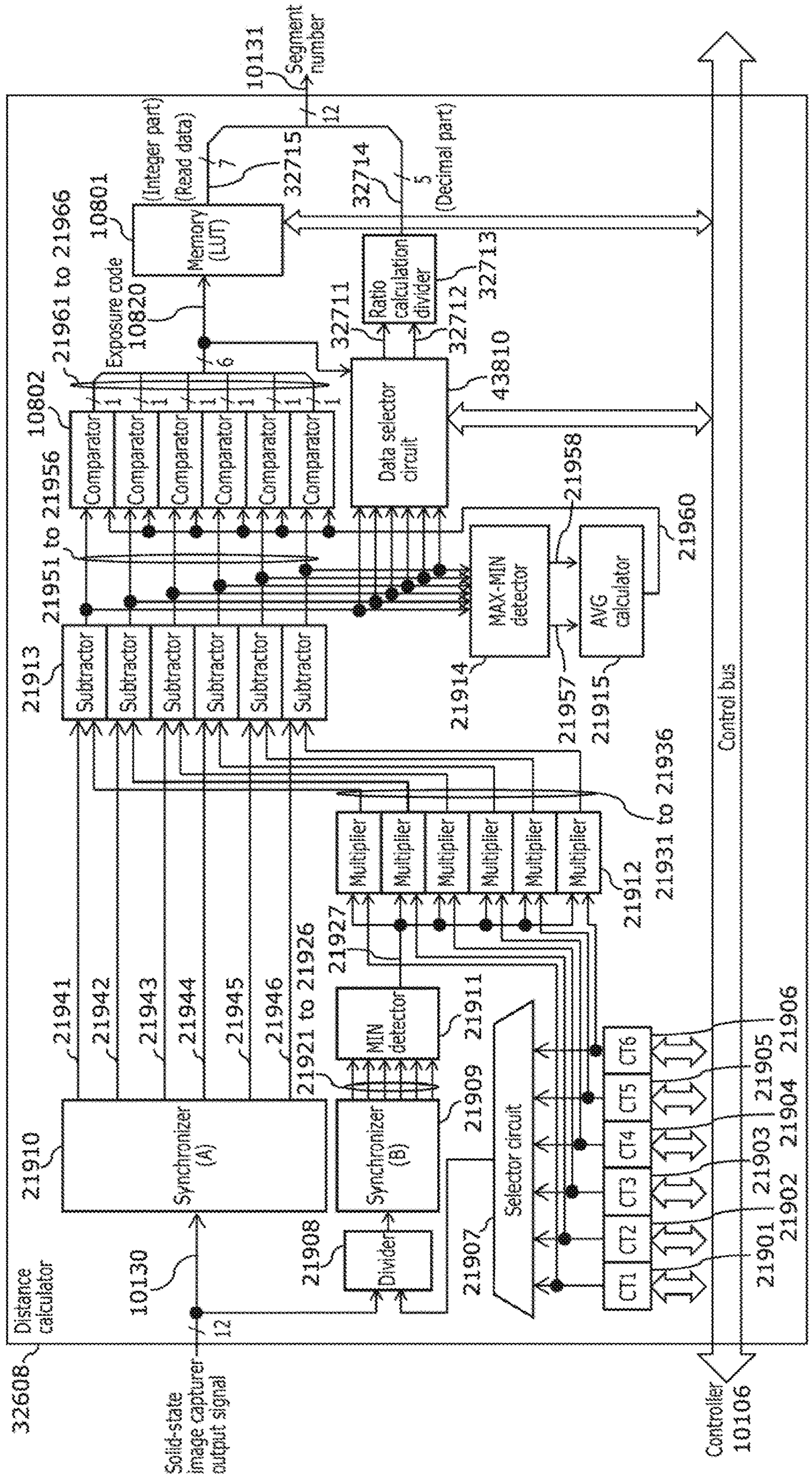
FIG. 27 illustrates a configuration of a distance calculator according to Embodiment 3.

FIG. 27 illustrates a configuration of distance calculator 32608 according to Embodiment 3. As illustrated in FIG. 27, distance calculator 32608 includes: exposure counts 21901 to 21906 of packets 1 to 6 controlled by controller 10106 via a control bus; memory (LUT) 10801 controlled by controller 10106 via the control bus; selector circuit 21907 that selects exposure counts 21901 to 21906 of packets 1 to 6; divider 21908 that performs division of solid-state image capturer output signal 10130 and the output signal from selector circuit 21907; synchronizer (B) 21909 that synchronizes the output signal of divider 21908 for each pixel address; MIN detector 21911 that detects a minimum value from among synchronizer (B) output signals 21921 to 21926; multiplier 21912 that multiplies MIN detector output signal 21927 and exposure counts 21901 to 21906 of packets 1 to 6; synchronizer (A) 21910 that synchronizes solid-state image capturer output signal 10130 for each pixel address; subtractor 21913 that performs subtraction of synchronizer (A) output signals 21941 to 21946 and multiplier output signals 21931 to 21936; MAX−MIN detector 21914 that detects a maximum value and a minimum value from among subtraction signals 21951 to 21956; AVG calculator 21915 that calculates an average value of maximum value signal 21957 and minimum value signal 21958 output from the MAX-MIN detector to generate threshold signal 21960; comparator 10802 that compares subtraction signals 21951 to 21956 with threshold signal 21960; data selection 32710 that selects data of subtraction signals 21951 to 21956; and ratio calculation divider 32713 that calculates the ratio of two-unit-segment reflected light 32712 and one-unit-segment reflected light 32711 output from data selection 32710. Next, the operation of distance calculator 32608 will be described. In brief summary, this is a method for improving ranging accuracy by identifying segment numbers (integer parts) 32715 where reflected light 10111 returned in the same manner as in Embodiment 2, and further, when reflected light 10111 is returned across two adjacent unit segments, using the ratio between (i) two-unit-segment reflected light 32712 corresponding to the amount of light of reflected light 10111 that returned to the two adjacent unit segments and (ii) one-unit-segment reflected light 32711 corresponding to the amount of reflected light 10111 that returned to the farther (far end) one of the two adjacent unit segments from emission pulse 10120 to calculate segment numbers (decimal parts) 32714 obtained by further dividing the unit segments. Note that the explanation will be based on the assumption that the signal values of packets 1 to 6 of solid-state image capturer output signal 10130 include at least one packet that does not include reflected light 10111 and at least one packet that does include reflected light 10111. How to realize this constraint will be explained with reference to FIG. 28.

First, the method of calculating segment number (integer part) 32715 will be explained. Solid-state image capturer output signal 10130 is synchronized in synchronizer (A) 21910 with the signal values of packets 1 to 6 for each pixel address, which generates synchronizer (A) output signals 21941 to 21946. Since the number of times that exposure pulses 10121 to 10126 of packets 1 to 6 become high level is different for each signal value of packets 1 to 6 in solid-state image capturer output signal 10130, in order to equalize the amount of reflected background light 21511 included in the signal values of packets 1 to 6, for each signal value of packets 1 to 6, exposure counts 21901 to 21906 of packets 1 to 6 are selected by selector circuit 21907, divided by divider 21908, and input to synchronizer (B) 21909. The method of generating exposure counts 21901 to 21906 of packets 1 to 6 will be explained later with reference to FIG. 28. The synchronizer (B) synchronizes the output signal of divider 21908 for each pixel address and outputs the result to MIN detector 21911. MIN detector 21911 estimates a signal value corresponding to the amount of reflected background light 21511 by detecting the minimum value of synchronizer (B) output signals 21921 to 21926, and generates MIN detector output signal 21927. MIN detector output signal 21927 is multiplied by exposure counts 21901 to 21906 of packets 1 to 6 in multiplier 21912, thereby generating multiplier output signals 21931 to 21936, which are the signal values corresponding to the amount of reflected background light 21511 included in each signal value of packets 1 to 6. Subtractor 21913 performs subtraction of synchronizer (A) output signals 21941 to 21946 and multiplier output signals 21931 to 21936 to generate subtraction signals 21951 to 21956 removed of the reflected background light 21511 component that is included in the signal values of packets 1 to 6. MAX-MIN detector 21914 generates maximum value signal 21957 and minimum value signal 21958 of subtraction signals 21951 to 21956. Here, since the signal values of packets 1 to 6 of solid-state image capturer output signal 10130 include at least one packet that does not include reflected light 10111 and at least one packet that does include reflected light 10111, maximum value signal 21957 is a signal value corresponding to the amount of reflected light 10111 and minimum value signal 21958 is black level value. AVG calculator 21915 generates an average value of maximum value signal 21957 and minimum value signal 21958 to generate threshold signal 21960, which is a threshold for detecting packets that include reflected light 10111 and packets that do not include reflected light 10111. Comparator 10802 compares threshold signal 21960, which is the average value of maximum value signal 21957 and minimum value signal 21958, with subtraction signals 21951 to 21956 to reduce variations caused by the dark current of photoelectric conversion pixel 10201 and FDAs 10211 to 10216 and reduce shot noise, which makes it possible to yield a comparison result of "1" by comparator 10802 for subtraction signals 21951 to 21956 that include reflected light 10111 and a comparison result of "0" by comparator 10802 for subtraction signals 21951 to 21956 that do not include reflected light 10111. Therefore, exposure code 10820, which is the bitwise concatenation of comparator output signals 21961 to 21966, indicates packets that include reflected light 10111. Exposure code 10820 is then used as a read address to access memory (LUT) 10801, and the read data of memory (LUT) 10801 becomes segment number (integer part) 32715. The initial values of memory (LUT) 10801 are set from controller 10106 via the control bus. The method of generating the initial values to be set in memory (LUT) 10801 will be explained with reference to FIG. 28.

Next, the method of calculating segment number (decimal part) 32714 will be explained. In Embodiment 2, when reflected light 10111 returned across two adjacent segment numbers 21700, the specific timing of the return of reflected light 10111 is not known, so it is assumed that the reflected light 10111 returned in the middle of two adjacent segments, and so the average of the two adjacent segment numbers is used to reduce the maximum error to half of the segment, but ranging accuracy is improved by calculating segment number (decimal part) 32714 obtained by further dividing the unit segment, using the ratio between (i) two-unit-segment reflected light 32712 corresponding to the amount of light of reflected light 10111 that returned to the two adjacent unit segments and (ii) one-unit-segment reflected light 32711 corresponding to the amount of reflected light 10111 that returned to the farther (far end) one of the two adjacent unit segments from emission pulse 10120 (i.e., by using one-unit-segment reflected light 32711÷two-unit-segment reflected light 32712). For example, if reflected light 10111 begins to return 2.5 ns after the beginning of a given unit segment, reflected light 10111 will occupy 7.5 ns of the closer (near end) one of the two adjacent unit segments to emission pulse 10120 and 2.5 ns of the farther (far end) one of two adjacent unit segments from emission pulse 10120. Here, theoretically, a proportional relationship can be established in which one-unit-segment reflected light 32711 is "0.25" if two-unit-segment reflected light 32712 is "1", and thus it is possible to calculate the delay time from the start of the unit segment time until the reflected light 10111 starts to return as 10 ns (=unit segment length)×0.25=2.5 ns. This ranging device outputs the segment number corresponding to the distance. The time difference between the generation of emission light 10110 and the return of reflected light 10111 can be calculated by multiplying the segment number where reflected light 10111 returned by the length of the unit segment. Accordingly by using the quotient of one-unit-segment reflected light 32711÷two-unit-segment reflected light 32712 as segment number (decimal part) 32714, it is possible to improve ranging accuracy. One-unit-segment reflected light 32711 and two-unit-segment reflected light 32712 are generated in data selection 32710 using subtraction signals 21951 to 21956, and divided in ratio calculation divider 32713 to generate segment number (decimal part) 32714. Data selection 32710 will be described in greater detail later with reference to FIG. 29A, FIG. 29B, and FIG. 31A to FIG. 31C.

Finally, segment number (integer part) 32715 and segment number (decimal part) 32714 are bitwise concatenated to generate segment number signal 10131.

FIG. 28 illustrates the method of generating the initial values of exposure counts 21901 to 21906 of packets 1 to 6 and memory (LUT) 10801 according to Embodiment 3. As illustrated in FIG. 28, the initial values of exposure counts 21901 to 21906 of packets 1 to 6 and memory (LUT) 10801 are generated from segment numbers 21700 and generation codes 21701 to 21706 of packets 1 to 6 to generate unit drive patterns 22231 to 22236 for packets 1 to 6, which control light source 10102 and solid-state image capturer 10105.

First, the method of calculating exposure counts 21901 to 21906 of packets 1 to 6 will be explained. The amount of reflected background light 21511 included in the signal values of packets 1 to 6 is proportional to the number of times exposure pulses 10121 to 10126 of packets 1 to 6 are set to high level (the exposure count). Accordingly, controller 10106 generates exposure counts 21901 to 21906 for packets 1 to 6 by calculating, for each generation code of packets 1 to 6, the number of segments among all segment numbers 21700 in which the generation code of the packet is "1".

Next, the method of generating the initial values for memory (LUT) 10801 will be explained. Controller 10106 generates each independent code 22000 as a 6-bit binary number, where packet 1 generation code 21701 is bit 0, packet 2 generation code 21702 is bit 1, packet 3 generation code 21703 is bit 2, packet 4 generation code 21704 is bit 3, packet 5 generation code 21705 is bit 4, and packet 6 generation code 21706 is bit 5. For example, independent code 22020 of segment number 21700 of 7, which is labeled 22021, is a 6-bit binary number where packet 1 generation code 21701 of "0" at segment number 21700 of 7 is bit 0, packet 2 generation code 21702 of "0" at segment number 21700 of 7 is bit 1, packet 3 generation code 21703 of "0" at segment number 21700 of 7 is bit 2, packet 4 generation code 21704 of "0" at segment number 21700 of 7 is bit 3, packet 5 generation code 21705 of "1" at segment number 21700 of 7 is bit 4, and packet 6 generation code 21706 of "0" at segment number 21700 of 7 is bit 5, which converts to 10 in hexadecimal notation. Controller 10106 generates each adjacent code 22001 by applying a bitwise logical OR operation between independent codes 22000 of two adjacent segments. For example, adjacent code 32823 corresponding to the adjacent segment numbers 21700 of 24 and 25, which are labeled 32824, is a 6-bit binary number where the result of the logical OR operation of the value "1" of bit 0 of the independent code at segment number 21700 of 24 and the value "0" of bit 0 of the independent code at segment number 21700 of 25 is "1" as bit 0, the result of the logical OR operation of the value "1" of bit 1 of the independent code at segment number 21700 of 24 and the value "1" of bit 1 of the independent code at segment number 21700 of 25 is "1" as bit 1, the result of the logical OR operation of the value "0" of bit 2 of the independent code at segment number 21700 of 24 and the value "0" of bit 2 of the independent code at segment number 21700 of 25 is "0" as bit 2, the result of the logical OR operation of the value "0" of bit 3 of the independent code at segment number 21700 of 24 and the value "0" of bit 3 of the independent code at segment number 21700 of 25 is "0" as bit 3, the result of the logical OR operation of the value "0" of bit 4 of the independent code at segment number 21700 of 24 and the value "1" of bit 4 of the independent code at segment number 21700 of 25 is "1" as bit 4, and the result of the logical OR operation of the value "1" of bit 5 of the independent code at segment number 21700 of 24 and the value "1" of bit 5 of the independent code at segment number 21700 of 25 is "1" as bit 5, which converts to 33 in hexadecimal notation. In this example, in independent codes 22000, the signal values of packets 1 to 6 that include reflected light 10111 are "1" and the signal values of packets 1 to 6 that do not include reflected light 10111 are "0" when reflected light 10111 returns to only one segment number 21700, and in adjacent codes 22001, the signal values of packets 1 to 6 that include reflected light 10111 are "1" and the signal values of packets 1 to 6 that do not include reflected light 10111 are "0" when reflected light 10111 returns across two adjacent segment numbers 21700, and exposure code 10820 is estimated for each segment number 21700 based on generation codes 21701 to 21706 of packets 1 to 6. For this reason, memory (LUT) 10801 is initialized with independent codes 22000 and adjacent codes 22001 as addresses and segment numbers 21700 corresponding to independent codes 22000 and adjacent codes 22001 as data, and memory (LUT) 10801 is accessed and read with exposure code 10820 as an address, making it is possible to convert exposure code 10820 to the segment number corresponding to the distance. Table 22010 is a data set for initializing memory (LUT) 10801. Since the hexadecimal notation of independent code 22020 is "10", the data corresponding to the hexadecimal address of "10" in table 22010 is 7, which is segment number 22021 of independent code 22020. Since the hexadecimal notation of adjacent code 32823 is "33", the data corresponding to the hexadecimal address of "33" in table 22010 is 24, which is the smaller of segment numbers 32824 of adjacent code 32823. This is because, with respect to segment numbers 32824 of adjacent code 32823, when reflected light 10111 returns across segment numbers 21700 of 24 and 25, the specific timing at which reflected light 10111 returned is calculated separately using the ratio of two-unit-segment reflected light 32712 which corresponds to the amount of reflected light 10111 that returned across segment numbers 21700 of 24 and 25 and one-unit-segment reflected light 32711 which corresponds to the amount of reflected light 10111 that returned to segment number 21700 of 25.

Next, the method of generating generation codes 21701 to 21706 of packets 1 to 6 to be applied to controller 10106 will be described. In order to calculate the segment numbers using exposure codes 10820 generated from the signal values of packets 1 to 6 described above, there must be a one-to-one correspondence between exposure codes 10820 and the segment numbers. Therefore, generation codes 21701 to 21706 of packets 1 to 6 are determined so that the values of independent codes 22000 and adjacent codes 22001 do not overlap, and exposure codes 10820 and the segment numbers are associated one-to-one. Moreover, generation codes 21701 to 21706 of packets 1 to 6 are determined such that independent codes 22000 and adjacent codes 22001 do not take a value of "00" or "3F" in hexadecimal notation. When reflected light 10111 is returned at a timing when the value of independent code 22000 or adjacent code 22001 is "00", exposure pulses 10121 to 10126 of packets 1 to 6 are low level, and as such, the signal values of packets 1 to 6 do not include the reflected light 10111 component. Even if target object 10101 does not exist within the ranging range of segment numbers 0 to 31, the signal values of packets 1 to 6 do not include the reflected light 10111 component. Accordingly, since it is not possible to determine whether these two conditions are satisfied from the signal values of packets 1 to 6, generation codes 21701 to 21706 of packets 1 to 6 are generated such that independent codes 22000 and adjacent codes 22001 do not take a value of "00" in hexadecimal notation. By making sure that independent codes 22000 and adjacent codes 22001 do not take a value of "00" in hexadecimal notation, it is possible to make sure that there is at least one packet that includes reflected light 10111 among the signal values of packets 1 to 6 of solid-state image capturer output signal 10130. However, by generating generation codes 21701 to 21706 of packets 1 to 6 in such a manner that independent codes 22000 and adjacent codes 22001 do not take a value of "3F" in hexadecimal notation, it is possible to make sure that there is at least one packet that does not include reflected light 10111 among the signal values of packets 1 to 6 of solid-state image capturer output signal 10130. In case exposure code 10820 matches "00", "1B", or "3F", which do not exist in independent codes 22000 or adjacent codes 22001, it is possible to determine that the segment number is not calculated correctly by setting the segment number to a negative value of —1.

FIG. 29A and FIG. 29B are diagrams illustrating data selection 32710 of distance calculator 32608 according to Embodiment 3. When reflected light 10111 returns across two adjacent segment numbers 21700, subtraction signals 21951 to 21956 of packets 1 to 6 can be classified into the following four types according to the combination of each of generation codes 21701 to 21706 of packets 1 to 6 of the two segments that compose the adjacent code.

More specifically, distance calculator 32608 classifies n types of signal values based on the bitwise combination of two independent codes corresponding to an adjacent code. Stated differently, when one bit of these two independent codes is 0 and the other bit of these two independent codes is 0, distance calculator 32608 classifies the n types of signal values as classification A. Distance calculator 32608 classifies the n types of signal values as classification B when one bit is 1 and the other bit is 0, classification C when one bit is 0 an the other bit is 1, and classification D when one bit is 1 and the other bit is 1.

Classification A corresponds to when the packet generation code closer to emission pulse 10120 is "0" and the packet generation code father from emission pulse 10120 is "0".

Classification B corresponds to when the packet generation code closer to emission pulse 10120 is "1" and the packet generation code father from emission pulse 10120 is "0".

Classification C corresponds to when the packet generation code closer to emission pulse 10120 is "0" and the packet generation code father from emission pulse 10120 is "1".

Classification D corresponds to when the packet generation code closer to emission pulse 10120 is "1" and the packet generation code father from emission pulse 10120 is "1".

In this way, distance calculator 32608 classifies n types of signal values based on the bitwise combination of two independent codes corresponding to an adjacent code. Here, two-unit-segment reflected light 32712 corresponding to the amount of reflected light 10111 that returned to two adjacent unit segments can be generated using subtraction signals 21951 to 21956 of packets 1 to 6 classified as classification D or subtraction signals 21951 to 21956 of packets 1 to 6 classified as classification B+subtraction signals 21951 to 21956 of packets 1 to 6 classified as classification C.

Accordingly, for each exposure code 10820, when there are subtraction signals 21951 to 21956 of packets 1 to 6 classified as classification D, subtraction signals 21951 to 21956 of packets 1 to 6 classified as classification D are used to generate two-unit-segment reflected light 32712, and when there are no subtraction signals 21951 to 21956 of packets 1 to 6 classified as classification D, subtraction signals 21951 to 21956 of packets 1 to 6 classified as classification B+subtraction signals 21951 to 21956 of packets 1 to 6 classified as classification C are used to generate two-unit-segment reflected light 32712.

One-unit-segment reflected light 32711 corresponding to the amount of reflected light 10111 that returned to the farther (far end) one of the two adjacent unit segments from emission pulse 10120 can be generated using subtraction signals 21951 to 21956 of packets 1 to 6 classified as classification C.

Generation codes 21701 to 21706 of packets 1 to 6 are generated such that the generation code closer to emission pulse 10120 is "0" and the generation code farther from emission pulse 10120 is "1" so that subtraction signals 21951 to 21956 of packets 1 to 6 classified as classification C are present in all adjacent codes 22001. Accordingly, for each exposure code 10820, subtraction signals 21951 to 21956 of packets 1 to 6 classified as classification C are used to generate one-unit-segment reflected light 32711.

If there are multiple subtraction signals 21951 to 21956 of packets 1 to 6 classified as classification B, C, or D, one of them is selected to generate two-unit-segment reflected light 32712 and one-unit-segment reflected light 32711.

Here, if exposure code 10820 is "0B", classification B is packet 2 subtraction signal 21952, classification C is packet 1 subtraction signal 21951, and classification D is packet 4 subtraction signal 21954. Two-unit-segment reflected light 32712 is packet 4 subtraction signal 21954 since packet 4 subtraction signal 21954 classified as classification D is present, and one-unit-segment reflected light 32711 is packet 1 subtraction signal 21951 since packet 1 subtraction signal 21951 classified as classification C.

If exposure code 10820 is "OC", classification B is packet 3 subtraction signal 21953, classification C is packet 4 subtraction signal 21954, and classification D is not present. Accordingly, since subtraction signals 21951 to 21956 of packets 1 to 6 classified as classification D are not present, two-unit-segment reflected light 32712 is packet 3 subtraction signal 21953 classified as classification B+packet 4 subtraction signal 21954 classified as classification C, and since packet 4 subtraction signal 21954 classified as classification C is present, one-unit-segment reflected light 32711 is packet 4 subtraction signal 21954.

When reflected light 10111 returns to only one segment number 21700, ranging accuracy can be ensured without calculating the ratio of one-unit-segment reflected light 32711 to two-unit-segment reflected light 32712 because emission light 10110 and exposure pulses 10121 to 10126 of packets 1 to 6 have the same pulse width (10 ns). Accordingly, when exposure code 10820 and independent code 22000 are the same, two-unit-segment reflected light 32712 is fixed to "1" and one-unit-segment reflected light 32711 is fixed to "0" so that the calculation result of ratio calculation divider 32713 is "0". If there are multiple subtraction signals 21951 to 21956 of packets 1 to 6 classified as classification B, C, or D, the S/N can be improved by improving the light utilization ratio relative to reflected light 10111 by using multiple subtraction signals 21951 to 21956 of packets 1 to 6. This will be described with reference to FIG. 31A through FIG. 31C.

Figure 30:
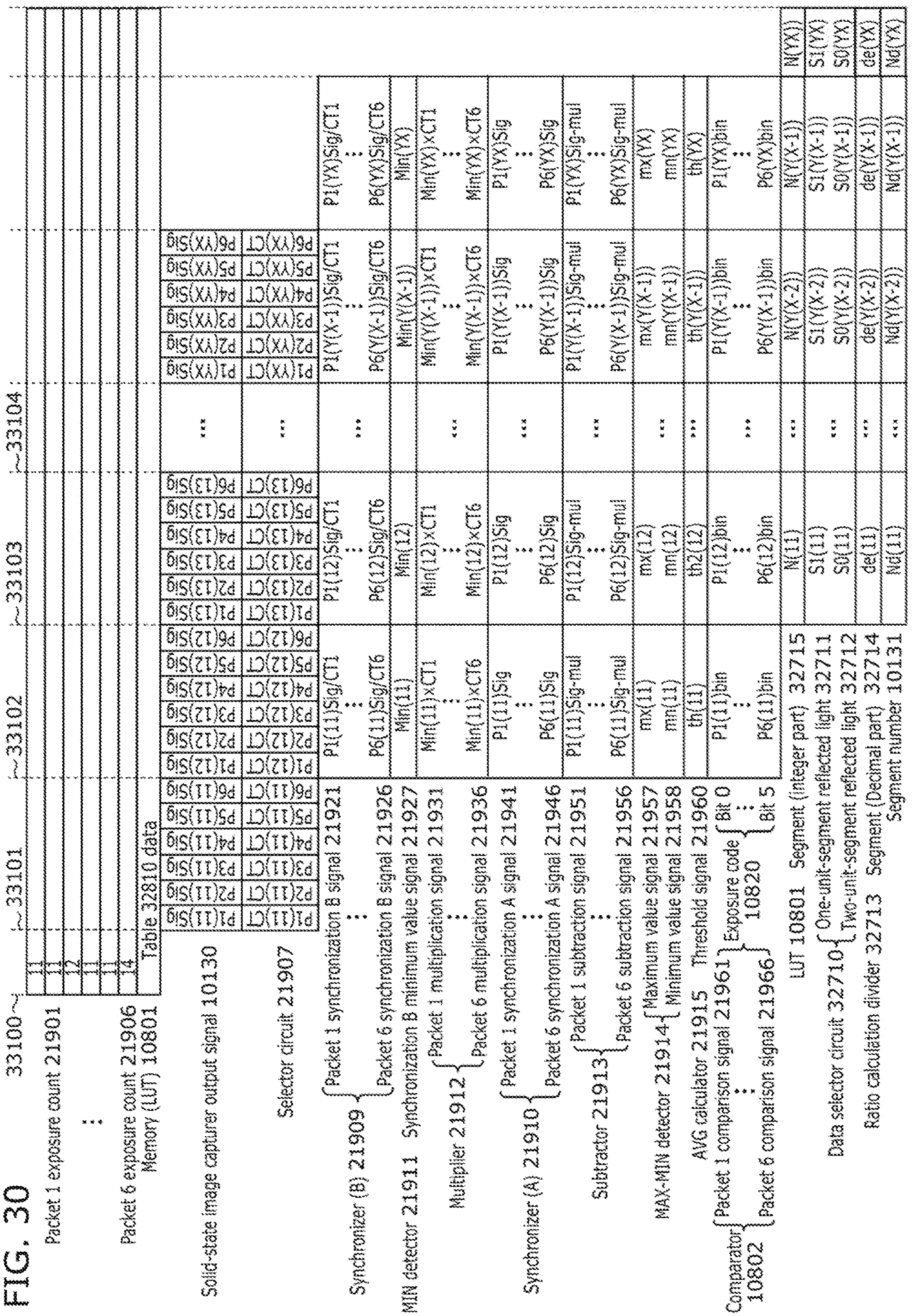
FIG. 30 illustrates timings of operations performed by a distance calculator according to Embodiment 3.

FIG. 30 illustrates a timing chart for distance calculator 32608 according to Embodiment 3.

Notations in FIG. 30 that are the same as in FIG. 21 and similar figures share the same meaning. The notation "N(11)" indicates to the integer part of segment number 10131 of pixel 10200 at pixel address 11 in the following description, and corresponds to the output of LUT 10801.

The notation "S1(11)" corresponds to one-unit-segment reflected light 32711 of pixel 10200 at pixel address 11.

The notation "S0(11)" corresponds to two-unit-segment reflected light 32712 of pixel 10200 at pixel address 11.

The notation "de(11)" indicates S1(11)/S0(11), i.e., (one-unit-segment reflected light 32711)/(two-unit-segment reflected light 32712) of pixel 10200 at pixel address 11, and corresponds to the decimal part of segment number 10131.

The notation "Nd(11)" does not include a decimal part in FIG. 21, but does include a decimal part in FIG. 30. Stated differently, the notation "Nd(11)" in FIG. 30 corresponds to N(11)+de(11), i.e., the integer part and the decimal part of segment number 10131 of pixel 10200 at pixel address 11. Here, "+" indicates concatenation or addition.

As illustrated in FIG. 30, at timing 33000 before a valid signal value is output from solid-state image capturer output signal 10130, controller 10106 sets values in exposure counts 21901 to 21906 of packets 1 to 6 and memory (LUT) 10801 via the control bus. Packet 1 exposure count 21901 is 11, packet 2 exposure count 21902 is 11, packet 3 exposure count 21903 is 12, packet 4 exposure count 21904 is 11, packet 5 exposure count 21905 is 11, packet 6 exposure count 21906 is 14, and memory (LUT) 10801 writes the data in table 32810. At timing 33001, the signal values of packets 1 to 6 of pixel address 11 are sequentially sent from solid-state image capturer output signal 10130. The sent signal values are sequentially sent to the synchronizer (A) 21910 and at the same time divided by exposure counts 21901 to 21906 of packets 1 to 6 and sent to synchronizer (B) 21909. At timing 33002, exposure code 10820 is determined using synchronizer (A) output signals 21941 to 21946, synchronizer (B) output signals 21921 to 21926, and exposure counts 21901 to 21906 of packets 1 to 6. Memory (LUT) 10801 is accessed and read using exposure code 10820 as the address, and segment number (integer part) 32715 corresponding to the distance of pixel address 11 is generated at timing 33003. Moreover, two-unit-segment reflected light 32712 and one-unit-segment reflected light 32711 are generated in data selection 32710 using subtraction signals 21951 to 21956 of packets 1 to 6 and exposure code 10820, and segment number (decimal part) 32714 is generated in ratio calculation divider 32713. Segment number (integer part) 32715 and segment number (decimal part) 32714 are bitwise concatenated to generate segment number signal 10131. All of the two-dimensional segment numbers are output by performing this operation on all two-dimensionally arranged pixels 10200.

In FIG. 29A and FIG. 29B, if there are multiple subtraction signals 21951 to 21956 of packets 1 to 6 classified as classification B, C, or D, one of them is selected and one-unit-segment reflected light 32711 and two-unit-segment reflected light 32712 are generated, but here, a method of generating one-unit-segment reflected light 32711 and two-unit-segment reflected light 32712 using multiple subtraction signals 21951 to 21956 of packets 1 to 6 will be described.

FIG. 31A to FIG. 31C are diagrams illustrating data selection 32710 of distance calculator 32608 with improved ranging accuracy according to Embodiment 3. It is possible to improve ranging accuracy by using the data selection process illustrated in FIG. 31A to FIG. 31C instead of the data selection process illustrated in FIG. 29A and FIG. 29B.

When reflected light 10111 returns across two adjacent segment numbers 21700, subtraction signals 21951 to 21956 of packets 1 to 6 can be classified into the following four types according to the combination of each of generation codes 21701 to 21706 of packets 1 to 6 of the two segments that compose the adjacent code.

Classification A corresponds to when the generation code closer to emission pulse 10120 is "0" and the generation code father from emission pulse 10120 is "0".

Classification B corresponds to when the generation code closer to emission pulse 10120 is "1" and the generation code father from emission pulse 10120 is "0".

Classification C corresponds to when the generation code closer to emission pulse 10120 is "0" and the generation code father from emission pulse 10120 is "1".

Classification D corresponds to when the generation code closer to emission pulse 10120 is "1" and the generation code father from emission pulse 10120 is "1".

Two-unit-segment reflected light 32712 and one-unit-segment reflected light 32711 can be calculated using the following four types of calculation methods depending on the presence or absence of subtraction signals 21951 to 21956 of packets 1 to 6 classified as classification B, C, or D. When subtraction signals 21951 to 21956 of packets 1 to 6 classified as classification B, C, and D are present, two-unit-segment reflected light 32712 is calculated as subtraction signals 21951 to 21956 of packets 1 to 6 classified as classification D +subtraction signals 21951 to 21956 of packets 1 to 6 classified as classification B+subtraction signals 21951 to 21956 of packets 1 to 6 classified as classification C, and one-unit-segment reflected light 32711 is calculated as subtraction signals 21951 to 21956 of packets 1 to 6 classified as classification D−subtraction signals 21951 to 21956 of packets 1 to 6 classified as classification B+subtraction signals 21951 to 21956 of packets 1 to 6 classified as classification C. When subtraction signals 21951 to 21956 of packets 1 to 6 classified as classification B and C are present and subtraction signals 21951 to 21956 of packets 1 to 6 classified as classification D are not present, two-unit-segment reflected light 32712 is calculated as subtraction signals 21951 to 21956 of packets 1 to 6 classified as classification B +subtraction signals 21951 to 21956 of packets 1 to 6 classified as classification C, and one-unit-segment reflected light 32711 is calculated as subtraction signals 21951 to 21956 of packets 1 to 6 classified as classification C. When subtraction signals 21951 to 21956 of packets 1 to 6 classified as classification C and D are present and subtraction signals 21951 to 21956 of packets 1 to 6 classified as classification B are not present, two-unit-segment reflected light 32712 is calculated as subtraction signals 21951 to 21956 of packets 1 to 6 classified as classification D, and one-unit-segment reflected light 32711 is calculated as subtraction signals 21951 to 21956 of packets 1 to 6 classified as classification C. When subtraction signals 21951 to 21956 of packets 1 to 6 classified as classification B and D are present and subtraction signals 21951 to 21956 of packets 1 to 6 classified as classification C are not present, two-unit-segment reflected light 32712 is calculated as subtraction signals 21951 to 21956 of packets 1 to 6 classified as classification D, and one-unit-segment reflected light 32711 is calculated as subtraction signals 21951 to 21956 of packets 1 to 6 classified as classification D−subtraction signals 21951 to 21956 of packets 1 to 6 classified as classification B. If there are multiple subtraction signals 21951 to 21956 of packets 1 to 6 classified as classifications B, C, and D, use the average value of the multiple subtraction signals 21951 to 21956 of packets 1 to 6 is used. Compared with the method of FIG. 29A and FIG. 29B, using multiple subtraction signals 21951 to 21956 of packets 1 to 6 to calculate one-unit-segment reflected light 32711 and two-unit-segment reflected light 32712 improves the light utilization ratio relative to reflected light 10111, thereby making it possible to improve the S/N. Note that the methods of generating one-unit-segment reflected light 32711 and two-unit-segment reflected light 32712 illustrated in FIG. 29A, FIG. 29B, FIG. 31A, and FIG. 31C are non-limiting examples.

From the above operation, the time required for 12 repetitions of frame unit drive pattern 10410, which corresponds to the imaging exposure time, is 17.28 ms, and the time required for image data readout 10411, which corresponds to the imaging readout time, is 16.053 ms. Therefore, the time required for one frame is 33.3 ms, and the frame rate of this ranging device is 30 fps. Compared to the conventional technique, this technique can significantly expand the range over which distance can be measured with a smaller number of packets, so by using this technique, the ranging range can be significantly expanded while maintaining the frame rate, even under conditions with background light, and ranging accuracy in which the unit segment is further divided can be achieved without using means for short pulse emission or short exposure.

Distance calculator 32608 may calculate the distance by further dividing the distance segments using signal values classified as at least two of classification B, classification C, and classification D.

As described above, in the ranging device according to Embodiment 3, the distance calculator: when there is a match between the exposure code and the adjacent codes, classifies the n types of signal values from the signal outputter based on a bitwise combination of the two independent codes corresponding to the matching adjacent code; and using the classified signal values, calculates a distance within the corresponding two adjacent unit segments.

With this, when the exposure code matches an adjacent code, the distance to the target object can be estimated, from among a range spanning across the boundary of the two corresponding distance segments and a range less than or equal to the distance segment, to a more precise position, thereby improving ranging accuracy.

Here, the distance calculator may classify the n types of signal values from the signal outputter based on the bitwise combination of the two independent codes corresponding to the adjacent code into any one of the following four classifications: classification A when the bit of the independent code closer to the emission pulse is 0 and the bit of the independent code farther from the emission pulse is 0; classification B when the bit of the independent code closer to the emission pulse is 1 and the bit of the independent code farther from the emission pulse is 0; classification C when the bit of the independent code closer to the emission pulse is 0 and the bit of the independent code farther from the emission pulse is 1; and classification D when the bit of the independent code closer to the emission pulse is 1 and the bit of the independent code farther from the emission pulse is 1. The distance calculator may calculate a distance using signal values classified as at least two classifications from among classification B, classification C, and classification D.

With this, when the exposure code matches an adjacent code, the distance to the target object can be estimated, from among a range spanning across the boundary of the two corresponding distance segments and a range less than or equal to the distance segment, to a more precise position, thereby improving ranging accuracy.

Here, the distance calculator may calculate a distance by using signal values classified as classification A to remove a background light component included in each of signal values classified as classification B, classification C, and classification D.

With this, regarding the distance to the target object, when the exposure code matches an adjacent code, the effect of background light can be reduced to further improve the ranging accuracy.

Embodiment 4

In Embodiments 1, 2, and 3, it was explained that the technique according to the present disclosure can significantly expand the ranging range. However, since the amount of reflected light attenuates in inverse proportion to the square of the distance, if the image is captured so that the near end is not saturated, the amount of exposure at the far end is extremely low, making it difficult to measure the far end. In addition, if the light intensity is increased to enable ranging at the far end, the near end will become saturated, making ranging impossible. In order to overcome this problem, we will explain how to change the exposure counts for each distance to reduce the difference in the amount of exposure between the near end and the far end and make it possible to measure the entire ranging range from the near end to the far end.

Figure 32:
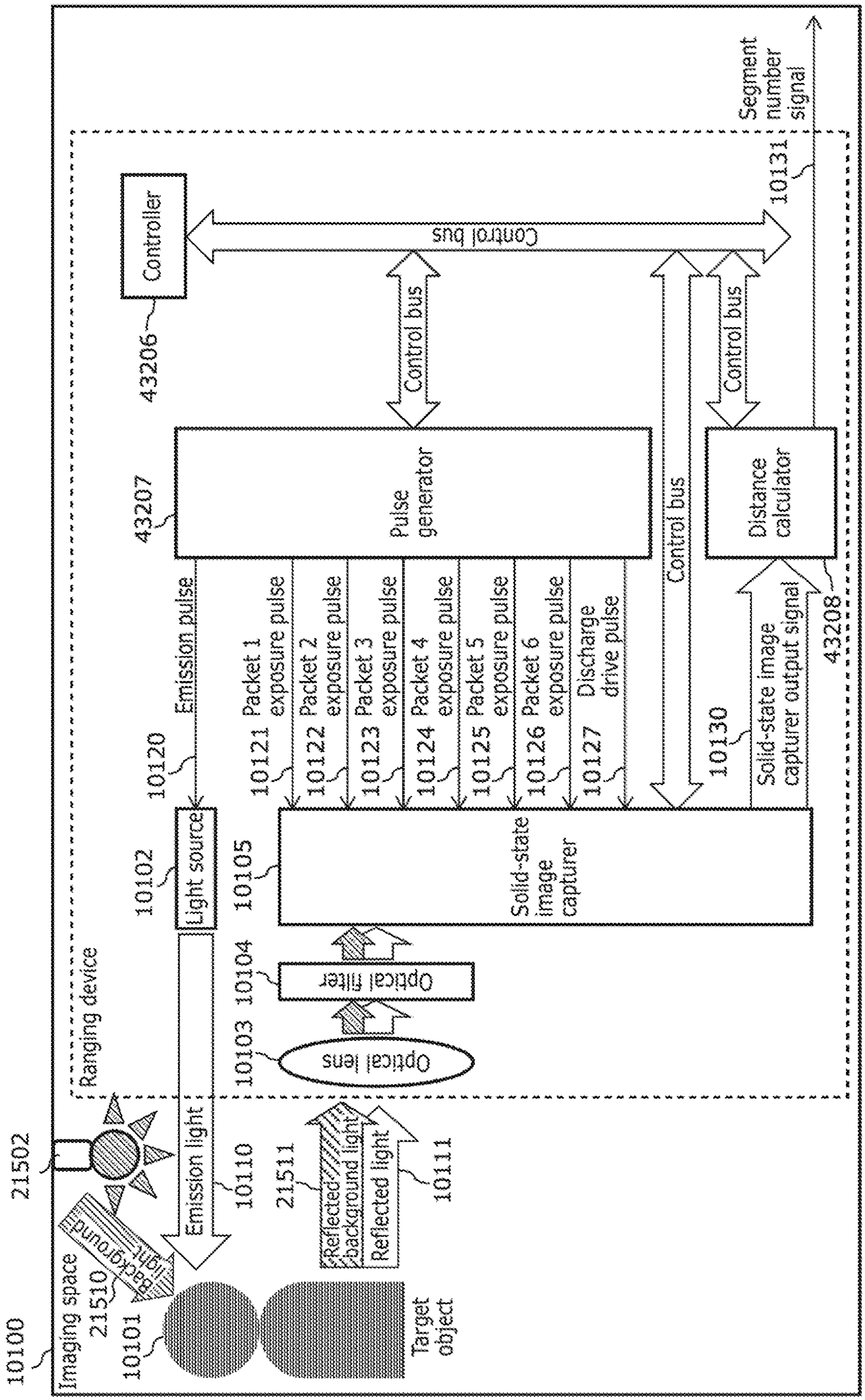
FIG. 32 schematically illustrates a configuration of a time of flight (TOF) ranging device according to Embodiment 4.

FIG. 32 schematically illustrates a configuration of a time of flight (TOF) ranging device and a surrounding object according to Embodiment 4 in an environment including background light. As illustrated in FIG. 32, background light

21510, which is emitted from background light light source 21502 and includes the same 940 nm wavelength component as light source 10102, and pulsed emission light 10110, which is 940 nm wavelength pulsed light (pulse width: 10 ns) emitted from light source 10102, are emitted to target object 10101 in imaging space 10100 and reflected by target object 10101. Reflected light 10111 of emission light 10110 and reflected background light 21511 of background light 21510 pass through optical lens 10103 and optical filter 10104, which transmits light in the near-infrared wavelength region around 940 nm, whereby reflected light 10111 of emission light 10110 and reflected background light 21511 including only components of background light 21510 around 940 nm are received by solid-state image capturer 10105, and an image is captured. The emission timing of light source 10102 and the exposure timing of solid-state image capturer 10105 are controlled by emission pulse 10120, exposure pulses 10121 to 10126 of packets 1 to 6, and discharge drive pulse 10127 from pulse generator 43207, which are controlled from controller 43206 via a control bus. Light source 10102 emits emission light 10110 when emission pulse 10120 is high level, and does not emit emission light 10110 when emission pulse 10120 is low level. For each pixel, solid-state image capturer 10105 outputs solid-state image capturer output signal 10130, which is six types of signal values corresponding to exposure pulses 10121 to 10126 of packets 1 to 6, to distance calculator 43208. Distance calculator 43208 uses solid-state image capturer output signal 10130 and control information from controller 43206 to output, for each pixel, segment number signal 10131 corresponding to the distance to target object 10101.

Light source 10102, optical lens 10103, optical filter 10104, solid-state image capturer 10105, controller 43206, pulse generator 43207, and distance calculator 43208 constitute the ranging device. Regarding the configuration, light source 10102 includes a drive circuit and light emitting elements, and emits light in response to application of voltage from the drive circuit. Laser diodes and other light emitting elements may be used as the light emitting elements. For example, controller 43206, pulse generator 43207, and distance calculator 43208 are realized by a combination of a central processing unit (CPU), a field programmable gate array (FPGA), a digital signal processor (DSP), and an analog front end (AFE) and the like.

FIG. 2 illustrates a configuration of pixel 10200 in solid-state image capturer 10105 according to Embodiments 1 through 4. As illustrated in FIG. 2, pixel 10200 includes photoelectric conversion pixel 10201 configured of a photodiode (PD) that receives reflected light 10111 and performs photoelectric conversion, drains 10210 for discharging signal charge photoelectrically converted by photoelectric conversion pixel 10201, a signal charge accumulator configured of floating diffusion amplifiers (FDAs) 10211 to 10216 that accumulate signal charges photoelectrically converted by photoelectric conversion pixel 10201, and an outputter which outputs voltage values dependent on the signal charges accumulated in FDAs 10211 to 10216 and is configured of source follower circuit 10221, output selection transistor 10231, source follower circuit 10222, output selection transistor 10232, source follower circuit 10223, output selection transistor 10233, source follower circuit 10224, output selection transistor 10234, source follower circuit 10225, output selection transistor 10235, source follower circuit 10226, and output selection transistor 10236.

Next, operations of pixel 10200 will be described. When packet 1 exposure pulse 10121 is set to high level, the signal charge photoelectrically converted in photoelectric conversion pixel 10201 is accumulated in FDA 10211, when packet 2 exposure pulse 10122 is set to high level, the signal charge photoelectrically converted in photoelectric conversion pixel 10201 is accumulated in FDA 10212, when packet 3 exposure pulse 10123 is set to high level, the signal charge photoelectrically converted in photoelectric conversion pixel 10201 is accumulated in FDA 10213, when packet 4 exposure pulse 10124 is set to high level, the signal charge photoelectrically converted in photoelectric conversion pixel 10201 is accumulated in FDA 10214, when packet 5 exposure pulse 10125 is set to high level, the signal charge photoelectrically converted in photoelectric conversion pixel 10201 is accumulated in FDA 10215, when packet 6 exposure pulse 10126 is set to high level, the signal charge photoelectrically converted in photoelectric conversion pixel 10201 is accumulated in FDA 10216, and when discharge drive pulse 10127 is set to high level, the signal charge photoelectrically converted in photoelectric conversion pixel 10201 is discharged to drains 10210. Accordingly, six types of imaging corresponding to exposure pulses 10121 to 10126 of packets 1 to 6 are performed per pixel by: discharging the signal charge photoelectrically converted in photoelectric conversion pixel 10201 to drains 10210 when all exposure pulses 10121 to 10126 of packets 1 to 6 are low level by setting discharge drive pulse 10127 to high level when all exposure pulses 10121 to 10126 of packets 1 to 6 are low level; and accumulating the signal charge from photoelectric conversion pixel 10201 in FDAs 10211 to 10216 corresponding to exposure pulses 10121 to 10126 of packets 1 to 6 only when one of the six exposure pulses 10121 to 10126 of packets 1 to 6 is high level by, when one of the six exposure pulses 10121 to 10126 of packets 1 to 6 is high level, setting the remaining five to low level and setting discharge drive pulse 10127 to low level. FDAs 10211 through 10216 accumulate signal charge, resulting in a voltage corresponding to the amount of signal charge, and generate a packet 1 voltage value corresponding to the amount of signal charge in FDA 10211, a packet 2 voltage value corresponding to the amount of signal charge in FDA 10212, a packet 3 voltage value corresponding to the amount of signal charge in FDA 10213, a packet 4 voltage value corresponding to the amount of signal charge in FDA 10214, a packet 5 voltage value corresponding to the amount of signal charge in FDA 10215, and a packet 6 voltage value corresponding to the amount of signal charge in FDA 10216. By setting output enable signal 10240 to high level, simultaneously, the packet 1 voltage value is output to pixel output signal 10241 through source follower circuit 10221 and output selection transistor 10231, the packet 2 voltage value is output to pixel output signal 10242 through source follower circuit 10222 and output selection transistor 10232, the packet 3 voltage value is output to pixel output signal 10243 through source follower circuit 10223 and output selection transistor 10233, the packet 4 voltage value is output to pixel output signal 10244 through source follower circuit 10224 and output selection transistor 10234, the packet 5 voltage value is output to pixel output signal 10245 through source follower circuit 10225 and output selection transistor 10235, and the packet 6 voltage value is output to pixel output signal 10246 through source follower circuit 10226 and output selection transistor 10236.

FIG. 3 illustrates a configuration of solid-state image capturer 10105 according to Embodiments 1 through 4. As illustrated in FIG. 3, solid-state image capturer 10105 includes X number of pixels 10200 in the horizontal direction and Y number of pixels in the vertical direction, arranged in two dimensions, where X=320 and Y=240 in Embodiments 1 through 4. The stated number of pixels is merely one non-limiting example. Output enable signals 10240 of pixels 10200 at pixel address 11, pixel address 12, and pixel address 1X arranged in the horizontal direction in the first row are connected to row select signal 10300, output enable signals 10240 of pixels 10200 at pixel address 21, pixel address 22, and pixel address 2X arranged in the horizontal direction in the second row are connected to row select signal 10301, output enable signals 10240 of pixels 10200 at pixel address 31, pixel address 32, and pixel address 3X arranged in the horizontal direction in the third row are connected to row select signal 10302, and output enable signals 10240 of pixels 10200 at pixel address Y1, pixel address Y2, and pixel address YX arranged in the horizontal direction in the Yth row are connected to row select signal 10303. Pixel output signals 10241 to 10246 of pixels 10200 at pixel address 11, pixel address 21, pixel address 31, and pixel address Y1 arranged in the vertical direction in the first column are connected to vertical pixel signals 10311 to 10316, pixel output signals 10241 to 10246 of pixels 10200 at pixel address 12, pixel address 22, pixel address 32, and pixel address Y2 arranged in the vertical direction in the second column are connected to vertical pixel signals 10321 to 10326, and pixel output signals 10241 to 10246 of pixels 10200 at pixel address 1X, pixel address 2X, pixel address 3X, and pixel address YX arranged in the vertical direction in the $X^{th}$ column are connected to vertical pixel signals 10331 to 10336. Vertical pixel signals 10311 to 10316, 10321 to 10326, and 10331 to 10336 are connected to column AD 10370, the output signals of column AD 10370 are connected to shift register 10371, and shift register 10371 outputs solid-state image capturer output signal 10130.

Next, readout operations of solid-state image capturer 10105 will be described. The readout operation is the same as that of a typical CMOS image sensor with six times the number of horizontal pixels. By setting row select signal 10300 to high level, row select signal 10301 to low level, row select signal 10302 to low level, and row select signal 10303 to low level, voltage values of packets 1 to 6 of pixel 10200 at pixel address 11 are output to vertical pixel signals 10311 to 10316, voltage values of packets 1 to 6 of pixel 10200 at pixel address 12 are output to vertical pixel signals 10321 to 10326, and voltage values of packets 1 to 6 of pixel 10200 at pixel address 1X are output to vertical pixel signals 10331 to 10336, and input to column AD 10370. By setting row select signal 10300 to low level, row select signal 10301 to high level, row select signal 10302 to low level, and row select signal 10303 to low level, voltage values of packets 1 to 6 of pixel 10200 at pixel address 21 are output to vertical pixel signals 10311 to 10316, voltage values of packets 1 to 6 of pixel 10200 at pixel address 22 are output to vertical pixel signals 10321 to 10326, and voltage values of packets 1 to 6 of pixel 10200 at pixel address 2X are output to vertical pixel signals 10331 to 10336, and input to column AD 10370. By setting row select signal 10300 to low level, row select signal 10301 to low level, row select signal 10302 to high level, and row select signal 10303 to low level, voltage values of packets 1 to 6 of pixel 10200 at pixel address 31 are output to vertical pixel signals 10311 to 10316, voltage values of packets 1 to 6 of pixel 10200 at pixel address 32 are output to vertical pixel signals 10321 to 10326, and voltage values of packets 1 to 6 of pixel 10200 at pixel address 3X are output to vertical pixel signals 10331 to 10336, and input to column AD 10370. By setting row select signal 10300 to low level, row select signal 10301 to low level, row select signal 10302 to low level, and row select signal 10303 to high level, voltage values of packets 1 to 6 of pixel 10200 at pixel address Y1 are output to vertical pixel signals 10311 to 10316, voltage values of packets 1 to 6 of pixel 10200 at pixel address Y2 are output to vertical pixel signals 10321 to 10326, and voltage values of packets 1 to 6 of pixel 10200 at pixel address YX are output to vertical pixel signals 10331 to 10336, and input to column AD 10370. Column AD 10370 AD-converts the input voltage values of packets 1 to 6 for the X number of pixels into 12-bit signal values, generates a packet 1 signal value resulting from AD-converting packet 1 voltage value, a packet 2 signal value resulting from AD-converting packet 2 voltage value, a packet 3 signal value resulting from AD-converting packet 3 voltage value, a packet 4 signal value resulting from AD-converting packet 4 voltage value, a packet 5 signal value resulting from AD-converting packet 5 voltage value, and a packet 6 signal value resulting from AD-converting packet 6 voltage value for the X number of pixels, and outputs the generated signal values to shift register 10371. Shift register 10371 shifts the input signal values of packets 1 to 6 for the X number of pixels one by one, and outputs the shifted signal values to solid-state image capturer output signal 10130.

Figure 33:
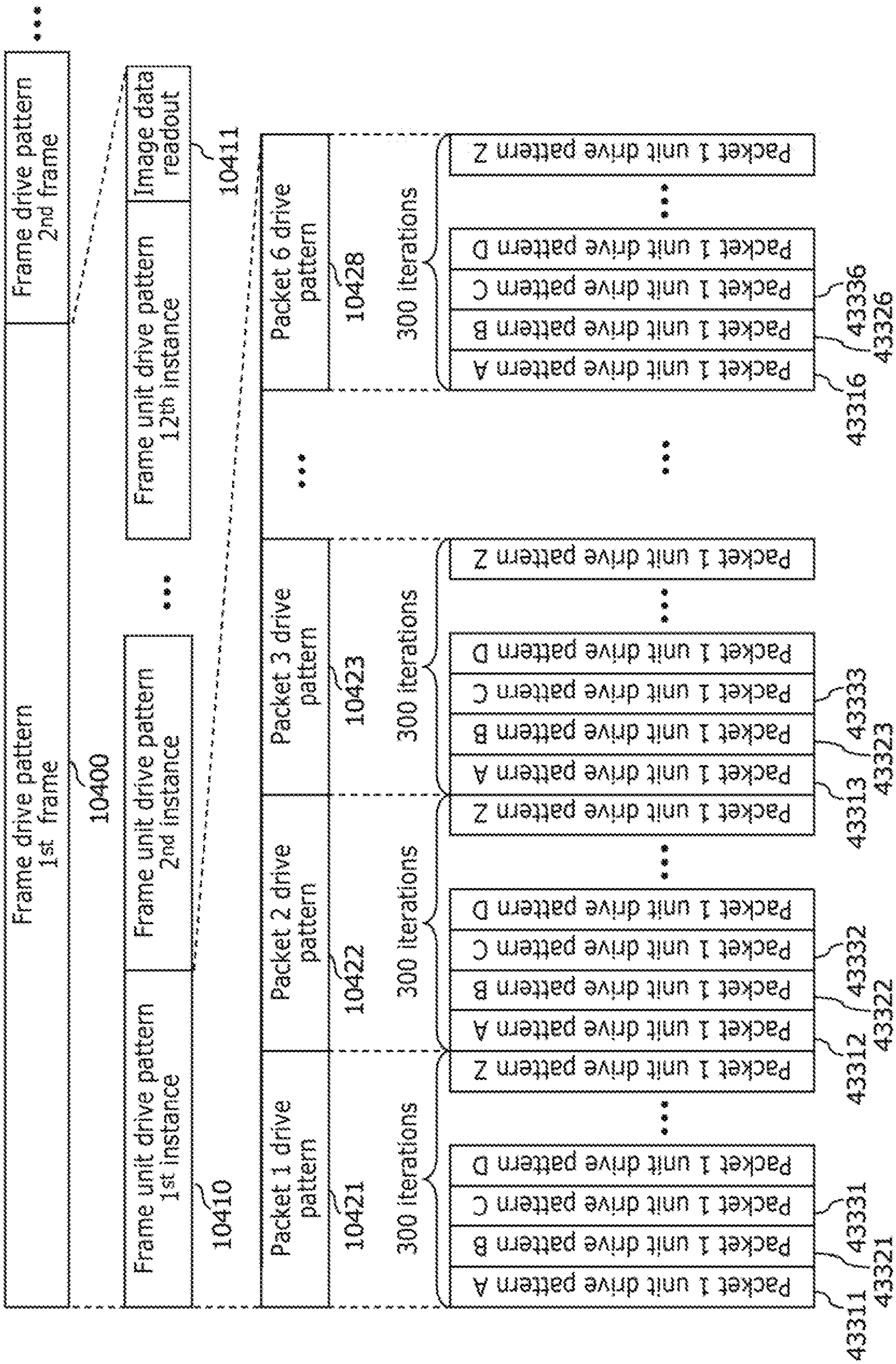
FIG. 33 illustrates a control sequence of a light emitter and a solid-state image capturer according to Embodiment 4.

FIG. 33 illustrates the control sequence of light source 10102 and solid-state image capturer 10105 according to Embodiment 4. In the control sequence illustrated in FIG. 33, as illustrated in FIG. 1, the number of frame unit drive pattern repetitions (12 times), the number of iterations of the unit drive patterns for packets 1 to 6 (300 times), and the switching timing of the unit drive patterns for packets 1 to 6 are instructed to pulse generator 43207 from controller 43206 through the control bus, and emission pulse 10120, exposure pulses 10121 to 10126 of packets 1 to 6, and discharge drive pulse 10127 are generated in pulse generator 43207 according to the number of frame unit drive pattern repetitions, the number of iterations of the unit drive patterns for packets 1 to 6, and the switching timing of the unit drive patterns for packets 1 to 6. In FIG. 33, the generation of unit drive patterns 1 to 282 for packets 1 to 6 is explained, and in FIG. 34, FIG. 35A to FIG. 35F, FIG. 36A to FIG. 36F, and FIG. 37A to FIG. 37F, the method of generation of emission pulse 10120, exposure pulses 10121 to 10126 of packets 1 to 6, and discharge drive pulse 10127 for each of unit drive patterns A43311 to 43316 for packets 1 to 6, unit drive patterns B43321 to 43326 for packets 1 to 6, and unit drive patterns C43331 to 43336 for packets 1 to 6.

As illustrated in FIG. 33, one frame consists of frame drive pattern 10400. Frame drive pattern 10400 consists of 12 repetitions of frame unit drive pattern 10410 and image data readout 10411, which outputs the signal charges accumulated in the signal charge accumulators of all pixels 10200 from solid-state image capturer 10105. Frame unit drive pattern 10410 consists of packet 1 drive pattern 10421, packet 2 drive pattern 10422, packet 3 drive pattern 10423, packet 4 drive pattern 10424, packet 5 drive pattern 10425, and packet 6 drive pattern 10426.

Packet 1 drive pattern 10421 switches between packet 1 unit drive patterns A to Z per iteration, and consists of a total of 300 iterations of packet 1 unit drive patterns A to Z. Packet 2 drive pattern 10422 switches between packet 2 unit drive patterns A to Z per iteration, and consists of a total of 300 iterations of packet 2 unit drive patterns A to Z. Packet 3 drive pattern 10423 switches between packet 3 unit drive patterns A to Z per iteration, and consists of a total of 300 iterations of packet 3 unit drive patterns A to Z. Packet 4 drive pattern 10424 switches between packet 4 unit drive patterns A to Z per iteration, and consists of a total of 300 iterations of packet 4 unit drive patterns A to Z. Packet 5 drive pattern 10425 switches between packet 5 unit drive patterns A to Z per iteration, and consists of a total of 300 iterations of packet 5 unit drive patterns A to Z. Packet 6 drive pattern 10426 switches between packet 6 unit drive patterns A to Z per iteration, and consists of a total of 300 iterations of packet 6 unit drive patterns A to Z. Unit drive patterns A to Z for packets 1 to 6 drive emission pulse 10120, exposure pulses 10121 to 10126 of packets 1 to 6, and discharge drive pulse 10127. The method of generating and the method of switching the unit drive patterns A to Z for packets 1 to 6 will be described later with reference to FIG. 34, FIG. 35A to FIG. 35F, FIG. 36A to FIG. 36F, and FIG. 37A to FIG. 37F. The control sequence of light source 10102 and solid-state image capturer 10105 illustrated in FIG. 33 is merely one non-limiting example.

Unit drive patterns A to Z for packets 1 to 6 are iterated a total of 300 times in drive patterns 10421 to 10426 for packets 1 to 6, and drive patterns 10421 to 10426 for packets 1 to 6 are repeated 12 times via the frame unit drive patterns. Stated differently, the unit drive patterns A to Z for packets 1 to 6 are iterated a total of 300×12=3600 times. By iterating process 3600 times, even though the amount of emission light 10110 emitted each time is small, it is possible to ensure a sufficient amount of light. On the other hand, by dividing frame drive pattern 10400 into 12 frame unit drive patterns 10410, the amount of time required for each frame unit drive pattern 10410 can be shortened and the apparent imaging timing of packets 1 to 6 can be synchronized. By repeating the frame unit drive pattern 10410 12 times, blur caused by target object 10101 moving occurs evenly in packets 1 to 6, making it possible to inhibit side effects such as data corruption during distance calculation caused by target object 10101 moving.

FIG. 34 illustrates generation codes 21701 to 21706 of packets 1 to 6 that are applied to controller 43206 to generate unit drive patterns A to Z for packets 1 to 6 and discharge drive pulse 10127 for controlling solid-state image capturer 10105, as well as segment exposure count 43400 used for switching unit drive patterns A to Z for packets 1 to 6 according to Embodiment 4.

As illustrated in FIG. 34, generation codes 21701 to 21706 of packets 1 to 6 are divided into 31 segments identified by segment numbers 21700 of 0 to 30, and each segment identified by one of segment numbers 21700 has a value of "0" or "1". Generation codes 21701 to 21706 of packets 1 to 6 are information for controlling the driving of exposure pulses 10121 to 10126 of packets 1 to 6. Segment exposure count 43400 specifies the number of times to control the driving of exposure pulses 10121 to 10126 of packets 1 to 6 for each segment number 21700, and it is used as the number of times to control exposure pulses 10121 to 10126 of packets 1 to 6 for each segment number 21700 in pulse generator 43207. By setting segment exposure count 43400 to increase as segment number 21700 increases from 0 (near end) to 30 (far end), the difference in the amount of exposure between the near end and the far end can be reduced, and the entire ranging range from the near end to the far end can be measured.

Unit drive pattern numbers 43401 of A to Z are assigned for each segment exposure count 43400. For example, segments labeled with segment numbers 21700 of 0 to 5, the corresponding segment exposure count 43400 of which is 9, have a unit drive pattern number 43401 of A, segment labeled with segment number 21700 of 6, the corresponding segment exposure count 43400 of which is 12, has a unit drive pattern number 43401 of B, and segment labeled with segment number 21700 of 7, the corresponding segment exposure count 43400 of which is 17, has a unit drive pattern number 43401 of C. When unit drive pattern number 43401 is A, unit drive pattern iteration count 43402 is 9, which is the same as segment exposure count 43400 corresponding to segments labeled with segment numbers 21700 of 0 to 5, when unit drive pattern number 43401 is B, unit drive pattern iteration count 43402 is 12−9=3, where 12 is segment exposure count 43400 corresponding to the segment labeled with segment number 21700 of 6 and 9 is segment exposure count 43400 of segments labeled with segment numbers 21700 of 0 to 5, and when unit drive pattern number 43401 is C, unit drive pattern iteration count 43402 is 17−12=5, where 17 is segment exposure count 43400 corresponding to the segment labeled with segment number 21700 of 7 and 12 is segment exposure count 43400 of the segment labeled with segment number 21700 of 6. With this, unit drive pattern A for packets 1 to 6 is iterated 9 times, unit drive pattern B for packets 1 to 6 is iterated 3 times, and unit drive pattern C for packets 1 to 6 is iterated 5 times, whereby unit drive patterns A to Z are iterated a total of 300 times for each packet. Segment number 21700, generation codes 21701 to 21706 of packets 1 to 6, segment exposure count 43400, unit drive pattern number 43401, and unit drive pattern iteration count 43402 are sent to pulse generator 43207 via the control bus, and pulse generator 43207 generates unit drive patterns A to Z for packets 1 to 6 from segment number 21700, generation codes 21701 to 21706 of packets 1 to 6, unit drive pattern number 43401, and unit drive pattern iteration count 43402. Note that unit drive pattern A for packets 1 to 6 will be described with reference to FIG. 35A to FIG. 35F, unit drive pattern B for packets 1 to 6 will be described with reference to FIG. 36A to FIG. 36F, and unit drive pattern C for packets 1 to 6 will be described with reference to FIG. 37A to FIG. 37F. The generation codes of packets 1 to 6 and the segment exposure count illustrated in FIG. 34 are non-limiting examples.

FIG. 35A to FIG. 35F are timing charts showing packet 1 unit drive pattern A43311, packet 2 unit drive pattern A43312, packet 3 unit drive pattern A43313, packet 4 unit drive pattern A43314, packet 5 unit drive pattern A43315, and packet 6 unit drive pattern A43316 according to Embodiment 4.

As illustrated in FIG. 35A to FIG. 35F, pulse generator 43207 generates unit drive patterns A43311, 43312, 43313, 43314, 43315, and 43316 for packets 1 to 6 by switching segment number 10600 every unit segment (10 ns) for 80 segments from 0 to 79, and using (i) generation codes 21701 to 21706 of packets 1 to 6 with the same segment numbers 10600 and 21700 and (ii) segment number 10600 to control emission pulse 10120, exposure pulses 10121 to 10126 of packets 1 to 6, and discharge drive pulse 10127. The reason why segment numbers 10600 of pulse generator 43207 are set to a value (79) that is twice or more than the maximum value (30) of segment numbers 21700 is to prevent the reception of reflected light 10111 of emission light 10110 that has been reflected by target object 10101 located outside the ranging range (a segment number that is larger than the maximum value of segment numbers 21700). Therefore, in a segment number that does not exist in segment numbers 21700, pulses are generated with emission pulse 10120 at low level, exposure pulses 10121 to 10126 of packets 1 to 6 at low level, and discharge drive pulse 10127 at high level. By controlling solid-state image capturer 10105 in this way, the time required for 12 repetitions of frame unit drive pattern 10410, which corresponds to the imaging exposure time, is 17.28 ms, which is calculated by multiplying the length of the unit segment, 10 ns, the number of segment numbers, 80, the total number of iterations of unit drive patterns A to Z, 300, the number of packets, 6, and the number of frame unit drive pattern repetitions, 12. This unit segment specifies that the pulse width of emission light 10110 and exposure pulses 10121 to 10126 of packets 1 to 6 are the same, and does not limit the pulse width to 10 ns. The following describes a method of controlling emission pulse 10120, exposure pulses 10121 to 10126 of packets 1 to 6, and discharge drive pulse 10127 for segment numbers 0 to 30 included in segment numbers 21700.

Figure 35A:
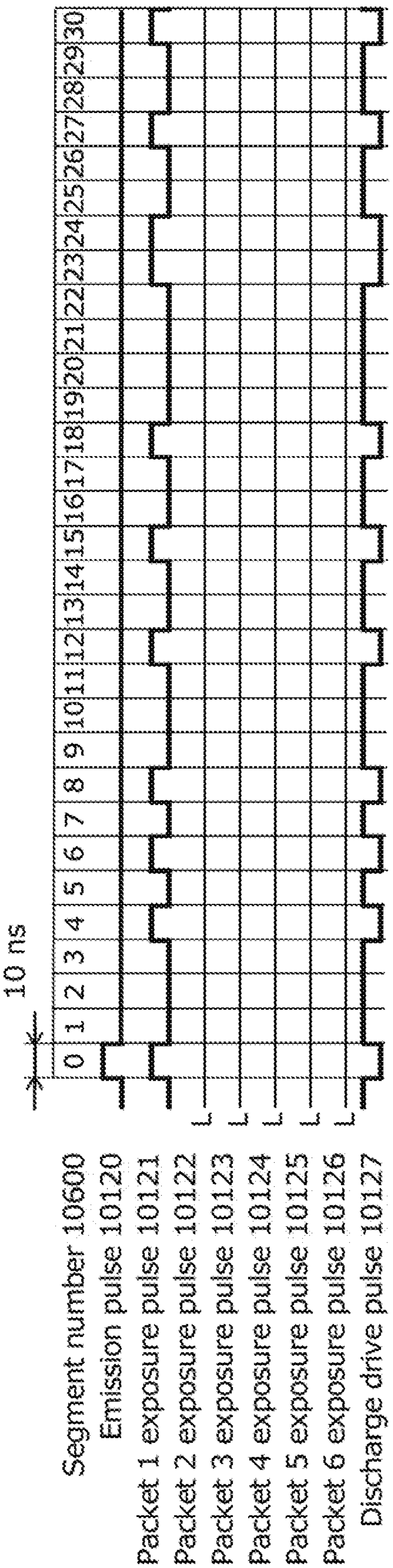
FIG. 35A illustrates the operation timing of packet 1 unit drive pattern A according to Embodiment 4.

FIG. 35A is a timing chart showing packet 1 unit drive pattern A43311. Emission pulse 10120 is generated as high level when segment number 21700 is 0, and low level when segment number 21700 is the remaining 1 to 30. Packet 1 exposure pulse 10121 is generated as high level when packet 1 generation code 21701 corresponding to segment number 21700 is "1" and low level when packet 1 generation code 21701 corresponding to segment number 21700 is "0", and packet 2 exposure pulse 10122, packet 3 exposure pulse 10123, packet 4 exposure pulse 10124, packet 5 exposure pulse 10125, and packet 6 exposure pulse 10126 are generated as low level in all segments, i.e., when segment number 21700 is 0 to 30. Discharge drive pulse 10127 is generated as low level when packet 1 generation code 21701 corresponding to segment number 21700 is "1" and high level when packet 1 generation code 21701 corresponding to segment number 21700 is "0", which results in a pulse whose logic is inverted from that of packet 1 exposure pulse 10121.

Figure 35B:
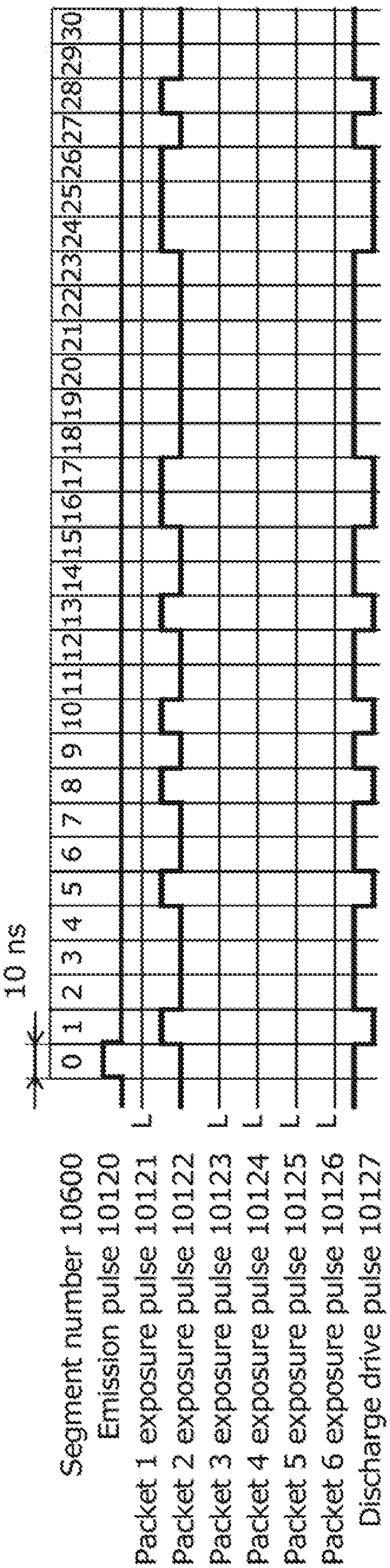
FIG. 35B illustrates the operation timing of packet 2 unit drive pattern A according to Embodiment 4.

FIG. 35B is a timing chart showing packet 2 unit drive pattern A43312. Emission pulse 10120 is generated as high level when segment number 21700 is 0, and low level when segment number 21700 is the remaining 1 to 30. Packet 2 exposure pulse 10122 is generated as high level when packet 2 generation code 21702 corresponding to segment number 21700 is "1" and low level when packet 2 generation code 21702 corresponding to segment number 21700 is "0", and packet 1 exposure pulse 10121, packet 3 exposure pulse 10123, packet 4 exposure pulse 10124, packet 5 exposure pulse 10125, and packet 6 exposure pulse 10126 are generated as low level in all segments, i.e., when segment number 21700 is 0 to 30. Discharge drive pulse 10127 is generated as low level when packet 2 generation code 21702 corresponding to segment number 21700 is "1" and high level when packet 2 generation code 21702 corresponding to segment number 21700 is "0", which results in a pulse whose logic is inverted from that of packet 2 exposure pulse 10122.

Figure 35C:
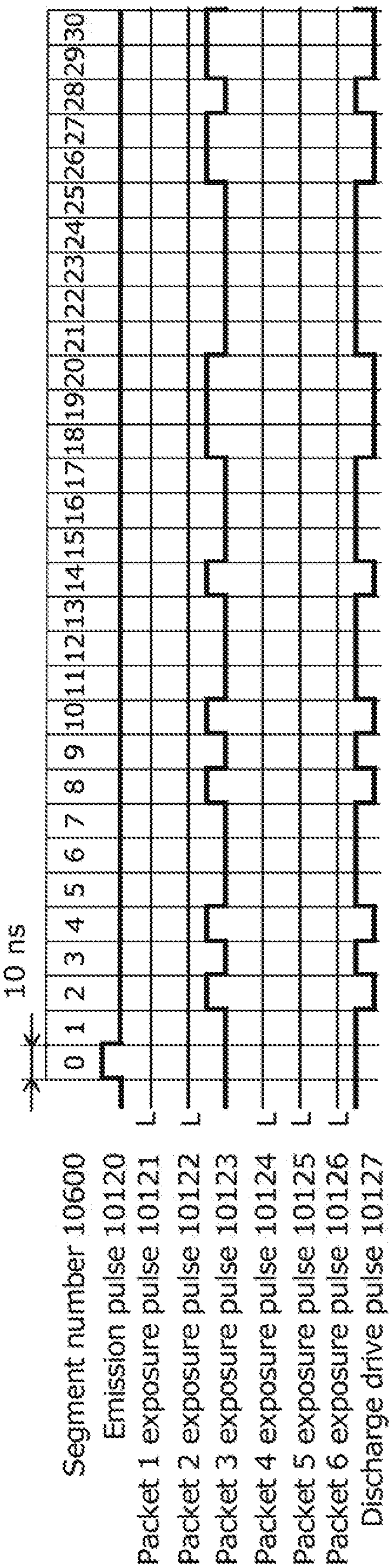
FIG. 35C illustrates the operation timing of packet 3 unit drive pattern A according to Embodiment 4.

FIG. 35C is a timing chart showing packet 3 unit drive pattern A43313. Emission pulse 10120 is generated as high level when segment number 21700 is 0, and low level when segment number 21700 is the remaining 1 to 30. Packet 3 exposure pulse 10123 is generated as high level when packet 3 generation code 21703 corresponding to segment number 21700 is "1" and low level when packet 3 generation code 21703 corresponding to segment number 21700 is "0", and packet 1 exposure pulse 10121, packet 2 exposure pulse 10122, packet 4 exposure pulse 10124, packet 5 exposure pulse 10125, and packet 6 exposure pulse 10126 are generated as low level in all segments, i.e., when segment number 21700 is 0 to 30. Discharge drive pulse 10127 is generated as low level when packet 3 generation code 21703 corresponding to segment number 21700 is "1" and high level when packet 3 generation code 21703 corresponding to segment number 21700 is "0", which results in a pulse whose logic is inverted from that of packet 3 exposure pulse 10123.

Figure 35D:
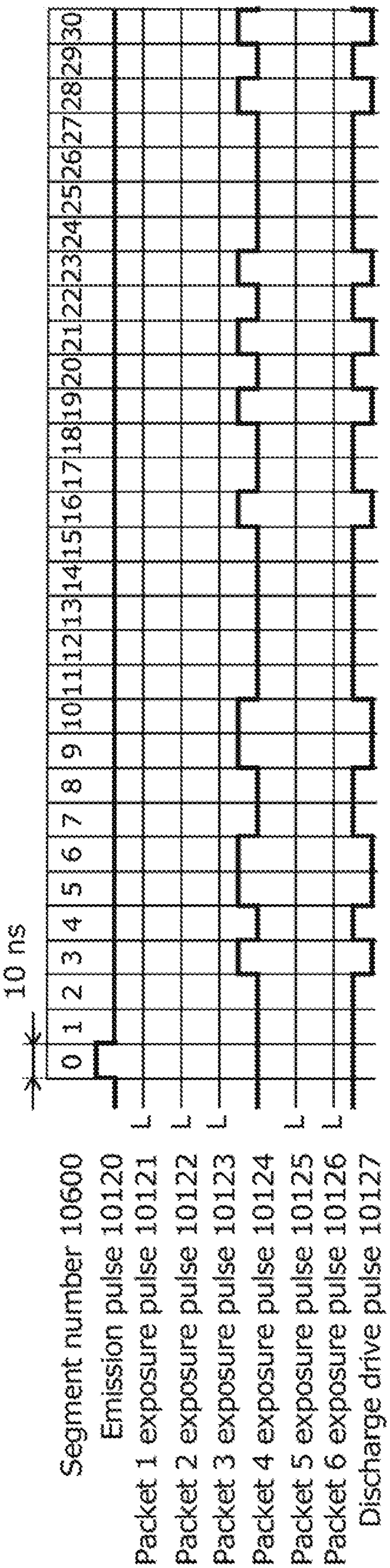
FIG. 35D illustrates the operation timing of packet 4 unit drive pattern A according to Embodiment 4.

FIG. 35D is a timing chart showing packet 4 unit drive pattern A43314. Emission pulse 10120 is generated as high level when segment number 21700 is 0, and low level when segment number 21700 is the remaining 1 to 30. Packet 4 exposure pulse 10124 is generated as high level when packet 4 generation code 21704 corresponding to segment number 21700 is "1" and low level when packet 4 generation code 21704 corresponding to segment number 21700 is "0", and packet 1 exposure pulse 10121, packet 2 exposure pulse 10122, packet 3 exposure pulse 10123, packet 5 exposure pulse 10125, and packet 6 exposure pulse 10126 are generated as low level in all segments, i.e., when segment number 21700 is 0 to 30. Discharge drive pulse 10127 is generated as low level when packet 4 generation code 21704 corresponding to segment number 21700 is "1" and high level when packet 4 generation code 21704 corresponding to segment number 21700 is "0", which results in a pulse whose logic is inverted from that of packet 4 exposure pulse 10124.

Figure 35E:
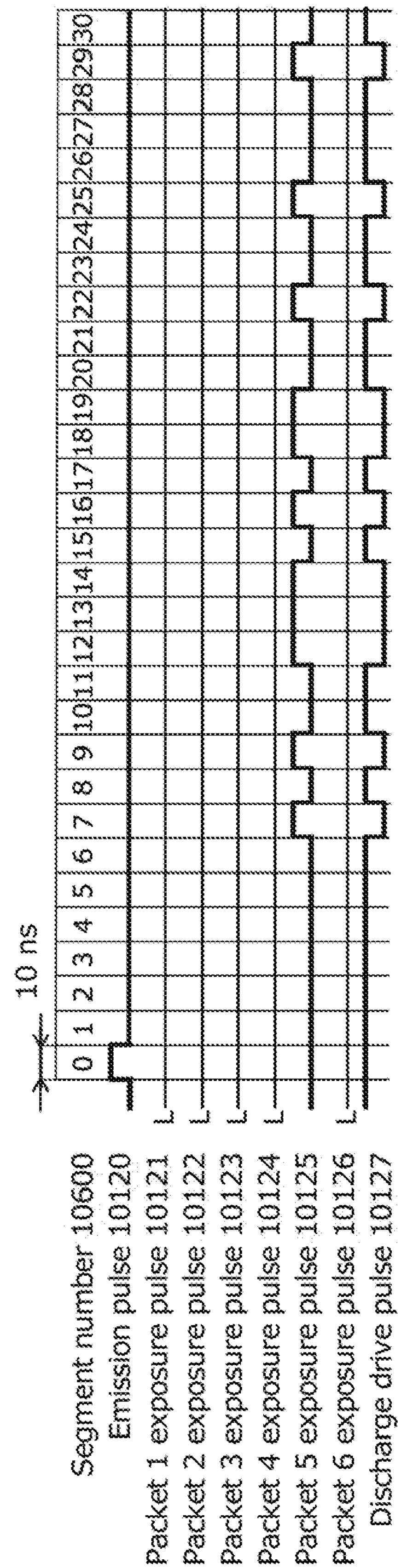
FIG. 35E illustrates the operation timing of packet 5 unit drive pattern A according to Embodiment 4.

FIG. 35E is a timing chart showing packet 5 unit drive pattern A43315. Emission pulse 10120 is generated as high level when segment number 21700 is 0, and low level when segment number 21700 is the remaining 1 to 30. Packet 5 exposure pulse 10125 is generated as high level when packet 5 generation code 21705 corresponding to segment number 21700 is "1" and low level when packet 5 generation code 21705 corresponding to segment number 21700 is "0", and packet 1 exposure pulse 10121, packet 2 exposure pulse 10122, packet 3 exposure pulse 10123, packet 4 exposure pulse 10124, and packet 6 exposure pulse 10126 are generated as low level in all segments, i.e., when segment number 21700 is 0 to 30. Discharge drive pulse 10127 is generated as low level when packet 5 generation code 21705 corresponding to segment number 21700 is "1" and high level when packet 5 generation code 21705 corresponding to segment number 21700 is "0", which results in a pulse whose logic is inverted from that of packet 5 exposure pulse 10125.

Figure 35F:
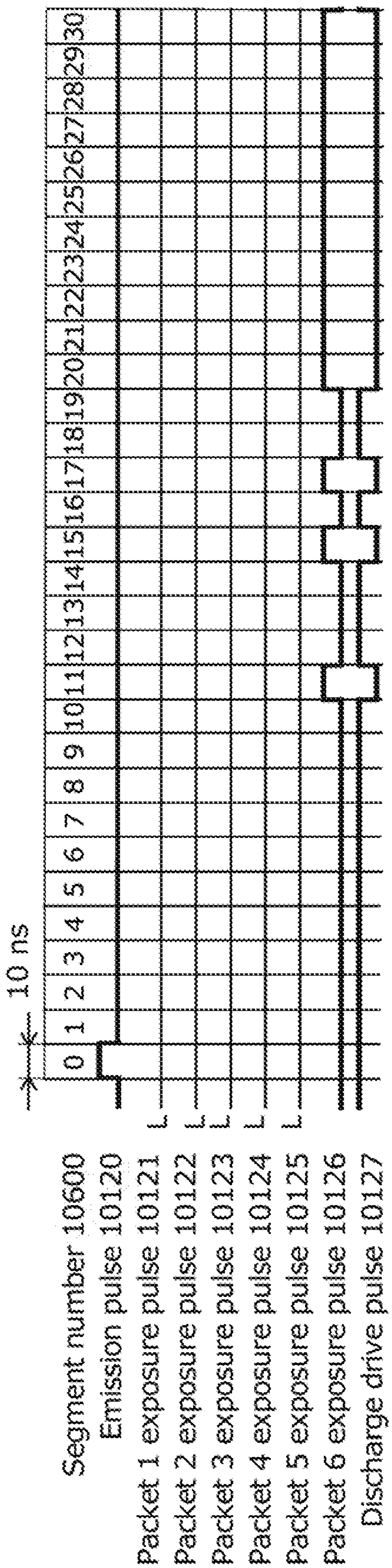
FIG. 35F illustrates the operation timing of packet 6 unit drive pattern A according to Embodiment 4.

FIG. 35F is a timing chart showing packet 6 unit drive pattern A43316. Emission pulse 10120 is generated as high level when segment number 21700 is 0, and low level when segment number 21700 is the remaining 1 to 30. Packet 6 exposure pulse 10126 is generated as high level when packet 6 generation code 21706 corresponding to segment number 21700 is "1" and low level when packet 6 generation code 21706 corresponding to segment number 21700 is "0", and packet 1 exposure pulse 10121, packet 2 exposure pulse 10122, packet 3 exposure pulse 10123, packet 4 exposure pulse 10124, and packet 5 exposure pulse 10125 are generated as low level in all segments, i.e., when segment number 21700 is 0 to 30. Discharge drive pulse 10127 is generated as low level when packet 6 generation code 21706 corresponding to segment number 21700 is "1" and high level when packet 6 generation code 21706 corresponding to segment number 21700 is "0", which results in a pulse whose logic is inverted from that of packet 6 exposure pulse 10126.

FIG. 36A to FIG. 36F are timing charts showing packet 1 unit drive pattern B43321, packet 2 unit drive pattern B43322, packet 3 unit drive pattern B43323, packet 4 unit drive pattern B43324, packet 5 unit drive pattern B43325, and packet 6 unit drive pattern B43326 according to Embodiment 4.

Figure 36A:
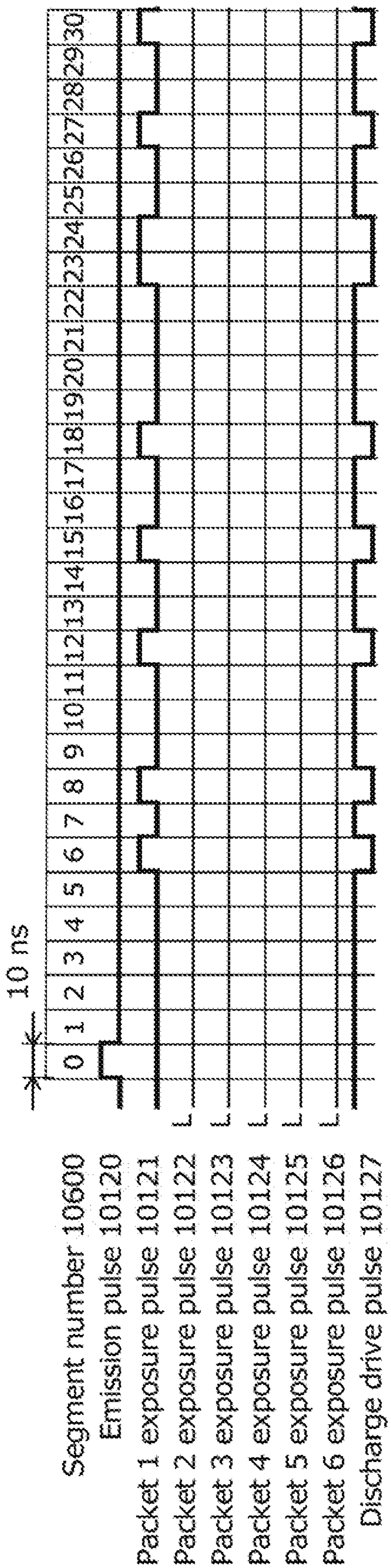
FIG. 36A illustrates the operation timing of packet 1 unit drive pattern B according to Embodiment 4.

FIG. 36A is a timing chart showing packet 1 unit drive pattern B43321. Emission pulse 10120 is generated as high level when segment number 21700 is 0, and low level when segment number 21700 is the remaining 1 to 30. When segment number 21700 is 0 to 5 corresponding to segment exposure count 43400 of 9, which is smaller than segment exposure count 43400 of 12 corresponding to unit drive pattern number 43401 of B, packet 1 exposure pulse 10121 is generated as low level, and when segment number 21700 is 6 to 30 corresponding to segment exposure count 43400 of 12 and up, packet 1 exposure pulse 10121 is generated as high level when packet 1 generation code 21701 corresponding to segment number 21700 is "1" and low level when packet 1 generation code 21701 corresponding to segment number 21700 is "0". Packet 2 exposure pulse 10122, packet 3 exposure pulse 10123, packet 4 exposure pulse 10124, packet 5 exposure pulse 10125, and packet 6 exposure pulse 10126 are generated as low level in all segments, i.e., when segment number 10600 is 0 to 30. When segment number 21700 is 0 to 5 corresponding to segment exposure count 43400 of 9, which is smaller than segment exposure count 43400 of 12 corresponding to unit drive pattern number 43401 of B, discharge drive pulse 10127 is generated as high level, and when segment number 21700 is 6 to 30 corresponding to segment exposure count 43400 of 12 and up, discharge drive pulse 10127 is generated as low level when packet 1 generation code 21701 corresponding to segment number 21700 is "1" and generated as high level when packet 1 generation code 21701 corresponding to segment number 21700 is "0", which results in a pulse whose logic is inverted from that of packet 1 exposure pulse 10121.

Figure 36B:
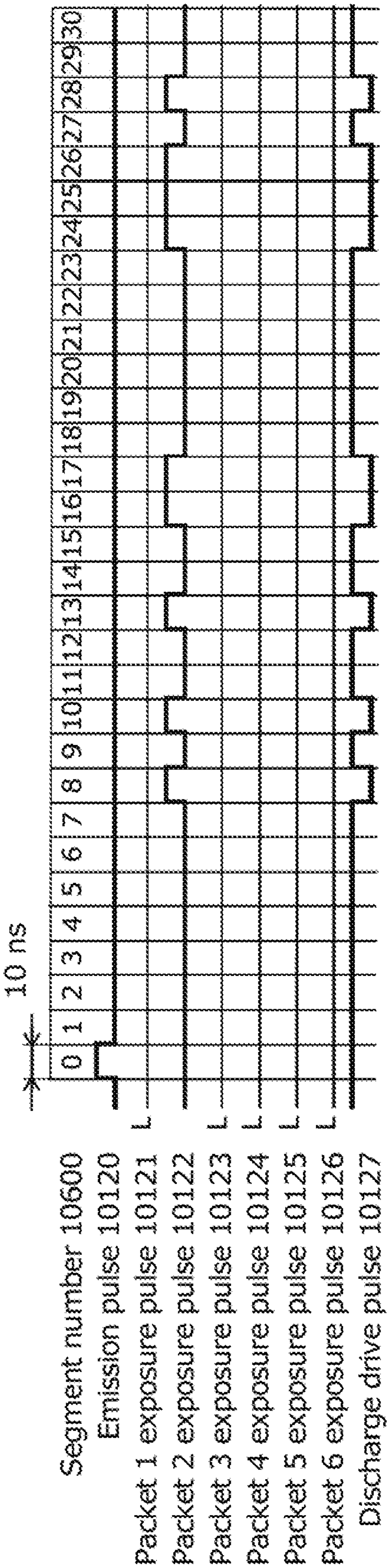
FIG. 36B illustrates the operation timing of packet 2 unit drive pattern B according to Embodiment 4.

FIG. 36B is a timing chart showing packet 2 unit drive pattern B43322. Emission pulse 10120 is generated as high level when segment number 21700 is 0, and low level when segment number 21700 is the remaining 1 to 30. When segment number 21700 is 0 to 5 corresponding to segment exposure count 43400 of 9, which is smaller than segment exposure count 43400 of 12 corresponding to unit drive pattern number 43401 of B, packet 2 exposure pulse 10122 is generated as low level, and when segment number 21700 is 6 to 30 corresponding to segment exposure count 43400 of 12 and up, packet 2 exposure pulse 10122 is generated as high level when packet 2 generation code 21702 corresponding to segment number 21700 is "1" and low level when packet 2 generation code 21702 corresponding to segment number 21700 is "0". Packet 1 exposure pulse 10121, packet 3 exposure pulse 10123, packet 4 exposure pulse 10124, packet 5 exposure pulse 10125, and packet 6 exposure pulse 10126 are generated as low level in all segments, i.e., when segment number 10600 is 0 to 30. When segment number 21700 is 0 to 5 corresponding to segment exposure count 43400 of 9, which is smaller than segment exposure count 43400 of 12 corresponding to unit drive pattern number 43401 of B, discharge drive pulse 10127 is generated as high level, and when segment number 21700 is 6 to 30 corresponding to segment exposure count 43400 of 12 and up, discharge drive pulse 10127 is generated as low level when packet 2 generation code 21702 corresponding to segment number 21700 is "1" and generated as high level when packet 2 generation code 21702 corresponding to segment number 21700 is "0", which results in a pulse whose logic is inverted from that of packet 2 exposure pulse 10122.

Figure 36C:
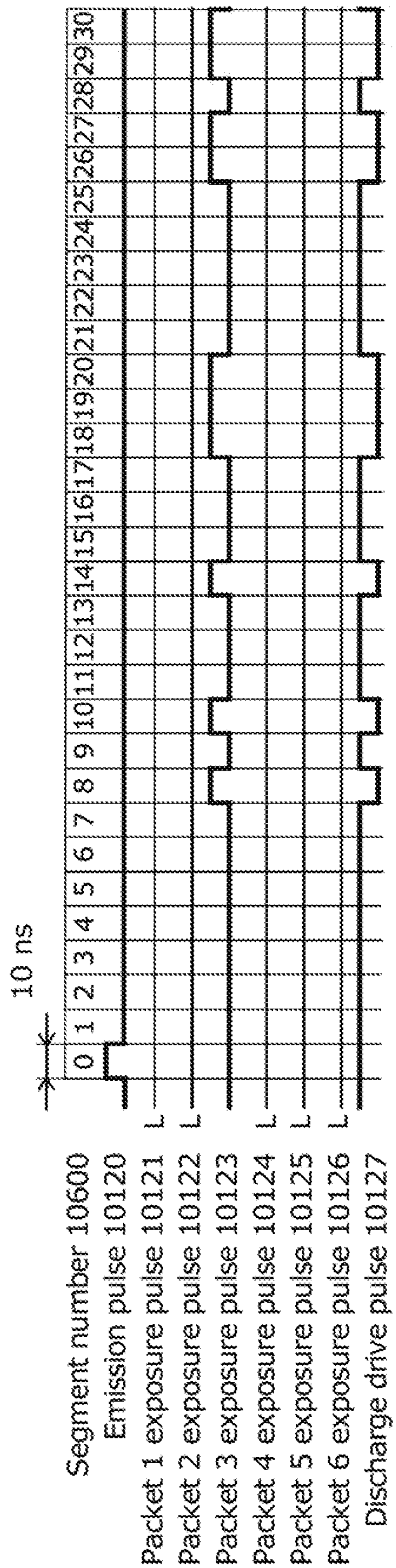
FIG. 36C illustrates the operation timing of packet 3 unit drive pattern B according to Embodiment 4.

FIG. 36C is a timing chart showing packet 3 unit drive pattern B43323. Emission pulse 10120 is generated as high level when segment number 21700 is 0, and low level when segment number 21700 is the remaining 1 to 30. When segment number 21700 is 0 to 5 corresponding to segment exposure count 43400 of 9, which is smaller than segment exposure count 43400 of 12 corresponding to unit drive pattern number 43401 of B, packet 3 exposure pulse 10123 is generated as low level, and when segment number 21700 is 6 to 30 corresponding to segment exposure count 43400 of 12 and up, packet 3 exposure pulse 10123 is generated as high level when packet 3 generation code 21703 corresponding to segment number 21700 is "1" and low level when packet 3 generation code 21703 corresponding to segment number 21700 is "0". Packet 1 exposure pulse 10121, packet 2 exposure pulse 10122, packet 4 exposure pulse 10124, packet 5 exposure pulse 10125, and packet 6 exposure pulse 10126 are generated as low level in all segments, i.e., when segment number 10600 is 0 to 30. When segment number 21700 is 0 to 5 corresponding to segment exposure count 43400 of 9, which is smaller than segment exposure count 43400 of 12 corresponding to unit drive pattern number 43401 of B, discharge drive pulse 10127 is generated as high level, and when segment number 21700 is 6 to 30 corresponding to segment exposure count 43400 of 12 and up, discharge drive pulse 10127 is generated as low level when packet 3 generation code 21703 corresponding to segment number 21700 is "1" and generated as high level when packet 3 generation code 21703 corresponding to segment number 21700 is "0", which results in a pulse whose logic is inverted from that of packet 3 exposure pulse 10123.

Figure 36D:
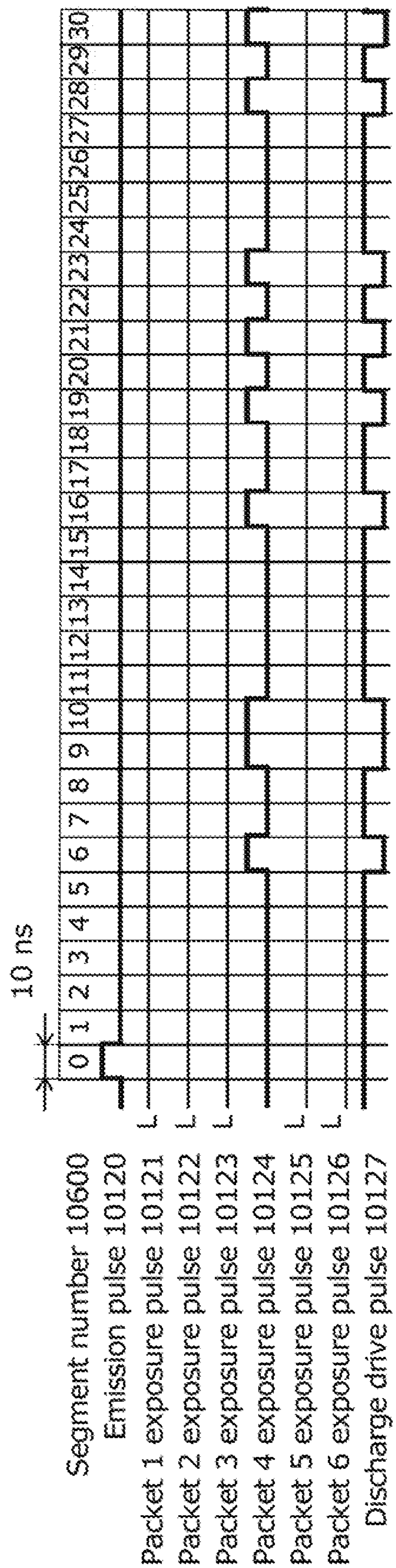
FIG. 36D illustrates the operation timing of packet 4 unit drive pattern B according to Embodiment 4.

FIG. 36D is a timing chart showing packet 4 unit drive pattern B43324. Emission pulse 10120 is generated as high level when segment number 21700 is 0, and low level when segment number 21700 is the remaining 1 to 30. When segment number 21700 is 0 to 5 corresponding to segment exposure count 43400 of 9, which is smaller than segment exposure count 43400 of 12 corresponding to unit drive pattern number 43401 of B, packet 4 exposure pulse 10124 is generated as low level, and when segment number 21700 is 6 to 30 corresponding to segment exposure count 43400 of 12 and up, packet 4 exposure pulse 10124 is generated as high level when packet 4 generation code 21704 corresponding to segment number 21700 is "1" and low level when packet 4 generation code 21704 corresponding to segment number 21700 is "0". Packet 1 exposure pulse 10121, packet 2 exposure pulse 10122, packet 3 exposure pulse 10123, packet 5 exposure pulse 10125, and packet 6 exposure pulse 10126 are generated as low level in all segments, i.e., when segment number 10600 is 0 to 30. When segment number 21700 is 0 to 5 corresponding to segment exposure count 43400 of 9, which is smaller than segment exposure count 43400 of 12 corresponding to unit drive pattern number 43401 of B, discharge drive pulse 10127 is generated as high level, and when segment number 21700 is 6 to 30 corresponding to segment exposure count 43400 of 12 and up, discharge drive pulse 10127 is generated as low level when packet 4 generation code 21704 corresponding to segment number 21700 is "1" and generated as high level when packet 4 generation code 21704 corresponding to segment number 21700 is "0", which results in a pulse whose logic is inverted from that of packet 4 exposure pulse 10124.

Figure 36E:
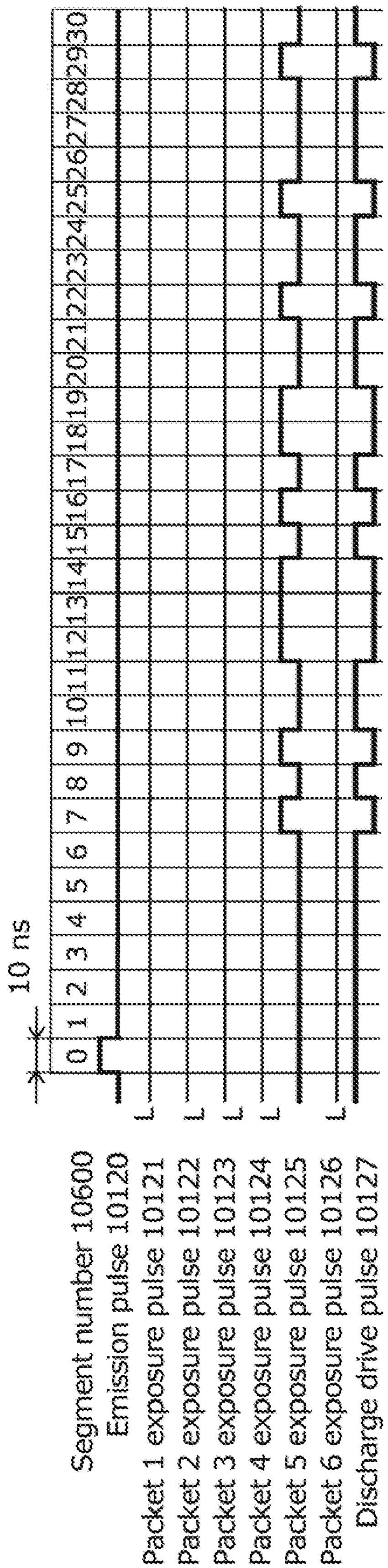
FIG. 36E illustrates the operation timing of packet 5 unit drive pattern B according to Embodiment 4.

FIG. 36E is a timing chart showing packet 5 unit drive pattern B43325. Emission pulse 10120 is generated as high level when segment number 21700 is 0, and low level when segment number 21700 is the remaining 1 to 30. When segment number 21700 is 0 to 5 corresponding to segment exposure count 43400 of 9, which is smaller than segment exposure count 43400 of 12 corresponding to unit drive pattern number 43401 of B, packet 5 exposure pulse 10125 is generated as low level, and when segment number 21700 is 6 to 30 corresponding to segment exposure count 43400 of 12 and up, packet 5 exposure pulse 10125 is generated as high level when packet 5 generation code 21705 corresponding to segment number 21700 is "1" and low level when packet 5 generation code 21705 corresponding to segment number 21700 is "0". Packet 1 exposure pulse 10121, packet 2 exposure pulse 10122, packet 3 exposure pulse 10123, packet 4 exposure pulse 10124, and packet 6 exposure pulse 10126 are generated as low level in all segments, i.e., when segment number 10600 is 0 to 30. When segment number 21700 is 0 to 5 corresponding to segment exposure count 43400 of 9, which is smaller than segment exposure count 43400 of 12 corresponding to unit drive pattern number 43401 of B, discharge drive pulse 10127 is generated as high level, and when segment number 21700 is 6 to 30 corresponding to segment exposure count 43400 of 12 and up, discharge drive pulse 10127 is generated as low level when packet 5 generation code 21705 corresponding to segment number 21700 is "1" and generated as high level when packet 5 generation code 21705 corresponding to segment number 21700 is "0", which results in a pulse whose logic is inverted from that of packet 5 exposure pulse 10125.

Figure 36F:
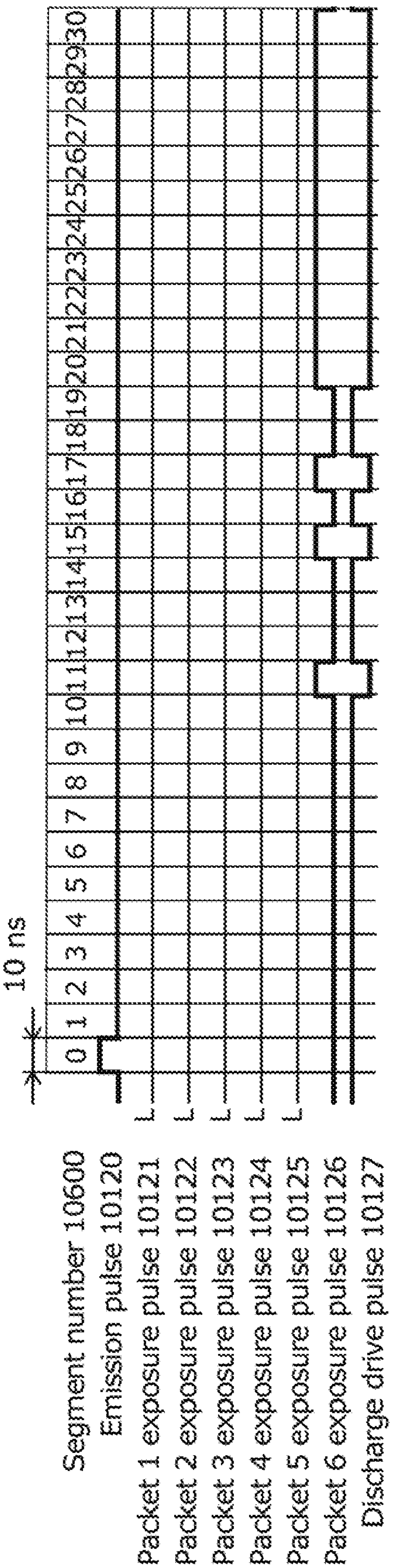
FIG. 36F illustrates the operation timing of packet 6 unit drive pattern B according to Embodiment 4.

FIG. 36F is a timing chart showing packet 6 unit drive pattern B43326. Emission pulse 10120 is generated as high level when segment number 21700 is 0, and low level when segment number 21700 is the remaining 1 to 30. When segment number 21700 is 0 to 5 corresponding to segment exposure count 43400 of 9, which is smaller than segment exposure count 43400 of 12 corresponding to unit drive pattern number 43401 of B, packet 6 exposure pulse 10126 is generated as low level, and when segment number 21700 is 6 to 30 corresponding to segment exposure count 43400 of 12 and up, packet 6 exposure pulse 10126 is generated as high level when packet 6 generation code 21706 corresponding to segment number 21700 is "1" and low level when packet 6 generation code 21706 corresponding to segment number 21700 is "0". Packet 1 exposure pulse 10121, packet 2 exposure pulse 10122, packet 3 exposure pulse 10123, packet 4 exposure pulse 10124, and packet 5 exposure pulse 10125 are generated as low level in all segments, i.e., when segment number 10600 is 0 to 30. When segment number 21700 is 0 to 5 corresponding to segment exposure count 43400 of 9, which is smaller than segment exposure count 43400 of 12 corresponding to unit drive pattern number 43401 of B, discharge drive pulse 10127 is generated as high level, and when segment number 21700 is 6 to 30 corresponding to segment exposure count 43400 of 12 and up, discharge drive pulse 10127 is generated as low level when packet 6 generation code 21706 corresponding to segment number 21700 is "1" and generated as high level when packet 6 generation code 21706 corresponding to segment number 21700 is "0", which results in a pulse whose logic is inverted from that of packet 6 exposure pulse 10126.

FIG. 37A to FIG. 37F are timing charts showing packet 1 unit drive pattern C43331, packet 2 unit drive pattern C43332, packet 3 unit drive pattern C43333, packet 4 unit drive pattern C43334, packet 5 unit drive pattern C43335, and packet 6 unit drive pattern C43336 according to Embodiment 4.

Figure 37A:
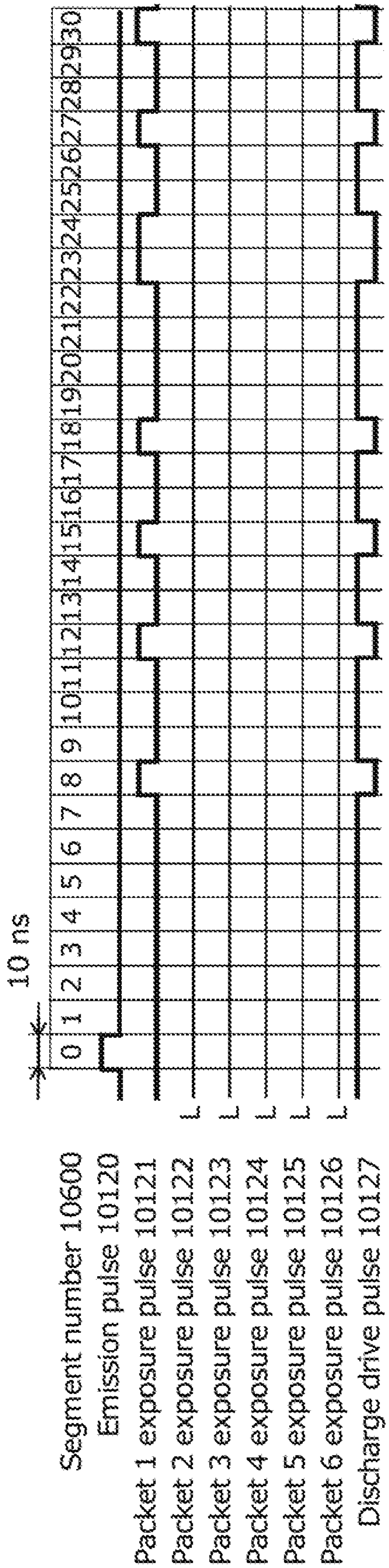
FIG. 37A illustrates the operation timing of packet 1 unit drive pattern C according to Embodiment 4.

FIG. 37A is a timing chart showing packet 1 unit drive pattern C43331. Emission pulse 10120 is generated as high level when segment number 21700 is 0, and low level when segment number 21700 is the remaining 1 to 30. When segment number 21700 is 0 to 6 corresponding to segment exposure counts 43400 of 9 and 12, which is smaller than segment exposure count 43400 of 17 corresponding to unit drive pattern number 43401 of C, packet 1 exposure pulse 10121 is generated as low level, and when segment number 21700 is 7 to 30 corresponding to segment exposure count 43400 of 17 and up, packet 1 exposure pulse 10121 is generated as high level when packet 1 generation code 21701 corresponding to segment number 21700 is "1" and low level when packet 1 generation code 21701 corresponding to segment number 21700 is "0". Packet 2 exposure pulse 10122, packet 3 exposure pulse 10123, packet 4 exposure pulse 10124, packet 5 exposure pulse 10125, and packet 6 exposure pulse 10126 are generated as low level in all segments, i.e., when segment number 10600 is 0 to 30. When segment number 21700 is 0 to 6 corresponding to segment exposure counts 43400 of 9 and 12, which is smaller than segment exposure count 43400 of 17 corresponding to unit drive pattern number 43401 of C, discharge drive pulse 10127 is generated as high level, and when segment number 21700 is 7 to 30 corresponding to segment exposure count 43400 of 17 and up, discharge drive pulse 10127 is generated as low level when packet 1 generation code 21701 corresponding to segment number 21700 is "1" and generated as high level when packet 1 generation code 21701 corresponding to segment number 21700 is "0", which results in a pulse whose logic is inverted from that of packet 1 exposure pulse 10121.

Figure 37B:
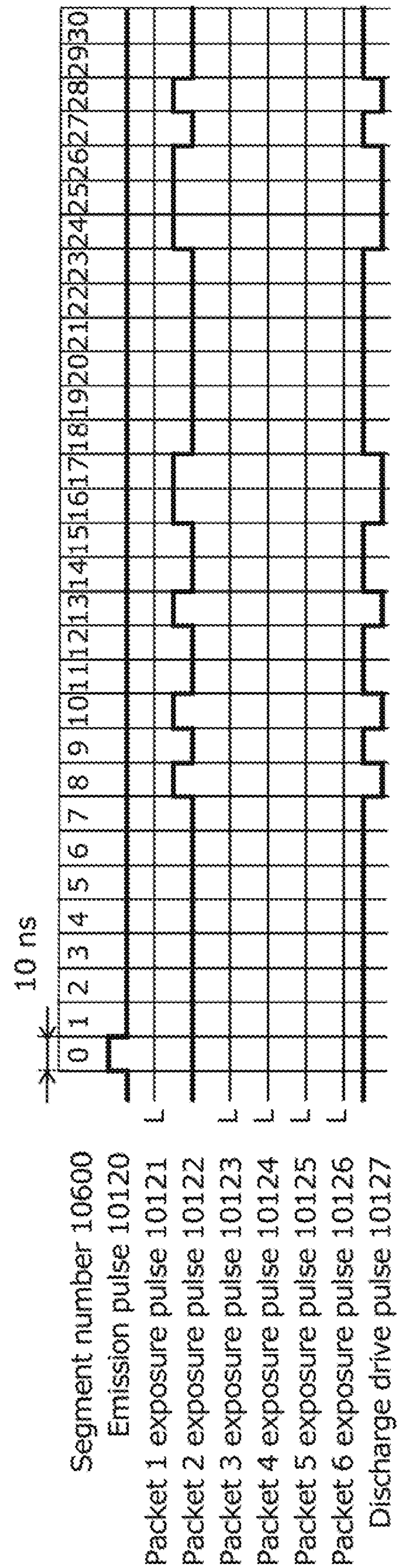
FIG. 37B illustrates the operation timing of packet 2 unit drive pattern C according to Embodiment 4.

FIG. 37B is a timing chart showing packet 2 unit drive pattern C43332. Emission pulse 10120 is generated as high level when segment number 21700 is 0, and low level when segment number 21700 is the remaining 1 to 30. When segment number 21700 is 0 to 6 corresponding to segment exposure counts 43400 of 9 and 12, which is smaller than segment exposure count 43400 of 17 corresponding to unit drive pattern number 43401 of C, packet 2 exposure pulse 10122 is generated as low level, and when segment number 21700 is 7 to 30 corresponding to segment exposure count 43400 of 17 and up, packet 2 exposure pulse 10122 is generated as high level when packet 2 generation code 21702 corresponding to segment number 21700 is "1" and low level when packet 2 generation code 21702 corresponding to segment number 21700 is "0". Packet 1 exposure pulse 10121, packet 3 exposure pulse 10123, packet 4 exposure pulse 10124, packet 5 exposure pulse 10125, and packet 6 exposure pulse 10126 are generated as low level in all segments, i.e., when segment number 10600 is 0 to 30. When segment number 21700 is 0 to 6 corresponding to segment exposure counts 43400 of 9 and 12, which is smaller than segment exposure count 43400 of 17 corresponding to unit drive pattern number 43401 of C, discharge drive pulse 10127 is generated as high level, and when segment number 21700 is 7 to 30 corresponding to segment exposure count 43400 of 17 and up, discharge drive pulse 10127 is generated as low level when packet 2 generation code 21702 corresponding to segment number 21700 is "1" and generated as high level when packet 2 generation code 21702 corresponding to segment number 21700 is "0", which results in a pulse whose logic is inverted from that of packet 2 exposure pulse 10122.

Figure 37C:
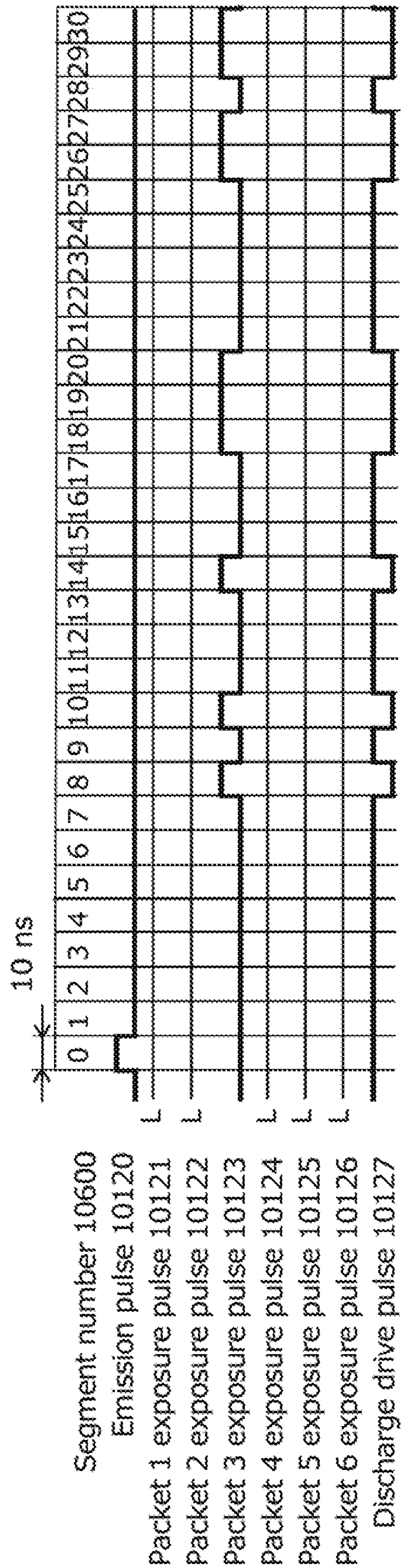
FIG. 37C illustrates the operation timing of packet 3 unit drive pattern C according to Embodiment 4.

FIG. 37C is a timing chart showing packet 3 unit drive pattern C43333. Emission pulse 10120 is generated as high level when segment number 21700 is 0, and low level when segment number 21700 is the remaining 1 to 30. When segment number 21700 is 0 to 6 corresponding to segment exposure counts 43400 of 9 and 12, which is smaller than segment exposure count 43400 of 17 corresponding to unit drive pattern number 43401 of C, packet 3 exposure pulse 10123 is generated as low level, and when segment number 21700 is 7 to 30 corresponding to segment exposure count 43400 of 17 and up, packet 3 exposure pulse 10123 is generated as high level when packet 3 generation code

21703 corresponding to segment number 21700 is “1” and low level when packet 3 generation code 21703 corresponding to segment number 21700 is “0”. Packet 1 exposure pulse 10121, packet 2 exposure pulse 10122, packet 4 exposure pulse 10124, packet 5 exposure pulse 10125, and packet 6 exposure pulse 10126 are generated as low level in all segments, i.e., when segment number 10600 is 0 to 30. When segment number 21700 is 0 to 6 corresponding to segment exposure counts 43400 of 9 and 12, which is smaller than segment exposure count 43400 of 17 corresponding to unit drive pattern number 43401 of C, discharge drive pulse 10127 is generated as high level, and when segment number 21700 is 7 to 30 corresponding to segment exposure count 43400 of 17 and up, discharge drive pulse 10127 is generated as low level when packet 3 generation code 21703 corresponding to segment number 21700 is “1” and generated as high level when packet 3 generation code 21703 corresponding to segment number 21700 is “0”, which results in a pulse whose logic is inverted from that of packet 3 exposure pulse 10123.

Figure 37D:
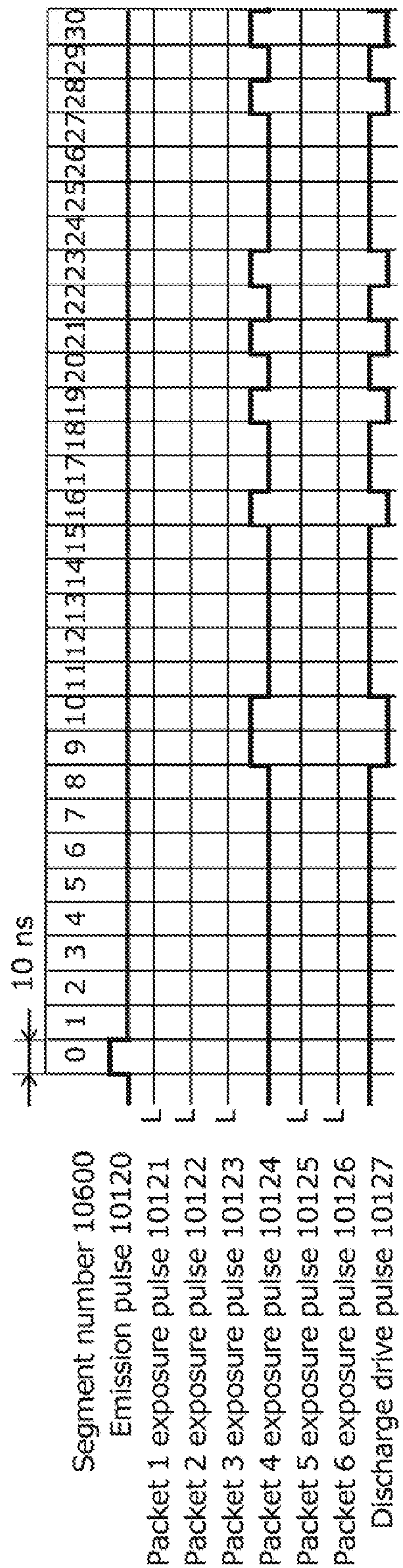
FIG. 37D illustrates the operation timing of packet 4 unit drive pattern C according to Embodiment 4.

FIG. 37D is a timing chart showing packet 4 unit drive pattern C43334. Emission pulse 10120 is generated as high level when segment number 21700 is 0, and low level when segment number 21700 is the remaining 1 to 30. When segment number 21700 is 0 to 6 corresponding to segment exposure counts 43400 of 9 and 12, which is smaller than segment exposure count 43400 of 17 corresponding to unit drive pattern number 43401 of C, packet 4 exposure pulse 10124 is generated as low level, and when segment number 21700 is 7 to 30 corresponding to segment exposure count 43400 of 17 and up, packet 4 exposure pulse 10124 is generated as high level when packet 4 generation code 21704 corresponding to segment number 21700 is “1” and low level when packet 4 generation code 21704 corresponding to segment number 21700 is “0”. Packet 1 exposure pulse 10121, packet 2 exposure pulse 10122, packet 3 exposure pulse 10123, packet 5 exposure pulse 10125, and packet 6 exposure pulse 10126 are generated as low level in all segments, i.e., when segment number 10600 is 0 to 30. When segment number 21700 is 0 to 6 corresponding to segment exposure counts 43400 of 9 and 12, which is smaller than segment exposure count 43400 of 17 corresponding to unit drive pattern number 43401 of C, discharge drive pulse 10127 is generated as high level, and when segment number 21700 is 7 to 30 corresponding to segment exposure count 43400 of 17 and up, discharge drive pulse 10127 is generated as low level when packet 4 generation code 21704 corresponding to segment number 21700 is “1” and generated as high level when packet 4 generation code 21704 corresponding to segment number 21700 is “0”, which results in a pulse whose logic is inverted from that of packet 4 exposure pulse 10124.

Figure 37E:
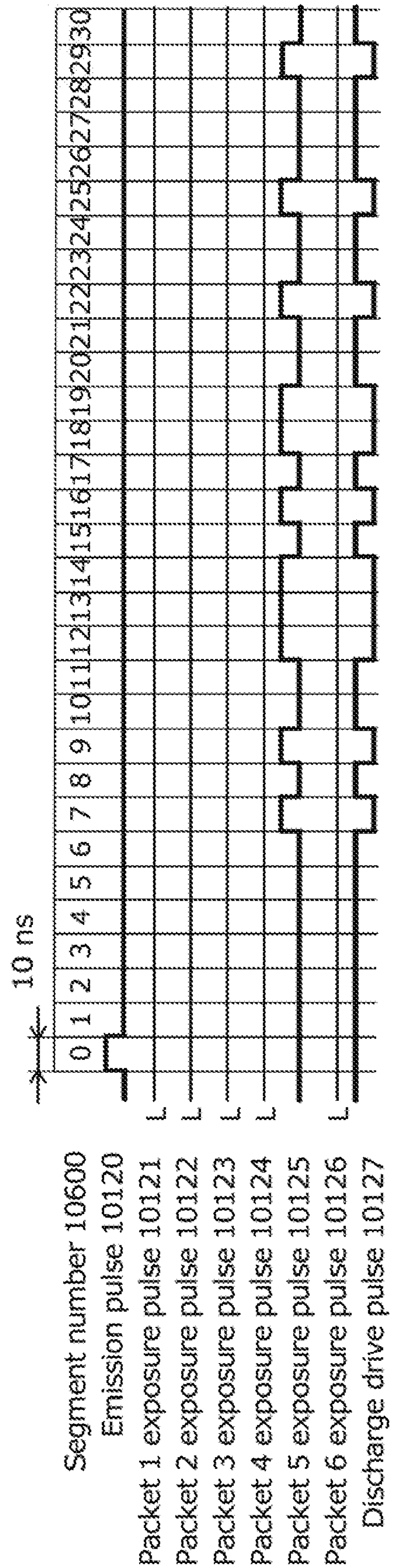
FIG. 37E illustrates the operation timing of packet 5 unit drive pattern C according to Embodiment 4.

FIG. 37E is a timing chart showing packet 5 unit drive pattern C43335. Emission pulse 10120 is generated as high level when segment number 21700 is 0, and low level when segment number 21700 is the remaining 1 to 30. When segment number 21700 is 0 to 6 corresponding to segment exposure counts 43400 of 9 and 12, which is smaller than segment exposure count 43400 of 17 corresponding to unit drive pattern number 43401 of C, packet 5 exposure pulse 10125 is generated as low level, and when segment number 21700 is 7 to 30 corresponding to segment exposure count 43400 of 17 and up, packet 5 exposure pulse 10125 is generated as high level when packet 5 generation code 21705 corresponding to segment number 21700 is “1” and low level when packet 5 generation code 21705 corresponding to segment number 21700 is “0”. Packet 1 exposure pulse 10121, packet 2 exposure pulse 10122, packet 3 exposure pulse 10123, packet 4 exposure pulse 10124, and packet 6 exposure pulse 10126 are generated as low level in all segments, i.e., when segment number 10600 is 0 to 3. When segment number 21700 is 0 to 6 corresponding to segment exposure counts 43400 of 9 and 12, which is smaller than segment exposure count 43400 of 17 corresponding to unit drive pattern number 43401 of C, discharge drive pulse 10127 is generated as high level, and when segment number 21700 is 7 to 30 corresponding to segment exposure count 43400 of 17 and up, discharge drive pulse 10127 is generated as low level when packet 5 generation code 21705 corresponding to segment number 21700 is “1” and generated as high level when packet 5 generation code 21705 corresponding to segment number 21700 is “0”, which results in a pulse whose logic is inverted from that of packet 5 exposure pulse 10125.

Figure 37F:
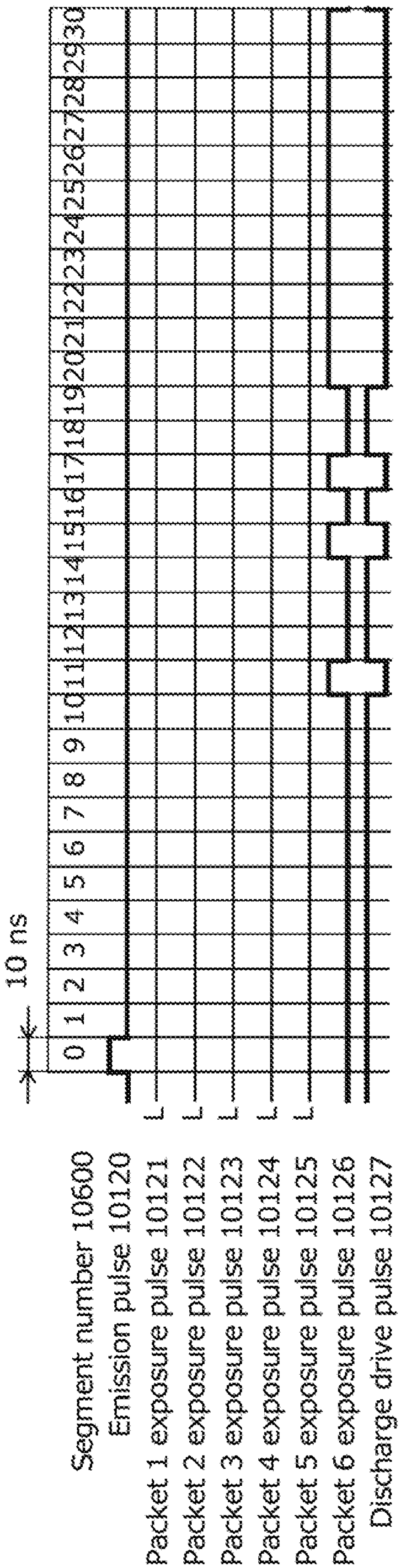
FIG. 37F illustrates the operation timing of packet 6 unit drive pattern C according to Embodiment 4.

FIG. 37F is a timing chart showing packet 6 unit drive pattern C43336. Emission pulse 10120 is generated as high level when segment number 21700 is 0, and low level when segment number 21700 is the remaining 1 to 30. When segment number 21700 is 0 to 6 corresponding to segment exposure counts 43400 of 9 and 12, which is smaller than segment exposure count 43400 of 17 corresponding to unit drive pattern number 43401 of C, packet 6 exposure pulse 10126 is generated as low level, and when segment number 21700 is 7 to 30 corresponding to segment exposure count 43400 of 17 and up, packet 6 exposure pulse 10126 is generated as high level when packet 6 generation code 21706 corresponding to segment number 21700 is “1” and low level when packet 6 generation code 21706 corresponding to segment number 21700 is “0”. Packet 1 exposure pulse 10121, packet 2 exposure pulse 10122, packet 3 exposure pulse 10123, packet 4 exposure pulse 10124, and packet 5 exposure pulse 10125 are generated as low level in all segments, i.e., when segment number 10600 is 0 to 3. When segment number 21700 is 0 to 6 corresponding to segment exposure counts 43400 of 9 and 12, which is smaller than segment exposure count 43400 of 17 corresponding to unit drive pattern number 43401 of C, discharge drive pulse 10127 is generated as high level, and when segment number 21700 is 7 to 30 corresponding to segment exposure count 43400 of 17 and up, discharge drive pulse 10127 is generated as low level when packet 6 generation code 21706 corresponding to segment number 21700 is “1” and generated as high level when packet 6 generation code 21706 corresponding to segment number 21700 is “0”, which results in a pulse whose logic is inverted from that of packet 6 exposure pulse 10126.

FIG. 7 illustrates the timing of image data readout 10411 of solid-state image capturer 10105 according to Embodiments 1 through 4. Row select signals 10300 to 10303, column AD 10370, and shift register 10371 are controlled to output the signal values of packets 1 to 6 of all pixels 10200 illustrated in FIG. 3 to solid-state image capturer output signal 10130. The operation of this image data readout 10411 is the same as that of a normal CMOS image sensor with six times more horizontal pixels.

As illustrated in FIG. 7, at timing 10700, by setting row select signal 10300 to high level, row select signal 10301 to low level, row select signal 10302 to low level, and row select signal 10303 to low level, voltage values of packets 1 to 6 of pixel 10200 at pixel address 11 are output to vertical pixel signals 10311 to 10316, the voltage values of packets 1 to 6 of pixel 10200 at pixel address 12 are output to vertical pixel signals 10321 to 10326, and the voltage values of packets 1 to 6 of pixel 10200 at pixel address 1X are output to vertical pixel signals 10331 to 10336. Vertical pixel signals 10311 to 10316, vertical pixel signals 10321 to 10326, and vertical pixel signals 10331 to 10336 are connected to column AD 10370, these signals are AD-converted into 12-bit signal values, and packet 1 signal value resulting from AD-converting packet 1 voltage value, packet 2 signal value resulting from AD-converting packet 2 voltage value, packet 3 signal value resulting from AD-converting packet 3 voltage value, packet 4 signal value resulting from AD-converting packet 4 voltage value, packet 5 signal value resulting from AD-converting packet 5 voltage value, and packet 6 signal value resulting from AD-converting packet 6 voltage value of pixel address 11, pixel address 12, and pixel address 1X are generated. At timing 10701, which is the timing of completion of the AD conversions, the AD-converted signal values of packets 1 to 6 of pixel address 11, pixel address 12, and pixel address 1X are output to shift register 10371. While shifting the input signal value, shift register 10371 outputs, from solid-state image capturer output signal 10130, in stated order: packet 1 signal value of pixel address 11, packet 2 signal value of pixel address 11, packet 3 signal value of pixel address 11, packet 4 signal value of pixel address 11, packet 5 signal value of pixel address 11, packet 6 signal value of pixel address 11, packet 1 signal value of pixel address 12, packet 2 signal value of pixel address 12, packet 3 signal value of pixel address 12, packet 4 signal value of pixel address 12, packet 5 signal value of pixel address 12, packet 6 signal value of pixel address 12, packet 1 signal value of pixel address 1X 1 signal value, packet 2 signal value at pixel address 1X, packet 3 signal value at pixel address 1X, packet 4 signal value at pixel address 1X, packet 5 signal value at pixel address 1X, and packet 6 signal value at pixel address 1X. Also, at timing 10701, row select signal 10300 is set to low level, row select signal 10301 is set to high level, row select signal 10302 is set to low level, and row select signal 10303 is set to low level, the voltage values of packets 1 to 6 of pixel 10200 at pixel address 21, the voltage values of packets 1 to 6 of pixel 10200 at pixel address 22, and the voltage values of packets 1 to 6 of pixel 10200 at pixel address 2X are input to column AD 10370, and AD conversion to 12-bit signal values is performed. At timing 10702, which is the timing of the completion of the AD conversions by column AD 10370 and the shift operation of shift register 10371 started at timing 10701, the results of the AD conversions by column AD 10370 started at timing 10701 are output to shift register 10371, and the input signal values are shifted and output from solid-state image capturer output signal 10130 in the same manner as described above. At timing 10702, row select signal 10300 is set to low level, row select signal 10301 is set to low level, row select signal 10302 is set to high level, and row select signal 10303 is set to low level, the voltage values of packets 1 to 6 of pixel 10200 at pixel address 31, the voltage values of packets 1 to 6 of pixel 10200 at pixel address 32, and the voltage values of packets 1 to 6 of pixel 10200 at pixel address 3X are input to column AD 10370, and AD conversion to 12-bit signal values is performed in the same manner as described above. By performing this operation for all rows, the signal values of all pixels 10200 are output from solid-state image capturer output signal 10130. Although six FDAs 10211 to 10216 are exemplified in FIG. 2 and six generation codes 21701 to 21706 of packets 1 to 6 are exemplified in FIG. 34, the number is not limited to six. If the number of signal charge accumulators is greater than the number of packet generation codes, it is possible to obtain the signal values of packets 1 to 6 in one frame, and thus calculate the segment number corresponding to the distance using the data of a single frame. If the number of signal charge accumulators is greater than the number of packet generation codes, it is possible to calculate the segment number corresponding to the distance by obtaining the signal values of packets 1 to 6 using the data of a plurality of frames. The time required for image data readout 10411, which corresponds to the imaging readout time, is calculated by dividing the number of pixels taking into account the blanking interval, which is calculated as (number of horizontal pixels X320+horizontal blanking interval 80)×(number of vertical pixels Y240+vertical blanking interval 23), by the output clock frequency of solid-state image capturer output signal 10130. If the output clock frequency is 39.319 MHz, the time required for image data readout 10411, which corresponds to the imaging readout time, is 16.053 ms.

Figure 38:
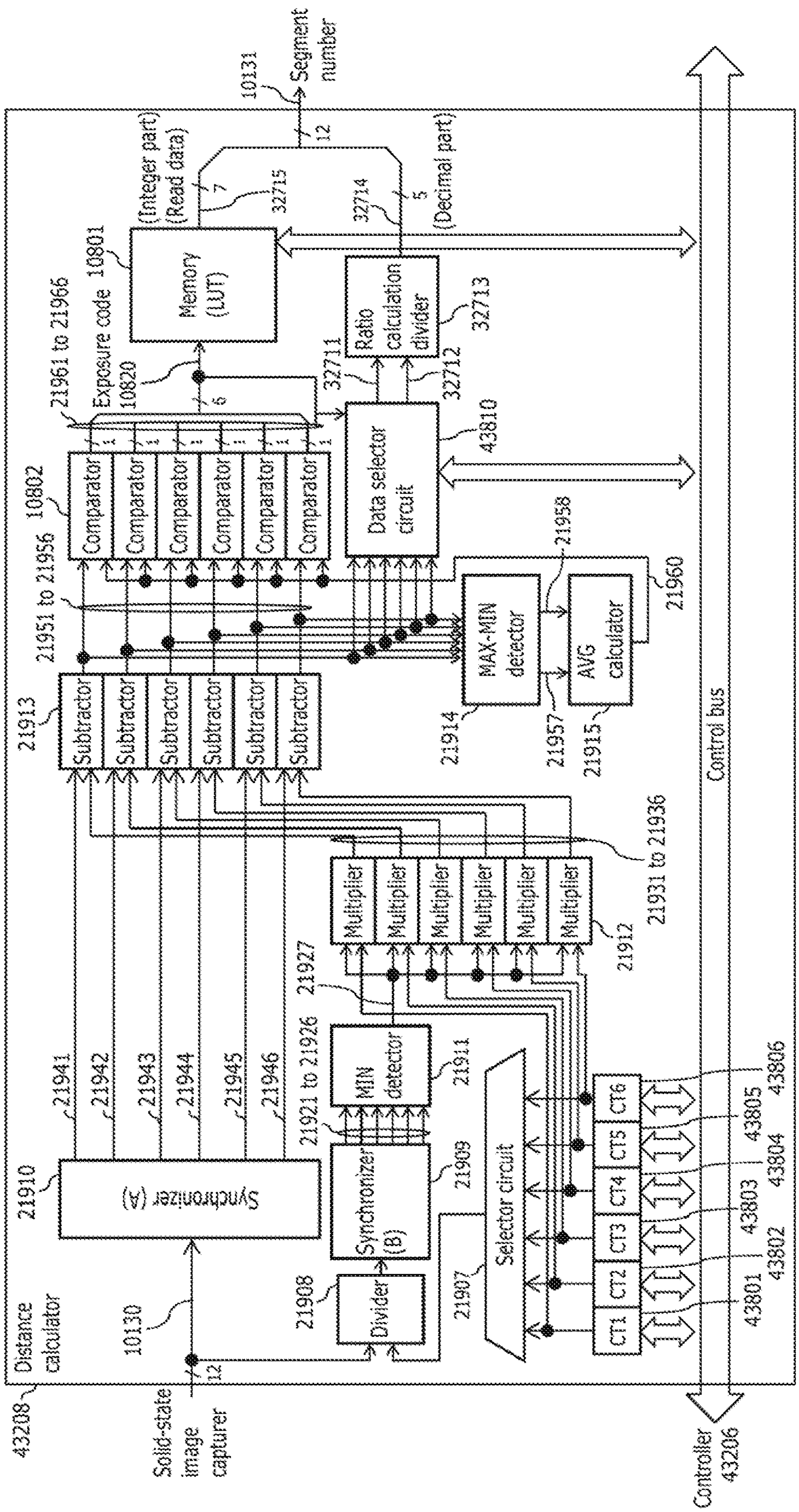
FIG. 38 is illustrates a configuration of a distance calculator according to Embodiment 4.

FIG. 38 illustrates a configuration of distance calculator 43208 according to Embodiment 4. As illustrated in FIG. 38, distance calculator 43208 includes: exposure counts 43801 to 43806 of packets 1 to 6 controlled by controller 43206 via a control bus; memory (LUT) 10801 controlled by controller 43206 via the control bus; data selection 32710 controlled by controller 43206 via the control bus; selector circuit 21907 that selects exposure counts 43801 to 43806 of packets 1 to 6; divider 21908 that performs division of solid-state image capturer output signal 10130 and the output signal from selector circuit 21907; synchronizer (B) 21909 that synchronizes the output signal of divider 21908 for each pixel address; MIN detector 21911 that detects a minimum value from among synchronizer (B) output signals 21921 to 21926; multiplier 21912 that multiplies MIN detector output signal 21927 and exposure counts 43801 to 43806 of packets 1 to 6; synchronizer (A) 21910 that synchronizes solid-state image capturer output signal 10130 for each pixel address; subtractor 21913 that performs subtraction of synchronizer (A) output signals 21941 to 21946 and multiplier output signals 21931 to 21936; MAX-MIN detector 21914 that detects a maximum value and a minimum value from among subtraction signals 21951 to 21956; AVG calculator 21915 that calculates an average value of maximum value signal 21957 and minimum value signal 21958 output from the MAX-MIN detector to generate threshold signal 21960; comparator 10802 that compares subtraction signals 21951 to 21956 with threshold signal 21960; data selection 32710 that selects data of subtraction signals 21951 to 21956; and ratio calculation divider 32713 that calculates the ratio of two-unit-segment reflected light 32712 and one-unit-segment reflected light 32711 output from data selection 32710. Next, the operation of distance calculator 43208 will be described. In brief summary, this is a method for improving ranging accuracy by identifying segment numbers (integer parts) 32715 where reflected light 10111 returned in the same manner as in Embodiment 2, and further, when reflected light 10111 is returned across two adjacent unit segments, using the ratio between (i) two-unit-segment reflected light 32712 corresponding to the amount of light of reflected light 10111 that returned to the two adjacent unit segments and (ii) one-unit-segment reflected light 32711 corresponding to the amount of reflected light 10111 that returned to the farther (far end) one of the two adjacent unit segments from emission pulse 10120 to calculate segment numbers (decimal parts) 32714 of further divided unit segments. Note that the explanation will be based on the assumption that the signal values of packets 1 to 6 of solid-state image capturer output signal 10130 include at least one packet that does not include reflected light 10111 and at least one packet that does include reflected light 10111. How to realize this constraint will be explained with reference to FIG. 39.

First, the method of calculating segment number (integer part) 32715 will be explained. Solid-state image capturer output signal 10130 is synchronized in synchronizer (A) 21910 with the signal values of packets 1 to 6 for each pixel address, which generates synchronizer (A) output signals 21941 to 21946. Since the number of times that exposure pulses 10121 to 10126 of packets 1 to 6 become high level is different for each signal value of packets 1 to 6 in solid-state image capturer output signal 10130, in order to equalize the amount of reflected background light 21511 included in the signal values of packets 1 to 6, for each signal value of packets 1 to 6, exposure counts 43801 to 43806 of packets 1 to 6 are selected by selector circuit 21907, divided by divider 21908, and input to synchronizer (B) 21909. The method of generating exposure counts 43801 to 43806 of packets 1 to 6 will be explained later with reference to FIG. 39. The synchronizer (B) synchronizes the output signal of divider 21908 for each pixel address and outputs the result to MIN detector 21911. MIN detector 21911 estimates a signal value corresponding to the amount of reflected background light 21511 by detecting the minimum value of synchronizer (B) output signals 21921 to 21926, and generates MIN detector output signal 21927. MIN detector output signal 21927 is multiplied by exposure counts 43801 to 43806 of packets 1 to 6 in multiplier 21912, thereby generating multiplier output signals 21931 to 21936, which are the signal values corresponding to the amount of reflected background light 21511 included in each signal value of packets 1 to 6. Subtractor 21913 performs subtraction of synchronizer (A) output signals 21941 to 21946 and multiplier output signals 21931 to 21936 to generate subtraction signals 21951 to 21956 removed of the reflected background light 21511 component that is included in the signal values of packets 1 to 6. MAX-MIN detector 21914 generates maximum value signal 21957 and minimum value signal 21958 of subtraction signals 21951 to 21956. Here, since the signal values of packets 1 to 6 of solid-state image capturer output signal 10130 include at least one packet that does not include reflected light 10111 and at least one packet that does include reflected light 10111, maximum value signal 21957 is a signal value corresponding to the amount of reflected light 10111 and minimum value signal 21958 is black level value. AVG calculator 21915 generates an average value of maximum value signal 21957 and minimum value signal 21958 to generate threshold signal 21960, which is a threshold for detecting packets that include reflected light 10111 and packets that do not include reflected light 10111. Comparator 10802 compares threshold signal 21960, which is the average value of maximum value signal 21957 and minimum value signal 21958, with subtraction signals 21951 to 21956 to reduce variations caused by the dark current of photoelectric conversion pixel 10201 and FDAs 10211 to 10216 and reduce shot noise, which makes it possible to yield a comparison result of "1" by comparator 10802 for subtraction signals 21951 to 21956 that include reflected light 10111 and a comparison result of "0" by comparator 10802 for subtraction signals 21951 to 21956 that do not include reflected light 10111. Therefore, exposure code 10820, which is the bitwise concatenation of comparator output signals 21961 to 21966, indicates packets that include reflected light 10111. Exposure code 10820 is then used as a read address to access memory (LUT) 10801, and the read data of memory (LUT) 10801 becomes segment number (integer part) 32715. The initial values of memory (LUT) 10801 are set from controller 43206 via the control bus. The method of generating the initial values to be set in memory (LUT) 10801 will be explained with reference to FIG. 39.

Next, the method of calculating segment number (decimal part) 32714 will be explained. In Embodiment 2, when reflected light 10111 returned across two adjacent segment numbers 21700, the specific timing of the return of reflected light 10111 is not known, so it is assumed that the reflected light 10111 returned in the middle of two adjacent segments, and so the average of the two adjacent segment numbers is used to reduce the maximum error to half of the segment, but ranging accuracy is improved by calculating segment number (decimal part) 32714 obtained by further dividing the unit segment, using the ratio between (i) two-unit-segment reflected light 32712 corresponding to the amount of light of reflected light 10111 that returned to the two adjacent unit segments and (ii) one-unit-segment reflected light 32711 corresponding to the amount of reflected light 10111 that returned to the farther (far end) one of the two adjacent unit segments from emission pulse 10120 (i.e., by using one-unit-segment reflected light 32711÷two-unit-segment reflected light 32712). For example, if reflected light 10111 begins to return 2.5 ns after the beginning of a given unit segment, reflected light 10111 will occupy 7.5 ns of the closer (near end) one of the two adjacent segments to emission pulse 10120 and 2.5 ns of the farther (far end) one of two adjacent unit segments from emission pulse 10120. Here, theoretically, a proportional relationship can be established in which one-unit-segment reflected light 32711 is "0.25" if two-unit-segment reflected light 32712 is "1", and thus it is possible to calculate the delay time from the start of the unit segment time until the reflected light 10111 starts to return as 10 ns (=unit segment length)×0.25=2.5 ns. This ranging device outputs the segment number corresponding to the distance. The time difference between the generation of emission light 10110 and the return of reflected light 10111 can be calculated by multiplying the segment number where reflected light 10111 returned by the length of the unit segment. Accordingly by using the quotient of one-unit-segment reflected light 32711÷two-unit-segment reflected light 32712 as segment number (decimal part) 32714, it is possible to improve ranging accuracy. One-unit-segment reflected light 32711 and two-unit-segment reflected light 32712 are generated in data selection 43810 using subtraction signals 21951 to 21956, and divided in ratio calculation divider 32713 to generate segment number (decimal part) 32714. Data selection 43810 will be described in greater detail later with reference to FIG. 40A to FIG. 40D.

Finally, segment number (integer part) 32715 and segment number (decimal part) 32714 are bitwise concatenated to generate segment number signal 10131.

Figure 39:
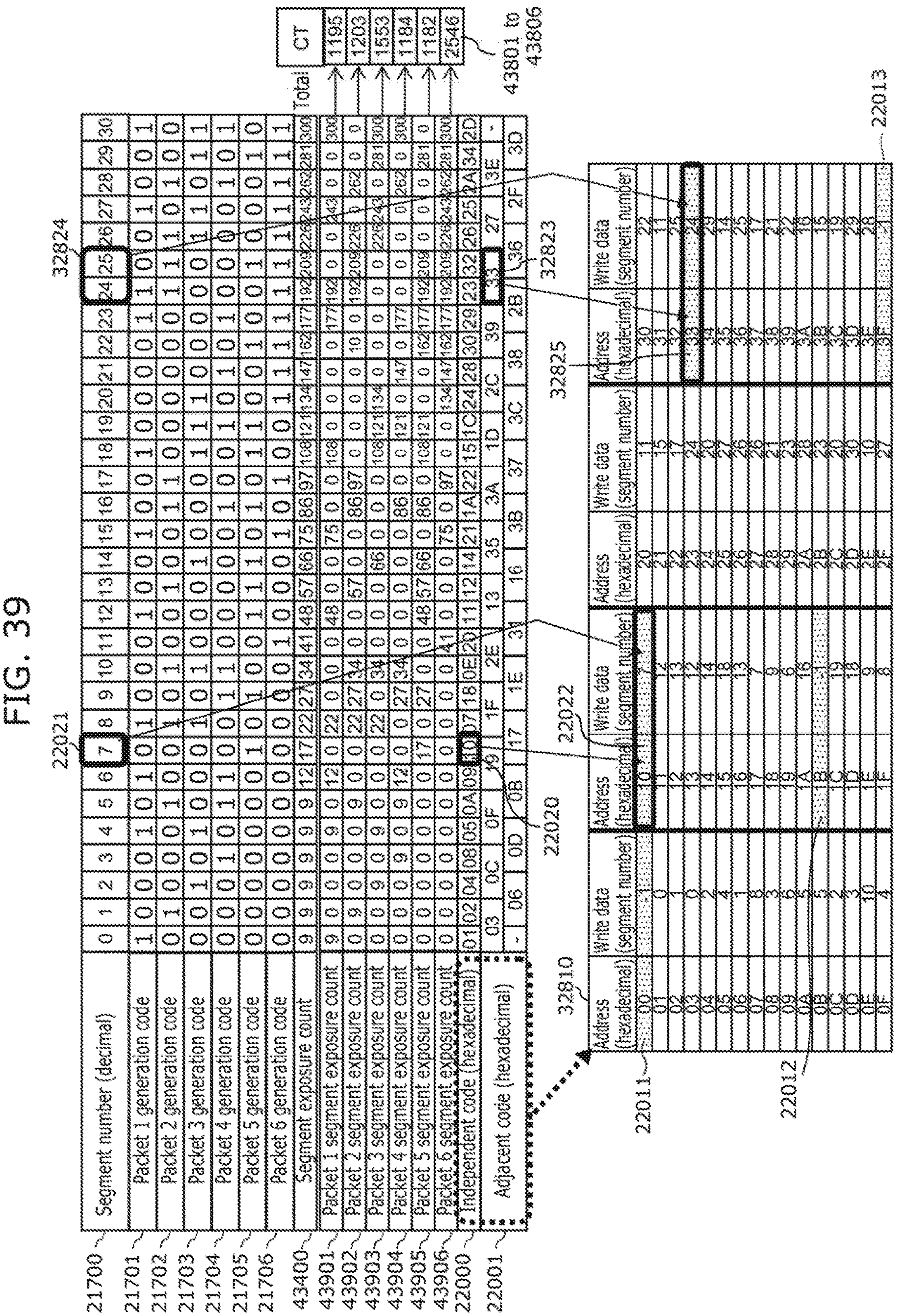
FIG. 39 illustrates data for storing generation codes of packets 1 to 6 of FIG. 34 in memory (LUT) in a distance calculator according to Embodiment 4.

FIG. 39 illustrates the method of generating the initial values of exposure counts 43801 to 43806 of packets 1 to 6 and memory (LUT) 10801 according to Embodiment 4. As illustrated in FIG. 39, the initial values of exposure counts 43801 to 43806 of packets 1 to 6 and memory (LUT) 10801 are generated from segment numbers 21700 and generation codes 21701 to 21706 of packets 1 to 6 to generate unit drive patterns 22231 to 22236 for packets 1 to 6, which control light source 10102 and solid-state image capturer 10105.

First, the method of calculating exposure counts 43801 to 43806 of packets 1 to 6 will be explained. The amount of reflected background light 21511 included in the signal values of packets 1 to 6 is proportional to the number of times exposure pulses 10121 to 10126 of packets 1 to 6 are set to high level (the exposure count). Accordingly, controller 43206 generates segment exposure counts 43901 to

43906 for packets 1 to 6 by calculating, for each generation code of packets 1 to 6, segment exposure count 43400 of segments among all segment numbers 21700 in which the generation code of the packet is "1". Note that segment exposure counts 43901 to 43906 of packets 1 to 6 of segments in which the generation code of packets 1 to 6 is "0" are "0". For each packet, exposure counts 43801 to 43806 of packets 1 to 6 are generated by calculating the sum of segment exposure counts 43901 to 43906 of packets 1 to 6.

Next, the method of generating the initial values for memory (LUT) 10801 will be explained. Controller 43206 generates each independent code 22000 as a 6-bit binary number, where packet 1 generation code 21701 is bit 0, packet 2 generation code 21702 is bit 1, packet 3 generation code 21703 is bit 2, packet 4 generation code 21704 is bit 3, packet 5 generation code 21705 is bit 4, and packet 6 generation code 21706 is bit 5. For example, independent code 22020 of segment number 21700 of 7, which is labeled 22021, is a 6-bit binary number where packet 1 generation code 21701 of "0" at segment number 21700 of 7 is bit 0, packet 2 generation code 21702 of "0" at segment number 21700 of 7 is bit 1, packet 3 generation code 21703 of "0" at segment number 21700 of 7 is bit 2, packet 4 generation code 21704 of "0" at segment number 21700 of 7 is bit 3, packet 5 generation code 21705 of "1" at segment number 21700 of 7 is bit 4, and packet 6 generation code 21706 of "0" at segment number 21700 of 7 is bit 5, which converts to 10 in hexadecimal notation. Controller 43206 generates each adjacent code 22001 by applying a bitwise logical OR operation between independent codes 22000 of two adjacent segments. For example, adjacent code 32823 corresponding to the adjacent segment numbers 21700 of 24 and 25, which are labeled 32824, is a 6-bit binary number where the result of the logical OR operation of the value "1" of bit 0 of the independent code at segment number 21700 of 24 and the value "0" of bit 0 of the independent code at segment number 21700 of 25 is "1" as bit 0, the result of the logical OR operation of the value "1" of bit 1 of the independent code at segment number 21700 of 24 and the value "1" of bit 1 of the independent code at segment number 21700 of 25 is "1" as bit 1, the result of the logical OR operation of the value "0" of bit 2 of the independent code at segment number 21700 of 24 and the value "0" of bit 2 of the independent code at segment number 21700 of 25 is "0" as bit 2, the result of the logical OR operation of the value "0" of bit 3 of the independent code at segment number 21700 of 24 and the value "0" of bit 3 of the independent code at segment number 21700 of 25 is "0" as bit 3, the result of the logical OR operation of the value "0" of bit 4 of the independent code at segment number 21700 of 24 and the value "1" of bit 4 of the independent code at segment number 21700 of 25 is "1" as bit 4, and the result of the logical OR operation of the value "1" of bit 5 of the independent code at segment number 21700 of 24 and the value "1" of bit 5 of the independent code at segment number 21700 of 25 is "1" as bit 5, which converts to 33 in hexadecimal notation. In this example, in independent codes 22000, the signal values of packets 1 to 6 that include reflected light 10111 are "1" and the signal values of packets 1 to 6 that do not include reflected light 10111 are "0" when reflected light 10111 returns to only one segment number 21700, and in adjacent codes 22001, the signal values of packets 1 to 6 that include reflected light 10111 are "1" and the signal values of packets 1 to 6 that do not include reflected light 10111 are "0" when reflected light 10111 returns across two adjacent segment numbers 21700, and exposure code 10820 is estimated for each segment number 21700 based on generation codes 21701 to 21706 of packets 1 to 6. For this reason, memory (LUT) 10801 is initialized with independent codes 22000 and adjacent codes 22001 as addresses and segment numbers 21700 corresponding to independent codes 22000 and adjacent codes 22001 as data, and memory (LUT) 10801 is accessed and read with exposure code 10820 as an address, making it is possible to convert exposure code 10820 to the segment number corresponding to the distance. Table 22010 is a data set for initializing memory (LUT) 10801. Since the hexadecimal notation of independent code 22020 is "10", the data corresponding to the hexadecimal address of "10" in table 22010 is 7, which is segment number 22021 of independent code 22020. Since the hexadecimal notation of adjacent code 32823 is "33", the data corresponding to the hexadecimal address of "33" in table 22010 is 24, which is the smaller of segment numbers 32824 of adjacent code 32823. This is because, with respect to segment numbers 32824 of adjacent code 32823, when reflected light 10111 returns across segment numbers 21700 of 24 and 25, the specific timing at which reflected light 10111 returned is calculated separately using the ratio of two-unit-segment reflected light 32712 which corresponds to the amount of reflected light 10111 that returned across segment numbers 21700 of 24 and 25 and one-unit-segment reflected light 32711 which corresponds to the amount of reflected light 10111 that returned to segment number 21700 of 25.

Next, the method of generating generation codes 21701 to 21706 of packets 1 to 6 to be applied to controller 43206 will be described. In order to calculate the segment numbers using exposure codes 10820 generated from the signal values of packets 1 to 6 described above, there must be a one-to-one correspondence between exposure codes 10820 and the segment numbers. Therefore, generation codes 21701 to 21706 of packets 1 to 6 are determined so that the values of independent codes 22000 and adjacent codes 22001 do not overlap, and exposure codes 10820 and the segment numbers are associated one-to-one. Moreover, generation codes 21701 to 21706 of packets 1 to 6 are determined such that independent codes 22000 and adjacent codes 22001 do not take a value of "00" or "3F" in hexadecimal notation. When reflected light 10111 is returned at a timing when the value of independent code 22000 or adjacent code 22001 is "00", exposure pulses 10121 to 10126 of packets 1 to 6 are low level, and as such, the signal values of packets 1 to 6 do not include the reflected light 10111 component. Even if target object 10101 does not exist within the ranging range of segment numbers 0 to 31, the signal values of packets 1 to 6 do not include the reflected light 10111 component. Accordingly, since it is not possible to determine whether these two conditions are satisfied from the signal values of packets 1 to 6, generation codes 21701 to 21706 of packets 1 to 6 are generated such that independent codes 22000 and adjacent codes 22001 do not take a value of "00" in hexadecimal notation. By making sure that independent codes 22000 and adjacent codes 22001 do not take a value of "00" in hexadecimal notation, it is possible to make sure that there is at least one packet that includes reflected light 10111 among the signal values of packets 1 to 6 of solid-state image capturer output signal 10130. However, by generating generation codes 21701 to 21706 of packets 1 to 6 in such a manner that independent codes 22000 and adjacent codes 22001 do not take a value of "3F" in hexadecimal notation, it is possible to make sure that there is at least one packet that does not include reflected light 10111 among the signal values of packets 1 to 6 of solid-state image capturer output signal 10130. In case exposure code 10820 matches "00", "1B", or "3F", which do not exist in independent codes 22000 or adjacent codes 22001, it is possible to determine that the segment number is not calculated correctly by setting the segment number to a negative value of —1.

FIG. 40A to FIG. 40D are diagrams illustrating data selection 43810 of distance calculator 43208 according to Embodiment 4. When reflected light 10111 returns across two adjacent segment numbers 21700, subtraction signals 21951 to 21956 of packets 1 to 6 can be classified into the following four types according to the combination of each of generation codes 21701 to 21706 of packets 1 to 6 of the two segments that compose the adjacent code.

Classification A corresponds to when the packet generation code closer to emission pulse 10120 is "0" and the packet generation code father from emission pulse 10120 is "0", classification B corresponds to when the packet generation code closer to emission pulse 10120 is "1" and the packet generation code father from emission pulse 10120 is "0", classification C corresponds to when the packet generation code closer to emission pulse 10120 is "0" and the packet generation code father from emission pulse 10120 is "1", and classification D corresponds to when the packet generation code closer to emission pulse 10120 is "1" and the packet generation code father from emission pulse 10120 is "1". Here, for each exposure code 10820, two-unit-segment reflected light 32712 corresponding the amount of reflected light 10111 that returned to two adjacent unit segments is generated using subtraction signals 21951 to 21956 of packets 1 to 6 and segment exposure counts 43901 to 43906 of packets 1 to 6 which are classified as classification B, as well as subtraction signals 21951 to 21956 of packets 1 to 6 and segment exposure counts 43901 to 43906 of packets 1 to 6 which are classified as classification C. For each exposure code 10820, one-unit-segment reflected light 32711 corresponding to the amount of reflected light 10111 that returned to the farther (far end) one of the two adjacent unit segments from emission pulse 10120 is generated using subtraction signals 21951 to 21956 of packets 1 to 6 classified as classification C and segment exposure counts 43901 to 43906 of packets 1 to 6 classified as classification B. Generation codes 21701 to 21706 of packets 1 to 6 are generated so that subtraction signals 21951 to 21956 of packets 1 to 6 classified as classifications B and C are present in all adjacent codes 22001. If there are multiple subtraction signals 21951 to 21956 of packets 1 to 6 classified as classification B or C, one of them is selected to generate two-unit-segment reflected light 32712 and one-unit-segment reflected light 32711.

Here, if exposure code 10820 is "0B", classification B is packet 2 subtraction signal 21952 and packet 2 segment exposure count 43902, and classification C is packet 1 subtraction signal 21951 and packet 1 segment exposure count 43901. The exposure count of packet 2 subtraction signal 21952 is "9", which is packet 2 segment exposure count 43902 corresponding to segment number 21700 of 5, and the exposure count of packet 1 subtraction signal 21951 is "12", which is packet 1 segment exposure count 43901 corresponding to segment number 21700 of 6. Since packet 2 subtraction signal 21952 classified as classification B and packet 1 subtraction signal 21951 classified as classification C have different exposure counts, using packet 2 subtraction signal 21952×the packet 1 exposure count corresponding to the segment number of 6 and packet 1 subtraction signal 21951×the packet 2 exposure count corresponding to the segment number of 5, which are corrected exposure counts corrected for the difference, two-unit-segment reflected light 32712 is generated by packet 2 subtraction signal 21952×the packet 1 exposure count corresponding to the segment number of 6+ packet 1 subtraction signal 21951×the packet 2 exposure count corresponding to the segment number of 5, and one-unit-segment reflected light 32711 is generated by packet 1 subtraction signal 21951×the packet 2 exposure count corresponding to the segment number of 5.

When reflected light 10111 returns to only one segment number 21700, ranging accuracy can be ensured without calculating the ratio of one-unit-segment reflected light 32711 to two-unit-segment reflected light 32712 because emission light 10110 and exposure pulses 10121 to 10126 of packets 1 to 6 have the same pulse width (10 ns). Accordingly, when exposure code 10820 and independent code 22000 are the same, two-unit-segment reflected light 32712 is fixed to "1" and one-unit-segment reflected light 32711 is fixed to "0" so that the calculation result of ratio calculation divider 32713 is "0".

Figure 41:
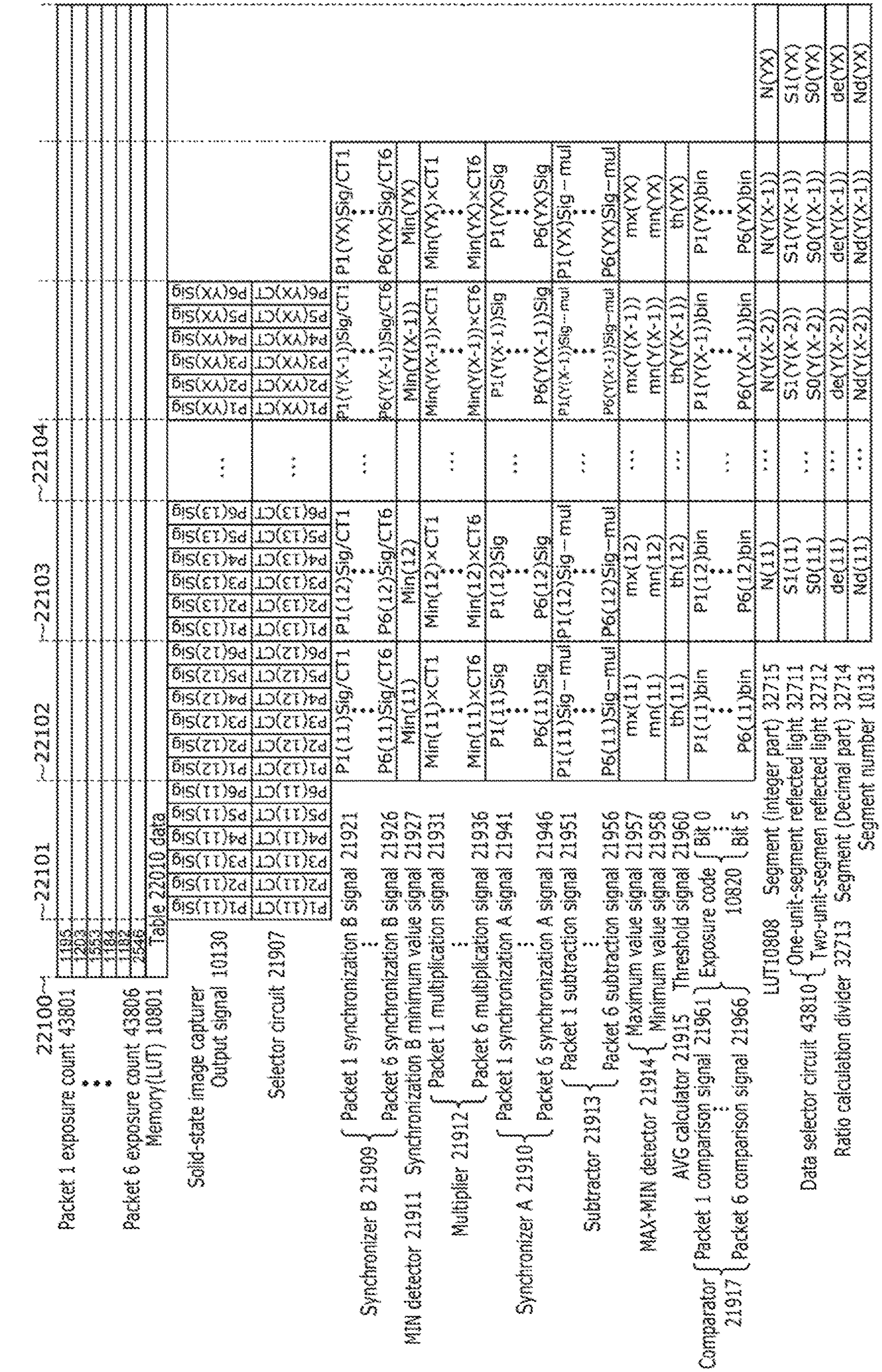
FIG. 41 illustrates timings of operations performed by a distance calculator according to Embodiment 4.

FIG. 41 illustrates a timing chart for distance calculator 43208 according to Embodiment 4. Notations in FIG. 41 that are the same as in FIG. 30 and similar figures share the same meaning.

As illustrated in FIG. 41, at timing 33000 before a valid signal value is output from solid-state image capturer output signal 10130, controller 43206 sets values in exposure counts 43801 to 43806 of packets 1 to 6 and memory (LUT) 10801 via the control bus. Packet 1 exposure count 43801 is 1195, packet 2 exposure count 43802 is 1203, packet 3 exposure count 43803 is 1553, packet 4 exposure count 43804 is 1184, packet 5 exposure count 43805 is 1182, packet 6 exposure count 43806 is 2546, and memory (LUT) 10801 writes the data in table 32810. At timing 33001, the signal values of packets 1 to 6 of pixel address 11 are sequentially sent from solid-state image capturer output signal 10130. The sent signal values are sequentially sent to the synchronizer (A) 21910 and at the same time divided by exposure counts 43801 to 43806 of packets 1 to 6 and sent to synchronizer (B) 21909. At timing 33002, exposure code 10820 is determined using synchronizer (A) output signals 21941 to 21946, synchronizer (B) output signals 21921 to 21926, and exposure counts 43801 to 43806 of packets 1 to 6. Memory (LUT) 10801 is accessed and read using exposure code 10820 as the address, and segment number (integer part) 32715 corresponding to the distance of pixel address 11 is generated at timing 33003. Moreover, two-unit-segment reflected light 32712 and one-unit-segment reflected light 32711 are generated in data selection 43810 using subtraction signals 21951 to 21956 of packets 1 to 6 and exposure code 10820, and segment number (decimal part) 32714 is generated in ratio calculation divider 32713. Segment number (integer part) 32715 and segment number (decimal part) 32714 are bitwise concatenated to generate segment number signal 10131. All of the two-dimensional segment numbers are output by performing this operation on all two-dimensionally arranged pixels 10200.

From the above operation, the time required for 12 repetitions of frame unit drive pattern 10410, which corresponds to the imaging exposure time, is 17.28 ms, and the time required for image data readout 10411, which corresponds to the imaging readout time, is 16.053 ms. Therefore, the time required for one frame is 33.3 ms, and the frame rate of this ranging device is 30 fps. Compared to the conventional technique, this technique can significantly expand the range over which distance can be measured with a smaller number of packets since the ranging range can be significantly expanded while maintaining the frame rate, even under conditions with background light, and ranging accuracy in which the unit segment is further divided can be achieve, so by using this technique, the difference in the amount of exposure between the near end and the far end can be reduced, and the entire ranging range from the near end to the far end can be measured.

In the ranging device according to Embodiment 4 as described above, the controller repeats control of the pulse generator according to the n types of packet generation codes a plurality of times, and the pulse generator includes a function for setting whether or not to mask a packet generation code to prevent generation of the exposure pulse or the emission pulse per unit segment.

This makes it possible to inhibit signal charge saturation by reducing the exposure count with a mask, for example, in the unit segment on the near end where intense reflected light can be received. In addition, the difference in exposure amount between the unit segment on the near end and the unit segment on the far end can be made smaller. This makes it possible to maintain or increase the ranging accuracy from the near end to the far end with reduced effects caused by saturation.

[Variation]

Next, a variation of the embodiments will be described. In Embodiments 1 through 4, as illustrated in FIG. 2, an example of a pixel configuration in which n (n=6) signal charge accumulators (FDAs) are provided for one photoelectric conversion pixel (PD) is given. This variation describes a ranging operation performed in an example of a pixel configuration in which one signal charge accumulator is provided for one photoelectric conversion pixel.

Figure 42:
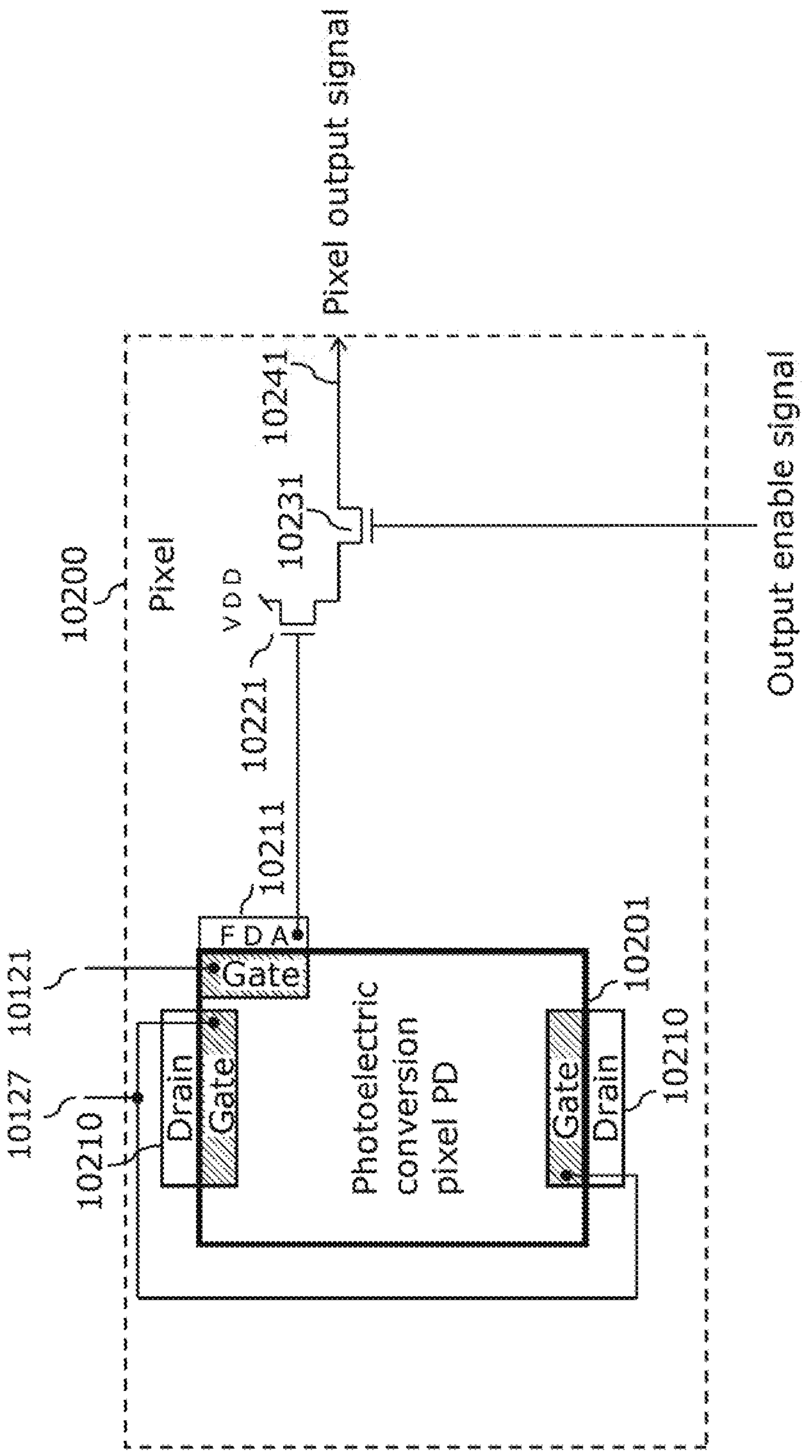
FIG. 42 illustrates a configuration of one pixel in a solid-state image capturer according to a variation.

FIG. 42 illustrates a configuration of one pixel in a solid-state image capturer according to a variation.

Pixel 10200 in FIG. 42 differs from FIG. 2 in that five FDAs (signal charge accumulators) 10211 and gates have been removed from one photoelectric conversion pixel 10201. The following description will focus on this point of difference.

FDA (signal charge accumulator) 10211 corresponds to each of packets 1 through 6. FDA (signal charge accumulator) 10211 cannot accumulate packets 1 to 6 simultaneously. Therefore, the accumulating operation and the readout operation of each packet are performed alternately.

Figure 43:
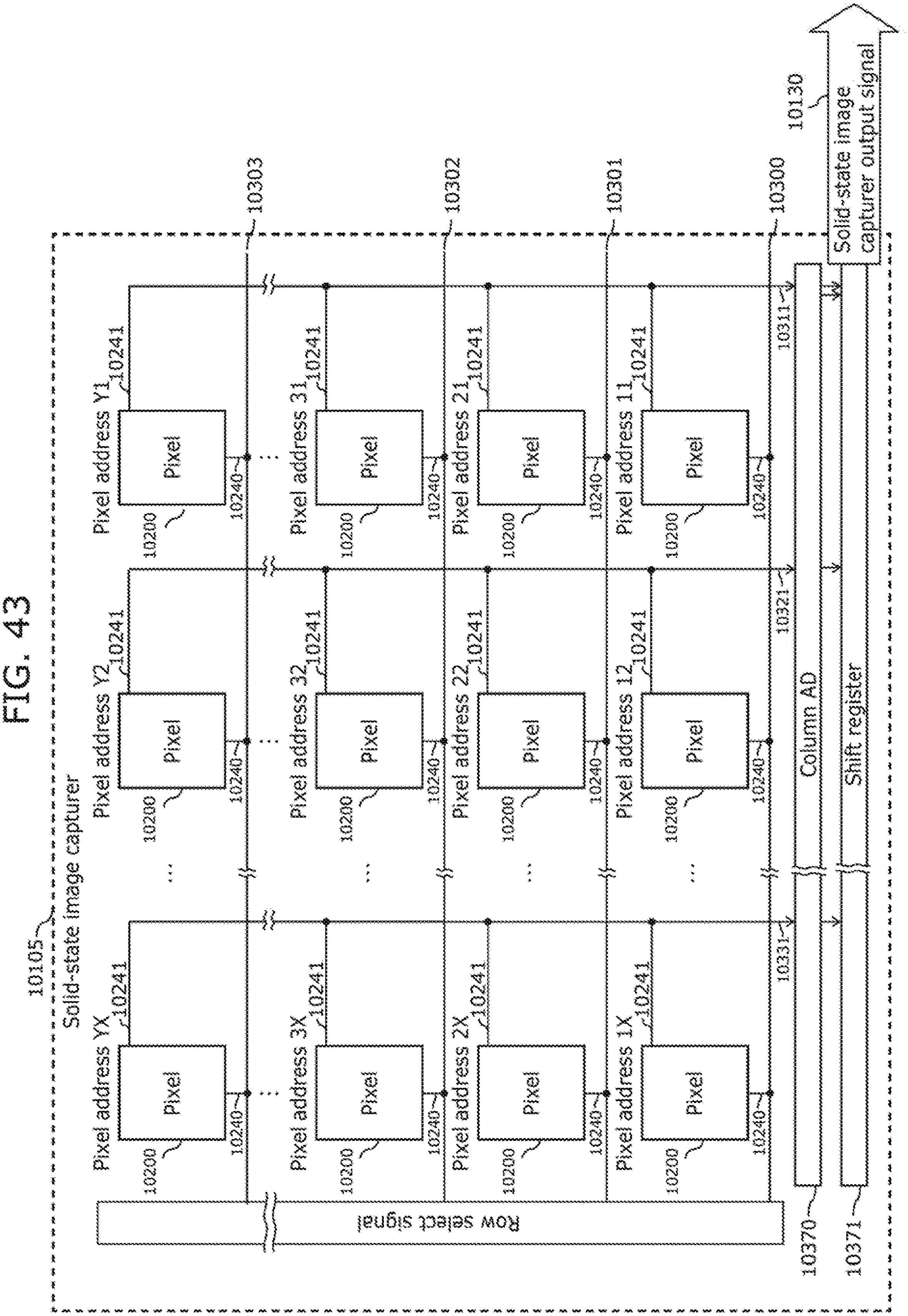
FIG. 43 illustrates a configuration of a solid-state image capturer according to a variation.

FIG. 43 illustrates a schematic configuration of a solid-state image capturer according to a variation.

Solid-state image capturer 10105 in FIG. 43 differs from FIG. 3 in that five vertical pixel signals 10332 to 10336 are removed per pixel row. The following description will focus on this point of difference.

Each pixel 10200 outputs pixel output signal 10241 from one vertical signal line 10331. The signal charges from packet 1 to packet 6 are output to vertical signal line 10331 in a time-division manner as pixel output signal 10241.

Figure 44:
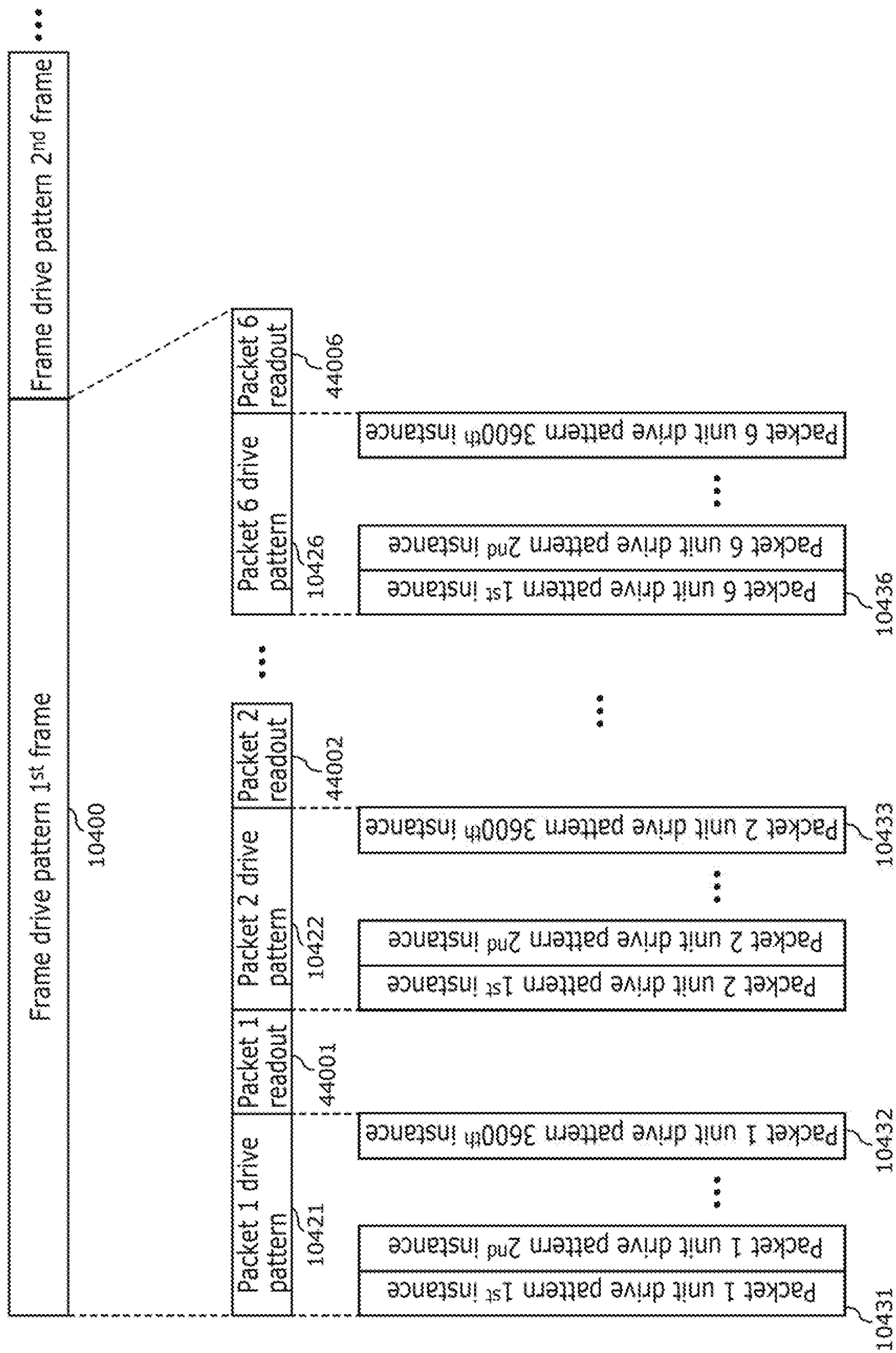
FIG. 44 illustrates a control sequence of a light emitter and a solid-state image capturer according to a variation.

FIG. 44 illustrates a control sequence of a light emitter and a solid-state image capturer according to a variation.

The control sequence illustrated in FIG. 44 differs from FIG. 4 in that the image data readout operation is divided into a plurality of sub-operations. The following description will focus on this point of difference.

In FIG. 4, the image data readout operation is performed for each frame. In contrast, in FIG. 44, the image data readout operation is performed for every packet 1 drive pattern 10421 through packet 6 drive pattern 10426. Stated differently, packet 1 readout operation 44001 is performed immediately after packet 1 drive pattern 10421. Packet 2 readout operation 44002 is performed immediately after packet 2 drive pattern 10422. Packet 3 readout operation 44003 is performed immediately after packet 3 drive pattern 10423. Packet 4 readout operation 44004 is performed immediately after packet 4 drive pattern 10424. Packet 5 readout operation 44005 is performed immediately after packet 5 drive pattern 10425. Packet 6 readout operation 44006 is performed immediately after packet 6 drive pattern 10426. This makes it possible to use a ranging operation that uses n types of packets even when the pixel is provided with one FDA (signal charge accumulator) 10211 per photoelectric conversion pixel 10201.

In FIG. 44, the hierarchy of frame unit drive pattern 10410 in FIG. 4 has been deleted since FIG. 44 shows an example of constructing one frame by reading packets 1 to 6 one at a time. However, FIG. 44 shows an example in which the total number of repetitions per frame of each of the unit drive patterns for packets 1 to 6 is the same as in FIG. 4.

Even when one FDA (signal charge accumulator) 10211 is provided per photoelectric conversion pixel 10201, such as in the variation illustrated in FIG. 42 through FIG. 44, the same advantageous effects as in Embodiments 1 through 4 can be achieved.

As described above, in the ranging device according to the variation, the solid-state image capturer includes: a photoelectric conversion pixel; a signal charge accumulator that accumulates a signal charge generated by the photoelectric conversion pixel; and a signal outputter that outputs a signal value corresponding to the signal charge accumulated in the signal charge accumulator.

This makes it possible to accumulate one type of signal value in the solid-state image capturer. The readout operation of signal values from the solid-state image capturer is performed every time one type of signal value is accumulated, i.e., every time an exposure made according to one type of packet generation code is continuously performed. This makes it possible to achieve a high ranging accuracy and a wide ranging range.

Embodiment 5

In Embodiments 1 through 4, each adjacent code is defined as a code obtained by applying a bitwise logical OR operation between two independent codes corresponding to two adjacent unit segments. Instead of this adjacent code, Embodiment 5 describes an example of using a second adjacent code defined as a code obtained by applying a bitwise logical AND operation—rather than a bitwise logical OR operation—between the two independent codes.

In the following, an adjacent code defined as a code obtain by a logical OR operation will be referred to as an "OR adjacent code" or a "first adjacent code". Moreover, when the unspecified term "adjacent code" is used, this shall refer to an OR adjacent code or a first adjacent code. The "adjacent code" in Embodiments 1 through 4 is an OR adjacent code or a first adjacent code.

An adjacent code defined as a code obtained by a logical AND operation will be referred to as an "AND adjacent code" or a "second adjacent code". In Embodiment 5, a ranging device that uses AND adjacent codes instead of OR adjacent codes will be described.

The configuration of the ranging device according to the present embodiment is approximately the same as the configurations illustrated in FIG. 1 and FIG. 8, but differs mainly in regard to the use of AND adjacent codes instead of OR adjacent codes and the addition of a second exposure code. The following description will focus on this difference.

Each AND adjacent code, i.e., second adjacent code is a code obtained by applying a bitwise logical AND operation between two independent codes corresponding to two adjacent unit segments. Stated differently, a bit of "1" in the AND adjacent code indicates an exposure in each of the two adjacent unit segments. For example, when the duration of the emission pulse is the same as the duration of the unit segment, a bit of "1" in the AND adjacent code means that the entire duration of the reflected light pulse (i.e., 100% of the duration of the reflected light pulse) is exposed. This means that if reflected light is present, the entire reflected light pulse is exposed, not just part of the reflected light pulse. In contrast, a bit of "1" in the OR adjacent code means that part or all of the reflected light pulse (i.e., a few % to 100% of the duration of the reflected light pulse) is exposed.

Each AND adjacent code is generated, for example, by applying a bitwise logical AND operation between two independent codes corresponding to two adjacent unit segments by controller 10106. If the above second exposure code matches any of the AND adjacent codes, the intermediate distance between the two unit segments corresponding to the matching AND adjacent code is the distance value of the pixel.

The second exposure code is data that is binarized using a different threshold than the exposure codes of Embodiments 1 through 4. Hereinafter, the exposure codes of Embodiments 1 through 4 may be referred to as first exposure codes. The first exposure code is used to determine whether there is a matching independent code and whether there is a matching OR adjacent code. In contrast, in the present embodiment, the first exposure code is used only to determine whether there is a matching independent code, and the second exposure code is used to determine whether there is a matching AND adjacent code.

For example, the first exposure code and the second exposure code are generated using threshold register 10800 and comparator 10802 illustrated in FIG. 8.

Threshold register 10800 holds a first threshold value and a second threshold value, and outputs the first threshold value and the second threshold value to comparator 10802. The second threshold value is greater than the first threshold value. Note that the threshold used to obtain the first exposure code is referred to as the first threshold value, and the threshold used to obtain the second exposure code is referred to as the second threshold value.

Comparator 10802 compares solid-state image capturer output signal 10130 with the first threshold value and binarizes solid-state image capturer output signal 10130. Comparator 10802 further compares solid-state image capturer output signal 10130 with the second threshold value and binarizes solid-state image capturer output signal 10130.

Synchronizer 10803 outputs binarized packets 1 to 6 of the same pixel address in parallel. In other words, synchronizer 10803 outputs, as the first exposure code, 6-bit data corresponding to packets 1 to 6 binarized using the first threshold value, and outputs, as the second exposure code, 6-bit data corresponding to packets 1 to 6 binarized using the second threshold value.

In FIG. 8, distance calculator 10108 may include two sets of: threshold register 10800; comparator 10802; synchronizer 10803; and memory 10801. In such cases, one set should be configured to hold the first threshold value in the threshold register and store the independent codes in the memory as a LUT, and the other set should be configured to hold the second threshold value in the threshold register and store the AND adjacent codes in the memory as a LUT.

Next, an example of the assignment of independent codes and second adjacent codes will be described.

FIG. 45A illustrates an example of the assignment of packet generation codes, independent codes, and second adjacent codes according to Embodiment 5. FIG. 45B illustrates an example of the assignment of packet generation codes, independent codes, and first adjacent codes for comparison with FIG. 45A.

FIG. 45A illustrates one example of six types of packet generation codes, independent codes, and second adjacent codes. FIG. 45B illustrates six types of packet generation codes, independent code, and first adjacent codes. The assigning of bits is carried out such that more bits of "1" are assigned to the six types of packet generation codes in FIG. 45A than in FIG. 45B. More specifically, the number of bits of "1" assigned to the six types of packet generation codes in FIG. 45A is 116. The number of bits of "1" assigned to the six types of packet generation codes in FIG. 45B is 80. Assigning a large number of bits of "1" to the packet generation codes will firstly increase the total reflected wave signal amount. In other words, this makes it possible to improve sensitivity and the signal-to-noise ratio. Secondly, it will increase the number of bits of "1" in the AND adjacent codes. In other words, this is suited for the AND adjacent codes.

Next, an example of an operation that uses AND adjacent codes will be described.

Figure 46:
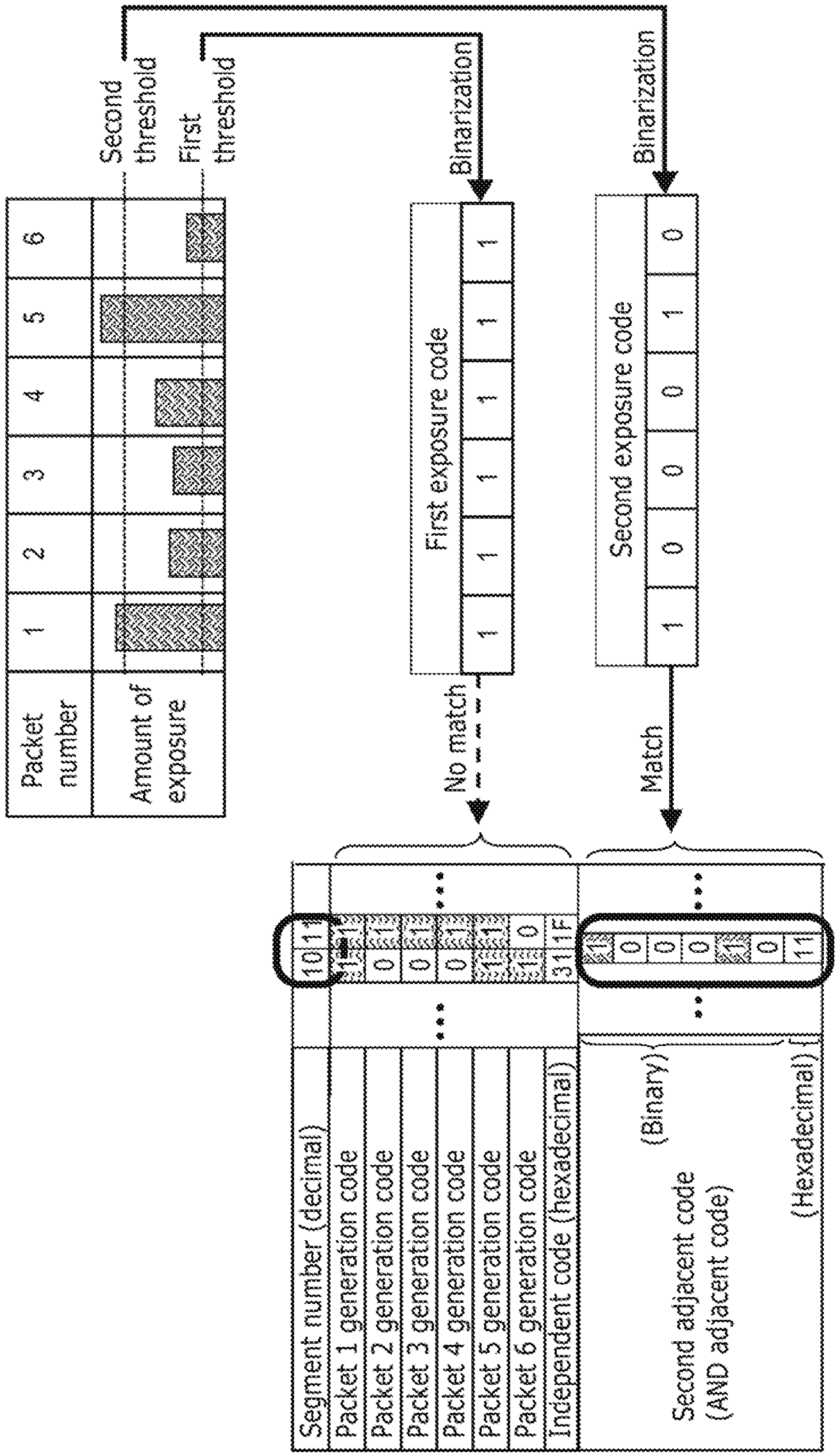
FIG. 46 explains an operation that uses AND adjacent codes of packets according to Embodiment 5.

FIG. 46 explains an operation that uses AND adjacent codes of packets according to Embodiment 5. The upper part of FIG. 46 shows exposure values (i.e., solid-state image capturer output signal 10130) for packets 1 to 6, and the first and second threshold values.

The first exposure code binarized using the first threshold value in the middle right of FIG. 46 is "111111". This first exposure code of "111111" cannot identify the distance segment based on the independent codes since there is no matching independent code.

The second exposure code binarized using the second threshold value in the bottom right of FIG. 46 is "010001". This second exposure code of "010001" has a matching AND adjacent code. Since the matching AND adjacent code corresponds to the two distance segments with segment numbers 10 and 11, the segment number indicating the distance segment where the target object is located is identified as, for example, 10.5.

In this way, even with a ranging device that uses AND adjacent codes instead of OR adjacent codes, it is possible to achieve the same advantageous results as in Embodiments 1 through 4. Moreover, since there is a high exposure count and a large amount of exposure signals, the sensitivity and signal-to-noise ratio can be improved.

Next, an example of setting the first and second threshold values will be given.

Figure 47:
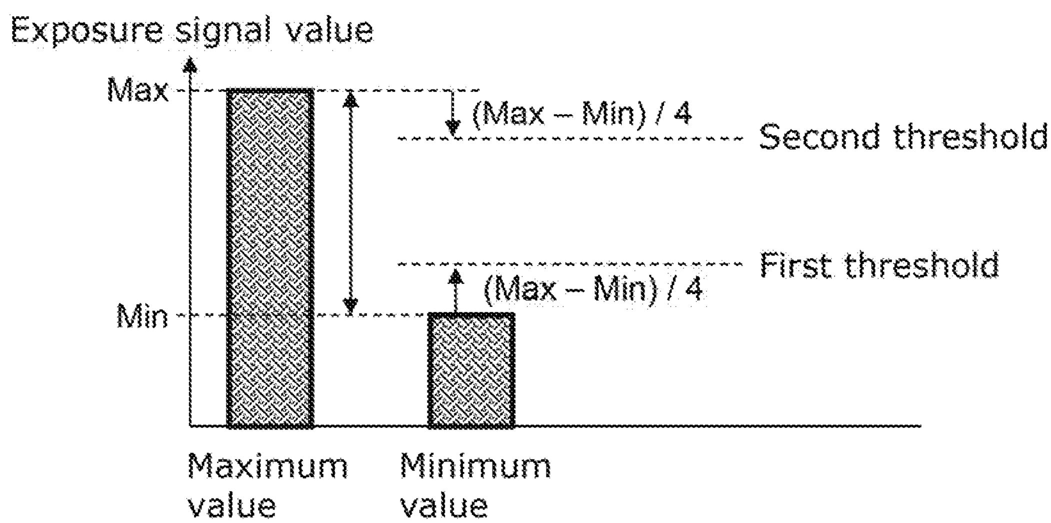
FIG. 47 explains first and second threshold values according to Embodiment 5.

FIG. 47 explains the first and second threshold values according to Embodiment 5. Solid-state image capturer output signal 10130 is represented on the vertical axis labeled "exposure signal value" in FIG. 47. The two exposure signal values in FIG. 47 indicate the maximum value, "Max", and the minimum value, "Min", of the exposure signal values of all packets in any unit segment. In this example, the first and second threshold values are expressed by the following equations:

$$\text{First threshold value}=\text{Min}+((\text{Max}-\text{Min})/4)$$

$$\text{Second threshold value}=\text{Max}+((\text{Max}-\text{Min})/4)$$

In this example, the minimum value Min is regarded as a value approximately corresponding to the background light component included in the exposure signal value, and the term ((Max−Min)/4) is regarded as the approximate maximum error of the background light component. The first and second threshold values are set dynamically for each unit segment, for example.

As described above, in the ranging device according to Embodiment 5, controller 10106 generates n-bit second adjacent codes by applying a bitwise logical AND operation between two independent codes corresponding to two adjacent unit segments, and distance calculator 10108: binarizes the n types of signal values into an n-bit binary number using a second threshold value and determines the binarized n-bit binary number as a second exposure code; and compares the second exposure code with the second adjacent codes, and when there is a match, calculates an intermediate distance between the two unit segments that correspond to the matching second adjacent code.

This makes it possible to achieve both frame rate and measurement accuracy (number of measurement segments and measurement time) without increasing memory capacity and computational resources, thus realizing a high-speed and high-accuracy ranging device at a low cost.

Here, each of the second adjacent codes may be different from any other independent code. Here, each of the second adjacent codes may be different from any other second adjacent code.

Embodiment 6

In the present embodiment, a ranging device that uses both the first adjacent codes, i.e., the OR adjacent codes of Embodiments 1 through 4 and the second adjacent codes, i.e., the AND adjacent codes of Embodiment 5 will be described.

The configuration of the ranging device according to the present embodiment is approximately the same as the configurations illustrated in FIG. 1 and FIG. 8, but differs mainly in regard to the use of AND adjacent codes in addition to OR adjacent codes and the use of the second exposure code. Therefore, the ranging device according to Embodiment 6 is equivalent to the ranging device according to Embodiment 5 additionally including a function for processing the OR adjacent codes. The processing for the OR adjacent codes may be the same as already described in Embodiments 1 through 4.

Next, an example of the assignment of independent codes, first adjacent codes, and second adjacent codes will be described.

FIG. 48 illustrates an example of the assignment of packet generation codes, first adjacent codes, and second adjacent codes according to Embodiment 6.

FIG. 48 illustrates one example of six types of packet generation codes, independent codes, first adjacent codes, and second adjacent codes. The first adjacent codes are written in both binary notation and hexadecimal notation. The second adjacent codes are also written in both binary notation and hexadecimal notation.

The assigning of bits is carried out such that more bits of "1" are assigned to the six types of packet generation codes in FIG. 48 than bits of "0". Thus, assigning a large number of bits of "1" to the packet generation codes will firstly increase the total reflected wave signal amount. In other words, this makes it possible to improve sensitivity and the signal-to-noise ratio. Secondly, it will increase the number of bits of "1" in the AND adjacent codes. In other words, this is suited for the AND adjacent codes.

The independent codes, the first adjacent codes, and the second adjacent codes are assigned exclusively. That is, each independent code, first adjacent code, and second adjacent code is assigned differently from any other independent code, first adjacent code, and second adjacent code, respectively.

Next, an example of an operation that uses both of first and second adjacent codes will be given.

Figure 49:
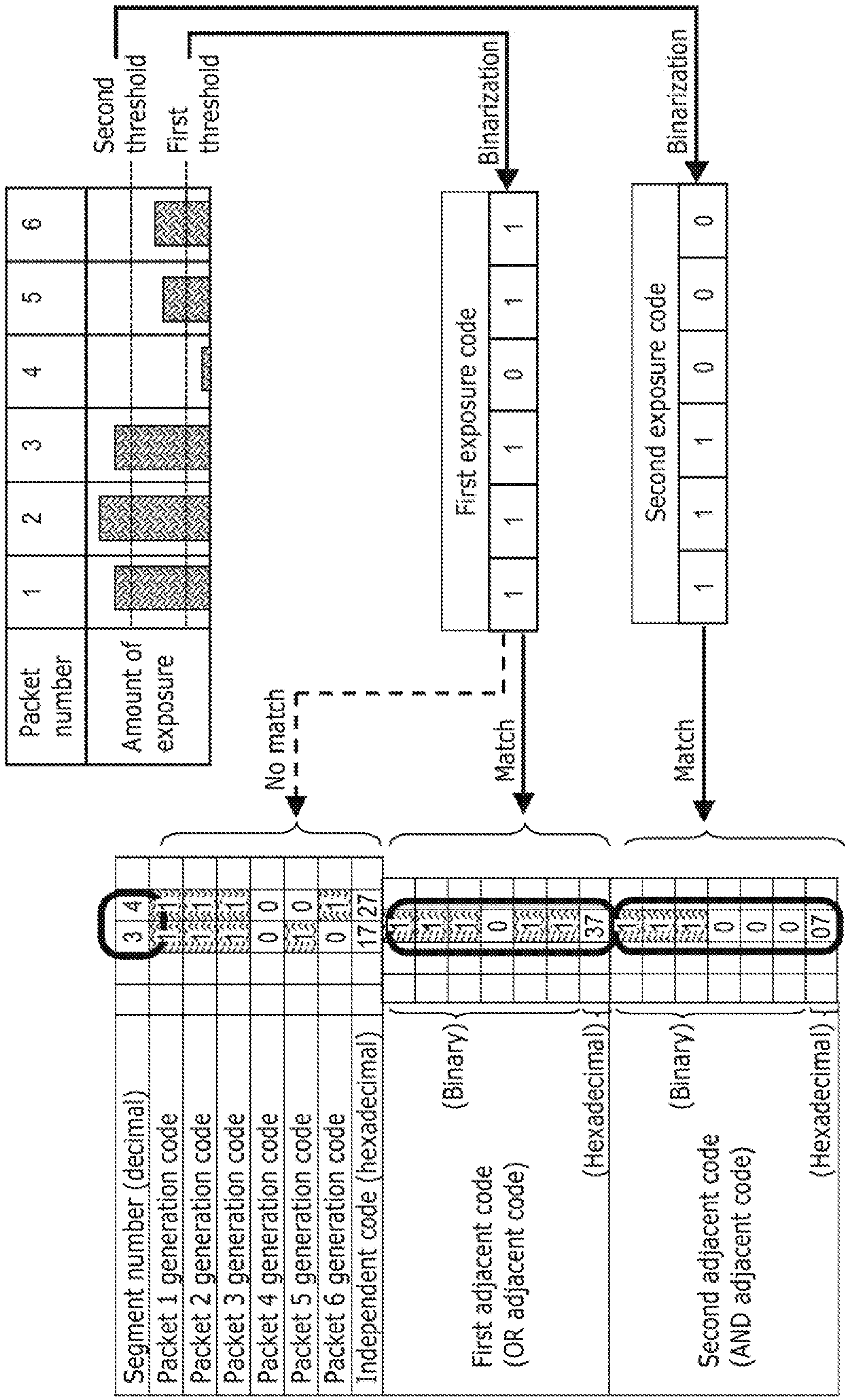
FIG. 49 explains an operation that uses both OR adjacent codes and AND adjacent codes of packets according to Embodiment 6.

FIG. 49 explains an operation that uses both OR adjacent codes and AND adjacent codes of packets according to Embodiment 6. The upper part of FIG. 49 shows exposure values, i.e., solid-state image capturer output signal 10130, for packets 1 to 6, and the first and second threshold values.

The first exposure code binarized using the first threshold value in the middle right of FIG. 49 is "110111". This first exposure code of "110111" cannot identify the distance segment based on the independent codes since there is no matching independent code. However, this first exposure code of "110111" has a matching OR adjacent code. Since the matching OR adjacent code corresponds to the two distance segments with segment numbers 3 and 4, the segment number indicating the distance segment where the target object is located is identified as, for example, 3.5.

The second exposure code binarized using the second threshold value in the bottom right of FIG. 49 is "000111". This second exposure code of "000111" has a matching AND adjacent code. Since the matching AND adjacent code corresponds to the two distance segments with segment numbers 3 and 4, the segment number indicating the distance segment where the target object is located is identified as, for example, 3.5.

Thus, the result of identifying the segment number based on the OR adjacent codes is the same as the result of identifying the segment number based on the AND adjacent codes, and by using both the OR adjacent codes and the AND adjacent codes, errors in determining the distance segment can be inhibited and the reliability of ranging results can be improved.

Next, the binarization using the first threshold value and the binarization using the second threshold value will be described. Since the intensity of the reflected light is inversely proportional to the square of the distance from the target object, the first and second threshold values are set to appropriate values for each unit segment. The first and second threshold values may be set in advance according to an anticipated ranging environment, or may be set dynamically according to the intensity of the background light in the actual ranging environment. Next, a binarization error that can occur when the first and second threshold values are set dynamically will be described.

Figure 50A:
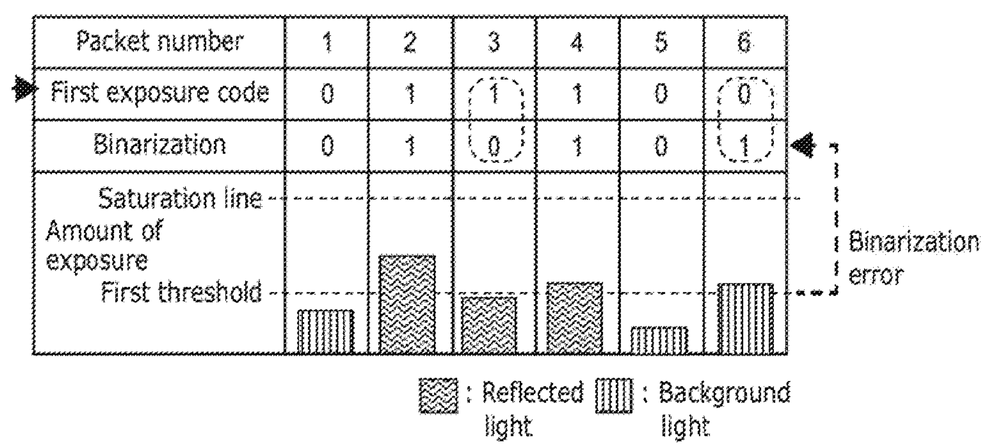
FIG. 50A explains an example in which a binarization error caused by a first threshold value occurs according to Embodiment 6.
Figure 50B:
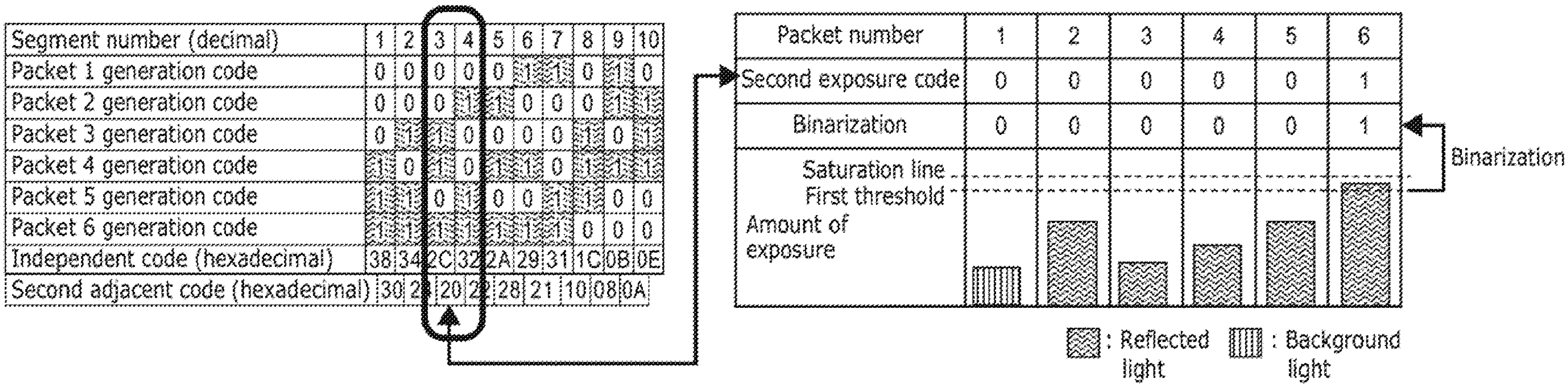
FIG. 50B explains an example in which a binarization error caused by a second threshold value does not occur according to Embodiment 6.

FIG. 50A explains an example in which a binarization error caused by the first threshold value occurs according to Embodiment 6. FIG. 50B explains an example in which a binarization error caused by the second threshold value does not occur according to Embodiment 6.

The right side of FIG. 50A shows the exposure values of packets 1 to 6, i.e., solid-state image capturer output signal 10130, and the binarization process that uses the first threshold value. Each exposure amount includes background light and, if there is a target object, reflected light. Background light can cause the exposure amount to exceed the first threshold value, such as in packet 6. Reflected light from a target object with low reflectance can result in an exposure amount that is lower than the first threshold, such as in packet 3. In such cases, an error occurs in the binarization process that uses the first threshold value. The correct exposure code "001110" is instead computed as "101010" due to this binarization, resulting in an incorrect first exposure code.

The right side of FIG. 50B shows the binarization process that uses the second threshold value. The second threshold value is set to a value greater than the first threshold value because it is used to binarize the amount of exposure where reflected light is present in each of the two unit segments corresponding to the AND adjacent code. In FIG. 50B, the second threshold value is set to a value considerably larger than the first threshold value in FIG. 50A, close to the saturation line. Hence, compared to the binarization process that uses the first threshold value in FIG. 50A, the binarization process that uses the second threshold value is influenced less by background light and can inhibit binarization errors.

Next, the influence of background light when the first and second threshold values are set dynamically will be described.

Figure 51A:
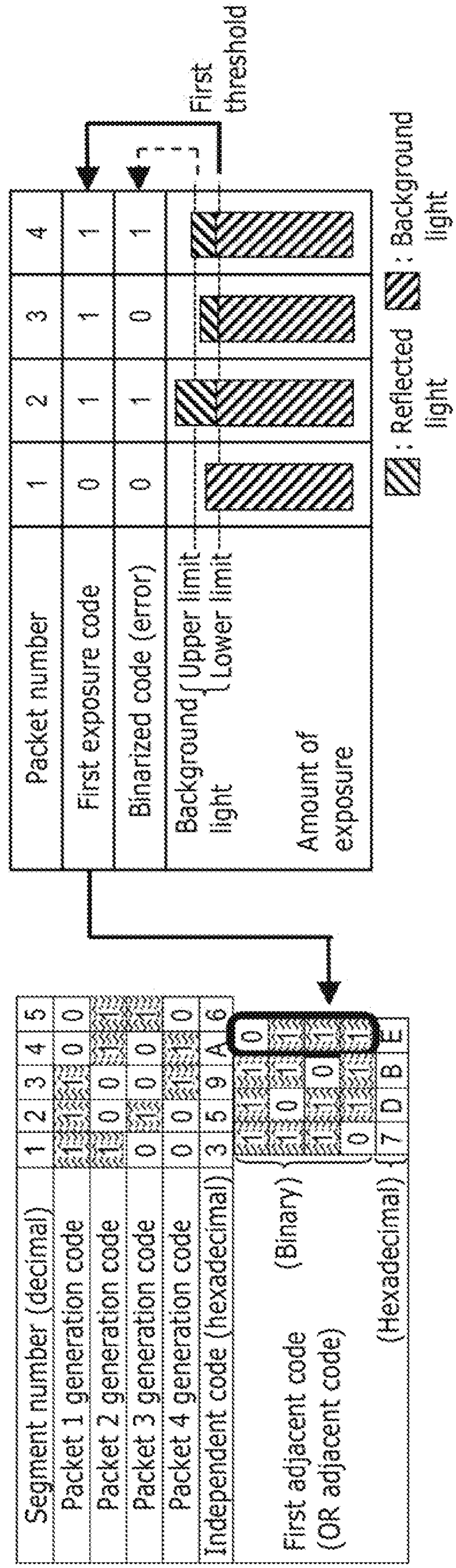
FIG. 51A explains binarization that uses a first threshold value according to Embodiment 6.
Figure 51B:
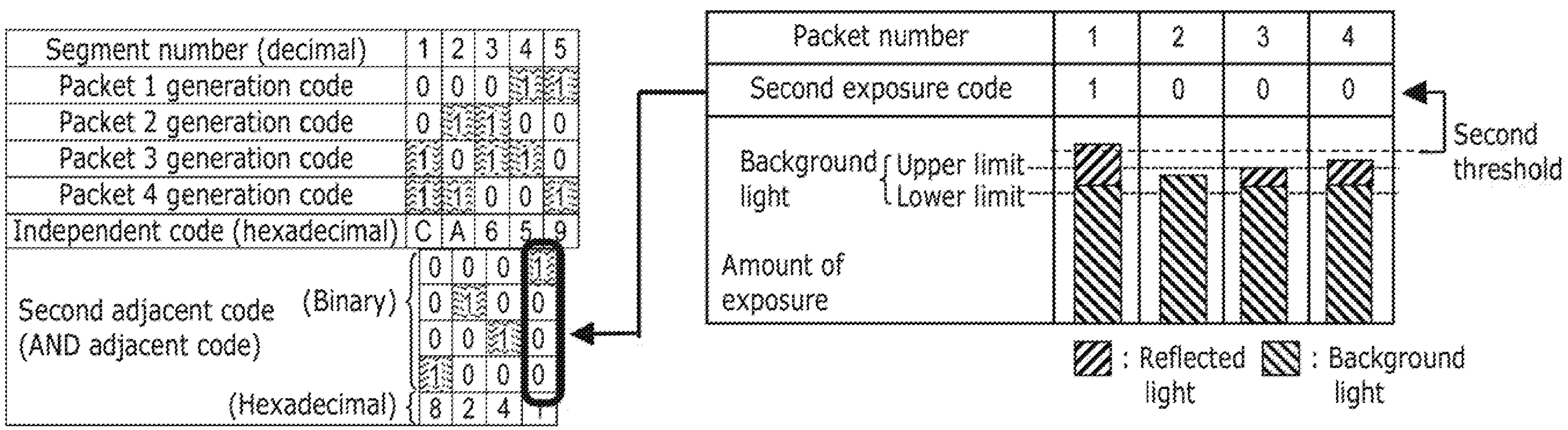
FIG. 51B explains binarization that uses a second threshold value according to Embodiment 6.

FIG. 51A explains binarization that uses the first threshold value according to Embodiment 6. FIG. 51B explains binarization that uses the second threshold value according to Embodiment 6.

The upper and lower limits of the background light in the unit segment of interest are shown relative to each exposure amount in packets 1 to 4 on the right side of FIG. 51A. For example, the first threshold value may be set to the upper limit of the background light, or the lower limit of the background light. However, when there is a lot of background light like there is in FIG. 51A, binarization errors can occur. Stated differently, when the lower limit of background light is set as the first threshold value, the exposure values are binarized to the correct first exposure code of "1110". In contrast, when the upper limit of the background light is set as the first threshold value, the exposure values are binarized to an incorrect binary code of "1010". Thus, the binarization process that uses the first threshold value may be affected by background light when using OR adjacent codes.

In FIG. 51B, the second threshold value is set to a value greater than the upper limit of background light. This prevents incorrect binarization of the upper limit of background light, which is high.

In this way, compared to the binarization process that uses the first threshold value in FIG. 51A, the binarization process that uses the second threshold value in FIG. 51B is influenced less by background light and can inhibit binarization errors.

In addition, the combined use of OR adjacent codes and AND adjacent codes can inhibit errors in determining the distance segment, which can further improve the reliability of ranging results.

As described above, in the ranging device according to Embodiment 6, controller 10106 generates n-bit first adjacent codes by applying a bitwise logical OR operation between the two independent codes corresponding to two adjacent unit segments, and further generates n-bit second adjacent codes by applying a bitwise logical AND operation between the two independent codes corresponding to two adjacent unit segments.

Distance calculator 10108 further binarizes the n types of signal values into an n-bit binary number using a second threshold value and determines the binarized n-bit binary number as a second exposure code, compares the second exposure code with the second adjacent codes, and when there is a match, calculates an intermediate distance between the two unit segments that correspond to the matching second adjacent code.

Here, the first threshold value may be lower than the second threshold value. This makes it possible to inhibit binarization errors caused by large amounts of background light.

Here, one independent code may be the same as any one of all of the independent codes and second adjacent codes of the other unit segments.

Here, when there is a match between the second exposure code and the second adjacent codes, the distance calculator classifies the n types of signal values based on a bitwise combination of the two independent codes corresponding to the matching second adjacent code, and using the classified signal values, calculates a distance within the corresponding two adjacent unit segments.

Here, the distance calculator classifies the n types of signal values based on the bitwise combination of the two independent codes into any one of the following four classifications: classification A when one bit of the two independent codes is 0 and an other bit of the two independent codes is 0; classification B when the one bit is 1 and the other bit is 0; classification C when the one bit is 0 and the other bit is 1; and classification D when the one bit is 1 and the other bit is 1. The distance calculator calculates a distance by further dividing the distance segments using signal values classified as at least two classifications from among classification B, classification C, and classification D.

Embodiment 7

[1.1 Configuration of Ranging Device]

Figure 52:
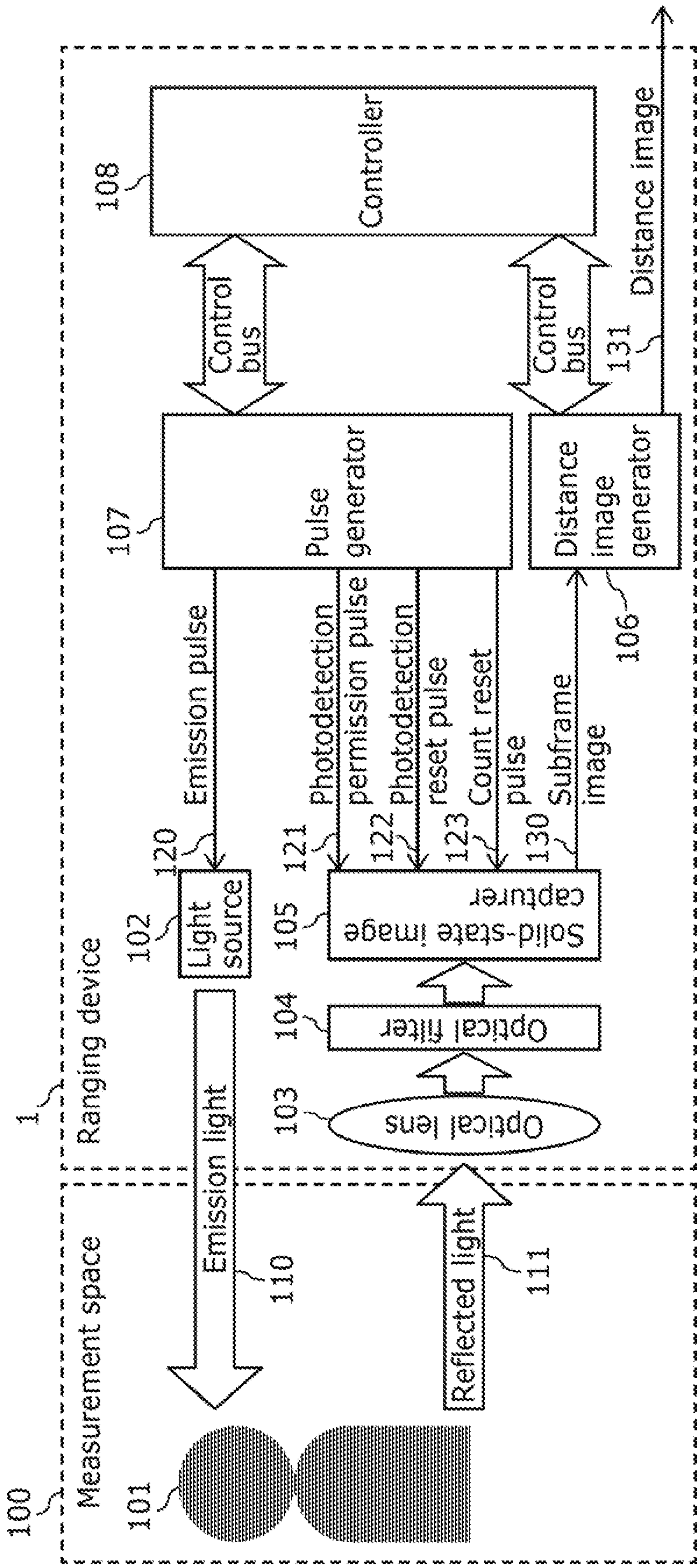
FIG. 52 is a block diagram illustrating an example of a configuration a ranging device and a surrounding object according to Embodiments 7, 9, and 10.

FIG. 52 is a block diagram schematically illustrating an example of a configuration of a time of flight (TOF) ranging device 1 and a surrounding object according to the present embodiment. FIG. 52 illustrates target object 101 in measurement space 100 as a surrounding object, emission light 110, and reflected light 111.

As illustrated in FIG. 52, ranging device 1 according to the present embodiment includes light source 102, optical lens 103, optical filter 104, solid-state image capturer 105, distance image generator 106, pulse generator 107, and controller 108.

Light source 102 emits emission light 110 toward target object 101 in measurement space 100.

Optical lens 103 focuses reflected light 111 reflected by target object 101.

Of the light focused by optical lens 103, optical filter 104 transmits only light in the near-infrared wavelength region around 940 nm.

Solid-state image capturer 105 detects the light transmitted through optical filter 104 and outputs the detection result as subframe image 130.

Distance image generator 106 generates distance information for each pixel of the distance image based on first to $n^{th}$ ($n \geq 4$) subframe images. The distance information indicates a measurement segment, among first to $m^{th}$ ($m \geq n$) measurement segments into which the ranging range is divided, that corresponds to the reflected light. For example, when n=6 and m=31, distance image generator 106 receives an input of six subframe images 130, divides the distance to target object 101 into first to thirty-first measurement segments for each pixel, calculates the distances, and outputs them out of the ranging device 1 as distance image 131. The term "measurement segment" is synonymous with the term "distance segment" used in Embodiments 1 through 6.

Pulse generator 107 outputs emission pulse 120 to light source 102 and outputs photodetection permission pulse 121, photodetection reset pulse 122, and count reset pulse 123 to solid-state image capturer 105. For example, pulse generator 107 generates one or more emission pulses according to an emission pattern prior to one instance of the output of the photodetection permission pulse. Here, the emission patterns are sequentially selected from a plurality of emission patterns that differ from each other in at least one of the number of times of output or the output timing of the emission pulses. The plurality of emission patterns include first to $n^{th}$ emission patterns corresponding to the first to $n^{th}$ subframe images. Each of the first to $n^{th}$ emission patterns indicates a plurality of emission pulses. The term "photodetection permission pulse" is synonymous with the term "exposure pulse" used in Embodiments 1 through 6.

Controller 108 controls distance image generator 106 and pulse generator 107.

If a sufficient amount of light can be obtained by light source 102, optical lens 103 may be omitted by using a pinhole as a substitute, and if no light source other than light source 102 is present in measurement space 100, optical filter 104 may be omitted. A coating that exhibits similar transmission characteristics as optical filter 104 may be applied to optical lens 103 instead of optical filter 104. Hereinafter the internal configuration of each element will be described.

[1.2 Configuration and Operation of Light Source]

Figure 53:
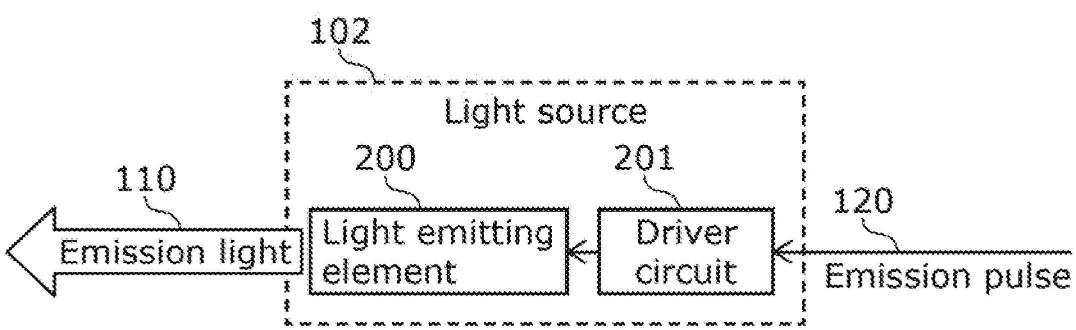
FIG. 53 is a block diagram illustrating an example of a configuration of a light source according to Embodiments 7, 9, and 10.

FIG. 53 is a block diagram illustrating an example of a configuration of light source 102 according to the present embodiment. Light source 102 includes light emitting element 200 and driver circuit 201, as illustrated in FIG. 53, and emits pulsed light with a wavelength of 940 nm by applying a voltage from driver circuit 201 to light emitting element 200 during the period when input emission pulse 120 is high. A vertical cavity surface emitting laser (VCSEL) is used as light emitting element 200, but some other light emitting element such as an infrared LED may be used.

[1.3 Configuration and Operation of Solid-state Image Capturer]

Figure 54:
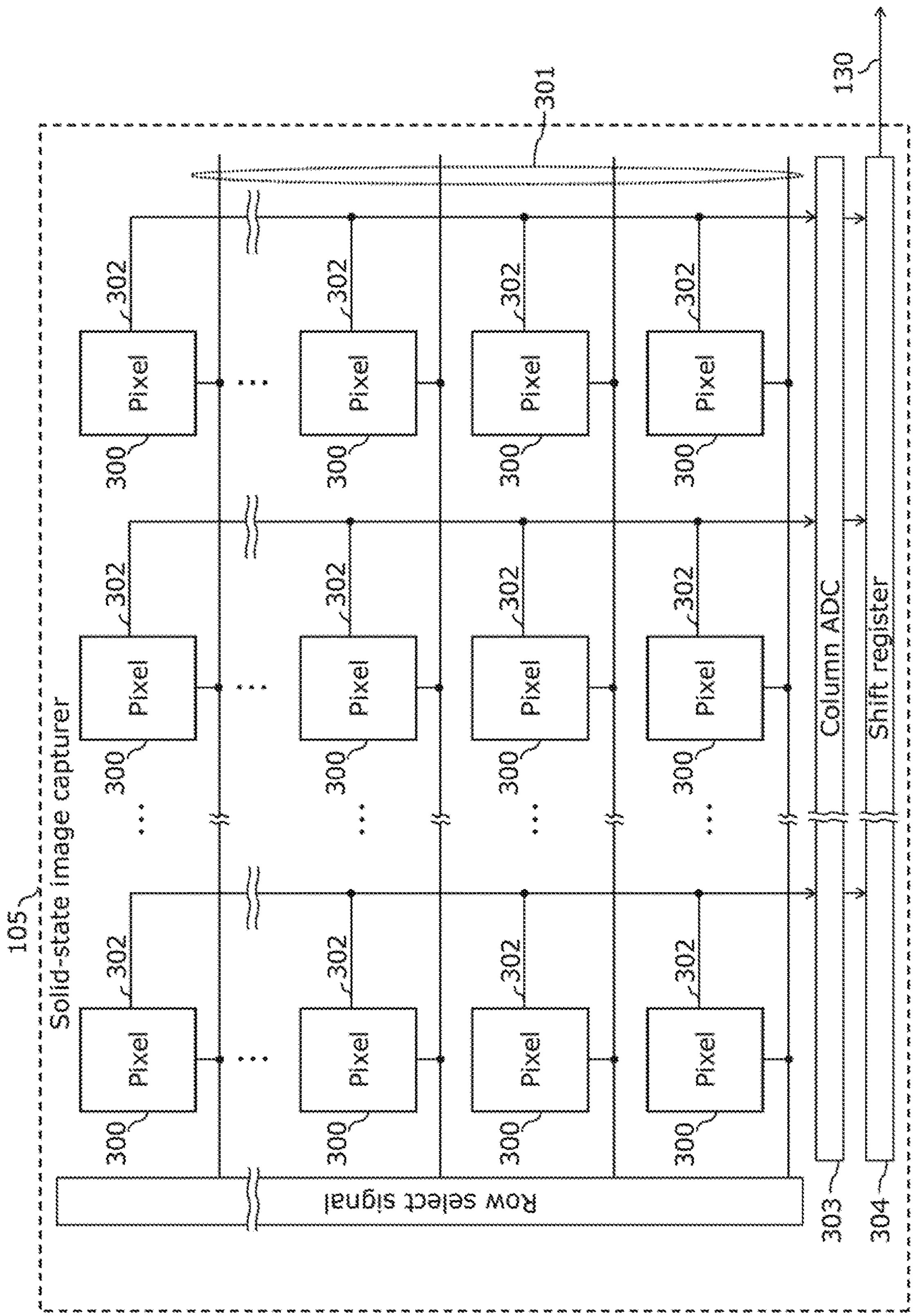
FIG. 54 is a block diagram illustrating an example of a configuration of a solid-state image capturer according to Embodiments 7 through 10.

FIG. 54 is a block diagram illustrating an example of a configuration of solid-state image capturer 105 according to the present embodiment. As illustrated in FIG. 54, solid-state image capturer 105 includes a plurality of pixels 300 arranged in two dimensions, column analog-to-digital converter (ADC) 303, and shift register 304, similar to a typical MOS image sensor.

Row select signals 301, which can be controlled per row, are connected to pixels 300, and by setting row select signal 301 to high, pixel output signal 302 is read out from pixels 300 of the corresponding row, converted to a digital signal by column ADC 303, and then sequentially output one pixel at a time as information for one row of subframe image 130 via shift register 304. By repeating the same operation for all rows, all pixels of subframe image 130 can be output.

Next, the configuration of pixel 300 will be described.

Figure 55:
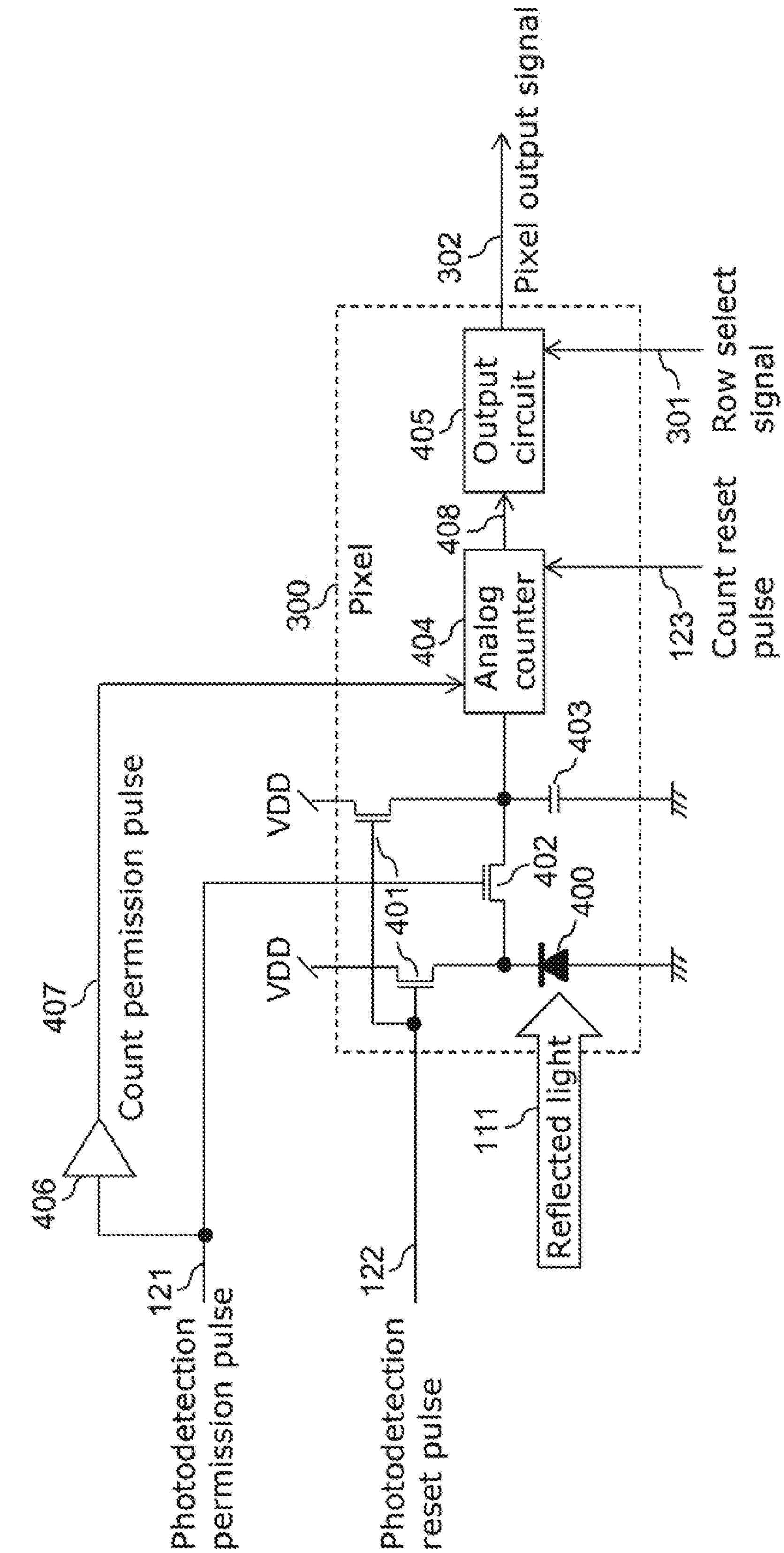
FIG. 55 is a block diagram including an example of a configuration of a pixel according to Embodiments 7 through 10.

FIG. 55 is a block diagram including an example of a configuration of pixel 300 according to the present embodiment. As illustrated in FIG. 55, pixel 300 includes avalanche photodiode (APD) 400 that detects reflected light 111, reset transistors 401, transfer transistor 402, photodetection capacitor 403 that holds the detection result of reflected light 111 as a voltage, analog counter 404 that counts the number of times reflected light 111 is detected, output circuit 405, and delay circuit 406.

Analog counter 404 holds a voltage corresponding to the photodetection count (this voltage is hereinafter referred to as detection count voltage 408), and updates detection count voltage 408 during the period when the input voltage is lower than reference voltage Vth and the count permission pulse is high. When count reset pulse 123 is high, detection count voltage 408 is reset to 0 V (corresponding to a photodetection count of 0).

Hereinafter, the photodetection operation of pixel 300 will be described.

Figure 56:
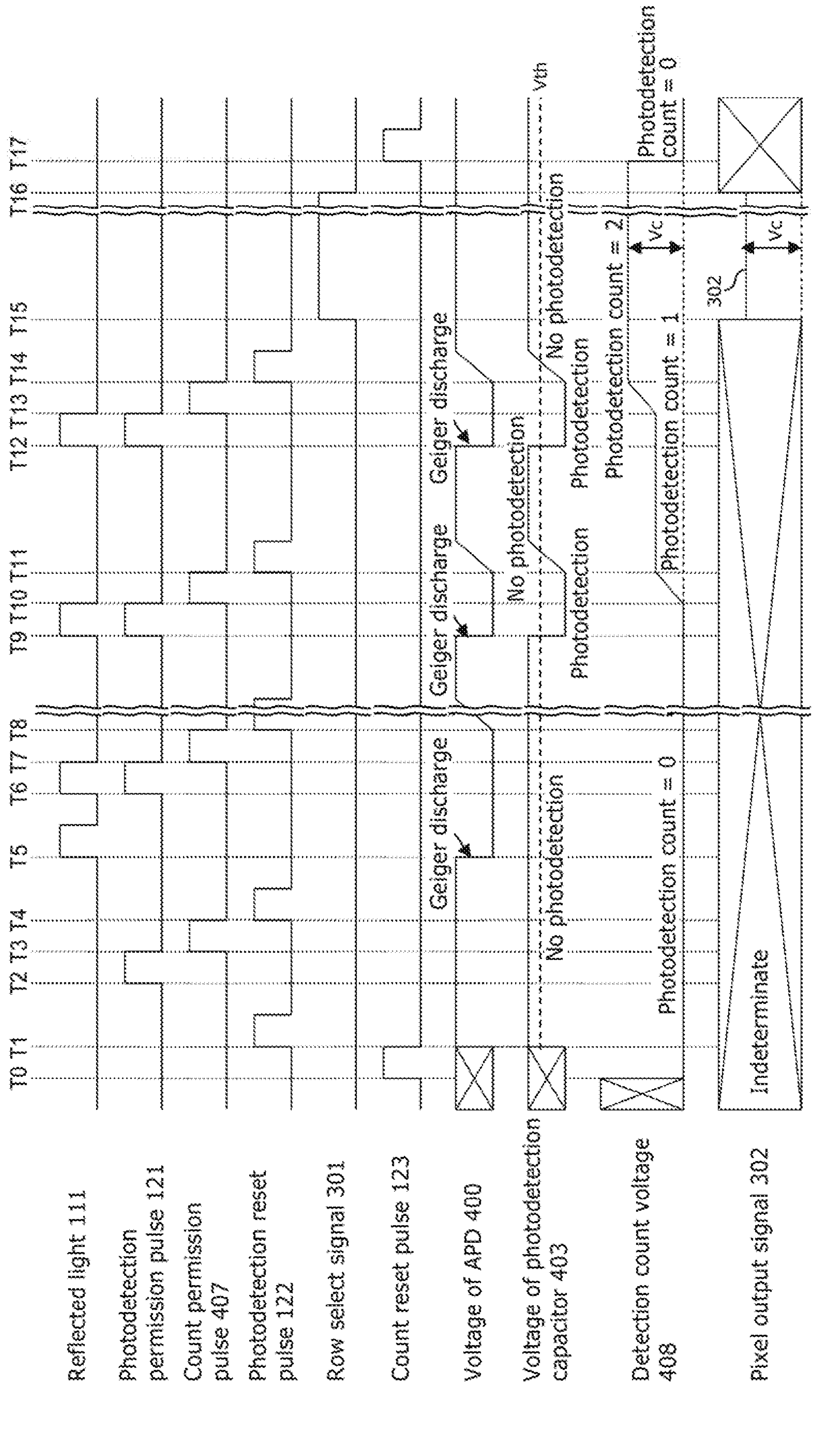
FIG. 56 is a time chart showing an example of the photodetection operation of a pixel according to Embodiments 7 through 10.

FIG. 56 is a time chart showing an example of the photodetection operation of pixel 300 according to the present embodiment. In FIG. 56, first, at timing T0, count reset pulse 123 is set to high to reset detection count voltage 408 (i.e., to indicate a photodetection count of 0).

Next, at timing T1, reset transistors 401 are turned ON and APD 400 and photodetection capacitor 403 are reset to the power supply voltage by setting photodetection reset pulse 122 to high, and then reset transistors 401 are turned OFF by turning photodetection reset pulse 122 to low.

At this time, by setting the power supply voltage so that the voltage applied to APD 400 is at least the breakdown voltage, APD 400 enters Geiger mode (i.e., a state in which Geiger discharge occurs when a single photon is incident).

Next, at timing T2, transfer transistor 402 is turned ON by setting photodetection permission pulse 121 to high, but the voltage of APD 400 and photodetection capacitor 403 does not change because reflected light 111 is not incident (i.e., "no photodetection" is indicated).

At timing T3, photodetection permission pulse 121 is set low, and count permission pulse 407 is delayed from photodetection permission pulse 121 by delay circuit 406 and set to high, but detection count voltage 408 does not change because the voltage of photodetection capacitor 403 is higher than reference voltage Vth (i.e., a photodetection count of 0 is indicated).

Then, at timing T4, APD 400 and photodetection capacitor 403 are reset to the power supply voltage by setting photodetection reset pulse 122 to high again.

Next, at timing T5, the voltage of APD 400 drops rapidly due to Geiger discharge caused by reflected light 111 being incident on APD 400, but since photodetection permission pulse 121 is low and transfer transistor 402 is OFF, the voltage of photodetection capacitor 403 does not change (i.e. "no photodetection" is indicated).

At timing T6, transfer transistor 402 is turned ON by setting photodetection permission pulse 121 to high, but the voltage of APD 400 is below the breakdown voltage, so even if reflected light 111 is incident at this point, Geiger discharge does not occur and the voltage of photodetection capacitor 403 does not change (i.e., "no photodetection" is indicated).

Therefore, at timing T7, detection count voltage 408 does not change, just like at timing T3 (i.e., a photodetection count of 0 is indicated).

Then, at timing T8, APD 400 and photodetection capacitor 403 are reset to the power supply voltage as in timing T4.

Then, at timing T9, transfer transistor 402 is turned ON by setting photodetection permission pulse 121 to high, and by reflected light 111 being incident on APD 400, the voltage of APD 400 drops rapidly due to Geiger discharge, and the voltage of photodetection capacitor 403 also drops (i.e. "photodetection" is indicated).

At timing T10, count permission pulse 407 is high, and the voltage of photodetection capacitor 403 is lower than reference voltage Vth, so detection count voltage 408 changes (i.e., a photodetection count of 1 is indicated).

Then, at timing T11, APD 400 and photodetection capacitor 403 are reset to the power supply voltage as in timing T4.

Like timings T9 through T11, reflected light 111 is also detected at timings T12 through T14, and detection count voltage 408 changes (i.e., a photodetection count of 2 is indicated).

By repeating the above operations, it is possible to count the number of times reflected light 111 is incident during the period when photodetection permission pulse 121 is high.

However, if reflected light 111 is incident before the period when photodetection permission pulse 121 is high, as in timing T5, it is not counted.

Then, at timing T15, the final detection count voltage 408, Vc, is output as pixel output signal 302 by setting row select signal 301 to high, and at timing T16, the output of pixel output signal 302 is completed by setting row select signal 301 to low.

Finally, at timing T17, detection count voltage 408 is reset again by setting count reset pulse 123 to high (i.e., a photodetection count of 0 is indicated).

[1.4 Configurations of Distance Image Generator, Pulse Generator, and Controller]

Figure 57:
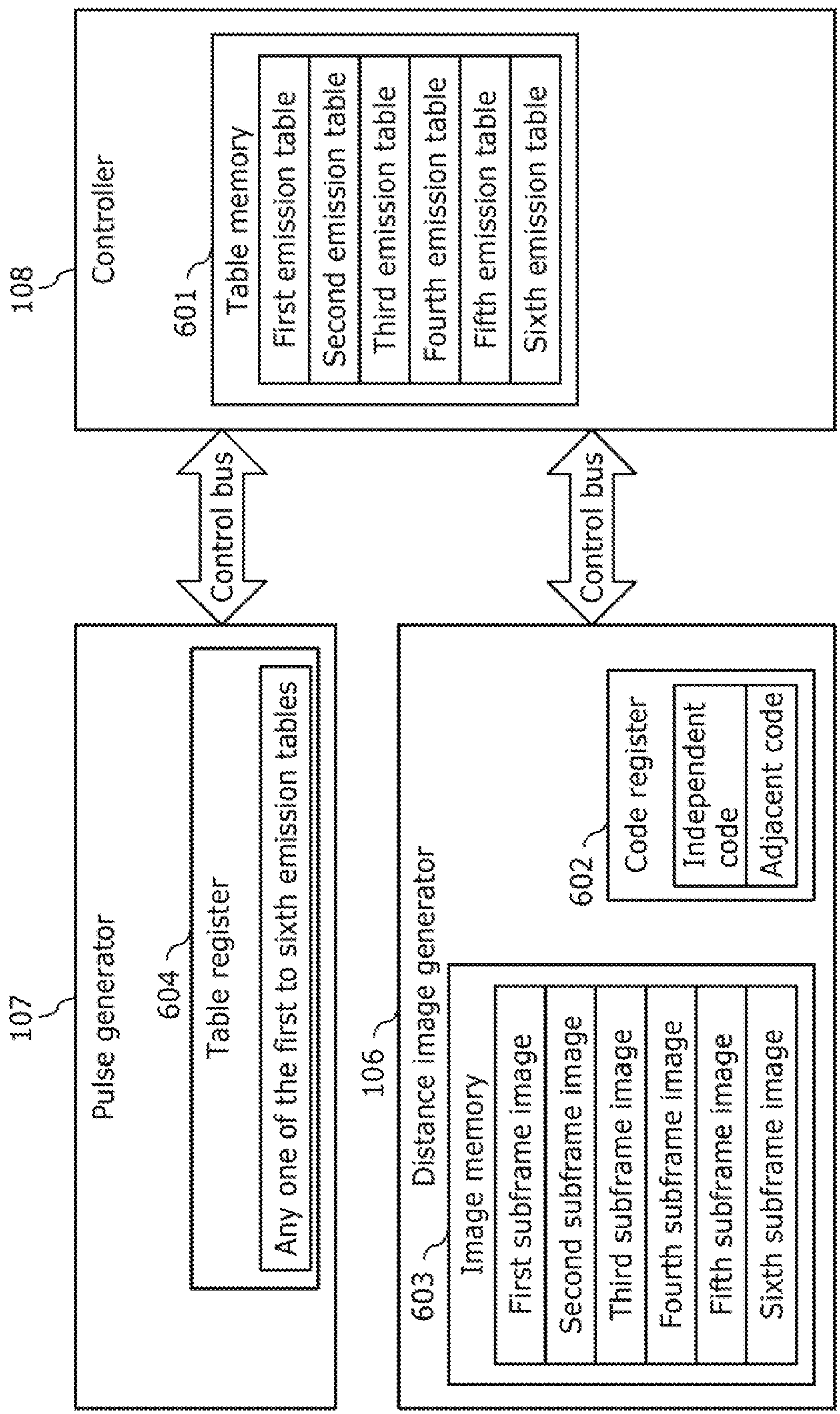
FIG. 57 illustrates an example of data held in a distance image generator, a pulse generator, and a controller according to Embodiments 7 through 10.

FIG. 57 illustrates an example of data held in distance image generator 106, pulse generator 107, and controller 108 according to the present embodiment.

Distance image generator 106, pulse generator 107, and controller 108 are equipped with table memory 601 for storing the first to sixth emission tables, code register 602 for storing the independent codes and the adjacent codes, an image memory for temporarily storing the first to sixth subframe images 603, and table register 604 that temporarily stores any one of the first to sixth emission tables, as illustrated in FIG. 57. Changes to code register 602 and table register 604 are made by controller 108 via the control bus. Controller 108 also determines the first to sixth emission patterns based on the first to sixth emission tables. The term "adjacent code" used here is synonymous with the term "adjacent code" in Embodiments 1 through 4 and the term "first adjacent code" in Embodiments 5 and 6. Even after Embodiment 7, the unspecified term "adjacent code" shall refer to the "first adjacent code" instead of the "second adjacent code".

Distance image generator 106, pulse generator 107, and controller 108 are realized by combining, for example, a central processing unit (CPU), a field programmable gate array (FPGA), a digital signal processor (DSP), and an image signal processor (ISP), etc.

[1.5 Operations: Overall]

An operation sequence of the ranging device according to the present embodiment is described below.

Figure 58:
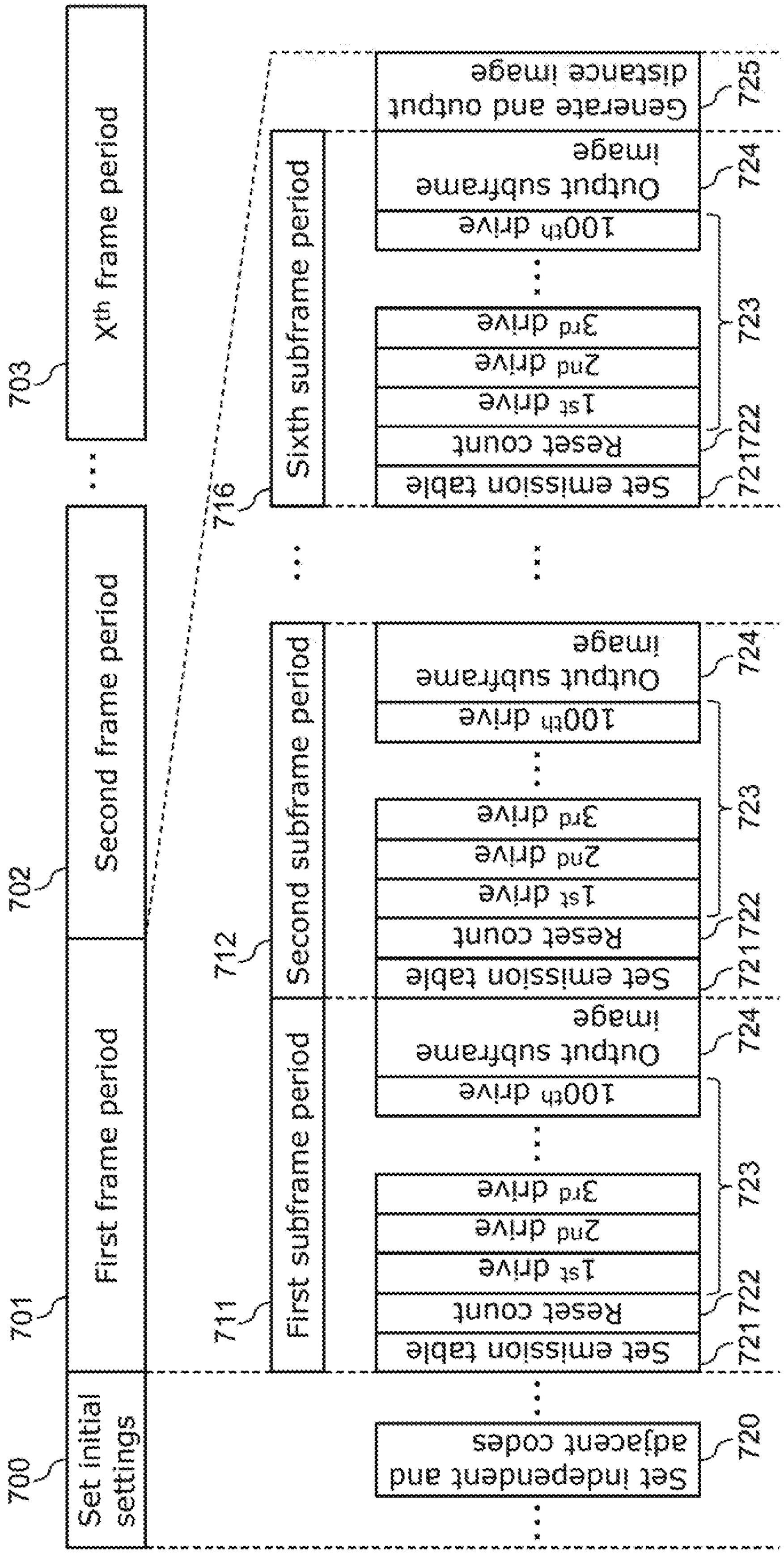
FIG. 58 is a time chart of an example of the operation sequence according to Embodiments 7 through 10.

FIG. 58 is a time chart of an example of the operation sequence according to the present embodiment. As illustrated in FIG. 58, first there is initial setting period 700, followed by first frame period 701 and second frame period 702, which are periods in which distance image 131 is output, and so on until $X^{th}$ frame period 703 (X is a natural number) in which the ranging device stops. This sequence sequentially repeats in this manner. First frame period 701 includes first subframe period 711 to sixth subframe period 716, and the same operations are performed in second frame period 702 and subsequent frame periods.

[1.6 Operations: Initial Setting]

First, an example of the data used for the initial settings will be given.

FIG. 59 illustrates specific examples of (a) emission tables, (b) emission codes, (c) independent codes and adjacent codes.

In initial setting period 700, at timing 720, controller 108 generates the emission codes shown in (b) in FIG. 59 based on the first to sixth emission tables shown in (a) in FIG. 59, and also generates the independent codes and adjacent codes shown in (c) in FIG. 59, and stores them in code register 602 of distance image generator 106 via the control bus.

[1.7 Emission Tables, Independent and Adjacent Codes]

As illustrated in (a) in FIG. 59, the first to sixth emission tables store the emission counts of light emitting element 200 included in light source 102 for each of the first to thirty-first measurement segments in each of the first to sixth subframe periods 711 to 716. The thirty-first measurement segment is the farthest and the first measurement segment is the closest.

For example, the value of the nineteenth measurement segment in first emission table is 76, which indicates that in first subframe period 711, light emitting element 200 emits light 76 times to detect reflected light 111 from the nineteenth measurement segment.

Similarly, the value of the eighth measurement segment in sixth emission table is 32, which indicates that in sixth subframe period 716, light emitting element 200 emits light 32 times to detect reflected light 111 from the eighth measurement segment.

Although the emission count is set to increase from the first measurement segment to the thirty-first measurement segment taking the attenuation of emission light 110 over distance into consideration, this example is not limiting. For example, the emission count may be set to increase near a measurement segment prioritized based on the situation.

As illustrated in (b) in FIG. 59, the first to sixth emission codes are the first to sixth emission tables binarized with a threshold value of 1, and the emission or non-emission of light by light emitting element 200 is stored for each of the first to thirty-first measurement segments in each of the first to sixth subframe periods 711 to 716. For example, the value of the nineteenth measurement segment of the first emission table is 76, so the value of the nineteenth measurement segment of the first emission code is 1. Similarly, the value of the nineteenth measurement segment of the sixth emission table is 0, so the value of the nineteenth measurement segment of the sixth emission code is 0. Here, the first to sixth emission codes are one specific example of the n types of packet generation codes according to Embodiments 1 through 6, and correspond to, for example, packet 1 generation code 10501 to packet 6 generation code 10506 illustrated in FIG. 5.

Next, the independent codes and the adjacent codes will be explained.

Each independent code is the n-bit data included in the first to $n^{th}$ emission codes per measurement segment. In (c) in FIG. 59, each independent code is 6-bit data, expressed in decimal notation. In (c) in FIG. 59, there are 31 independent codes. Each of the independent codes is, in principle, different from any other independent code. Each independent code is generated by controller 108, for example, as an n-bit binary number of the n bits included in the first to $n^{th}$ emission codes per measurement segment.

Distance image generator 106 determines photodetection codes by regarding the first to $n^{th}$ subframe images as an n-bit binary numbers pixel by pixel. The term "photodetection code" is synonymous with the term "exposure code" described in Embodiments 1 through 4 and the term "first exposure code" in Embodiments 5 and 6. Even after Embodiment 7, the notations "photodetection code" and "exposure code" shall refer to the "first exposure code" instead of the "second exposure code".

Distance image generator 106 further compares the photodetection code with the independent codes. If the photodetection code matches any of the independent codes, it means that a target object was present in the measurement segment corresponding to the independent code. This makes it possible to generate distance information that indicates the measurement segment where the target object is located.

Each adjacent code is a code obtained by applying a bitwise logical OR operation between two independent codes corresponding to two adjacent measurement segments. Each adjacent code is generated, for example, by applying a bitwise logical OR operation between two independent codes corresponding to two adjacent measurement segments by controller 108.

If the photodetection code above matches any one of the adjacent codes, it means that the target object was present within the range of the two measurement segments corresponding to the matching adjacent code. This makes it possible to generate distance information that indicates the measurement segment where the target object is located.

For example, as shown in (c) in FIG. 59, each independent code is the equivalent to the first to sixth emission codes per measurement segment among the first to thirty-first measurement segments, regarded as a 6-bit binary number. For example, the independent code for the nineteenth measurement segment of the first to sixth emission codes is [1, 0, 0, 0, 1, 0], and taking the sixth emission code as the most significant bit, the value is written as 010001 in binary notation and 17 in decimal notation. The adjacent code is the logical OR of the independent codes of two adjacent measurement segments. For example, the adjacent code spanning the nineteenth measurement segment and the eighteenth measurement segment is 19, which is the logical OR of the two corresponding independent codes of 17 and 18, respectively.

Note that the first to sixth emission tables should be designed so that none of the independent and adjacent codes to be generated overlap, and in addition, the independent and adjacent codes should be designed to include at least one bit of 0.

[1.8 Operations: Subframe Periods]

Returning to FIG. 58, in first subframe period 711 to sixth subframe period 716, controller 108 first selects one of the first to the sixth emission tables at timing 721 and holds the selected table in table register 604 of pulse generator 107 via the control bus. For example, the first emission table is selected for first subframe period 711, the second emission table is selected for second subframe period 712, and the emission tables for the third and subsequent subframe periods are selected following the same rules. Next, at timing 722, pulse generator 107 resets detection count voltage 408 held in solid-state image capturer 105 by setting count reset pulse 123 to high (i.e., photodetection count=0). Then, at timing 723, solid-state image capturer 105 performs the first to one-hundredth drives sequentially. In the first to one-hundredth drives, pulse generator 107 outputs emission pulse 120 based on the emission tables held in table register 604.

[1.9 Operations: Emission Pulse Output]

Figure 60:
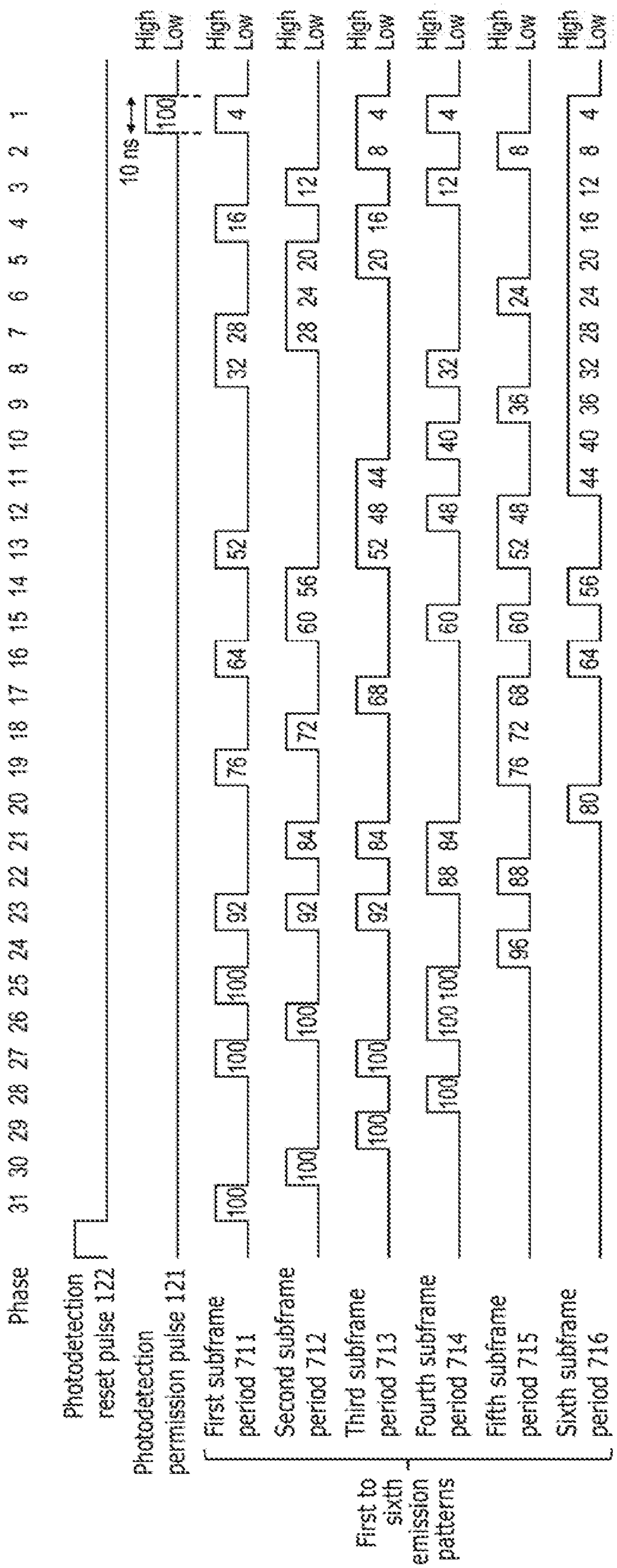
FIG. 60 illustrates an example of first to sixth emission patterns according to Embodiments 7 through 10.

Here, FIG. 60 illustrates the first to sixth emission patterns included in the output patterns of emission pulse 120 in first subframe period 711 to sixth subframe period 716. FIG. 60 illustrates an example of the first to sixth emission patterns according to Embodiments 7 through 10.

The emission pulses in first subframe period 711 in FIG. 60 indicate the first emission pattern. The first emission pattern in FIG. 60 corresponds to one repetition of the first emission pattern, which is repeated 100 times within first subframe period 711, similar to the example in FIG. 58.

Similarly, the second to sixth subframe periods 712 to 716 represent the second through sixth emission patterns, respectively.

The first to sixth subframe periods 711 to 716 in FIG. 60 are not periods that exist at the same time, but rather periods that exist at different timings as illustrated in FIG. 58. In FIG. 60, they are shown together for convenience. In practice, the combination of the emission pattern corresponding to one of the first to sixth subframe periods 711 to 716 and photodetection reset pulse 122 is repeated. In FIG. 60, operations performed at six different timings are shown together.

As illustrated in FIG. 60, after resetting solid-state image capturer 105 to the state of "no photodetection" by setting photodetection reset pulse 122 to high, the output logic of emission pulse 120 is determined in phases 1 to 31 in 10 ns units based on photodetection permission pulse 121. Phases 1 to 31 correspond to the first to thirty-first measurement segments, respectively. For example, when emission pulse 120 is high output in phase 31 and emission light 110 is emitted from light source 102, reflected light 111 is detected by solid-state image capturer 105 only when target object 101 is in the thirty-first measurement segment. When emission pulse 120 is high output in phase 27 in addition to phase 31, reflected light 111 is detected by solid-state image capturer 105 when target object 101 is in the thirty-first measurement segment and the twenty-seventh measurement segment. Note that the numbers below each pulse in FIG. 60 indicate the number of times each pulse is set high in each phase. Photodetection permission pulse 121 is set to high once at phase 1 in each of the first to one-hundredth drives, thus totaling 100 times, and the same operation is repeated in each of first subframe period 711 to sixth subframe period 716 (in FIG. 60, photodetection permission pulses 121 in first subframe period 711 to sixth subframe period 716 are shown as a single line for simplicity). The number of high outputs of emission pulse 120 is determined based on the first to sixth emission tables illustrated in (a) in FIG. 59. For example, the number of high outputs of emission pulse 120 in phase 19 of first subframe period 711 is 76 according to the value of the nineteenth measurement segment of the first emission table illustrated in (a) in FIG. 59.

Figure 61:
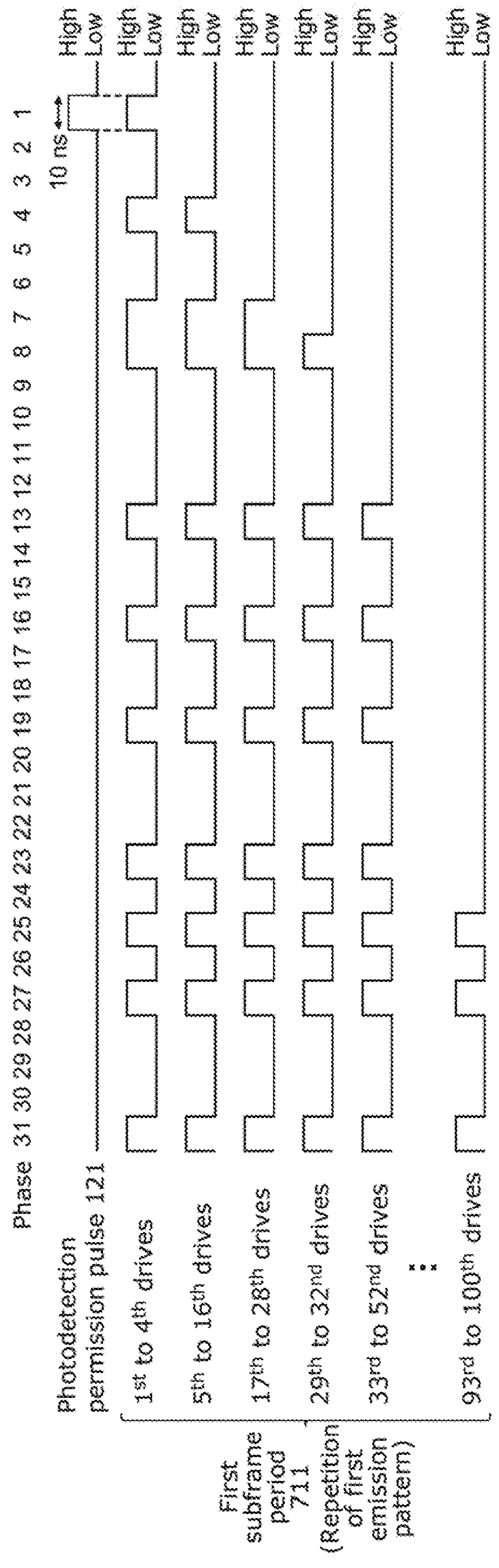
FIG. 61 illustrates another example of drives of a first emission pattern according to Embodiments 7 through 10.

Furthermore, the plurality of first emission patterns included in first subframe period 711, i.e., the first emission pattern repeated 100 times, into which the output pattern of emission pulse 120 is divided for the first to one-hundredth drives in first subframe period 711, are as illustrated in FIG. 61.

FIG. 61 illustrates an example of drives of the first emission pattern according to Embodiments 7 through 10. As illustrated in FIG. 61, photodetection permission pulse 121 repeats the same operation for each of the first to one-hundredth drives. In FIG. 61, for simplicity, photodetection permission pulses 121 in the first to one-hundredth drives are shown as a single line. Stated differently, the first to one-hundredth drives illustrated in FIG. 58 are illustrated together for convenience. The first emission pattern has the same high output period as the output pattern of emission pulse 120 in first subframe period 711 of FIG. 60 in the first to fourth drives, but the number of high outputs in phase 1 from FIG. 60 is four, so the high output in phase 1 is masked in the fifth to one-hundredth drives. Here, "masked" means that the emission pulses are decimated and disabled. In addition, since the number of high outputs in phase 4 from FIG. 60 is 16, the high output in phase 4 is additionally masked in the seventeenth to one-hundredth drives, and for the rest, the high output is masked following the same rule, whereby only phases 25, 27, and 31 in the ninety-third to one-hundredth drives have a high output.

The above operations illustrated in FIG. 61 satisfy the high output count of emission pulse 120 in first subframe period 711 illustrated in FIG. 60. The method of assigning the number of high outputs of emission pulse 120 is not limited to this. For example, the high output of phase 1, which is performed in the first to fourth drives, may be performed in the first, twenty-fifth, fiftieth, and one-hundredth drives in order to distribute it over the time axis. A rest period (a period during which no detection operation is performed) may be provided between each drive to prevent reflected light 111 caused by emission pulse 120 in an earlier drive from being mistakenly detected in a later drive.

In FIG. 61, the operations are shown with a focus on first subframe period 711, but the same rules apply to second subframe period 712 to sixth subframe period 716. With the above operations, in each of the first to sixth subframe periods, solid-state image capturer 105 holds detection count voltage 408 corresponding to reflected light 111 from a plurality of measurement segments, which is different for each pixel.

[1.10 Operations: Subframe Image Output]

Returning to FIG. 58, after completing the first to one-hundredth drives, at timing 724, detection count voltage 408 of each pixel is read out row by row as pixel output signal 302 from solid-state image capturer 105, and A/D conversion is performed to output it as subframe image 130. Distance image generator 106 holds subframe image 130 in image memory 603 as one of the first to sixth subframe images (the first subframe image for the first subframe period, the second subframe image for the second subframe period, and so on). After repeating the above operations and completing up to sixth subframe period 716, at timing 725, distance image generator 106 generates and outputs distance image 131 based on the first to sixth subframe images and the independent and adjacent codes held in code register 602.

[1.11 Operations: Distance Image Output]

Figure 62:
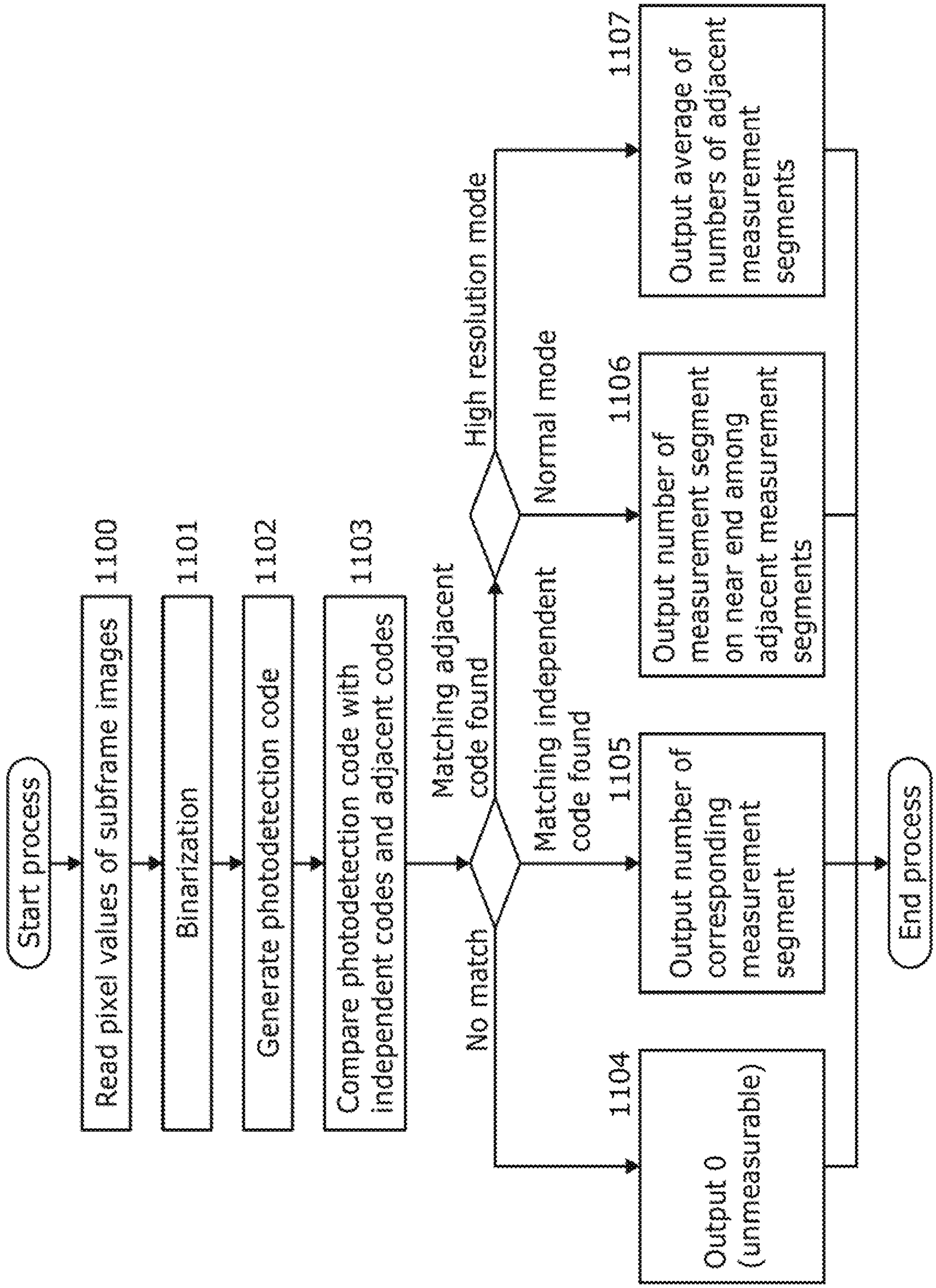
FIG. 62 is a flowchart illustrating an example of a process for generating a distance image according to the present embodiment.

FIG. 62 is a flowchart illustrating an example of a process for generating a distance image according to the present embodiment. FIG. 62 illustrates an example of a process for generating a distance image at each pixel of distance image 131 by distance image generator 106. As illustrated in FIG. 62, there are two processing modes of distance generation: a normal mode in which the distance to target object 101 is divided into the first to thirty-first measurement segments, and a high resolution mode in which the distance is further divided into units equivalent to half a measurement segment. It is possible to switch between the normal mode and the high resolution mode from controller 108 via a control bus. In either processing mode, the pixel values to be processed (i.e., the photodetection count) for each of the first to sixth subframe images are first read from image memory 603 in step 1100. Next, in step 1101, the read pixel values to be processed are binarized.

Figure 63:
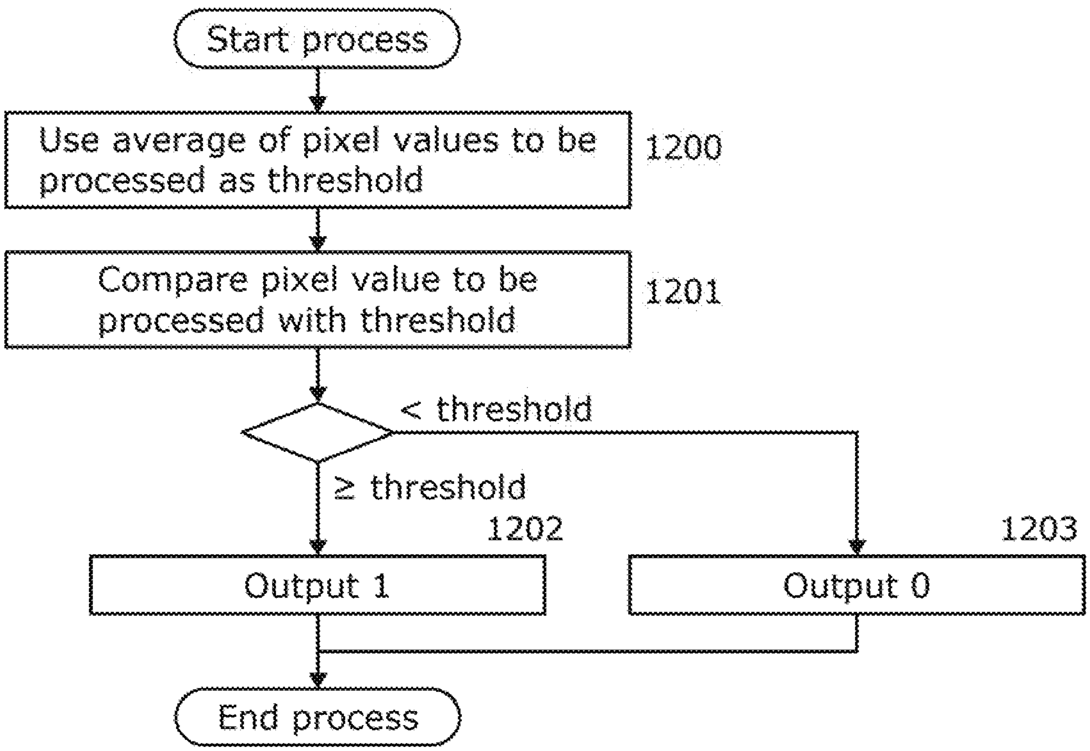
FIG. 63 is a flowchart illustrating an example of the binarization process of step 1101 in FIG. 62.

FIG. 63 is a flowchart illustrating an example of the binarization process of step 1101 in FIG. 62. First in the binarization process in step 1200, as illustrated in FIG. 63, the average value of the pixel values to be processed is obtained and used as a threshold. Next, the pixel values to be processed are compared with the threshold value in step 1201. If the pixel value is above the threshold value, 1 is output in step 1202, if the pixel value is below the threshold value, 0 is output in step 1203. The threshold in the binarization process works to remove unnecessary components such as background light (light in the infrared wavelength region caused by sources other than the emission light 110 that are present in measurement space 100) and noise caused by solid-state image capturer 105. For example, if the pixel values to be processed in the first to sixth subframe images are [33, 2, 3, 1, 31, 3], the average value is 12 (rounded down to the nearest whole number), and if this is set as the threshold, the result of the binarization process will be [1, 0, 0, 0, 1, 0], where small components below the threshold are clipped to 0. Returning to FIG. 62, in step 1102, a photodetection code, i.e., the first exposure code, is generated by taking the result of the binarization process as a 6-bit binary number. For example, if the result of the binarization process is [1, 0, 0, 0, 1, 0], the photodetection code is 17 in decimal notation if the tail is taken as the most significant bit. Next, in step 1103, the photodetection code is compared with the independent codes and the adjacent codes. If the photodetection code does not match any of the independent codes or the adjacent codes, 0 is output in step 1104 as unmeasurable, if the photodetection code matches an independent code, the number of the corresponding measurement segment is output in step 1105, and if the photodetection code matches an adjacent code, the number of the measurement segment on the near end among the adjacent measurement segments is output in step 1106 (if in normal mode) or the average of the numbers of the adjacent measurement segments is output in step 1107 (if in high resolution mode). For example, if the photodetection code is 0 or 63, it outputs 0 as unmeasurable because there is neither an independent code nor an adjacent code that matches from (c) in FIG. 59. Note that whether to use the normal mode or the high resolution mode may be set in advance by the user.

If the photodetection code is 17, it matches the independent code of the nineteenth measurement segment from (c) in FIG. 59, so 19 is output. If the photodetection code is 31, it matches the adjacent code spanning the twenty-second and twenty-third measurement segments from (c) in FIG. 59, so 22 is output in the normal mode and 22.5, the average value, is output in the high resolution mode. In the normal mode, the number of the measurement segment on the far end among the adjacent measurement segments may be output. By performing the above process illustrated in FIG. 62 for each pixel, distance image 131 can be generated from the first to sixth subframe images.

[1.12 Operations: Overlapping of First Independent Code]

Next, another example of the independent codes and the adjacent codes will be given.

In FIG. 64, (a) illustrates another example of independent and adjacent codes according to Embodiment 7, and (b) illustrates yet another example.

The first measurement segment corresponds to the nearest distance. For example, the independent code of 1 of the first measurement segment in (a) in FIG. 64 matching the photodetection code means that target object 101 is present at a position very close to 0 m (0 m to less than 0.75 m when the pulse width of emission pulse 120 is 10 ns). Depending on the application of the ranging device, it may not be necessary to take such a condition into account (e.g., if it can be guaranteed that there is no target object near 0 m), in which case the independent code of the first measurement segment will be redundant. Therefore, regarding the independent code of the first measurement segment only, it is possible to allow the independent code of the first measurement segment to overlap only one independent code of another measurement segment. For example, as illustrated in (b) of FIG. 64, if the independent codes of the first and fourth measurement segments are allowed to have an overlapping value of 1, the measurement of the thirty-second measurement segment becomes possible instead of disabling the measurement of the first measurement segment.

[1.13 Advantageous Effects, etc.]

By performing the same operation as described above for first frame period 701 on second frame period 702 and subsequent frame periods, distance image 131 can be sequentially output out of the ranging device as a moving image. In the present embodiment, the number of subframe images required to divide the distance to target object 101 into the first to thirty-first measurement segments and output the distance is 6, which is reduced to ⅕ or less compared to 31 (the same number as the number of measurement segments) in the conventional techniques disclosed in PTL 1. This makes it possible to increase the measurement time per subframe (i.e., the measurement accuracy) by a factor of five or more while maintaining the frame rate and the number of measurement segments. Moreover, the memory capacity for holding subframe images is ⅕ or less of that of conventional methods, and the required processing speed (i.e., computational resources) is also ⅕ or less. Alternatively, it is possible to increase the number of measurement segments by a factor of five or more while maintaining the frame rate and measurement time per subframe. In this case, too, the memory capacity for holding subframe images and the required processing speed are the same as that of conventional methods.

Accordingly, the present embodiment can be said to be a very reasonable method for achieving both frame rate and measurement accuracy (number of measurement segments and measurement time) without increasing memory capacity and computational resources, thus realizing a high-speed and high-accuracy ranging device at a low cost.

As described above, the ranging device according to Embodiment 1 includes: light source 102 that emits light toward a measurement space; solid-state image capturer 105 that generates first to $n^{th}$ ($n \geq 4$) subframe images in one frame period based on reflected light from a target object in the measurement space; pulse generator 107 that generates an emission pulse that instructs light source 102 to emit light and a photodetection permission pulse that instructs solid-state image capturer 105 to detect light; distance image generator 106 that generates distance information for each pixel of a distance image based on the first to $n^{th}$ subframe images, the distance information indicating a measurement segment, among first to $m^{th}$ ($m \geq n$) measurement segments into which the ranging range is divided, that corresponds to the reflected light; and controller 108 that controls pulse generator 107 and distance image generator 106. Pulse generator 107 generates one or more emission pulses according to an emission pattern prior to one instance of the output of the photodetection permission pulse. The emission patterns are sequentially selected from a plurality of emission patterns that differ from each other in at least one of the number of times of output or the output timing of the emission pulses.

With this, since it is possible reduce the number of subframe images required per measurement segment, the frame rate can be improved while maintaining distance measurement accuracy, distance measurement accuracy can be improved while maintaining the frame rate, or as a moderate setting, both distance measurement accuracy and the frame rate can be improved. In addition, the system can be configured inexpensively because the memory capacity and computational resources required for distance image generation can be reduced.

Here, the emission patterns may include first to $n^{th}$ emission patterns corresponding to the first to $n^{th}$ subframe images, and each of the first to $n^{th}$ emission patterns may indicate a plurality of emission pulses.

This makes it possible to measure the distances of m measurement segments, which is much more than n, from n subframe images. This is because the first to $n^{th}$ emission patterns (and also the first to $n^{th}$ subframe images) are capable of measuring the reflected waves of approximately 2 to the $(n-1)^{th}$ power of measurement segments. Stated differently, the number of measurement segments, m, is a multiple of n, and can be approximately 2 to the $(n-1)^{th}$ power.

Here, light source 102 may include one or more light emitting elements, controller 108 may include first to $n^{th}$ emission tables corresponding to the first to $n^{th}$ subframe images, the first to $n^{th}$ emission tables may store, for each of the first to $m^{th}$ measurement segments, a total emission count of the one or more light emitting elements, and controller 108 may determine the first to $n^{th}$ emission patterns based on the first to $n^{th}$ emission tables.

This makes it possible to easily determine the first to $n^{th}$ emission patterns by preparing n emission tables in advance.

Here, controller 108 may: generate first to $n^{th}$ emission codes as the n types of packet generation codes by binarizing the first to $n^{th}$ emission tables; generate independent codes, each independent code being an n-bit binary number of n bits included in the first to $n^{th}$ emission codes per first to $m^{th}$ measurement segment; and generate adjacent codes by applying a logical OR operation between the independent codes corresponding to two adjacent measurement segments. Distance image generator 106 may determine a photodetection code, the photodetection code being an n-bit binary number of n bits of the first to $n^{th}$ subframe images per pixel, and generate the distance information by comparing the photodetection code with the independent codes and the adjacent codes.

With this, if the photodetection code matches any of the independent codes, it means that a target object was present in the measurement segment corresponding to the independent code. If the photodetection code above matches any one of the adjacent codes, it means that the target object was present within the range of the two measurement segments corresponding to the matching adjacent code. This makes it possible to generate distance information that indicates the measurement segment where the target object is located.

Here, each of the adjacent codes may be different from any other adjacent code.

This makes it possible to uniquely identify the measurement segment where there was reflected light.

Here, each of the independent codes may be different from any other independent code.

Here, the independent code corresponding to the nearest distance among the first to $m^{th}$ measurement segments may be the same as any of the independent codes or adjacent codes corresponding to a distance other than the nearest distance.

This makes it possible, for example, to expand the ranging range by adding one more measurement segment when no target object can exist in the nearest measurement segment in the environment where the ranging device is used.

Here, each of the independent codes and the adjacent codes may include at least one bit of 0.

This makes it possible to obtain the background light component from the pixel value corresponding to "0" in the subframe image, and to improve the ranging accuracy by taking the background light component into account.

Here, the one frame period may include first to $n^{th}$ subframe periods for generating the first to $n^{th}$ subframe images, and in an $i^{th}$ (i is an integer from 1 to n) subframe period, pulse generator 107 may repeat, M times, a set of: an output of the emission pulse according to an $i^{th}$ emission pattern; and one instance of an output of the photodetection permission pulse.

This makes it possible to improve the measurement accuracy through repeated measurements even when the amount of emission light is small.

Here, in each of the first to $n^{th}$ subframe periods, the shorter the distance of a measurement segment among the first to $m^{th}$ measurement segments is, the more controller 108 may decimate, to a number less than M, the number of repetitions of the emission pulse corresponding to the measurement segment.

This makes it possible to increase the amount of emission light as the measurement segment distance increases to ensure measurement accuracy.

Here, the amount of emission light may be increased in two or more steps, for example.

The ranging method according to Embodiment 7 is used in a ranging device including: light source 102 that emits light toward a measurement space; solid-state image capturer 105 that generates first to $n^{th}$ ($n \geq 4$) subframe images in one frame period based on reflected light from a target object in the measurement space; pulse generator 107 that generates an emission pulse instructing light source 102 to emit light and a photodetection permission pulse that instructs solid-state image capturer 105 to detect light; distance image generator 106 that generates distance information for each pixel of a distance image based on the first to $n^{th}$ subframe images, the distance information indicating a measurement segment, among first to $m^{th}$ (m n) measurement segments into which the ranging range is divided, that corresponds to the reflected light; and controller 108 that controls pulse generator 107 and distance image generator 106. The ranging method includes: sequentially selecting an emission pattern from among emission patterns that differ from each other in at least one of the number of times of output or the output timing of the emission pulse; generating one or more emission pulses according to the selected emission pattern, and after the generation of the one or more emission pulse according to the selected emission pattern, performing one instance of the output of the photodetection permission pulse.

With this, since it is possible reduce the number of subframe images required per measurement segment, the frame rate can be improved while maintaining distance measurement accuracy, distance measurement accuracy can be improved while maintaining the frame rate, or as a moderate setting, both distance measurement accuracy and the frame rate can be improved. In addition, the system can be configured inexpensively because the memory capacity and computational resources required for distance image generation can be reduced.

Embodiment 8

The present embodiment describes a case in which the light source includes a plurality of light emitting elements.

[2.1 Configuration of Ranging Device]

Figure 65:
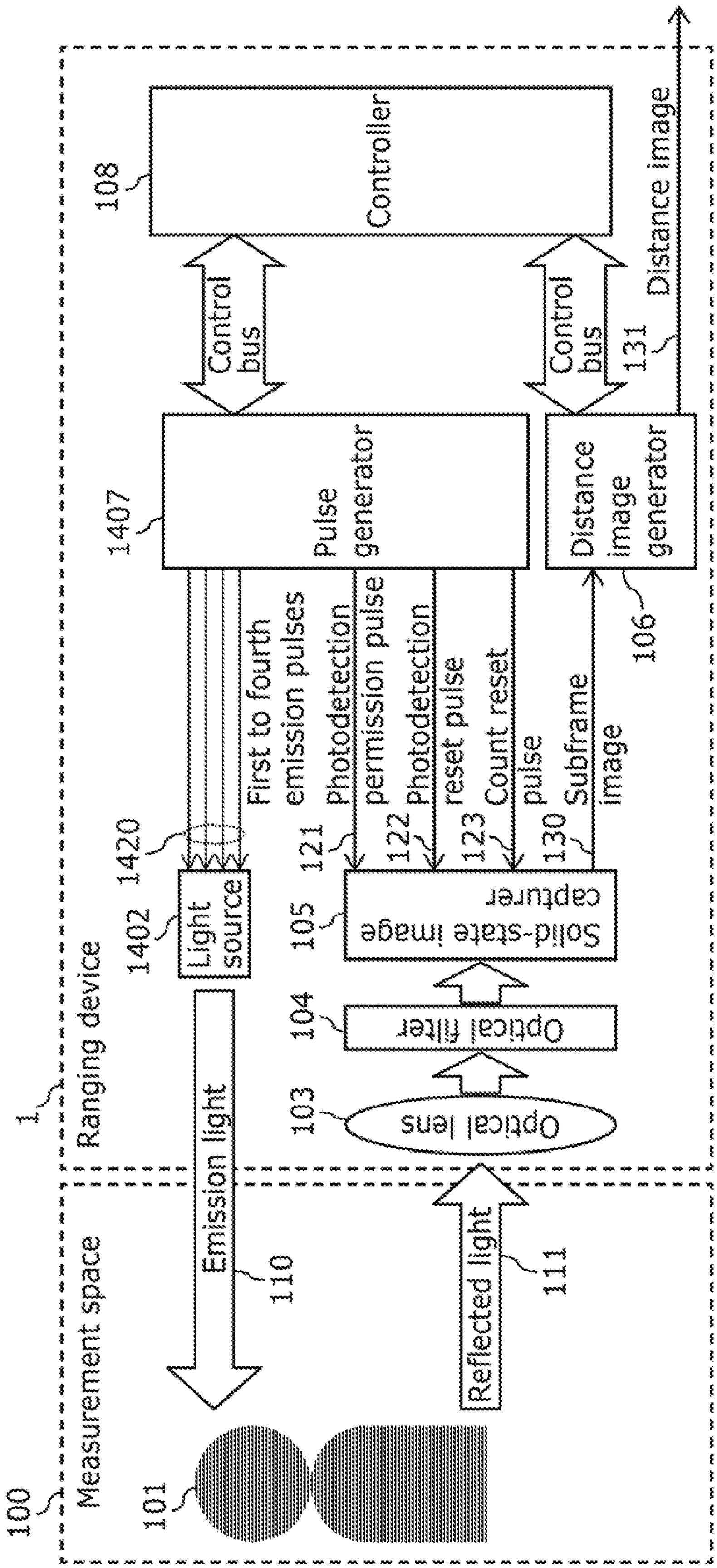
FIG. 65 is a block diagram schematically illustrating an example of a configuration a ranging device and a surrounding object according to Embodiment 8.

FIG. 65 is a block diagram schematically illustrating an example of a configuration of a time of flight (TOF) ranging device and a surrounding object according to the present embodiment. FIG. 65 differs from FIG. 52 mainly in regard to the inclusion of light source 1402 and pulse generator 1407 instead of light source 102 and pulse generator 107. The following description will focus on this point of difference.

[2.2 Configuration and Operation of Light Source]

Figure 66:
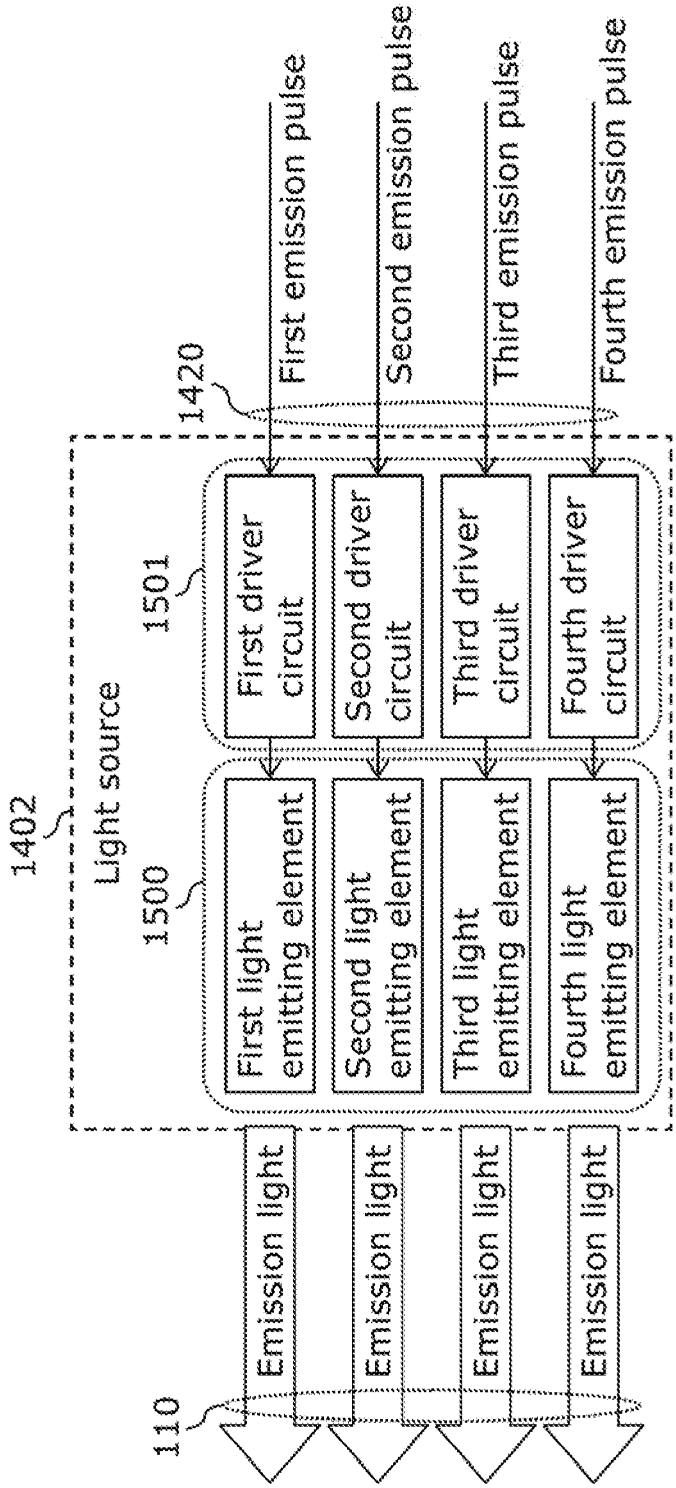
FIG. 66 is a block diagram illustrating an example of a configuration of a light source according to Embodiment 8.

FIG. 66 is a block diagram illustrating an example of a configuration of light source 1402 according to Embodiment 8. Light source 1402 includes first to fourth light emitting elements 1500 and first to fourth driver circuits 1501, as illustrated in FIG. 66. By applying a voltage from the first to fourth driver circuits 1501 to the first to fourth light emitting elements 1400 during the period when the input first to fourth emission pulses 1420 are high, each of the first to fourth light emitting elements 1400 individually emits pulsed light of 940 nm wavelength. Although a vertical cavity surface emitting laser (VCSEL) is used for the first to fourth light emitting elements 1400, other light emitting elements such as infrared LEDs may be used.

[2.3 Configuration of Pulse Generator]

FIG. 67 illustrates an example of emission tables according to Embodiment 8. FIG. 67 differs from (a) in FIG. 59 in that the emission count is increased by up to a factor of four. Pulse generator 1407, like pulse generator 107 illustrated in FIG. 57, includes table register 604 that temporarily stores any one of the first to sixth emission tables illustrated in FIG. 67.

[2.4 Operations: Overall]

Hereinafter, just like in Embodiment 7, an operation sequence of the ranging device according to the present embodiment will be described with reference to FIG. 58. As illustrated in FIG. 58, first there is initial setting period 700, followed by first frame period 701 and second frame period 702, which are periods in which distance image 131 is output, and so on until $X^{th}$ frame period 703 (X is a natural number) in which the ranging device stops. This sequence sequentially repeats in this manner. First frame period 701 includes first subframe period 711 to sixth subframe period 716, and the same operations are performed in second frame period 702 and subsequent frame periods.

[2.5 Operations: Initial Setting]

In initial setting period 700, at timing 720, controller 108 generates the emission codes shown in (b) in FIG. 59 based on the first to sixth emission tables shown in FIG. 67, and also generates the independent codes and adjacent codes shown in (c) in FIG. 59, and stores them in code register 602 of distance image generator 106 via the control bus.

[2.6 Emission Tables, Independent and Adjacent Codes]

As illustrated in FIG. 67, the first to sixth emission tables store the emission counts of the first to fourth light emitting elements 1400 included in light source 1402 for each of the first to thirty-first measurement segments in each of the first to sixth subframe periods 711 to 716. For example, the value of the nineteenth measurement segment in first emission table is 246, which indicates that in first subframe period 711, first to fourth light emitting elements 1400 emit light a total of 246 times to detect reflected light 111 from the nineteenth measurement segment. Similarly, the value of the eighth measurement segment in sixth emission table is 73, which indicates that in sixth subframe period 716, first to fourth light emitting elements 1400 emit light a total of 73 times to detect reflected light 111 from the eighth measurement segment. The same procedure as in Embodiment 7 can be used to generate the emission codes shown in (b) of FIG. 59, the independent codes shown in (c) of FIG. 59, and the adjacent codes from the emission tables shown in FIG. 67.

[2.7 Operations: Subframe Periods]

Returning to FIG. 58, in first subframe period 711 to sixth subframe period 716, controller 108 first selects one of the first to the sixth emission tables at timing 721 and holds the selected table in table register 604 of pulse generator 1407 via the control bus. For example, the first emission table is selected for first subframe period 711, the second emission table is selected for second subframe period 712, and the emission tables for the third and subsequent subframe periods are selected following the same rules. Next, at timing 722, pulse generator 1407 resets detection count voltage 408 held in solid-state image capturer 105 by setting count reset pulse 123 to high (i.e., photodetection count=0). Then, at timing 723, solid-state image capturer 105 performs the first to one-hundredth drives sequentially. In the first to one-hundredth drives, pulse generator 1407 determines output patterns of first to fourth emission pulses 1420 based on the emission tables held in table register 604.

[2.8 Operations: Emission Pulse Output]

Figure 68:
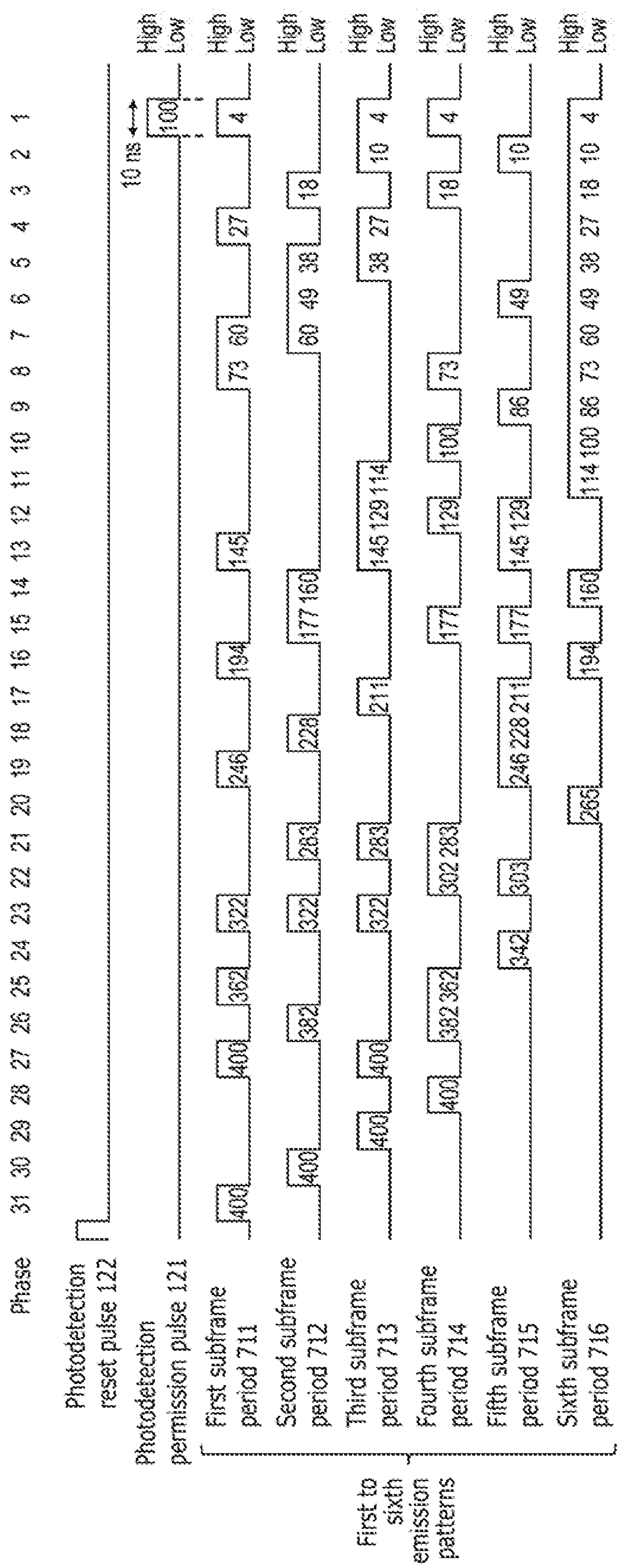
FIG. 68 illustrates an example of first to sixth emission patterns according to Embodiment 8.

Here, FIG. 68 illustrates the first to sixth emission patterns included in the output patterns of the first to fourth emission pulses 1420 in first subframe period 711 to sixth subframe period 716. As illustrated in FIG. 68, after resetting solid-state image capturer 105 to the state of "no photodetection" by setting photodetection reset pulse 122 to high, the output logic of the first to fourth emission pulses 1420 are determined in phases 1 to 31 in 10 ns units based on photodetection permission pulse 121. Phases 1 to 31 correspond to the first to thirty-first measurement segments, respectively. For example, when the first to fourth emission pulses 1420 are high output in phase 31 and emission light 110 is emitted from light source 1402, reflected light 111 is detected by solid-state image capturer 105 only when target object 101 is in the thirty-first measurement segment. When the first to fourth emission pulses 1420 are high output in phase 27 in addition to phase 31, reflected light 111 is detected by solid-state image capturer 105 when target object 101 is in the thirty-first measurement segment and the twenty-seventh measurement segment. Note that the numbers below each pulse in FIG. 68 indicate the number of times each pulse is set high in each phase. Photodetection permission pulse 121 is set to high once at phase 1 in each of the first to one-hundredth drives, thus totaling 100 times, and the same operation is repeated in each of first subframe period 711 to sixth subframe period 716 (in FIG. 68, photodetection permission pulse 121 in first subframe period 711 to sixth subframe period 716 is shown as a single pulse for simplicity). The number of high outputs of the first to fourth emission pulses 1420 is determined based on the first to sixth emission tables illustrated in FIG. 67. For example, the number of high outputs of the first emission pulse in phase 8 of first subframe period 711 is 73 according to the value of the eighth measurement segment of the first emission table illustrated in FIG. 67.

Figure 69:
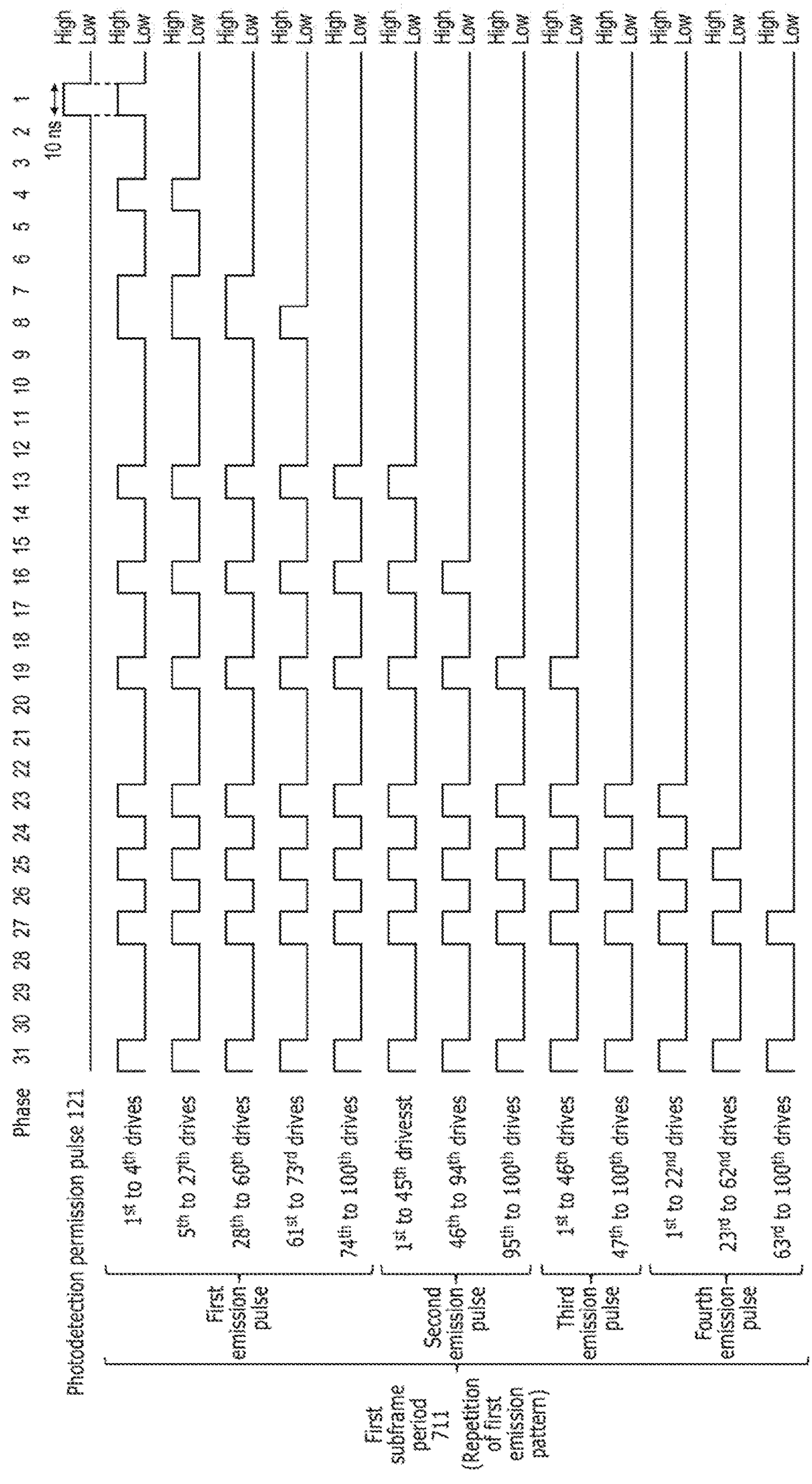
FIG. 69 illustrates an example of repeated driving according to a first emission pattern according to Embodiment 8.

Furthermore, the first emission pattern repeated 100 times, into which the output patterns of the first to fourth emission pulses 1420 are divided for the first to one-hundredth drives in first subframe period 711, are as illustrated in FIG. 69. Each first emission pattern is composed of the first to fourth emission pulses to control the amount of light. Hereinafter, the part of the first emission pattern that corresponds to the first emission pulse is referred to as the first subpattern. Similarly, the parts of the first emission pattern that correspond to the second to fourth emission pulses are respectively referred to as second to fourth subpatterns.

FIG. 69 illustrates an example of repeated driving according to a first emission pattern according to Embodiment 8. As illustrated in FIG. 69, photodetection permission pulse 121 repeats the same operation in each of the first to one-hundredth drive patterns (in FIG. 69, photodetection permission pulses 121 in the first to the one-hundredth drives are shown as a single line for simplicity).

The first subpattern of the first emission pattern has the same high output period as the first emission pattern of the first to fourth emission pulses 1420 in first subframe period 711 of FIG. 68 in the first to fourth drives, but the number of high outputs in phase 1 from FIG. 68 is four, so the high output in phase 1 is masked in the fifth to one-hundredth drives. In addition, since the number of high outputs in phase 4 from FIG. 68 is 27, the high output in phase 4 is additionally masked in the twenty-eighth to one-hundredth drives, and for the rest, the high output is masked following the same rule, whereby only phases 13, 16, 19, 23, 25, 27, and 31 in the seventy-fourth to one-hundredth drives have a high output.

Moreover, the first to forty-fifth drives of the second subpattern of the first emission pattern are the same as the seventy-fourth through one-hundredth first subpatterns, but the number of high outputs in phase 13 from FIG. 68 is 145 times, which is 45 times excluding the 100 high outputs in phase 13 of the first subpattern, so the high output in phase 13 is masked in the forty-sixth to one-hundredth drives. In addition, from FIG. 68, the number of high outputs in phase 16 is 194 times, which is 94 times excluding the 100 high outputs in phase 16 in the first subpattern, so the high output in phase 16 is additionally masked in the ninety-fifth to one-hundredth drives.

Moreover, the first to forty-sixth drives of the third subpattern of the first emission pattern are the same as the ninety-fifth through one-hundredth second subpatterns, but the number of high outputs in phase 19 from FIG. 68 is 246 times, which is 46 times excluding the 200 high outputs in phase 19 of the first and second subpatterns, so the high output in phase 19 is masked in the forty-seventh to one-hundredth drives.

Moreover, the first to twenty-second drives of the fourth subpattern of the first emission pattern are the same as the forty-seventh through one-hundredth third subpatterns, but the number of high outputs in phase 23 from FIG. 68 is 322 times, which is 22 times excluding the 300 high outputs in phase 23 of the first to third subpatterns, so the high output in phase 23 is masked in the twenty-third to one-hundredth drives. In addition, from FIG. 68, the number of high outputs in phase 25 is 362 times, which is 62 times excluding the 300 high outputs in phase 25 in the first to third subpatterns, so the high output in phase 25 is additionally masked in the sixty-third to one-hundredth drives.

The above operations illustrated in FIG. 69 satisfy the high output count of the first to fourth emission pulses 1420 in first subframe period 711 illustrated in FIG. 68. The method of assigning the number of high outputs of the first to fourth emission pulses 1420 is not limited to this. For example, the high output of phase 1, which is performed in the first to fourth drives, may be performed in the first, twenty-fifth, fiftieth, and one-hundredth drives in order to distribute it over the time axis. A rest period (a period during which no detection operation is performed) may be provided between each drive to prevent reflected light 111 caused by the first to fourth emission pulses 1420 in an earlier drive from being mistakenly detected in a later drive. In FIG. 69, the operations are shown with a focus on first subframe period 711, but the same rules apply to second subframe period 712 to sixth subframe period 716. With the above operations, in each of the first to sixth subframe periods, solid-state image capturer 105 holds detection count voltage 408 corresponding to reflected light 111 from a plurality of measurement segments, which is different for each pixel.

[2.9 Operations: Subframe Image Output, Distance Image Output]

Returning to FIG. 58, after completing the first to one-hundredth drives, using the same procedures as in Embodiment 7, solid-state image capturer 105 outputs subframe image 130 and distance image generator 106 generates and outputs distance image 131.

[2.10 Advantageous Effects, etc.]

By performing the same operation as described above for first frame period 701 for second frame period 702 and subsequent frame periods, distance image 131 can be sequentially output out of the ranging device as a moving image. In the present embodiment, the number of subframe images required to divide the distance to target object 101 into the first to thirty-first measurement segments and output the distance is 6, which is reduced to ⅕ or less compared to 31 (the same number as the number of measurement segments) in the conventional techniques disclosed in PTL 1. This makes it possible to increase the measurement time per subframe (i.e., the measurement accuracy) by a factor of five or more while maintaining the frame rate and the number of measurement segments. Moreover, the memory capacity for holding subframe images is ⅕ or less of that of conventional methods, and the required processing speed (i.e., computational resources) is also ⅕ or less. Alternatively, it is possible to increase the number of measurement segments (i.e., measurement accuracy) by a factor of five or more while maintaining the frame rate and measurement time per subframe. In this case, too, the memory capacity for holding subframe images and the required processing speed are the same as that of conventional methods.

In addition, including the first to fourth light emitting elements 1400 provides four times the degree of freedom in controlling the emission count compared to Embodiment 7. As illustrated in (a) in FIG. 59 and in FIG. 67, for example, it is possible to increase the ratio of the emission count between the first measurement segment (near) and the thirty-first measurement segment (far) to four times that of Embodiment 7 while maintaining the emission code. This makes it easier to avoid both saturation of near pixel values and blackout of far pixel values.

Therefore, the present embodiment can achieve both frame rate and measurement accuracy (number of measurement segments and measurement time) without increasing memory capacity and computational resources, and is a very reasonable method for realizing a high speed and high accuracy ranging device from short to long distances at a low cost.

As described above, in the ranging device according to Embodiment 8, for the first to $m^{th}$ measurement segments, light source 102 increases the amount of emission light to a greater degree the greater the distance of the measurement segment is.

This makes it possible to control the amount of light according to the distances of the measurement segments. For example, it is easy to both avoid saturation of pixel values corresponding to close measurement segments and avoid blacking out of pixel values corresponding to far measurement segments.

Here, the amount of emission light may be increased in two or more steps, for example.

Embodiment 9

The present embodiment describes an example of using an emission pattern that emits one instance of light prior to one instance of the output of the photodetection permission pulse.

Stated differently, Embodiment 9 generates first to $n^{th}$ emission pattern groups corresponding to the first to $n^{th}$ subframe images as emission patterns, and each of the first to $n^{th}$ emission pattern groups includes emission patterns indicating one instance of an emission pulse with mutually different output timings. Pulse generator 107 selects one of the first to $n^{th}$ emission pattern groups and outputs one instance of the photodetection permission pulse for each emission pattern included in the selected emission pattern group.

Note that the first emission pattern group is a set of emission patterns that can be created by dividing the first emission pattern in Embodiment 7 into emission patterns indicating a single emission pulse with mutually different output timings. The same applies to the second to $n^{th}$ emission patterns.

[3.1 Configuration of Ranging Device]

The time of flight (TOF) ranging device and surrounding object according to the present embodiment are the same as described in Embodiment 7 and illustrated in FIG. 52. However, light emitting element 200 of light source 102 will be described for an example where the minimum emission interval is limited to 1 μs due to system constraints such as power consumption and heat generation, which are more realistic issues.

[3.2 Operations: Overall]

Hereinafter, just like in Embodiment 7, an operation sequence of the ranging device according to the present embodiment will be described with reference to FIG. 58. As illustrated in FIG. 58, first there is initial setting period 700, followed by first frame period 701 and second frame period 702, which are periods in which distance image 131 is output, and so on until $X^{th}$ frame period 703 (X is a natural number) in which the ranging device stops. This sequence sequentially repeats in this manner. First frame period 701 includes first subframe period 711 to sixth subframe period 716, and the same operations are performed in second frame period 702 and subsequent frame periods.

[3.3 Operations: Initial Setting]

In initial setting period 700, at timing 720, controller 108 generates the light emission codes shown in (b) in FIG. 59 based on the first to sixth light emission tables shown in FIG. 70, and also generates the independent codes and adjacent codes shown in (c) in FIG. 59, and stores them in code register 602 of distance image generator 106 via the control bus.

[3.4 Light Emission Tables, Independent and Adjacent Codes]

As illustrated in FIG. 70, the first to sixth emission tables store the emission count of light emitting element 200 included in light source 102 for each of the first to thirty-first measurement segments in each of the first to sixth subframe periods 711 to 716, and the same procedures as in Embodiment 7 can be used to generate the emission codes shown in (b) of FIG. 59 and the independent and adjacent codes shown in (c) of FIG. 59.

Figure 71:
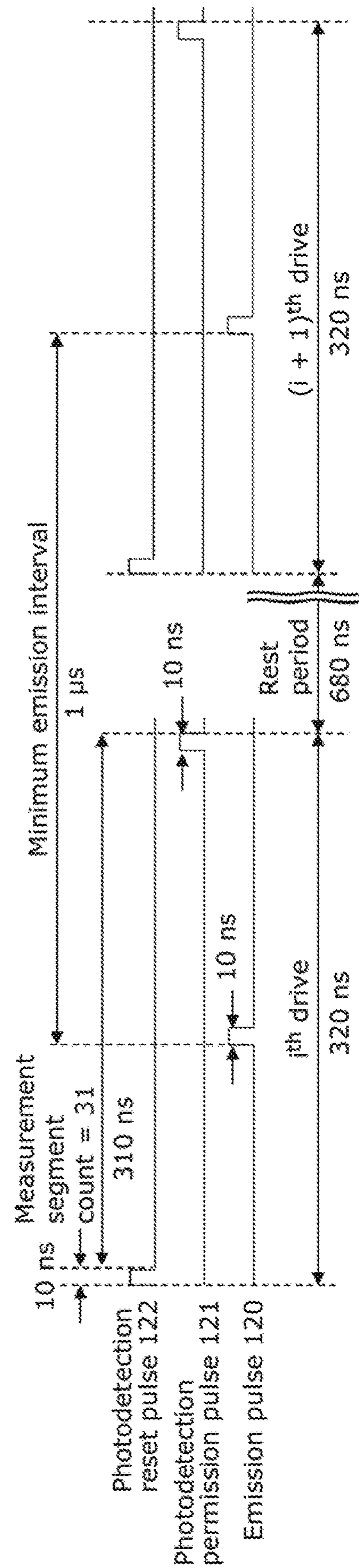
FIG. 71 is a time chart that includes an example of a rest segment in a drive timing of a light emitting element according to Embodiment 9.

FIG. 71 is a time chart that includes an example of the minimum emission interval and the rest segment in the drive timing of the light emitting element according to Embodiment 9. Since the minimum emission interval of light emitting element 200 is 1 μs, assuming 10 ns per measurement segment as illustrated in FIG. 71, 31 (number of measurement segments)×10 ns+10 ns (high output period of photodetection reset pulse)=320 ns is assigned to each of the first to one-hundredth drives, and the remaining 680 ns is allocated to the rest period between each drive.

Therefore, since light emitting element 200 can emit light only once in each of the first to one-hundredth drives, the first to sixth emission tables are designed so that the total emission count of each of the first to sixth emission tables is 100, as illustrated in FIG. 70.

[3.5 Operations: Subframe Periods]

Returning to FIG. 58, in the first to sixth subframe periods 711 to 716, just like in Embodiment 7, the emission table is selected at timing 721, detection count voltage 408 is reset at timing 722, and solid-state image capturer 105 sequentially performs the first to one-hundredth drives at timing 723. In the first to one-hundredth drives, pulse generator 107 determines a corresponding emission pattern from among the first to sixth emission patterns of emission pulse 120 based on the emission tables held in table register 604.

[3.6 Operations: Emission Pulse Output]

Figure 72:
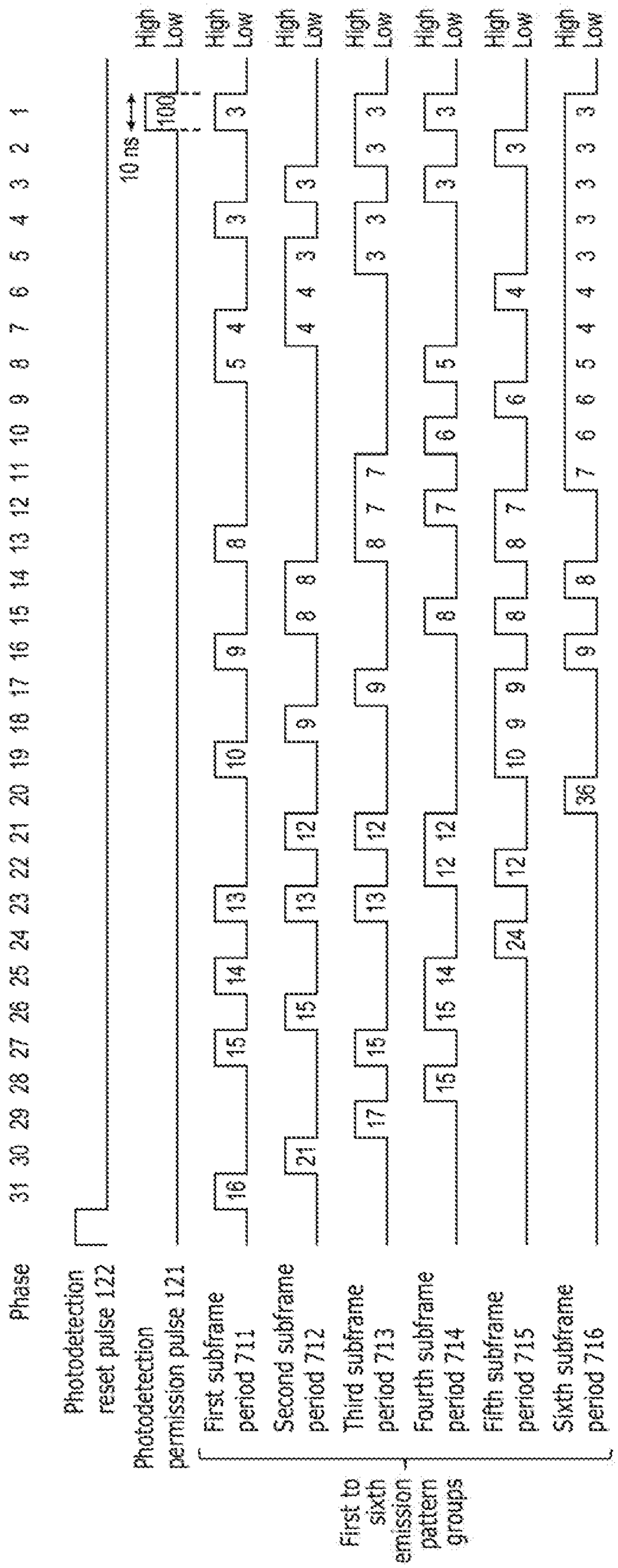
FIG. 72 illustrates an example of first to sixth emission pattern groups according to Embodiment 9.

Here, FIG. 72 illustrates the first to sixth emission pattern groups included in the output patterns of emission pulse 120 in first subframe period 711 to sixth subframe period 716. As illustrated in FIG. 72, after resetting solid-state image capturer 105 to the state of "no photodetection" by setting photodetection reset pulse 122 to high, the output logic of emission pulse 120 is determined in phases 1 to 31 in 10 ns units based on photodetection permission pulse 121. Phases 1 to 31 correspond to the first to thirty-first measurement segments, respectively. For example, when emission pulse 120 is high output in phase 31 and emission light 110 is emitted from light source 102, reflected light 111 is detected by solid-state image capturer 105 only when target object 101 is in the thirty-first measurement segment. When emission pulse 120 is high output in phase 27 in addition to phase 31, reflected light 111 is detected by solid-state image capturer 105 when target object 101 is in the thirty-first measurement segment and the twenty-seventh measurement segment. Note that the numbers below each pulse in FIG. 72 indicate the number of times each pulse is set high in each phase. Photodetection permission pulse 121 is set to high once at phase 1 in each of the first to one-hundredth drives, thus totaling 100 times, and the same operation is repeated in each of first subframe period 711 to sixth subframe period 716 (in FIG. 72, photodetection permission pulse 121 in first subframe period 711 to sixth subframe period 716 is shown as a single pulse for simplicity). The number of high outputs of emission pulse 120 is determined based on the first to sixth emission tables illustrated in FIG. 70. For example, the number of high outputs of the first emission pulse in phase 8 of first subframe period 711 is 5 according to the value of the eighth measurement segment of the first emission table illustrated in FIG. 70.

Figure 73:
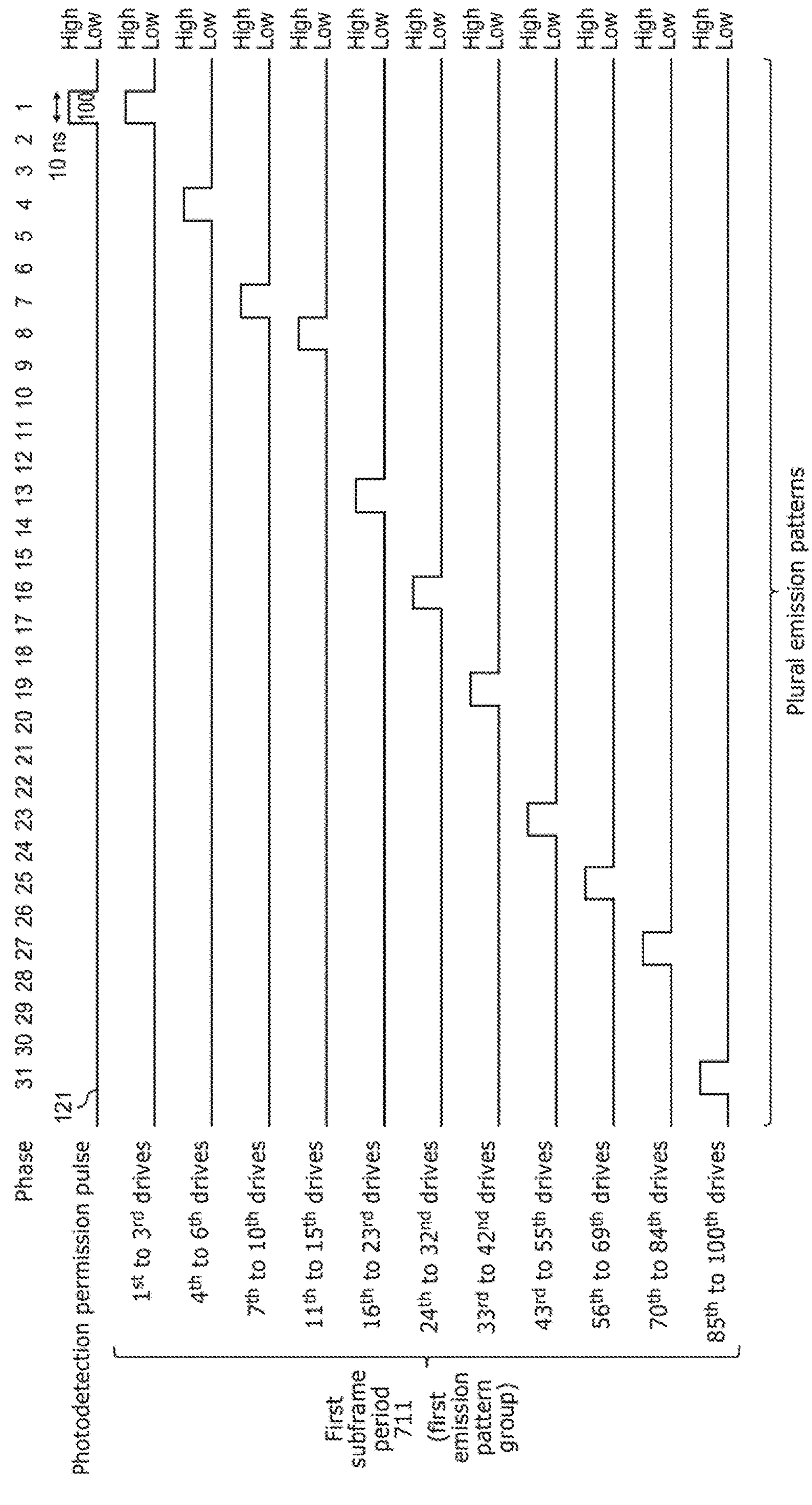
FIG. 73 illustrates an example of drives of a plurality of emission patterns into which a first emission pattern group is divided according to Embodiment 9.

Furthermore, the first emission pattern group of emission pulse 120 in first subframe period 711 can be divided for each of the first to one-hundredth drives as illustrated in FIG. 73. FIG. 73 illustrates an example of drives of a plurality of emission patterns into which the first emission pattern is divided according to Embodiment 9. As illustrated in FIG. 73, photodetection permission pulse 121 repeats the same operation in each of the first to one-hundredth drive patterns (in FIG. 73, photodetection permission pulses 121 in the first to the one-hundredth drives are shown as a single line for simplicity). The first emission pattern group outputs emission pulse 120 is high output only three times in phase 1 in first subframe period 711 illustrated in FIG. 72 in the first to third drives. Next, in the fourth to sixth drives, emission pulse 120 is high output only three times in phase 4. The same rules are followed thereafter so that emission pulse 120 is high output only in one phase in each drive.

The above operations illustrated in FIG. 73 satisfy the high output count of emission pulse 120 in first subframe period 711 illustrated in FIG. 72. The method of assigning the high output of emission pulse 120 is not limited to this. For example, the high output of phase 1 performed in the first to third drives may be replaced with the high output of phase 4 performed in the fourth through sixth drives. In FIG. 73, the operations are shown with a focus on first subframe period 711, but the same rules apply to second subframe period 712 to sixth subframe period 716. With the above operations, in each of the first to sixth subframe periods, solid-state image capturer 105 holds detection count voltage 408 corresponding to reflected light 111 from a plurality of measurement segments, which is different for each pixel.

[3.7 Operations: Subframe Image Output, distance image Output]

Returning to FIG. 58, after completing the first to one-hundredth drives, using the same procedures as in Embodiment 7, solid-state image capturer 105 outputs subframe image 130 and distance image generator 106 generates and outputs distance image 131.

[3.8 Advantageous Effects, etc.]

By performing the same operation as described above for first frame period 701 for second frame period 702 and subsequent frame periods, distance image 131 can be sequentially output out of the ranging device as a moving image. In the present embodiment, since a light emitting element with a constraint on the minimum emission interval is used, as illustrated in FIG. 70, the emission count in the farthest measurement segment of each subframe period is limited to 15 to 36 times, which is 1/6.6 to 1/2.7 times less than the 100 times in (a) in FIG. 59 according to Embodiment 7. However, the number of subframe images required to divide the distance to target object 101 into the first to thirty-first measurement segments and output them is 6, which is reduced to ⅕ or less compared to 31 (the same number as the number of measurement segments) in the conventional techniques disclosed in PTL 1. Therefore, the measurement time per subframe can be increased by a factor of five or more while maintaining the frame rate and the number of measurement segments, and the effective measurement time is 5/6.6 to 5/2.7 of the conventional techniques, so the decrease in measurement accuracy is minor. In spite of this, the memory capacity for holding subframe images is ⅕ or less of that of conventional methods, and the required processing speed (i.e., computational resources) is also ⅕ or less. Therefore, the present embodiment can achieve both frame rate and measurement accuracy (number of measurement segments and measurement time) without increasing memory capacity and computational resources, and is a very reasonable method for realizing a high speed and high accuracy ranging device with a high degree of freedom in selecting light emitting elements at a low cost.

As described above, in the ranging device according to Embodiment 9, the plurality of emission patterns include first to $n^{th}$ emission pattern groups corresponding to the first to $n^{th}$ subframe images, each of the first to $n^{th}$ emission pattern groups includes emission patterns indicating one instance of an emission pulse with mutually different output timings, and pulse generator 107 selects one of the first to $n^{th}$ emission pattern groups and outputs one instance of the photodetection permission pulse for each emission pattern included in the selected emission pattern group.

This makes it possible to measure the distances of m measurement segments, which is greater than n, from n subframe images. This is because the first to $n^{th}$ emission pattern groups (and also the first to $n^{th}$ subframe images) are can be used to accommodate approximately 2 to the $(n-1)^{th}$ power of measurement segments. Stated differently, the number of measurement segments, m, is greater than n, and can be approximately 2 to the $(n-1)^{th}$ power or less.

Here, light source 102 may include one or more light emitting elements, controller 108 may include first to $n^{th}$ emission tables corresponding to the first to $n^{th}$ subframe images, the first to $n^{th}$ emission tables may store, for each of the first to $m^{th}$ measurement segments, a total emission count of the one or more light emitting elements, and controller 108 may determine the emission patterns to be included in the first to $n^{th}$ emission pattern groups based on the first to $n^{th}$ emission tables.

This makes it possible to easily determine the first to $n^{th}$ emission pattern groups and the plurality of emission patterns in each of the first to $n^{th}$ emission pattern groups by preparing n emission tables in advance.

Embodiment 10

[4.1 Configuration of Ranging Device]

The time of flight (TOF) ranging device and surrounding object according to the present embodiment are the same as described in Embodiment 1 and illustrated in FIG. 52. An example of a high accuracy calculation method in which distance image generator 106 further divides the distance to target object 101 into 16 measurement segments will be given.

[4.2 Operations: Overall]

Hereinafter, just like in Embodiment 7, an operation sequence of the ranging device according to the present embodiment will be described with reference to FIG. 58. As illustrated in FIG. 58, first there is initial setting period 700, followed by first frame period 701 and second frame period 702, which are periods in which distance image 131 is output, and so on until $X^{th}$ frame period 703 (X is a natural number) in which the ranging device stops. This sequence sequentially repeats in this manner. First frame period 701 includes first subframe period 711 to sixth subframe period 716, and the same operations are performed in second frame period 702 and subsequent frame periods.

[4.3 Operations: Initial Setting]

In initial setting period 700, just like in Embodiment 7, at timing 720, controller 108 generates the emission codes shown in (b) in FIG. 59 based on the first to sixth emission tables shown in (a) in FIG. 59, and also generates the independent codes and adjacent codes shown in (c) in FIG. 59, and stores them in code register 602 of distance image generator 106 via the control bus.

[4.4 Operations: Subframe Periods]

Next, in the first to sixth subframe periods 711 to 716, just like in Embodiment 7, the emission table is selected at timing 721, detection count voltage 408 is reset at timing 722, and solid-state image capturer 105 sequentially performs the first to one-hundredth drives at timing 723. In the first to one-hundredth drives, pulse generator 107 determines an emission pattern based on the emission tables held in table register 604. Note that the emission pattern is as illustrated in FIG. 60 and FIG. 61, just as in Embodiment 7.

[4.5 Operations: Subframe Image Output]

After completing the first to one-hundredth drives, at timing 724, detection count voltage 408 of each pixel is read out row by row as pixel output signal 302 from solid-state image capturer 105, and A/D conversion is performed to output it as subframe image 130. Distance image generator 106 holds subframe image 130 in image memory 603 as one of the first to sixth subframe images (the first subframe image for the first subframe period, the second subframe image for the second subframe period, and so on). After repeating the above operations and completing up to sixth subframe period 716, at timing 725, distance image generator 106 generates and outputs distance image 131 based on the first to sixth subframe images and the independent and adjacent codes held in code register 602.

[4.6 Operations: Distance Image Output]

Figure 74:
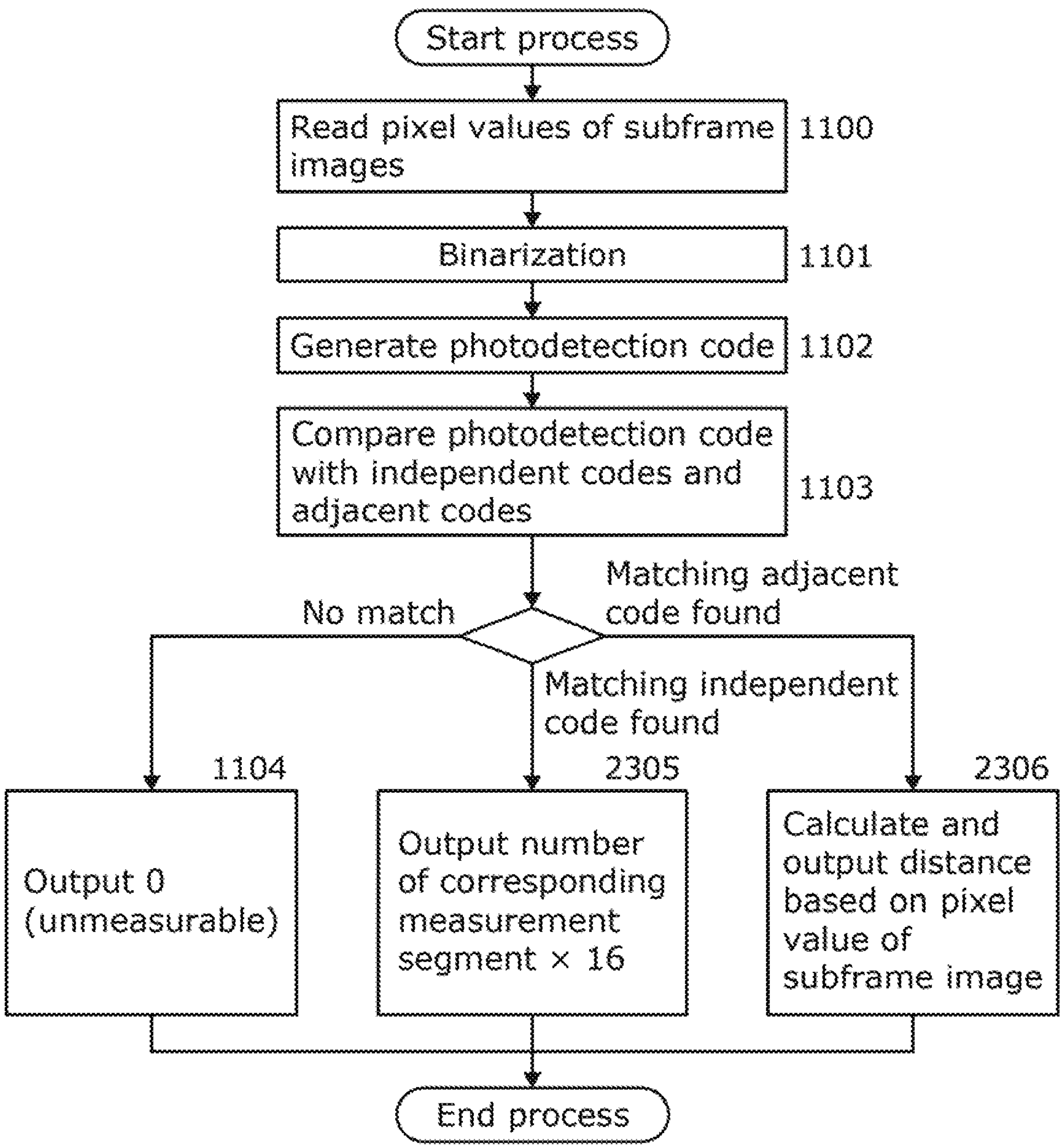
FIG. 74 is a flowchart illustrating an example of a process for generating a distance image according to Embodiment 10.

FIG. 74 is a flowchart illustrating an example of a process for generating a distance image according to Embodiment 10. FIG. 74 illustrates an example of a process for generating a distance image at each pixel of distance image 131 by distance image generator 106 according to the present embodiment. As in FIG. 62 in Embodiment 7, the photodetection code is generated from step 1100 to step 1102, and the photodetection code is compared with the independent and adjacent codes in step 1103. If the photodetection code does not match any of the independent or adjacent codes, 0 is output as unmeasurable in step 1104. On the other hand, if the photodetection code matches an independent code, the corresponding measurement segment number×16 is output in step 2305, and if the photodetection code matches an adjacent code, distance is calculated based on the pixel value of the subframe image and output in step 2306.

Figure 75:
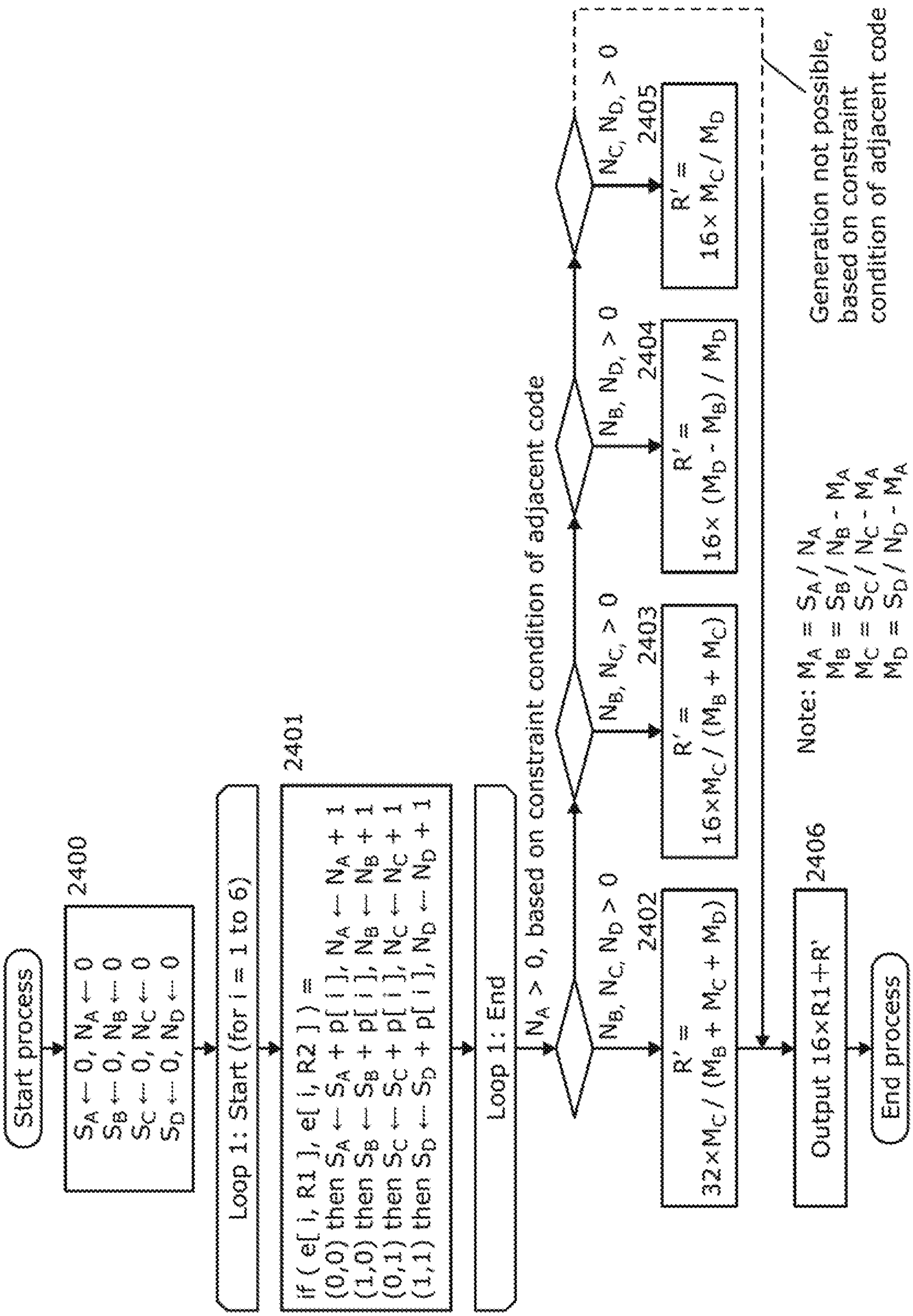
FIG. 75 is a flowchart illustrating an example of the distance calculation process in FIG. 74.

FIG. 75 is a flowchart illustrating an example of the distance calculation process in step 2306 in FIG. 74. Here, p[i] is the pixel value of the $i^{th}$ subframe image, R1 and R2 are the two measurement segments corresponding to the adjacent codes that match the photodetection code, and e[i, R1] and e[i, R2] are the $i^{th}$ emission codes in measurement segments R1 and R2. Among pixel values p[i], a signal resulting from accumulating pixel values for which reflected light 111 was not detected in both R1 and R2 (only background light is included) is defined as SA, a signal resulting from accumulating pixel values for which reflected light 111 was detected only in R1 is defined as SB, a signal resulting from accumulating pixel values for which reflected light 111 was only detected in R2 is defined as SC, a signal resulting from accumulating pixel values for which reflected light 111 was detected in either of R1 or R2 is defined as SD, and the cumulated numbers of signals SA, SB, SC, ad SD are defined as NA, NB, NC, and ND, respectively. First, in step 2400, signals SA, SB, SC, SD and NA, NB, NC, ND are initialized to 0.

Next, in step 2401, the accumulation of p[i] is performed on SA when the combination (e[i, R1], e[i, R2]) is (0, 0), on SB when the combination is (1, 0), on SC when the combination is (0, 1), and on SD when the combination is (1, 1). Also, 1 is accumulated for NA, NB, NC, and ND under the same conditions. By repeating step 2401 for i=1 to 6, the pixel values of the first to sixth subframe images are assigned to signals SA, SB, SC, and SD.

As in Embodiment 7, since the emission table is designed so that at least one bit of the adjacent code is 0, at least one of i=1 to 6 will be (e[i, R1], e[i, R2])=(0, 0), so NA>0 without fail.

Next, distance R' between measurement segments R1 and R2 is calculated using different formulas in steps 2402 to 2405 depending on the values of NB, NC, and ND.

Since R' is proportional to the amount of reflected light 111 detected at R2/(the amount of reflected light 111 detected at R1 and R2), when NC, ND>0, as illustrated in step 2405, MC=SC/NC—MA is used in the numerator and MD=SD/ND—MA is used in the denominator. The division by NC and ND is for normalization, and the subtraction of MA=SA/NA is to remove the background light. The reason why the numerator is multiplied by a factor of 16 is to make sure that the result of the division takes a value from 0 to 15 when it is converted to an integer.

Similarly, MC=SC/NC—MA is used in the numerator in steps 2402 and 2403 as well, and MD=SD/ND—MA is used in the denominator in step 2404 as well.

On the other hand, if either NC or ND is zero, MD—MB is used in the numerator as illustrated in step 2404, or MB+MC is used in the denominator as illustrated in step 2403 (however, MB=SB/NB—SA/NA).

When NB, NC, ND>0, the denominator is MB+MC+MD as illustrated in step 2402 to improve S/N by increasing the amount of signal, but it is possible to use only MD as well. In the former case, the denominator is twice as large as in steps 2403 to 2405, so the coefficient in numerator should be 32. As in Embodiment 7, the emission table is designed so that there is no overlap between independent and adjacent codes, which means that neither NC nor ND is ever set to 0.

Finally, in step 2406, the value obtained by adding R' to R1 multiplied by 16 is output as the distance.

As illustrated in the following example, if the first to sixth subframe images p[i=1 to 6] at a given pixel are [10, 1, 9, 9, 9, 8, 1], the photodetection code binarized with an average value of 6 (rounded down to the nearest bit) is [1, 0, 1, 1, 1, 0], which is 29 if the tail is taken as the most significant bit, which coincides with the adjacent code spanning across measurement segments 12 and 13 in (c) in FIG. 59. In (b) in FIG. 59, since the second and sixth subframe images are the ones where no reflected light 111 is detected in either of measurement segments 12 and 13 (emission code is 0), NA=2 and MA=(p[2]+p[6])/NA=(1+1)/2=1. Since subframe images for which reflected light 111 is detected only in measurement segment 12 is only the fourth subframe image, NB=1 and MB=p[4]=9. Moreover, since subframe images for which reflected light 111 is detected only in measurement segment 13 is only the first subframe image, NC=1 and MC=p[1]=10. Since the subframes images for which reflected light 111 is detected in both measurement segments 12 and 13 are the third and fifth subframe images, ND=2 and MD=(p[3]+p[5])/ND=(9+8)/2=8 (rounded down to the nearest whole number). Therefore, from NB, NC, ND>0, R'=32×MC/(MB+MC+MD)=32×10/(9+10+8)=11 (rounded down to the nearest whole number), resulting in the output of 16×R1+R'=16 12+11=203.

By performing the above processes illustrated in FIG. 74 and FIG. 75 for each pixel, distance image 131 can be generated from the first to sixth subframe images.

[4.7 Advantageous Effects, etc.]

By performing the same operation as described above for first frame period 701 for second frame period 702 and subsequent frame periods, distance image 131 can be sequentially output out of the ranging device as a moving image. In the present embodiment, the number of subframe images required to divide the distance to target object 101 into the first to thirty-first measurement segments and output the distance is 6, which is reduced to ⅕ or less compared to 31 (the same number as the number of measurement segments) in the conventional techniques. This makes it possible to increase the measurement time per subframe (i.e., the measurement accuracy) by a factor of five or more while maintaining the frame rate and the number of measurement segments. Moreover, the memory capacity for holding subframe images is ⅕ or less of that of conventional methods, and the required processing speed (i.e., computational resources) is also ⅕ or less. Alternatively, it is possible to increase the number of measurement segments by a factor of five or more while maintaining the frame rate and measurement time per subframe. In this case, too, the memory capacity for holding subframe images and the required processing speed are the same as that of conventional methods.

Furthermore, when the photodetection code matches an adjacent code, since the distance between the two measurement segments is divided into 16 parts and calculated based on the pixel values of the subframe image, it is possible to improve ranging accuracy by a factor of 16 compared to the normal mode in Embodiment 7.

Accordingly, the present embodiment can be said to be a very reasonable method for achieving both frame rate and measurement accuracy (number of measurement segments and measurement time) without increasing memory capacity and computational resources, thus realizing a high-speed and high-accuracy ranging device at a low cost.

As described above, in the ranging device according to Embodiment 10, when the photodetection code matches an adjacent code, distance image generator 106 classifies each pixel value of the first to $n^{th}$ subframe images into one of cases A to D based on the combination of each bit value of the independent codes for the two measurement segments R1 and R2 corresponding to the matching adjacent code, and calculates distance information for the subdivided region from measurement segment R1 to measurement segment R2, using the ratio of the signals in cases A to D. Here, case A corresponds to the case where there is no reflected light in measurement segment R1 and no reflected light in measurement segment R2, case B corresponds to the case where there is reflected light in measurement segment R1 and no reflected light in measurement segment R2, case C corresponds to the case where there is no reflected light in measurement segment R1 and is reflected light in measurement segment R2, and case D corresponds to the case where there is reflected light in measurement segment R1 and is reflected light in measurement segment R2.

With this, when the photodetection code matches an adjacent code, since the range of distance of the two measurement segments is further divided based on pixel values of the subframe image, it is possible to improve ranging accuracy.

Here, distance image generator 106 may consider the signal of case A as a background light component and subtract it from the signals of case B, case C, and case D before calculating the distance information.

This improves the accuracy of the distance information by removing the background light.

Embodiment 11

Adjacent codes in Embodiments 1 through 4 and 7 through 10 are defined as the bitwise logical OR of two independent codes corresponding to two adjacent unit segments, and the OR adjacent codes, i.e., first adjacent codes described in Embodiments 5 and 6 have the same definition. In contrast, Embodiment 11 describes AND adjacent codes, i.e., second adjacent codes defined as a bitwise logical AND of these two independent codes rather than these two adjacent code. The second adjacent codes, i.e., AND adjacent codes are described in Embodiments 5 and 6.

The configuration of the ranging device in the present embodiment is approximately the same as that of FIG. 52 and FIG. 57 described in Embodiment 7. However, the main differences are the use of AND adjacent codes instead of OR adjacent codes and the use of second exposure codes. The AND adjacent codes and the second exposure codes have already been described in Embodiments 5 and 6.

First, an example of the assignment of independent codes and second adjacent codes will be described.

FIG. 76 illustrates an example of the assignment of first to sixth emission codes and second adjacent codes according to Embodiment 11. The first to second emission codes correspond to packet 1 generation code to packet 6 generation code according to Embodiments 1 to 6.

FIG. 76 illustrates one example of emission codes as the six types of packet generation codes, independent codes, and second adjacent codes. The bits are assigned to the example of the first to sixth emission codes in FIG. 76 so that the number of bits "1" is greater than the number of bits "0".

Thus, assigning a large number of bits of "1" to the packet generation codes will firstly increase the total reflected wave signal amount. In other words, this makes it possible to improve sensitivity and the signal-to-noise ratio. Secondly, it will increase the number of bits of "1" in the AND adjacent codes. In other words, this is suited for the AND adjacent codes.

The ranging device according to the present embodiment mainly differs from Embodiment 5 in that exposure and emission are swapped. For example, "exposure" may be replaced with "emission" and "emission" may be replaced with "exposure" according to the packet generation codes.

Embodiment 12

Embodiment 12 describes an example of the configuration of a ranging device that uses both OR adjacent codes and AND adjacent codes with respect to Embodiment 11.

FIG. 77 illustrates an example of the assignment of packet generation codes, first adjacent codes, and second adjacent codes according to Embodiment 12.

FIG. 77 illustrates one example of first to sixth emission codes, independent codes, first adjacent codes, and second adjacent codes. The first adjacent codes are written in both binary notation and hexadecimal notation. The second adjacent codes are also written in both binary notation and hexadecimal notation.

The bits are assigned to the example of the first to sixth packet generation codes in FIG. 77 so that the number of bits "1" is greater than the number of bits "0". Thus, assigning a large number of bits of "1" to the packet generation codes will firstly increase the total reflected wave signal amount. In other words, this makes it possible to improve sensitivity and the signal-to-noise ratio. Secondly, it will increase the number of bits of "1" in the AND adjacent codes. In other words, this is suited for the AND adjacent codes.

The ranging device according to the present embodiment mainly differs from Embodiment 6 in that exposure and emission are swapped. For example, "exposure" may be replaced with "emission" and "emission" may be replaced with "exposure" according to the packet generation codes.

As described above, in the ranging device according to Embodiment 12, the controller: generates first to $n^{th}$ emission codes as the n types of packet generation codes by binarizing the first to $n^{th}$ emission tables; generates independent codes, each independent code being an n-bit binary number of n bits included in the first to $n^{th}$ emission codes per unit segment; and generates first adjacent codes by applying a logical OR operation between the independent codes corresponding to two adjacent unit segments. The distance calculator determines a first exposure code, the first exposure code being an n-bit binary number of n bits of the first to $n^{th}$ subframe images per pixel, and generates the distance information by comparing the first exposure code with the independent codes and the first adjacent codes.

Here, the controller may: generate first to $n^{th}$ emission codes as the n types of packet generation codes by binarizing the first to $n^{th}$ emission tables; generate independent codes, each independent code being an n-bit binary number of n bits included in the first to $n^{th}$ emission codes per unit segment; and generate second adjacent codes by applying a logical AND operation between the independent codes corresponding to two adjacent unit segments. The distance calculator may determine a second exposure code, the second exposure code being an n-bit binary number of n bits of the first to $n^{th}$ subframe images per pixel, and generate the distance information by comparing the second exposure code with the independent codes and the second adjacent codes.

Although one or more aspects of the ranging device have been described based on embodiments, the present disclosure is not limited to these embodiments. Various modifications of the above embodiments that may be conceived by those skilled in the art, as well as embodiments resulting from combinations of elements from different embodiments that do not depart from the essence of the present disclosure may be included in one or more aspects of the present disclosure.

INDUSTRIAL APPLICABILITY

The ranging device according to the present disclosure is useful for three-dimensional measurement of a person or a building or the like, because it can achieve three-dimensional measurement of a distant target object to be measured without being dependent on the surrounding environment.

The invention claimed is:

1. A ranging device comprising:

a pulse generator that generates an emission pulse instructing emission timing and an exposure pulse instructing exposure timing for receiving reflected light;

a controller that controls the pulse generator according to n types of packet generation codes indicating whether or not to expose or emit light in each of unit segments corresponding to distance segments into which a ranging range is divided, n being an integer greater than or equal to 4;

a light source that emits light according to the emission pulse;

a solid-state image capturer that captures an image according to the exposure pulse; and a distance calculator that calculates a distance based on n types of signal values obtained from the solid-state image capturer, the n types of signal values being per unit segment among the unit segments.

2. The ranging device according to claim 1, wherein the solid-state image capturer generates first to $n^{th}$ subframe images in one frame period based on the reflected light, the first to $n^{th}$ subframe images corresponding to the n types of packet generation codes, the distance calculator generates distance information for each pixel in a distance image based on the n types of signal values included in the first to $n^{th}$ subframe images, the distance information indicating a distance segment among the distance segments that corresponds to the reflected light, and the pulse generator generates one or more exposure pulses according to the n types of packet generation codes subsequent to one instance of the emission pulse, or generates one or more emission pulses according to the n types of packet generation codes prior to one instance of the exposure pulse.

3. The ranging device according to claim 1, wherein the n types of packet generation codes indicate n types of exposure patterns or n types of emission patterns in the unit segments, each of the n types of exposure patterns associates a plurality of exposure pulses with one emission pulse, each of the n types of emission patterns associates a plurality of emission pulses with one exposure pulse, the n types of exposure patterns differ from each other in at least one of a number of times of output or an output timing of the plurality of exposure pulses in the unit segments, and the n types of emission patterns differ from each other in at least one of a number of times of output or an output timing of the plurality of emission pulses in the unit segments.

4. The ranging device according to claim 3, wherein the controller sequentially selects one of the n types of packet generation codes and causes the pulse generator to generate the exposure pulse or the emission pulse according to the selected packet generation code.

5. The ranging device according to claim 1, wherein the controller generates n-bit binary numbers as independent codes, each n-bit binary number being n bits included in the n types of packet generation codes per unit segment among the unit segments, and the distance calculator:

binarizes the n types of signal values into an n-bit binary number using a first threshold value and determines the binarized n-bit binary number as a first exposure code; and compares the first exposure code with the independent codes and calculates a distance corresponding to the unit segment that matches.

6. The ranging device according to claim 5, wherein the controller generates n-bit first adjacent codes by applying a bitwise logical OR operation between two of the independent codes corresponding to two adjacent unit segments among the unit segments, and the distance calculator further compares the first exposure code with the first adjacent codes, and when there is a match, calculates an intermediate distance between two of the unit segments that correspond to the matching first adjacent code.

7. The ranging device according to claim 6, wherein each of the first adjacent codes is different from any other of the first adjacent codes.

8. The ranging device according to claim 5, wherein the controller generates n-bit second adjacent codes by applying a bitwise logical AND operation between two of the independent codes corresponding to two adjacent unit segments among the unit segments, and the distance calculator further:

binarizes the n types of signal values into an n-bit binary number using a second threshold value and determines the binarized n-bit binary number as a second exposure code; and compares the second exposure code with the second adjacent codes, and when there is a match, calculates an intermediate distance between two of the unit segments that correspond to the matching second adjacent code.

9. The ranging device according to claim 8, wherein each of the second adjacent codes is different from any other of the second adjacent codes.

10. The ranging device according to claim 6, wherein the controller generates n-bit second adjacent codes by applying a bitwise logical AND operation between two of the independent codes corresponding to two adjacent unit segments among the unit segments, and the distance calculator further:

binarizes the n types of signal values into an n-bit binary number using a second threshold value and determines the binarized n-bit binary number as a second exposure code; and compares the second exposure code with the second adjacent codes, and when there is a match, calculates an intermediate distance between two of the unit segments that correspond to the matching second adjacent code.

11. The ranging device according to claim 10, wherein the first threshold value is lower than the second threshold value.

12. The ranging device according to claim 5, wherein each of the independent codes is different from any other of the independent codes.

13. The ranging device according to claim 6, wherein the independent code corresponding to the unit segment where a timing of the emission pulse is equal to a timing of the exposure pulse is the same as any one of all of the independent codes and the first adjacent codes corresponding to the remaining unit segments.

14. The ranging device according to claim 8, wherein the independent code corresponding to the unit segment where a timing of the emission pulse is equal to a timing of the exposure pulse is the same as any one of all of the independent codes and the second adjacent codes corresponding to the remaining unit segments.

15. The ranging device according to claim 6, wherein the distance calculator:

when there is a match between the first exposure code and the first adjacent codes, classifies the n types of signal values based on a bitwise combination of the two independent codes corresponding to the matching first adjacent code; and using the classified signal values, calculates a distance within corresponding two adjacent unit segments.

16. The ranging device according to claim 8, wherein the distance calculator:

when there is a match between the second exposure code and the second adjacent codes, classifies the n types of signal values based on a bitwise combination of the two independent codes corresponding to the matching second adjacent code; and using the classified signal values, calculates a distance within corresponding two adjacent unit segments.

17. The ranging device according to claim 15, wherein the distance calculator:

classifies the n types of signal values based on the bitwise combination of the two independent codes into any one of the following four classifications:

classification A when one bit of the two independent codes is 0 and an other bit of the two independent codes is 0;

classification B when the one bit is 1 and the other bit is 0;

classification C when the one bit is 0 and the other bit is 1; and classification D when the one bit is 1 and the other bit is 1; and calculates a distance by further dividing the distance segments using signal values classified as at least two classifications from among classification B, classification C, and classification D.

18. The ranging device according to claim 17, wherein the distance calculator calculates a distance by using signal values classified as classification A to remove a background light component included in each of signal values classified as classification B, classification C, and classification D.

19. The ranging device according to claim 1, wherein the controller repeats control of the pulse generator according to the n types of packet generation codes a plurality of times, and the pulse generator includes a function for setting whether or not to mask a packet generation code among the n types of packet generation codes to prevent generation of the exposure pulse or the emission pulse per unit segment among the unit segments.

20. The ranging device according to claim 1, wherein the solid-state image capturer includes:

a photoelectric conversion pixel;

n signal charge accumulators that each accumulate a signal charge generated by the photoelectric conversion pixel, the n signal charge accumulators corresponding to the n types of packet generation codes; and a signal outputter that outputs the n types of signal values corresponding to the signal charges accumulated in the n signal charge accumulators.

21. The ranging device according to claim 1, wherein the solid-state image capturer includes:

a photoelectric conversion pixel;

a signal charge accumulator that accumulates a signal charge generated by the photoelectric conversion pixel; and a signal outputter that outputs a signal value corresponding to the signal charge accumulated in the signal charge accumulator.

22. The ranging device according to claim 2, wherein the light source includes one or more light emitting elements, the controller includes first to $n^{th}$ emission tables corresponding to the first to $n^{th}$ subframe images, the first to $n^{th}$ emission tables store, for each of the unit segments, a total emission count of the one or more light emitting elements, and the controller determines the n types of emission patterns as the n types of packet generation codes based on the first to $n^{th}$ emission tables.

23. The ranging device according to claim 2, wherein the n types of emission patterns include first to $n^{th}$ emission pattern groups corresponding to the first to $n^{th}$ subframe images, each of the first to $n^{th}$ emission pattern groups includes emission patterns indicating one instance of an emission pulse with mutually different output timings, and the pulse generator selects one of the first to $n^{th}$ emission pattern groups and outputs one instance of the exposure pulse for each emission pattern included in the selected emission pattern group.

24. The ranging device according to claim 23, wherein the light source includes one or more light emitting elements, the controller includes first to $nt^{h}$ emission tables corresponding to the first to $n^{th}$ subframe images, the first to $n^{th}$ emission tables store, for each of the unit segments, a total emission count of the one or more light emitting elements, and the controller determines emission patterns to be included in each of the first to $n^{th}$ emission pattern groups based on the first to $n^{th}$ emission tables.

25. The ranging device according to claim 22, wherein the controller:

generates first to $n^{th}$ emission codes as the n types of packet generation codes by binarizing the first to $n^{th}$ emission tables;

generates independent codes, each independent code being an n-bit binary number of n bits included in the first to $n^{th}$ emission codes per unit segment among the unit segments; and generates first adjacent codes by applying a logical OR operation between the independent codes corresponding to two adjacent unit segments among the unit segments, and the distance calculator:

determines a first exposure code, the first exposure code being an n-bit binary number of n bits of the first to $n^{th}$ subframe images per pixel; and generates the distance information by comparing the first exposure code with the independent codes and the first adjacent codes.

26. The ranging device according to claim 22, wherein the controller:

generates first to $n^{th}$ emission codes as the n types of packet generation codes by binarizing the first to $n^{th}$ emission tables;

generates independent codes, each independent code being an n-bit binary number of n bits included in the first to $n^{th}$ emission codes per unit segment among the unit segments; and generates second adjacent codes by applying a logical AND operation between the independent codes corresponding to two adjacent unit segments among the unit segments, and the distance calculator:

determines a second exposure code, the second exposure code being an n-bit binary number of n bits of the first to $n^{th}$ subframe images per pixel; and generates the distance information by comparing the second exposure code with the independent codes and the second adjacent codes.

27. The ranging device according to claim 24, wherein the one frame period includes first to $n^{th}$ subframe periods for generating the first to $n^{th}$ subframe images, and in an $i^{th}$ subframe period among the first to $n^{th}$ subframe periods, the pulse generator repeats, M times, a set of: an output of the emission pulse according to an $i^{th}$ emission pattern; and one instance of an output of the exposure pulse, i being an integer from 1 to n, M being integer greater than or equal to 2.

28. The ranging device according to claim 27, wherein in each of the first to $n^{th}$ subframe periods, the shorter a distance of a distance segment among the distance segments is, the more the controller decimates, to a number less than M, a total number of repetitions of the emission pulse in the unit segment corresponding to the distance segment.

29. The ranging device according to claim 22, wherein the farther a distance segment among the distance segments is, the greater the light source increases an amount of emission light in the unit segment corresponding to the distance segment.

30. A ranging method used in a ranging device including:

a pulse generator that generates an emission pulse instructing emission timing and an exposure pulse instructing exposure timing for receiving reflected light;

a controller that controls the pulse generator;

a light source that emits light according to the emission pulse;

a solid-state image capturer that captures an image according to the exposure pulse; and a distance calculator that calculates a distance based on signal values obtained from the solid-state image capturer, the ranging method comprising:

generating, by the pulse generator, an exposure pulse and an emission pulse according to n types of packet generation codes indicating whether or not to expose or emit light in each of unit segments corresponding to distance segments into which a ranging range is divided, n being an integer greater than or equal to 4;

obtaining n types of signal values obtained from the solid-state image capturer, the n types of signal values being per unit segment among the unit segments;

binarizing the n types of signal values into an n-bit binary number;

determining the binarized n-bit binary number as an exposure code;

generating n-bit binary numbers as independent codes, each n-bit binary number being n bits included in the n types of packet generation codes per unit segment among the unit segments; and comparing the exposure code with the independent codes and calculating a distance corresponding to the unit segment that matches, wherein each of the n types of packet generation codes instructs a plurality of exposure pulses for one emission pulse or a plurality of emission pulses for one exposure pulse.

* * * * *